US012784543B2

(12) United States Patent
Ellis et al.

(10) Patent No.: US 12,784,543 B2
(45) Date of Patent: Nov. 3, 2026

(54) CREDIT WAGERING SYSTEM AND METHOD OF USE WITH LOAN AND WARRANTYING

(71) Applicant: Our IP Holding, LLC, Las Vegas, NV (US)

(72) Inventors: Gary E. Ellis, Las Vegas, NV (US); Gary Larkin, Las Vegas, NV (US); Craig H. Macy, Reno, NV (US)

(73) Assignee: Our IP Holding, LLC, Las Vegas, NV (US)

( * ) Notice: Subject to any disclaimer, the term of this patent is extended or adjusted under 35 U.S.C. 154(b) by 7 days.

(21) Appl. No.: 18/386,436

(22) Filed: Nov. 2, 2023

(65) Prior Publication Data

US 2024/0062623 A1 Feb. 22, 2024

Related U.S. Application Data

(60) Division of application No. 17/229,571, filed on Apr. 13, 2021, now abandoned, which is a division of application No. 17/023,179, filed on Sep. 16, 2020, now abandoned, which is a continuation-in-part of application No. 16/523,710, filed on Jul. 26, 2019, now abandoned.

(60) Provisional application No. 63/035,462, filed on Jun. 5, 2020, provisional application No. 62/901,148, filed on Sep. 16, 2019, provisional application No. 62/814,407, filed on Mar. 6, 2019, provisional application No. 62/711,356, filed on Jul. 27, 2018, provisional application No. 62/703,781, filed on Jul. 26, 2018.

(51) Int. Cl.
*G07F 17/32* (2006.01)
*G06Q 20/06* (2012.01)
*G06Q 50/34* (2012.01)

(52) U.S. Cl.
CPC ......... *G07F 17/3258* (2013.01); *G06Q 20/06* (2013.01); *G06Q 50/34* (2013.01)

(58) Field of Classification Search
CPC . G07F 17/3258; G07F 17/3244; G06Q 50/34; G06Q 20/06
See application file for complete search history.

(56) References Cited

U.S. PATENT DOCUMENTS

2003/0001335 A1* 1/2003 Vancura ................. G07F 17/32 273/138.1
2011/0065497 A1 3/2011 Patterson, Jr.
(Continued)

*Primary Examiner* — Kang Hu
(74) *Attorney, Agent, or Firm* — HOLLAND & HART LLP

(57) ABSTRACT

A system and method providing, in some embodiments, at least partially automated processing for warrantying, settling, requesting, approving, processing, advancing, collecting, and/or managing of credit provided for use in wager gaming and related activities, including, in some instances, one or more of loan transactions, loan warrantying services, operator receivable participation interest, receivable purchase associate with patron's repayment of the receivable, third-party provision of advances to an operator patron limited for use within the operator property or properties for designated gaming activities, associated fees, activity tracking, activity reporting, credit approval throttling, fund advancement throttling, credit account packaging and transfer, automated collections, and responsible wager gaming.

18 Claims, 101 Drawing Sheets

(56) References Cited

U.S. PATENT DOCUMENTS

| | | | |
|---|---|---|---|
| 2014/0094278 | A1 | 4/2014 | Abouchar et al. |
| 2014/0157381 | A1* | 6/2014 | Disraeli .............. H04L 63/0853 726/7 |
| 2015/0243133 | A1 | 8/2015 | Nicholas |
| 2018/0040200 | A1 | 2/2018 | Ellis |
| 2022/0138845 | A1 | 5/2022 | Shepherd et al. |
| 2022/0198873 | A1 | 6/2022 | Higgins et al. |

* cited by examiner

3800

3900

4000

5500

Figure 56
9:41
Back
Done
Email Address
john@smith.com

5600

5900

6500

| Player Club Status | FIRST CALCULATED CREDIT APPLICATION SCORE | | | | |
|---|---|---|---|---|---|
| | 800-850 (<=4%) | 740-799 (<=6%) | 670-739 (<=10%) | 550-669 (<=20%) | <550 (<=33%) |
| 12 + month (≥=Level3 ) | $1,000 | $1,000 | $750 | $500 | $250 |
| 6-12month (≥=Level3 ) | $1,000 | $750 | $500 | $500 | $250 |
| 6-12month (<=Level3 ) | $750 | $750 | $500 | $250 | $100 |
| 6-12month (<=Level3 ) | $500 | $500 | $500 | $100 | decline |
| <6mnths (<=level 3) | $500 | $500 | $250 | decline | decline |

Figure 94

Tier Two- Player Advance Limit Upgrade *(FICO -with -Bank DD)*

| Player Club | FICO Score | FIRST CALCULATED CREDIT APPLICATION SCORE | | | | |
|---|---|---|---|---|---|---|
| | | 800-850 (<=4%) | 740-799 (<=6%) | 670-739 (<=10%) | 550-669 (<=20%) | <550 (<=33%) |
| 12 + month (≥=Level3 ) | 800-850 (<=2.9%) | $3,000 | $3,000 | $2,000 | $1,000 | $500 |
| 6-12month (≥=Level3 ) | 740-799 (<=3.5%) | $3,000 | $3,000 | $2,000 | $1,000 | $500 |
| 6-12month (<=Level3 ) | 670-739 (<=6.3%) | $2,000 | $2,000 | $2,000 | $1,000 | $500 |
| 6-12month (<=Level3 ) | 550-669 (<=16.4%) | $1,000 | $1,000 | $1,000 | $250 | decline |
| <6mnths (<=level 3) | <550 (<=28%) | $500 | $500 | $500 | decline | decline |

Figure 95

Tier Three · Player Advance Limit Upgrade *(FICO -with -Bank DD)*

| Player Club | FICO Score | FIRST CALCULATED CREDIT APPLICATION SCORE | | | | |
|---|---|---|---|---|---|---|
| | | 800-850 (<=4%) | 740-799 (<=6%) | 670-739 (<=10%) | 550-669 (<=20%) | <550 (<=33%) |
| 12 + month (<=Level3 ) | 800-850 (<=2.9%) | $5,000 | $5,000 | $3,000 | $1,500 | $1,000 |
| 6-12month (<=Level3 ) | 740-799 (<=3.5%) | $5,000 | $5,000 | $3,000 | $1,500 | $1,000 |
| 6-12month (<=Level3 ) | 670-739 (<=6.3%) | $3,000 | $3,000 | $3,000 | $1,500 | $1,000 |
| 6-12month (<=Level3 ) | 550-669 (<=16.4%) | $1,500 | $1,500 | $1,500 | $250 | decline |
| <6mnths (<=level 3) | <550 (<=28%) | $1,000 | $1,000 | $1,000 | decline | decline |

Figure 96

Tier Four · Player Advance Limit Upgrade *(FICO -with -Bank DD)*

| Player Club | FICO Score | FIRST CALCULATED CREDIT APPLICATION SCORE | | | | |
|---|---|---|---|---|---|---|
| | | 800-850 (<=4%) | 740-799 (<=6%) | 670-739 (<=10%) | 550-669 (<=20%) | <550 (<=33%) |
| 12 + month (≥=Level3 ) | 800-850 (<=2.9%) | $10,000+ | $7,500 | $3,000 | decline | decline |
| 6-12month (≥=Level3 ) | 740-799 (<=3.5%) | $7,500 | $5,000 | $3,000 | decline | decline |
| 6-12month (≥=Level3 ) | 670-739 (<=6.3%) | $5,000 | $3,000 | $3,000 | decline | decline |
| 6-12month (≥=Level3 ) | 550-669 (<=16.4%) | $3,000 | $3,000 | $3,000 | decline | decline |
| <6mnths (≥=level 3) | <550 (<=28%) | decline | decline | decline | decline | decline |

Figure 97

CREDIT WAGERING SYSTEM AND METHOD OF USE WITH LOAN AND WARRANTYING

CROSS-REFERENCE TO RELATED APPLICATIONS

This application is a divisional of applicant's prior U.S. patent application Ser. No. 17/229,571, entitled "Credit Wagering System And Method Of Use With Loan And Warrantying" filed Apr. 13, 2021, which is a divisional of U.S. patent application Ser. No. 17/023,179 entitled "Credit Wagering System And Method Of Use With Loan And Warrantying" filed Sep. 16, 2020, which claims priority through applicant's prior U.S. patent application Ser. No. 16/523,710 entitled "Wager Credit Management System And Method Of Use" filed Jul. 26, 2019, which claims priority through the applicant's prior provisional patent applications as follows:

1. Credit Wagering System With Loan And Factoring And Method Of Use, Application Ser. No. 62/703,781, filed Jul. 26, 2018;
2. Credit Wagering System With Loan And Factoring And Method Of Use, Application Ser. No. 62/711,356, filed Jul. 27, 2018; and
3. Credit Wagering System With Loan And Factoring And Method Of Use, Application Ser. No. 62/814,407, filed Mar. 6, 2019; all of which divisional, continuation-in-part, and provisional applications are hereby incorporated by reference in their entirety, provided that if any of these prior applications are in any way inconsistent with the present application (including without limitation any limiting aspects), the present application will prevail. The present application further claims priority through the applicant's additional prior provisional patent applications as follows:

1. Wagering Account Pooling System and Method of Use, Application Ser. No. 62/901,148, filed Sep. 16, 2019; and
2. Remote Wagering Credit Administration and Method of Use, Application Ser. No. 63/035,462, filed Jun. 5, 2020; both of which additional provisional applications are hereby incorporated by reference in their entirety, provided that if any of these prior applications are in any way inconsistent with the present application (including without limitation any limiting aspects), the present application will prevail.

COPYRIGHT

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

TECHNICAL FIELD

The technology of the present application relates to a credit wager system and method of use, and more particularly in varying embodiments to a credit wager system and method of use with loan and/or warrantying for the warrantying, settling, requesting, approving, processing, and/or managing of credit provided for use in wager gaming and related activities, including one or more of loan transactions, loan warrantying services, operator receivable participation interest, receivable purchase associate with patron's repayment of the receivable, third-party provision of advances to an operator patron limited for use within the operator property or properties for designated gaming activities, associated fees, activity tracking, activity reporting, credit approval throttling, fund advancement throttling, credit account packaging and transfer, automated collections, and responsible wager gaming.

CERTAIN ASPECTS OF THE BACKGROUND AND OF SOME OF APPLICANT'S INVENTIVE CONTRIBUTIONS

Traditionally, placing wagers on gaming devices has dominantly involved submitting tangible currency such as bills and coins at the time the wagers were placed. If a player had no cash or coins, the player had to stop playing, or otherwise temporarily leave the gaming area to obtain additional currency. Operator (which is defined herein to include any wager gaming operator or provider, including, but not limited to, physical casinos, card clubs, online gaming providers, mobile gaming providers, sports book operators, fantasy sports providers, and the like) credit such as cashing checks and issuing markers developed as ways for players to get cash, on credit, to continue playing. The problems with traditional operator credit have long been many.

For example, the player, once given the cash issued on credit, would have to physically take the money to the gaming device to play. This has allowed the player to take the cash and not use it to play at the gaming device. The player could simply pocket the cash and walk out of the casino. The casino has often born the risk, associated costs, or both of collecting, from the player, credit receivable obligations if the player failed to repay a marker, if the player's check bounced, or both. Further problems for casinos include delays associated with handling and managing traditional credit, such as cash flow shortages resulting from the period of time such credit remained uncollected.

At the same time, the prominent use of cash at one or more phases of the gaming process has also long presented significant problems. For example, the carrying of cash to and from the casino sometimes increases the occurrence of theft from players, which has resulted in one or more of reducing the quality of the casino experience for patrons, increasing costs to the casino for liability coverage and security, reducing the number and frequency of return player visits, and negatively impacting the reputation of the casino with respect to potential customer perception, community perception, or both. This had one or more of a revenue impact on the casino, a financial and psychological impact on players, and a negative impact on the ability of casinos to foster a positive community perception that might have assisted in helping to promote pro-casino local, state, and national laws and regulations, as well as pro-casino zoning decisions.

In addition, the absence of easily obtained wager credit has typically placed an added burden on players to procure and manage their cash carry. Players have had to first consider when and where to obtain cash, and also consider their potential stake for the relevant gaming period to avoid having to return to a cash provider. The cash carry also had had to be managed by the player while engaged in gaming, including the submitting of cash to devices, tables, or sports book, the retrieving of cash from devices, tables, or sports book, and the continued need to monitor cash not being played to avoid loss, such as by dropping bills or coins. This overhead sometimes resulted in a degraded player experience, along with an increase in player anxiety due to the amount of cash carried, the risk of losing a portion of the cash, or both.

For communities, the cash nature of the casino gaming environment has sometimes placed an increased burden on community services, such as the demands placed on law enforcement, the courts, and other social and health care service providers. For example, with the level of crime resulting, at least in part, from the presence of cash—often massive amounts—inside and outside the casino, the increased presence of police, both for crime prevention and for response to criminal activity, has often increased the overall cost of services, which often impacts both the burden on taxpayers as well as the availability of such resources to focus on other more pressing criminal activity. Similarly, courts and other social and health care services have been impacted, facing an increased caseload as the number of arrests have increased and other related consequences of crime, including diversion and consumption of casino resources, commensurately increase as well.

The absence of easy player access to wager credit and the resulting involvement of large quantities of cash in the traditional gaming experience also has long-burdened the casino operator. Casinos often had to handle and manage very large cash drops in order to ensure they could cash out players, which involved various labor costs, including, for example, costs associated with moving cash to and from the casino, as well as around the casino and among properties. A further disadvantage has long been the increased risk of casino theft, along with the resulting impact on the cost of security to prevent such theft, both during the transport of cash to and from the casino, as well as within the casino.

Consequently, casinos and card clubs have long been vulnerable to money laundering and other financial crimes because of the nature of these operations. These gaming institutions are fast-paced, cash-intensive businesses that often provide a broad array of financial products and services, some of which are similar to those provided by financial depository institutions and money services businesses. Moreover, gaming institutions serve a diverse and transient customer base about which they often have relatively little knowledge. And, players have often structured transactions to avoid certain reporting thresholds.

Country- and state-specific regulatory requirements also have directly impacted operator's ability to extend and the burden of managing credit. For example, in the U.S., casinos became subject to anti-money laundering regulations promulgated under the Bank Secrecy Act (BSA) in 1985. Federal law requires casinos to report currency transactions over certain threshold amounts, such as $10,000, conducted by, or on behalf of, one person, as well as multiple currency transactions that aggregate to over certain legislated threshold amounts in a single day. These transactions are reported on reports, such as, for example, a Currency Transaction Report by Casinos (CTRC) form. In addition, casinos are required to report suspicious transactions (or patterns of transactions) conducted or attempted by, at or through the gaming establishment. These laws were passed to safeguard against money laundering and other financial crimes. Historically, it was both labor intensive and systems intensive to track, retrieve, analyze, and report such transactions to the extent it was possible to do so reliably.

To comply with this U.S. law, operators must not only use all available information to detect and report the transactions themselves, but also obtain and include the personal identification information about the individual conducting the transaction such as a social security number, driver's license, or other government issued document, in the filed report. This burdensome requirement applies whether individuals conducting the transactions are wagering on behalf of themselves or someone else.

Historically, it also has been difficult for operators to detect suspicious activity and CTRC report triggering events. Even when such activity and events have been detected, it has been difficult and often manually intensive to collect evidence surrounding such events, collect the necessary player-related information, prepare the required reports, and file the required reports with the casino records-keeping system and with an applicable regulatory agency. Often such challenges have resulted in reports not being filed, which in certain cases resulted in significant legal and financial consequences for casinos failing to use all available information and file such reports.

For example, in the U.S., nearly half of the filings made by operators reported suspicious activities are characterized as "structuring" or "minimal" gaming. These activities involve chip, jackpot, and token redemptions that customers may have structured to avoid currency transaction reporting requirements. Under U.S. federal law it has long been a crime to break up transactions into smaller amounts for the purpose of evading the reporting requirement, and detection of this activity can lead to a required report from the operator to the government.

A structured transaction can include, for example, situations such as the following. The player opens a line of credit with the operator for $27,000. The player knows the operator will be required to file a Currency Transaction Report if the player makes a payment with over $10,000 in currency on a single day. To evade a Currency Transaction Report being filed, the player makes $9,000 payments on the line of credit over different gaming days. Tracking this type of activity to report it in compliance with regulatory requirements is often challenging and costly.

With the requirement of using all available information to detect and report, significant burdens were placed on systems not designed for such optimized data collection and analysis, which could result in increased and inefficient bandwidth usage, excessive data storage demands, wasteful proliferation of computing devices, unsynchronized data and data integrity issues, and the like.

The Applicant further believes it has discovered certain disadvantages and drawbacks of gaming even when implemented with credit lines as described above. Costs are incurred in association with determining whether to grant a credit line to a player; these costs may take the form of a fee for a credit report, the time and effort of operator employees to process credit applications, the time and effort involved in an on-the-spot decision by an employee to grant a credit line without an advance application, and even the expense of establishing and maintaining an electronic system that can make credit determinations without employee involvement. For these and other reasons, the operator often does not want to be in the business of evaluating, providing, and carrying massive credit or be involved in any way with efforts to obtain repayment, including to avoid unpleasantness between the casino and its customers. Operators are therefore often unwilling or unable to serve as a source of funds for players in connection with granting credit lines, particularly on a large scale as the number and type of players requesting credit lines increases, as has long been occurring in the wager gaming industry.

For many years, operator's also have faced increased pressure to foster, support, and enforce responsible gaming.

Many operators have taken proactive approaches in trying to address responsible gaming, which approaches have often proven to be costly, limited in their effectiveness, or both. For example, in many jurisdictions, both in the United States and abroad, such as in Australia, cash dispensing technologies such as automated teller machines are required to be located at a minimum distance from the gaming floor. Among other things, regulators hoped that, by requiring players to leave the gaming floor when in need of advancing funds, they would be less likely to engage in irresponsible gaming behavior, having to walk away from the gaming floor for some period of time. This approach to try to provide more responsible gaming has many disadvantages, including disrupting the responsible player's gaming experience, reducing cash velocity even when such reduction is not necessary or useful, requiring players to leave a particular machine to which they have a developed an affinity, and questionable efficacy, as the player is not prevented from returning and gambling irresponsibly. In addition, many approaches to encouraging and enforcing responsible gaming employ the personal involvement of casino personnel, which can be costly, subjective, embarrassing to the player, and inefficient.

With respect to the securing and administering credit for purposes of using such credit to place wagers in the context of gaming was traditionally a complex, inefficient, resource-intensive endeavor for one or more of the player, the operator, and the credit provider. Typically, placing wagers on gaming devices involved submitting tangible currency such as bills and coins at the time the wagers were placed. If a player had no cash or coins, the player had to stop playing, or otherwise temporarily leave the gaming area to obtain additional currency. Casino credit such as cashing checks and issuing markers developed as ways for players to get cash, on credit, to continue playing. The problems with casino credit were many.

The Applicant believes it has discovered certain disadvantages and drawbacks of cashless gaming even when implemented with credit lines as described above. Costs are incurred in association with determining whether to grant a credit line to a player; these costs may take the form of a fee for a credit report, the time and effort of casino employees to process credit applications, the time and effort involved in an on-the-spot decision by an employee to grant a credit line without an advance application, and even the expense of establishing and maintaining an electronic system that can make credit determinations without employee involvement.

For the patron, a lack of visibility into, and control over, the requesting of, receiving of, drawing of, and paying back of credit has contributed to reduced enjoyment of the gaming experience. This sometimes has included one or more of having to pause gaming activity to request credit in the absence of sufficient available funds, increases in stress due to uncertainty as to when paydown payments were due, the amounts due, late payments, the amount of available credit, and the like. Further, the lack of easily-available access to administration of one or more of the patron's credit accounts, markers, or the like has often contributed to inefficient use of the patron's time, repeated interactions with multiple electronic systems, staff, or both, the inability to responsibly and effectively control and direct the requesting of, drawing of, wagering of, and payment of credit lines and markers, and players carrying larger amounts of cash to, from, and within gaming establishment, leading in turn to other problems with transporting and carrying such cash, including pickpocketing of game players for example.

In addition, there has traditionally been a separation between banking interfaces and interfaces available for making payments against outstanding wagering credit line balances. It was typically the case that multiple transactional steps, procedures, and systems were involved in even the most basic of payment transactions, creating frustration and inefficiencies for one or more of the parties involved in the transactions.

Further, the absence of modern processes for quickly identifying available credit and credit offers based on a patron's player club status, their current property location, or both often hindered operators and credit providers ability to extend the appropriate amounts of credit in a timely manner to patrons wanting to engage in gaming at a particular property. Manual processes involved in verifying identity further impeded smooth and enjoyable credit administration for one or more of the operator, credit provider, and patron.

Finally, these historically disjointed processes and systems suffered from a variety of technical disadvantages, including one or more of:

- slower processing due to the involvement of manual procedures, multiple system integrations, or both;
- increased processing, increased memory demands, or both due, at least in part, to data duplication across systems, the need to retrieve data from external systems for validation, or both;
- reduced security due to increased data transmission activity resulting, at least in part, from the involvement of multiple intermediary system stopping points;
- increased network bandwidth usage due to system traffic due to processes involving, for example, email verifications, file transfers, fax activity, system integrations, scanning activity, and the like; and
- patron use inefficiencies including one or more of susceptibility to user error and frustration relating to complex and multiple graphical user interfaces, paper submissions, phone verifications, and staff engagement.

BRIEF SUMMARY OF SOME ASPECTS OF THE DISCLOSURE

The inventors believe that they discovered many of the problems and issues with the prior art discussed in the Certain Aspects section above, including in some embodiments their cumulative problematic effect for operators, patrons, gaming and financial regulatory authorities, law enforcement, and social and health care service providers, among others, such as insurers and financing providers. To the end of solving or at least substantially reducing one or more such problems, including, in some embodiments, in an effort to facilitate cashless gaming while ensuring one or more of safe and responsible gaming, the timely extension of credit, player honoring of obligations to the casino, and regulatory compliance, the Applicant has developed systems in which funds are automatically advanced either directly or from an intermediate account, such as a wager account, to a gaming device based, at least in part, on a credit line of the player. In some embodiments, the credit line may be approved in advance, for example by the player submitting a credit application in person, on-line, via the mail, or the like. The credit line in some instances, may be approved while the player is in, for example, an operator property, such as a casino, based on one or more of a written application submitted at that time, an oral request by the player, an on-line application, an electronic request by the player while using a gaming device, action by a casino employee even if not specifically requested by the player, or the like.

In some embodiments, once credit has been extended to a player, any cash submitted by the player and any of the player's winnings may be selectively used to pay down the wager account, including in some embodiments at the direction of the casino based on, for example, certain automated rules, at the discretion of the player, or a combination thereof. In some applications, the player is encouraged to apply winnings or to insert cash to pay down the wager account.

In some embodiments, distribution of winnings by a gaming device to the player, for example in the form of cash or a cashout ticket, is disabled until the wager account has been repaid. In certain embodiments, a distribution of at least a portion of the winnings is provided to the player when a wager account balance remains unpaid. In some embodiments, upon the occurrence of certain events, the passage of pre-determined periods of time, or both, a credit account is paid down, at least in part, through authorized automated direct debiting of a player's funding account, such as a bank account. This expedited paydown of credit accounts can reduce the period of time where the casino might otherwise have to maintain credit accounts with unpaid balances, reducing resulting cash flow shortages.

The collecting of relevant personal information at the time of submitting a request for credit, combined with monitoring and tracking of credit advances and gaming activity, can provide improved identification of events triggering reporting requirements related to suspicious activity and currency transaction amounts. In some embodiments, credentials, such as, for example, a driver's license can be scanned and submitted as part of an electronic application process, allowing for the storage of the driver's license image and data which may be used in submission as part of an activity or transaction report to a regulatory authority. In some implementations, the method and rules for the extension of credit, including, for example, the timing of and amount of extensions of credit, as well as the controls for rule-based automated pay down of wager and credit accounts can identify, prevent, or both, suspicious activities and reportable transactions.

In some systems, extending a credit line to a player and funding a wager account by advances against the credit line may be implemented, for example, in a single gaming device such as a slot machine, a video poker machine, or the like. Or a server may extend the wager account by electronic communication across two or more devices so that the player could use some of the credit line at one slot machine, some at another slot machine, a video poker machine, an electronic roulette machine, or the like. All such gaming devices may be located at various points within a casino or they may be located at more than one casino.

The server may include information respecting credit lines from many players, and when any one of these players commences play at a gaming device that is in communication with the server, the player is asked to provide some form of identification or password to enable access to that player's credit line on that device. In some instances, these user interfaces are familiar to players, such as touch screen interfaces provides via a SMIB, which can reduce resistance or aversion to technology adoption that might otherwise exist for certain demographics.

In some embodiments, tiered credit approval amount thresholds throttle the timing of credit approval decisions, which in some applications can allow for an increased ability for the casino to include additional activity, including gaming activity and selective pay down activity, and financial information in credit approval decisions for the extension of increased credit amount requests. In some instances, these credit approval tiers can be part of a responsible gaming service, controlling the access to credit and thereby allowing the casino to avoid refusing to advance funds solely on the basis of the player's behavior. In some applications, this can also provide benefit to the player as the ease and real-time nature of the system allows the player just-in-time approval and access to a line of credit without the player obtaining an initial large line of credit that could negatively impact other aspects of that player's financial state or credit worthiness.

In addition, in certain embodiments, a responsible gaming application service can use these or other amount thresholds to provide one or more of credit approval delay periods, credit access delay periods, or credit amount throttling. This can, in some embodiments, achieve the desired goal of controlling gaming behavior for responsible gaming purpose without the undesirable consequence of making the player seek out a cash advance machine or cashier to obtain additional funds when desired where there is no responsible gaming issue. In some instances, this can result in an improved gaming experience, as well as improved velocity of cash entering the casino floor while simultaneously improving responsible gaming management.

In some instance, funds are advanced directly from the credit line or credit account to the gaming machine without first creating an intermediate account, such as, for example, a wager account or wallet, for tracking balances or amounts in a wager account or wallet. In some implementations, the line of credit account is available for withdrawal from, or pay down through, an integrated banking service, such as an online banking app. In some instances, automatic advances and paydowns occur between a gaming machine interface, the credit account, and a banking institution.

Additional benefits and advantages can include the ability to obtain credit request approvals in advance, during play, or both, thus improving on floor funds management, reducing friction for player fund access, and increasing velocity of cash entering the casino floor. This electronic-based method of credit transaction facilitation can, in some embodiments, reduce the cash management overhead costs as well, including one or more of reducing or eliminating the depositing of funds, reducing labor demands such as cage, vault, drop, and count teams, floor attendants, security personnel, and audit personnel, reducing the need for count machines and bank machines, reducing the costs associated with paper management, and reducing interest to the casino associated with large cash floats.

A further advantage of providing easily accessible managed wager credit is the reduction or elimination of players needing to carry cash. By this reduction or elimination in the cash carry, incidence of theft of player funds can be reduced, resulting in one or more of improving the quality of the casino experience for patrons, decreasing costs to the casino for liability coverage and security, increasing the number and frequency of return player visits, and improving the reputation of the casino with respect to potential customer perception, community perception, or both. This can have a positive revenue impact on the operator, reduce player losses due to theft, and foster a positive community perception that can promote pro-casino local, state, and national laws and regulations, as well as pro-casino zoning decisions.

In addition, the presence of easily obtained wager credit can reduce the burden on players by reducing or eliminating the need procure and manage a substantial cash carry. Players can be free from having to consider where to obtain cash, and also having to consider the potential stake needed in advance for the relevant gaming period. Further, the presence of easily obtained managed wager credit can reduce or eliminate the player burden of managing the cash carry while engaged in gaming, including the inconvenience of submitting cash to devices, tables, or sports book, retrieving of cash from devices, tables, or sports book, and the continued need to monitor cash not being played to avoid loss, such as by dropping bills or coins. The reduction or elimination of this overhead can improve the player experience, along with decrease player anxiety that might otherwise due to, ate least in part, to the amount of cash carried, the risk of losing a portion of that cash, or both.

The reduction to the cash-only nature of the casino gaming environment can have additional advantages and benefits applicable to communities. The reduction in the cash nature of the activity can reduce the burden on community services, such as the demands placed on law enforcement, the courts, social and health care services, etc. With a reduced level of due, at least in part, to the reduced presence of cash inside and outside the casino, required police presence can be reduced, reducing the overall cost of services, which can reduce both the burden on taxpayers as well as improve the ability for such resources to focus on other more pressing criminal activity. Similarly, courts can experience a decreased caseload as the number of arrests decline.

Source of funds tracking can be improved by, in certain instances, incorporating questions or source checks into the credit request and approval process, thus reducing the operator's exposure for failing to report source of funds violations. Further, such source of funds issues can be addressed in advance of arrival at the casino, improving the player experience and reducing the cost to the operator of manually managing such issues on the casino property.

In some embodiments, the operator enters into a loan warrantying arrangement with a warrantor, which can be a commercial entity, that takes a participation interest, such as an equity position, in an operator receivable portfolio including one or more of receivables related to advances made to players, receivables related to player wagering losses, or both, or a partial or complete ownership interest in one or more credit accounts, credit account receivables, or both. In some embodiments, such warrantying can provide to the operator one or more of accelerated cashflow, guaranteed minimum advance returns, or both. Additional benefits to the operator can include one or more of; a) managing of at least some player account status communications, such as, for example, notices, statements, demand notices of adverse action, collections, legal notices, and the like, b) real-time or near-real-time transactional online reporting, oversight, or both, c) treasury management and reporting, and d) credit account settlement and financial accounting support.

In some embodiments, the credit wager system and method of use with loan and warrantying provides for a tiered credit structure. This tiered structure can one or more of; a) for given advance, mitigate the risk associate with, at least in part, one or more of fraud, money laundering, or issues associated with bank secrecy laws, b) enable valued and qualified players to increase their credit limit subject to appropriate and additional underwriting, taking into account, among other factors, player history and overall value status to the casino operator, and c) mitigate adverse or irresponsible player behavior that might otherwise jeopardize one or more of a player's personal financial well-being, the relationship between the player and the casino operator, or both.

In some embodiments, the credit wager system and method of use with loan and warrantying can make available one or more of a variety of warrantor revenue sources such as, for example, collecting credit application fees from the player or the operator, collecting warranty fees, whether such warranty fees are collected directly from the operator, as a percentage of advanced principal funds recovered, or indirectly through operator receivable purchase price discounts, collection of credit application scoring fees from the operator, and the like.

In some embodiments, the credit wager system and method of use with loan and warrantying can make available to the operator the ability for a third party to issue traditional consumer credit to a patron for the purpose of wagering with an affiliated operator under an agreement that permits the third party to acquire or take an equity position in the player wagering losses from the operator at a predetermined discount, with associated service charges, or both.

Some credit wager system and method of use with loan and warrantying as disclosed in this application can provide one or more of a variety of technical advantages including, but not limited to, reducing the memory storage and bandwidth demands through targeted tracking of credit activity during the credit approval phase and at near-realtime or in realtime during the fund advancement phase during game play, improving privacy and security of personal information through reuse of collected information with limited information proliferation, improving system user interface efficiencies through the streamlined application interface and rule-based credit management features, reducing multi-system processor load through the introduction of real-time or near real-time, at-game, credit management, and the like.

Further, The applicant has developed a system that addresses various inefficiencies existing in today's technologies and procedures relating to the administration of credit lines associated with gaming activity by allowing patrons to control and direct the requesting of, drawing of, wagering of, and payment of credit lines and markers from a unified mobile interface using one or more of accessible cloud-based and on-premises services.

This approach can, in some embodiments, yield high efficiencies across systems and processes, including one or more of:

- Faster processing due to the reduction or elimination of manual procedures, reduced system integrations, or both.
- Reduced processing and memory demand due, at least in part, to the reduction or elimination of data duplication across systems.
- Reduced processing and memory demands through optimized identity and credit verification procedures and reduced data retrieval and replication using one or more of device verification methods, email verification methods, linking with bank accounts, linking with player's club accounts, linking with operator CRM systems, and the like.
- Improved security due in part to reduced data transmission activity resulting, at least in part, from the reduction of involvement of multiple intermediary system stopping points.
- Reduced network bandwidth usage due to a reduction in system traffic resulting from the elimination of some ad hoc processes such as email verifications, file transfers, fax activity, system integrations, scanning activity, and the like.

Reduction in patron user error and frustration through a single, simplified, unified graphical user interface, reducing or eliminating paper submissions, phone verifications, and staff engagement.

Additional benefits and advantages in some embodiments can include the ability to obtain credit request approvals in advance, during play, or both, thus improving on floor funds management, reducing friction for player fund access, and increasing velocity of cash entering the casino floor. This electronic-based method of credit transaction facilitation can reduce the cash management overhead costs as well, including one or more of reducing or eliminating the depositing of funds, reducing labor demands such as cage, vault, drop, and count teams, floor attendants, security personnel, and audit personnel, reducing the need for count machines and bank machines, reducing the costs associated with paper management, and reducing interest to the casino associated with large cash floats.

In some embodiments, the patron's increased visibility in and control over credit lines can contribute to responsible gaming, allowing the patron to easily monitor and control amount and timing of draws, as well paydowns. This can also provide benefit to the patron as the ease and real-time nature of the mobile experience allows the player just-in-time approval and access to a line of credit without the player obtaining an initial large line of credit that could negatively impact other aspects of that player's financial state or credit worthiness.

The wagering account pooling system can support a process enrolling players and creating virtual player wagering accounts into which players can receive wagering advances, where the wagering advance is a virtual representation of value, such as monetary value, that virtual representation operable to be transmitted as an input to one or more processes or gaming devices in the wagering account pooling system.

In some embodiments, the virtual player wagering account allows players to engage in wagering activity with, for example, participating physical, online and mobile casinos, race and sports book operators using wagering advances, or player's winnings or credits on deposit in the virtual player wagering accounts resulting from, for example prior wagers, and the like.

In some embodiments, a wagering advance to a virtual player wagering accounts is provided following a financial capability assessment score which may assess financial capability attributes, such as, for example, one or more of: a) traditional credit bureau scoring; b) alternate financial information; c) bank history; d) source of household income; e) combined household debt; f) prior player wagering behavior with the operator; g) derogatory information within specialized gaming industry player bureaus, and the like.

In some implementations, an individual player wager advance limit is set based on, for example, a matrix which assesses, for example, amongst other factors, a player's financial capability assessment score, operator risk tolerance, third-party financial services entity risk tolerance, local regulatory guidance, and player's established history with the operator.

In some instances, a player may draw a wagering advance, generating a crediting event to their virtual player wagering accounts. In some instances, at least a portion of the wagering advance amount shall be due for repayment by player on a date certain following the gaming day of said wagering advance, such as, for example, a day between fifteen to thirty days, but subject to substantial variation on, for example, a region by region basis, an operator to operator basis, and the like.

In some embodiments, a player not otherwise restricted may draw a wagering advance up to their remaining advance limit, at any time up to their designated advance limit to post a virtual credit to their virtual player wagering account and make wagers with participating operators. In some instances, additional advance sources are available in excess of the advance limit that can be used to provide a wagering advance. As the player elects to secure a wagering advance to their virtual player wagering account, their associated advance limit is decremented accordingly. In some implementations, when a Player has exhausted their advance limit, when an advance becomes due, or both, the P virtual player wagering account is frozen and the player is not able to make further wagers until the past due advance sum has been repaid to the operator account.

In some embodiments, the wagering account pooling system may allocate fees to the player, the operator, or both for one or more events, such as, for example, the enrolment of a player, provision to operator of the player's financial capability assessment score, provision to player of a wagering advance and/or the management of the advance issue for a Licensed Operator, repayment by player or collection from the player of the wagering advance and associated fees, the wagering with an operator from a virtual player wagering account, and the management for the operator of the advance and wagering ecosystem.

In some instances, the advance to the player is provided on a non-interest bearing basis and may be subject to one or more government regulations or may be offered to a player by the operator or third-party financial service provider, with an applicable interest factor or installment repayment fee.

In some instances, the virtual player wagering account may be managed by or on behalf of the participating operator in collaboration with, or independently by, an affiliated partner which in certain jurisdictions, which would be an appropriately licensed and/or regulated financial institution or bank.

In some implementations, the individual virtual player wagering accounts are treated as part of a consolidated or pooled account where all virtual player wagering accounts create a joint asset base and all deposits of the collective virtual player wagering account holders can be, for example, guaranteed by one or more of a financial institution, the wager account pooling system provider, or other third party. In some embodiments, the pooled account acts as a consolidated account hosting the individual virtual player wagering account balances for all or a portion of the enrolled players. In some instances, when players are enrolled and actively wagering, player wagers are treated as an aggregate daily wager from the pooled account, and wins and losses are settled in aggregate at the completion of a game period with the operator on behalf of the aggregate wagering of all the players in the pooled account, while individual player virtual player wagering accounts are settled independently.

In some implementations, player virtual player wagering accounts maintain a virtual balance until a player elects to cash-out and disburse a virtual player wagering account balance to, for example, the player's designated bank account, upon which event, the wagering account pooling system initiates an allocation of funds disbursement activity firstly to repay any outstanding wagering advances and their associated fees, followed by disbursement to the player's designated account, such as, for example the player's personal bank account. Virtual player wagering accounts may remain active following a disbursement of all or substantially all of the available funds until, for example, closed by a player's specific request, the direction of a participating financial institution, a directive of a regulatory authority of competent jurisdiction, a directive of the participating operator, or in accordance with wagering account pooling program participation rules.

The obligations of the pooled account, such as, for example, funding the daily wagering obligations of all enrolled players may be borne by the operator, a participating financial institution, a participating third party financial partner, and the like.

In some embodiments, the wagering account pooling system provider will operate a program where players may receive interest or noninterest-bearing wagering advances for specified periods while the participating operators will be guaranteed a daily settlement based on the player's losses incurred by the total players participating in each game day wagering via the pooled account ("Aggregate Game Day Hold"). In some instances, operators my receive 100% of the Aggregate Game Day Hold or a discounted value based on agreement between the operator and one or more of the wagering account pooling system provider, participating affiliate, or warrantor.

It is to be understood that this Brief Summary section recites some novel aspects of the present disclosure, but there are other novel and advantageous aspects disclosed in this specification. They will become apparent as this specification proceeds. In this regard, the scope of the invention is to be determined by the claims as issued and not by whether a claim addresses any or all issues noted in the Certain Aspects section or includes a feature included or not included in this Brief Summary section.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The applicants' preferred and other embodiments are disclosed in the accompanying drawings in which:

FIG. 94 is a table of an example tier one initial score-to-credit approval schedule for use in the approval process of FIG. 7C;

FIG. 95 is a table of an example tier two score-to-credit approval schedule for use in the approval process of FIG. 7C;

FIG. 96 is a table of an example tier three score-to-credit approval schedule for use in the approval process of FIG. 7C; and FIG. 97 is a table of an example tier four score-to-credit approval schedule for use in the approval process of FIG. 7C.

DETAILED DESCRIPTION OF THE PREFERRED AND OTHER EMBODIMENTS

Figure 1:
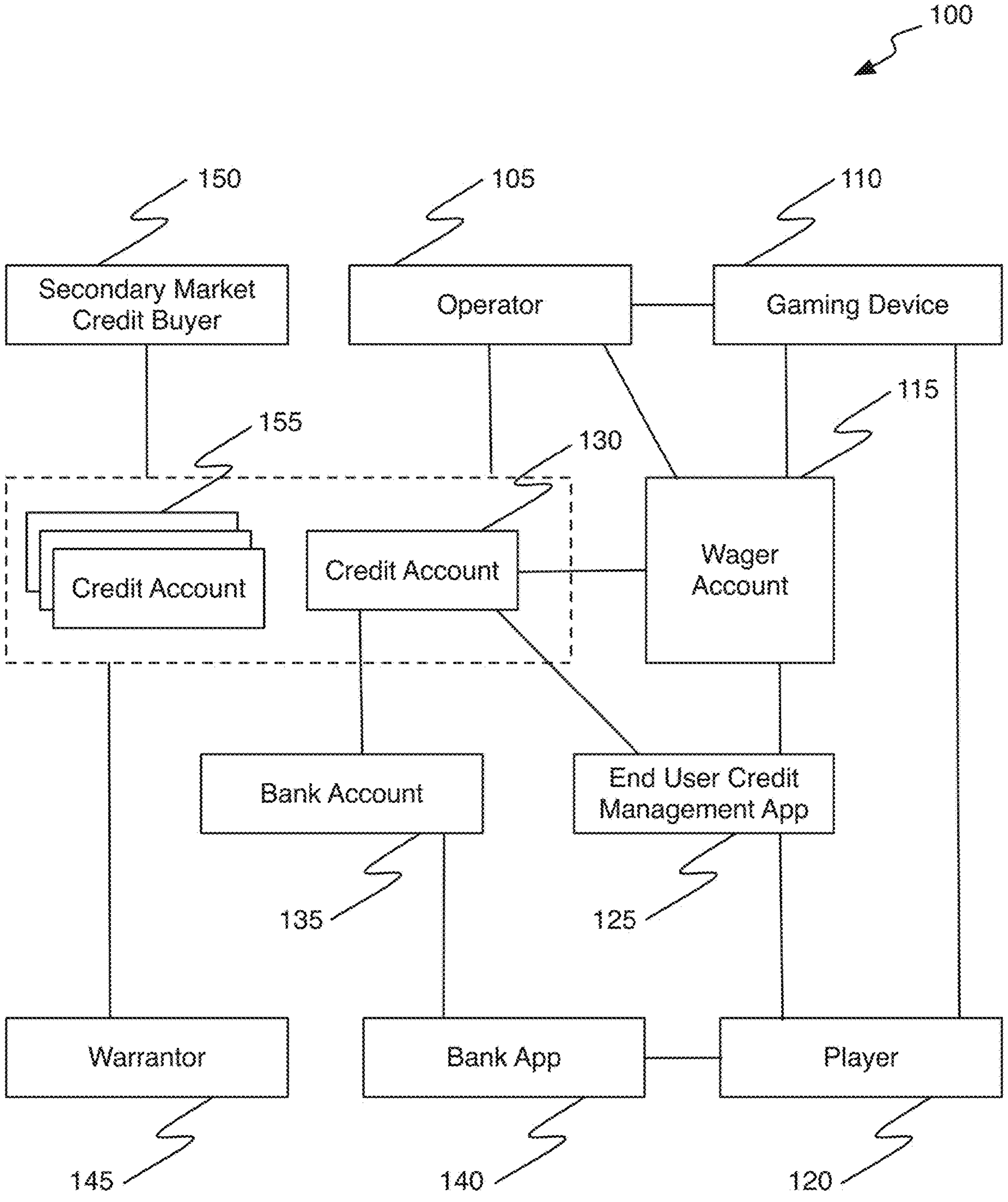
FIG. 1 is a block diagram of participant and system relationships for the credit wagering system and method of use with loan and warrantying.

Broadly, this application is directed to a credit wager system and method of use, in some embodiments, with one or more among loan and warrantying. factoring, or aggregation of at least portions of accounts, and aggregate processing. The methods disclosed in the present application can be implemented in many different ways, including through software, hardware, firmware, remote processing, or the like, or a combination thereof. The method is directed to use with a gaming device, but the term "gaming device" includes all machines involved in the process of conducting and funding gaming activity and should not be limited to slot machines and video poker machines. "Gaming device" may include any device used in gaming that receives, dispenses, or transfers a medium of exchange, such as coins, cash, vouchers, tickets, gaming chips, or other fungible value media, or electronic representations thereof, including cryptocurrencies. This can include chip and ticket handling machines that convert gaming chips, tickets, game credits, or electronic representations thereof, into currency or cryptocurrency. Moreover, this application specifically contemplates use of the present method and system with gaming tables, and all wager gaming, including specifically mobile wager gaming, and table games, sports book, and racing applications, such as horse and dog racing for example, or portions of any such activity such as by providing an automated wager gaming money or value advancing and monitoring application for use in conjunction with wager gaming.

Also, it is contemplated that the present method can be implemented at one or more gaming devices. That is, the method can be implemented at a single gaming device, a plurality of gaming devices operating separately, a plurality of networked gaming devices, a plurality of gaming devices networked with a server controller, a gaming device in combination with a mobile device, or any combination or variation thereof. For purposes of this application, the term "casino" includes conventional casinos as well as all other providers of any wager gaming and wager gaming system, including online gaming, race book, sports book, and remote device gaming.

In some embodiments a credit wager system with loan and warrantying includes the collecting of a loan origination fee, loan transaction fee, or the like that the player pays as part of an initial application for a credit line. The amount of this fee may be different depending on various conditions, such as, for example, whether the player submits an application on-line or on paper, whether the application is made ahead of time or at the casino, whether the application can be processed electronically or must be handled by casino employees, whether credit is being issued by the operator, warrantor, or a third-party financial provider. In some situations, such as an electronic request through a gaming device while the player is actually using the gaming device, the fee may be lower or higher than other loan fees or may be waived entirely.

In some embodiments, the casino enters into a loan warrantying arrangement with a commercial entity (the warrantor) that takes a proprietary interest, such as a partial or complete ownership interest, in one or more credit accounts, credit account receivables, or both. In some instances, the warrantor acquires an equity interest as a percentage of advances made to players during a certain period, such as a 24-hour period. This can be accomplished by, for example, the transfer of funds to the casino operator equal to a percentage, such as a discount in some embodiments, of one or more new advance originations initiated in the defined period. In return, the warrantor can receive a percentage of the first-recovered repayments of advanced amounts up to the previously funded amounts from that defined period (the warranty guarantee amount), plus an additional percentage amount (the warranty service amount). In some embodiments, the warranty service fee is received by the warrantor on scheduled basis over a certain collection period.

In some instances, the warrantor can participate in one or more of solely or jointly reviewing and approving the casino's method for establishing credit lines before issuing credit to a player. In some instances, the warrantor requires that it participate in the credit approval process, for example, by doing the approval itself, through another entity, or jointly. In some cases, approval is performed, at least in part, electronically or in some other manner. In some embodiments, the warrantor can use one or more of a variety of known and obtained credit-related attributes, such as, for example, attributes obtained from hard credit inquiries, soft credit inquiries, employment verification services, funding account verification services, fungible asset verification services, fund transfer monitoring services, and the like, to determine credit-worthiness and whether to extend some amount of credit to a player. When a player uses a certain amount of credit and loses the money in wagering, the warrantor can hold an equity position in the receivable for that amount, or in the alternative, take partial or complete ownership in the receivable. Reconciliation between the casino and the warrantor can take place from time to time, for example hourly, daily weekly or monthly, and can involve one or more of the following:

1. Detail and total of all credit advanced to one or more players during the reconciliation period.
2. Detail and total of all credit line paydown events by one or more players, such as through automated paydowns at the time of machine cash out, or discretionary paydowns through submissions of payment at a game machine, cash machine, funds transfer enabled app, or cage.
3. The difference between these amounts can equal the amount advanced to the casino (for example via ACH or some other electronic method) or, in the case of collections exceeding advances, returned to the warrantor.

As an example that may take place in certain embodiments, assume there are two players, Player #1 and Player #2, whose accounts are part of the warrantying account set. Further on a given day Player #1 uses $1,000 of his/her credit line and loses all of it at the machine. Meanwhile, Player #2 uses $500 of his/her credit line, hits a jackpot for $750, and presses "cash out" thereby automatically repaying the $500 draw on his/her credit line and receiving the balance of $250 in cash. At reconciliation, the warrantor would reimburse the casino for $1,000 or applicable part thereof as agreed under a warranty Advance receivable participation or sale/purchase agreement with Casino because that is the amount advanced to the casino ($1,000 for Player 1 plus $500 for Player 2) net of the $500 repaid by Player #2. If Player #1 returns the next day, draws another $500 on his/her line of credit, hits a $2,000 jackpot and presses "cash out", the $1,500 drawn on his/her credit line ($1,000 on the first day plus $500 on the next day) is automatically repaid and the player receives the balance of $500 in cash. At reconciliation, the casino would reimburse the warrantor for $1,000 on the account of Player #1 because that is the net amount received back from that player by the casino ($1,000 on the first day plus $500 on the second day minus $500 repaid by the player on the second day).

In some embodiments, if the funds for the credit line are provided by another party such as a warrantor either in advance of the granting of the credit or after the credit has been extended, the transaction is reported to that party. This report can include the amount of the credit and identity of the player or players, and any other information desired. In some instances, the player's or players' obligations may be purchased from the casino at a discount. In some embodiments, fees are charged to one or more player at one or more stages of the process.

In some embodiments, a loan transaction fee may be charged each time the player requests an advance, such as, for example, to a wager account, against the player's credit line. This can be done electronically, for example by a message displayed on a screen of a gaming device to the effect that a request for a credit advance of, for example, $100 will result in a debit of $103 from the player's credit line even though only $100 will be made available at the gaming device for the player to use in wagering. The fee may be a fixed amount for each request, a percentage of the credit line, a percentage of the amount being advanced, or the like.

Referring now to FIG. 1, in some embodiments, various participants and systems can interact as part of the applying for, extending, transferring, and managing credit in connection with the method and operation of the credit wager system with loan and warrantying, particularly where loan warrantying is involved. In some instances, a casino operator 105 operates one or more gaming devices operable to receive wagerable funds from an intermediate account, such as, for example, a wager account 115. A player 120 can withdraw funds, access funds, or both in the wager account 115 through one or more interfaces, such as, for example, the gaming device 110 primary interface, through a secondary gaming device interface, through an end user credit management app 125 that runs on, for example, a mobile device or a casino device, or the like.

Figure 92:
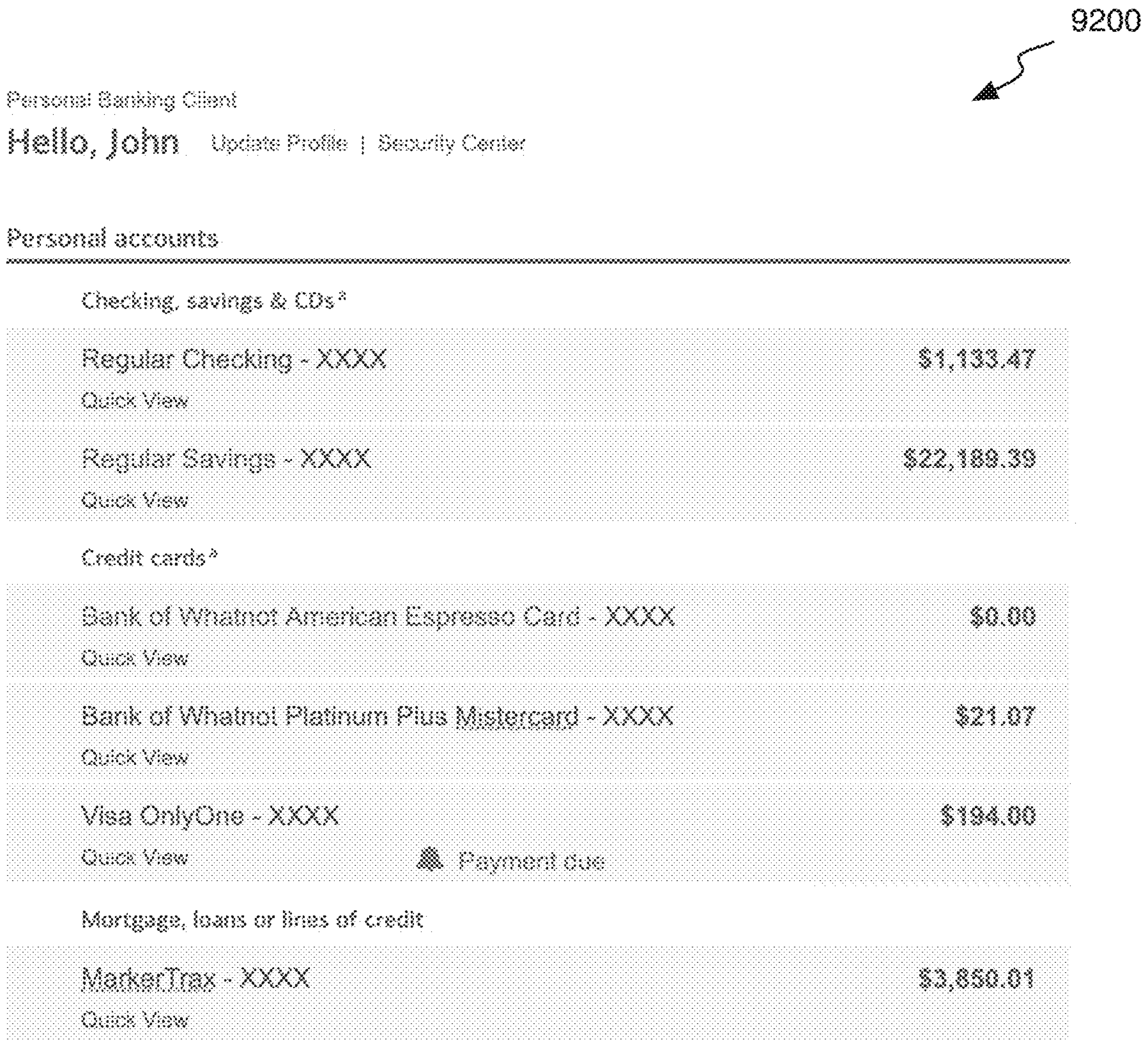
FIG. 92 is a screen capture online banking view with an integrated line of credit managed by the credit wagering system with loan and warrantying of FIG. 2B and FIG. 3.

In some implementations, the wager account 115 can be funded, at least in part, from one or more credit accounts 130, can add to or pay down the balance in the one or more associated credit accounts 130, or both. This adding or paying down of the credit account 130 can be effected by player 120 at player's discretion via interfacing with the end user credit management app 125, the gaming device 110 interface, or both. In some instances, the adding or paying down of the credit account 130 occurs, at least in part, automatically upon the occurrence of certain events, such as, for example, an attempted cash out event. In some embodiments, the one or more credit accounts 130 are associated with a bank account 135 which can be accessed via a banking app 140 displaying credit account information 9200 (e.g., see FIG. 92). In some instances, one or more credit accounts 130 are directly accessible via the banking app 140.

In some embodiments, one or more warrantors 145 have a proprietary interest, such as a partial or complete ownership interest in accounts receivables associated with one or more credit accounts, and can assist with, take responsibility for, or both, collection of such accounts receivables. In some instances, the warrantor 145 participates in decision involving the extension of credit, collection of accounts receivables, or both. One or more secondary market credit buyers 150 may purchase, or otherwise invest in, individual credit accounts 130 or packages of credit accounts 155 or their associated accounts receivables.

Figure 2A:
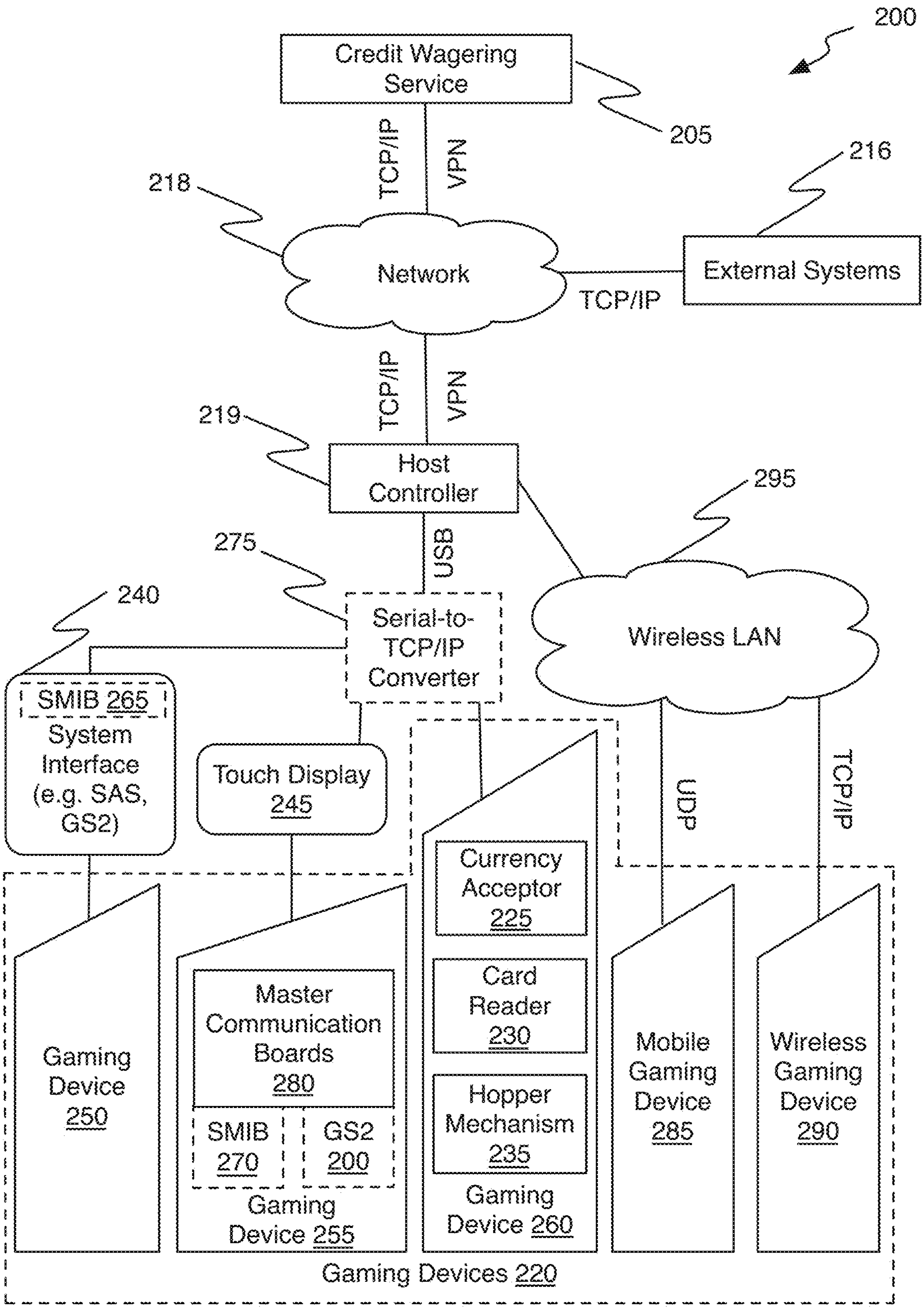
FIG. 2A is a block diagram of front-end gaming components of a credit wagering system with loan and warrantying supporting the relationships and activities of FIG. 1.

Referring now to FIG. 2A, in some embodiments, a networked gaming system 200 includes and is operable to support a wager credit management service 205. In some embodiments, the wager credit management service 205 communicates with a host server (controller) 219 over network 218, one or more external services 216, or both. In certain instances, this network can be a virtual private network. The controller 219 can be operatively coupled to a local database and may optionally be a server on the casino premises. The controller 219 can be operatively coupled to one or more gaming devices 220. Some game devices 220 can include a currency acceptor 225, a card reader 230, and/or a hopper mechanism 235. Some game devices can be connected to an external system interface 240, an external touch display 245, or both.

Gaming devices 220 can be interfaced to the controller 219 by various methods. One exemplary method (not shown) involves interfacing gaming devices 250, 255, 260 to a fiber tap board. The fiber tap boards can be daisy-chained together to connect multiple gaming devices 250, 255, 260 to a single controller 219. To distinguish one gaming machine from another when using a daisy-chained configuration, gaming machines 250, 255, 260 can support an automated and/or attendant configurable system address range assignment.

In another embodiment, a smart interface board (SMIB) 265, 270 connects gaming devices 250, 255 to a controller 219 via, for example, a serial-to-tcp/ip converter 275 connected to the controller 219 via, for example, USB. One example of a commercially available serial-to-tcp/ip is the Lantronix UDS1100 External Device Server. The SMIB 265, 270 can poll the gaming device 250, 255 to which it is connected and pass the information for that gaming device 250, 255 to the controller 219. In some instances, the SMIB 270 is installed in the gaming device 255 and connected to a master communication board 280. In other instances, the SMIB 265 can be part of an external interface device 240. In certain instances, the gaming device 260 is designed to interface directly with the controller 219 without a SMIB. In some instances, mobile gaming devices 285 and wireless gaming devices 290 communicate with the controller 219 over a wireless LAN 295 over protocols such as TCP/IP and/or UDP. In certain instances, gaming devices 220 include one or more virtual gaming devices, such as, for example, devices that support and facilitate one or more of, participation, observation, and wagering in gaming activities such as online gaming, sports book, race book, and the like.

In certain instances, the controller 219 requests data by sending general polls and long polls to the gaming devices 220. General polls are sent to the gaming devices 220 to obtain event information. In some embodiments, gaming devices respond to general polls with a single byte exception code indicating that an event has occurred. For example, when the controller 219 desires accounting information, such as the gaming device's managed credit meter total, it issues a long poll requesting the specific data. When responding to a host long poll, the gaming device 110 message can include its address, host command, requested data, and a two-byte cyclical redundancy check (CRC).

In some applications, the controller 219 calculates a CRC for one or more types of long polls. The CRC is calculated over the entire packet, including, for example, the address and command byte, with an initial seed value of zero. The gaming device 220 calculates the CRC in the same manner for one or more multi-byte long poll responses.

Cases may arise where the wager credit management service 205 is offline or otherwise unavailable to the controller 219. When the connection between the wager credit management service 205 and the controller 219 are interrupted, there is the potential to lose credit management authorization data, transactional data, or both. In some applications, messages are placed on a transmit queue and subsequently dequeued after receipt by the wager credit management service 205.

In some embodiments, the controller 219 can configure a gaming device for real-time event reporting. Gaming devices 220 can respond with an exception message including, for example, its address, an event response identifier, an exception code, any additional data, and a two-byte CRC. When in this mode, gaming devices 220 can respond to long polls with event responses.

Figure 2B:
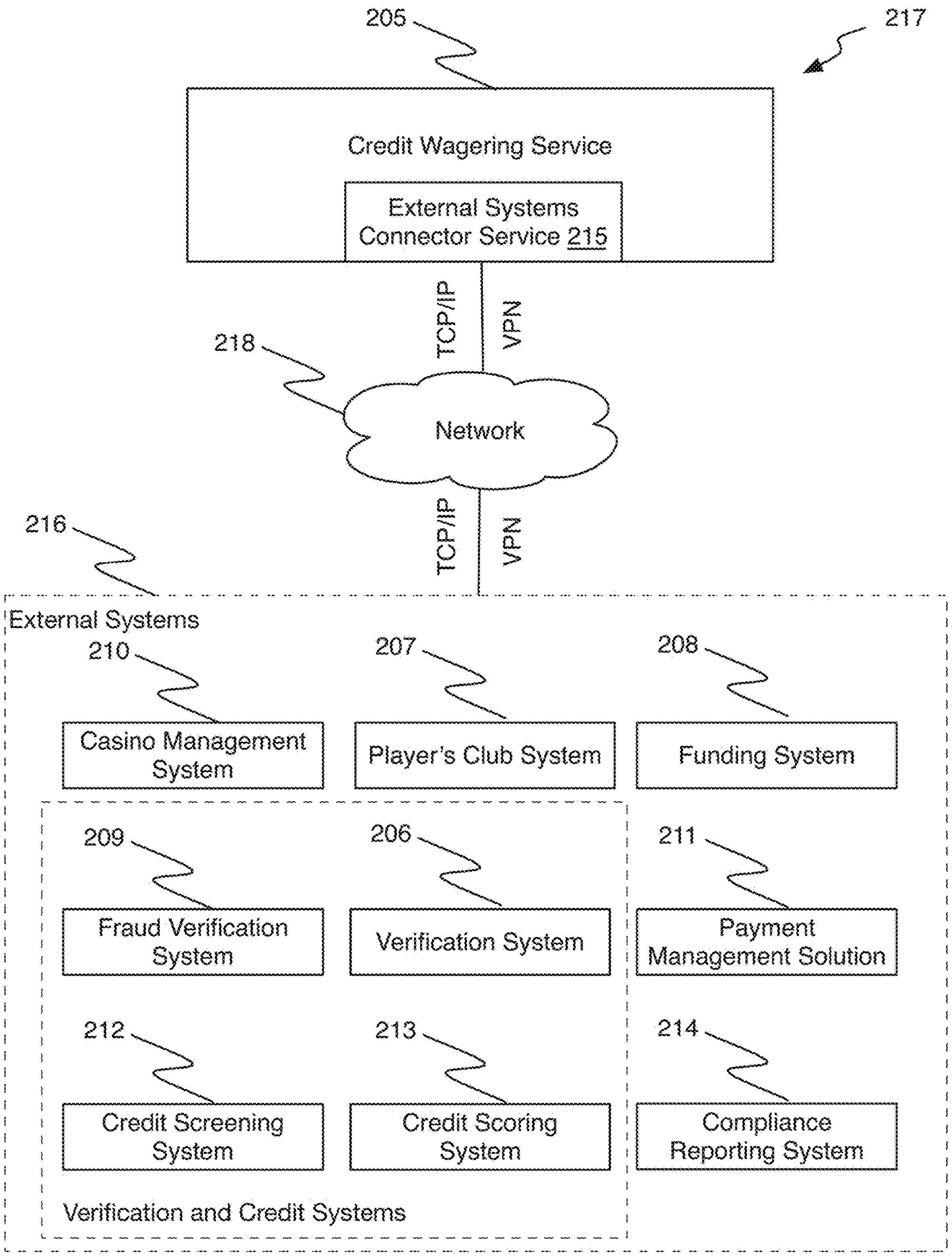
FIG. 2B is a block diagram of the systems integration framework of a credit wagering system with loan and warrantying supporting the external systems relationships and activities of FIG. 1.

Referring now to FIG. 2B, in some embodiments, the credit wager system with loan and warrantying 205 integrates with a one or more external systems 216 through an external systems connector service 215, creating a multi-system integration configuration 217. In some embodiments, external systems data, functions, or both are engaged via external systems API interfaces in communication with the external systems connector service 215, the external systems including one or more of; a) one or more verification systems 206 for providing verification of one or more of player identification data, player credentials, employment information, bank account information, and the like (e.g., Dwolla™, Yodlee™, Plaid™, etc.) b) a player's club system 207 for one or more of sharing player, game play, player account, and reward related data and functions, c) a funding system, such as a banking system 208 for one or more of making automated direct deposits or automated direct debit, d) a fraud verification system 209 for detecting fraudulent activity, data, or behavior, e) casino management system 210 for engagement with casino management functions and data, f) payment management solution 211, g) credit screening system 212 for the execution of credit screening including checking derogatories, performing soft checks, hard checks, or both, h) one or more credit scoring systems 213 for obtaining credit related scoring output to, at least in part, determine a degree of credit worthiness, and i) one or more compliance reporting systems 214 for automated filing of compliance and regulatory reports.

Figure 3:
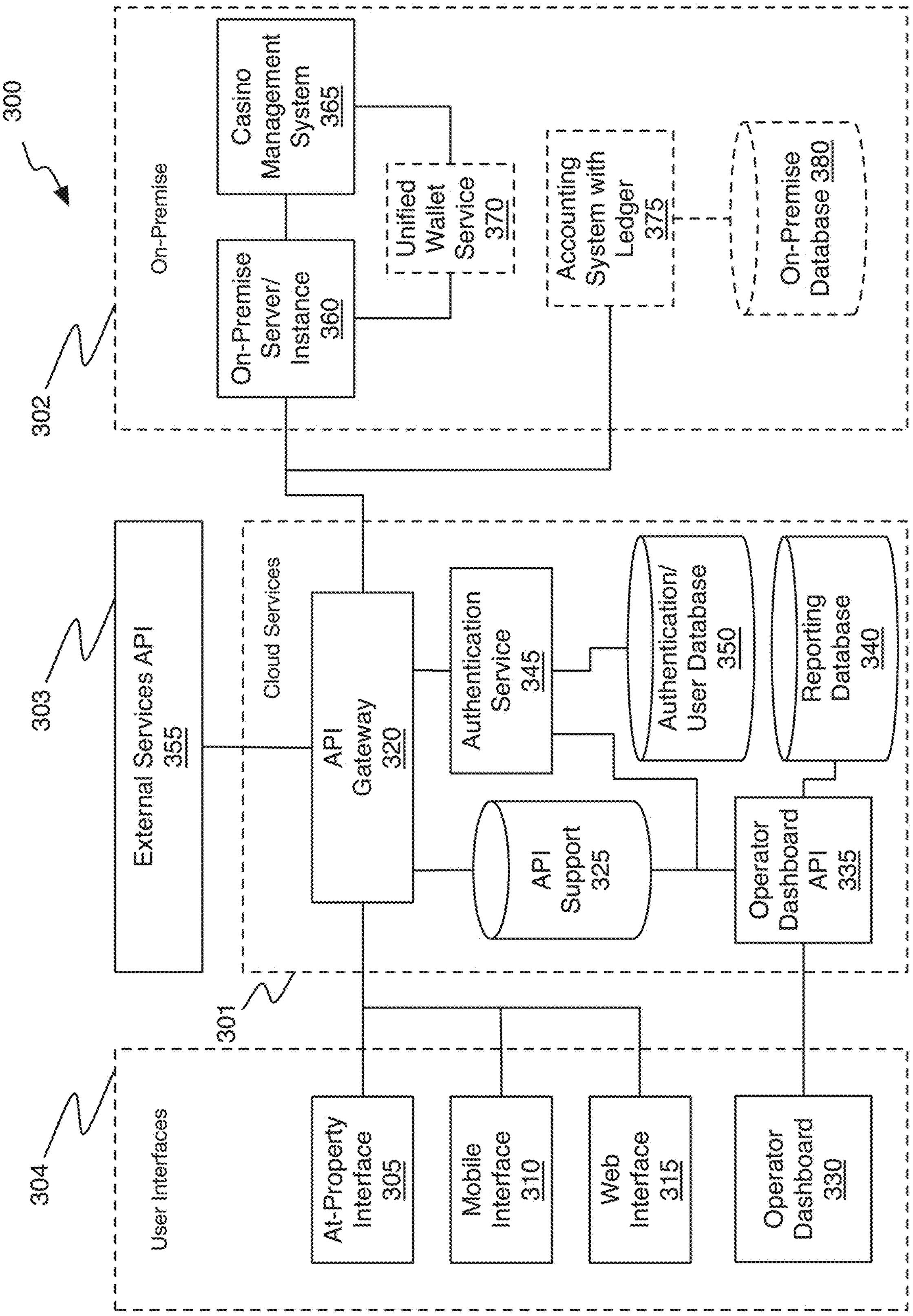
FIG. 3 is a block diagram of the cloud and on-premise back-end components of the credit wagering system with loan and warrantying of FIG. 2B.

Referring now to FIG. 3, in some instances, the back-end architecture includes one or more of a set of cloud services 301, a set of on-premise services 302, and a set of external services 303, with access to one or more services provided to one or more user interfaces 304. in some embodiments, one or more user interfaces 304 access one more cloud or on-premise services either directly or indirectly. These user interfaces can include, for example, at-property interfaces 305, mobile interfaces 310, web interfaces 315, and an operator dashboard 320.

In some implementation, a dashboard service allows one or more of property operators, staff, system operators, warrantors, and the like to login and view a given operator's program status and activity. The end-user dashboard interface 320 communicates with the dashboard services via an operator dashboard API 335, the end user interface 320 displaying information about a given operators program and patrons, generating report data through engagement with a reporting database 340, or both. In some instances, some or all communication with the operator dashboard API is performed over HTTPS.

In some embodiments, one or more user interfaces 304 communicate with one or more cloud services 303, on-premise services 302, or both via an API gateway 320. In some instances, interfacing with an on-premise service is indirect, first engaging one or more cloud services 301 via the API gateway 320, such as the authentication service 345, supported by an authentication/user database 350. In certain implementations, user interface interactions and back-end interactions with external services and their respective external service API's 355 include engagement through the API gateway 320.

In certain implementations, one or more one or more credit wager system and method of use with loan and warrantying services are operated on-premise at a property location, such as at a casino or its associated data center. This can include an on-premise server instances 360 in communication with one or more of a casino management system 365, a unified wallet system 370, an accounting system ledger 375, and other services, any of which may be supported by one or more on-premise databases 380.

Figure 4:
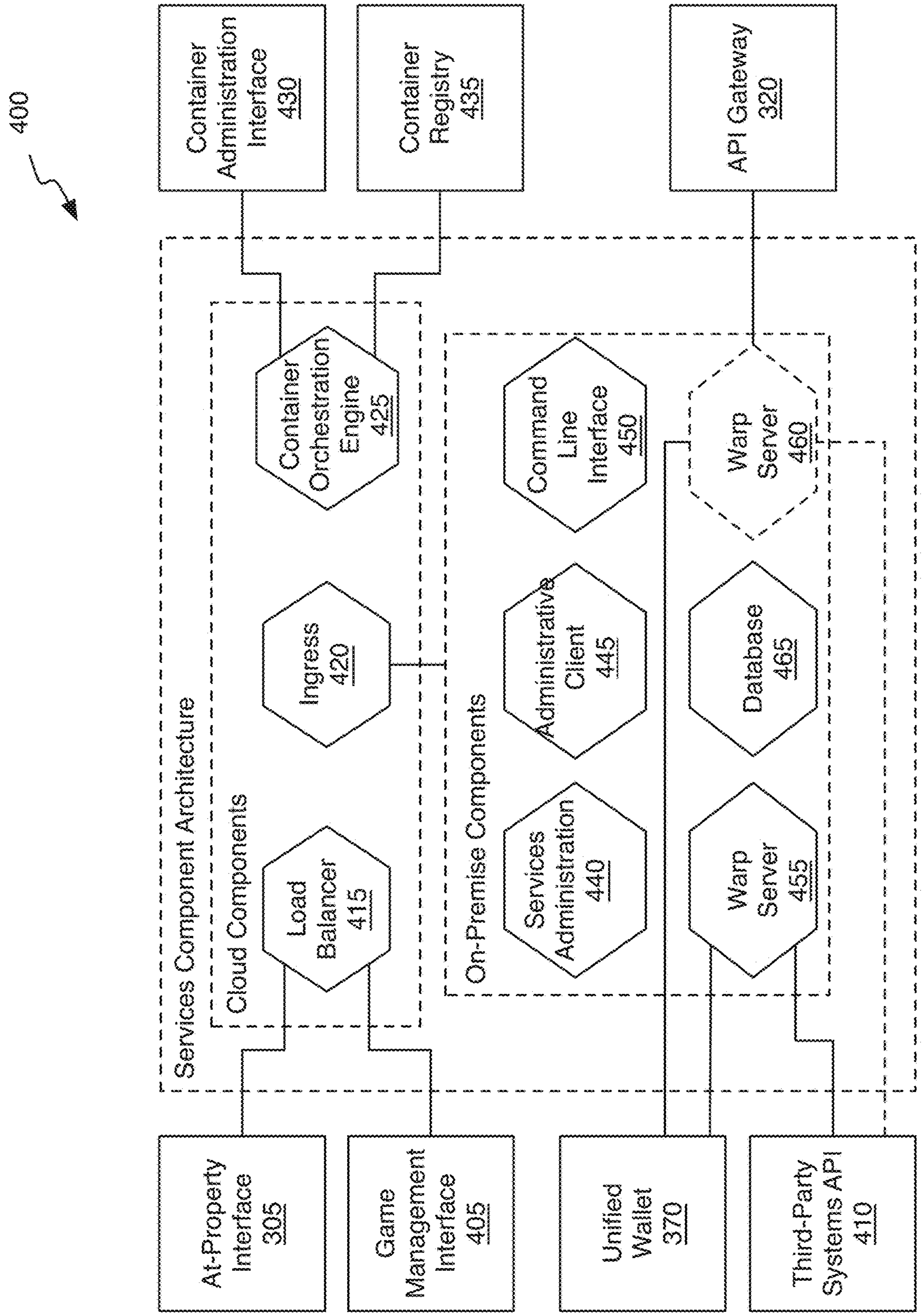
FIG. 4 is a block diagram of one example of a back-end system components architecture that can underly the deployment of the cloud and on-premise components of FIG. 3.

Referring now to FIG. 4, in some embodiments, at least some of the components of the remote wagering credit administration system infrastructure are designed to operate in a cloud environment and can be, for example, deployed as a container cluster, such as a Kubernetes cluster, managed, at least in part, through a container administration interface 430 and container registry 435 in communication with a container orchestration engine 425. Load balancing of traffic, such as traffic related to at-property interfaces 305 and game management interfaces 405, can occur through an independent load balancer 415, at the Ingress controller 420, or both. Ingress 420 can expose HTTP and HTTPS routes from outside the cluster to services within the cluster. Traffic routing can be controlled by rules defined on the Ingress resource. The ingress may be configured to give one or more services externally-reachable URLs, load balance traffic, terminate SSL/TLS, and offer name based virtual hosting. This can allow for unified management of application services as well as one or more of logging, health checks, encrypted communications between services, as well as integration with additional security services for one or more of certificate issuance, load balancing, application isolation and other features.

Infrastructure components and hardening can include one or more of:

a) OpenVPN tunneled connections to one or more components, including on-premises components. Hardening of OpenVPN connections can include one or more of:
   a. Keys, such as, for example, 2048-bit RSA keys;
   b. Unique keys for each system and link;
   c. TLS-Auth key utilization for prevention against scanning, DOS and brute-force attacks; and
   d. Managed CRL for disused key;
b) Sealed Kubernetes hosts (i.e., once infrastructure hosts are deployed, no host system access is available;
c) Write-only security logging—Application, firewall, load balancer, database and system logs can be published to, for example, a SIEM logging service. And
d) Minimum-knowledge application isolation, where one or more services that communicates with on-premises devices can be isolated within its own container with its keys, such as customer-specific security keys. This can provide a logical isolation between customers.

In some embodiments, the warp server 460 web service allows patrons to perform certain tasks and operations, such as, for example, logging in and viewing their account history and status from the web or other user interface, rendering a series of webpages or views depending on what address is input into the web browser address bar or selection interface. Communication can be facilitated via the API gateway 320 using HTTPS/TLS encryption over XHR requests requesting information about the given patrons account and status over this protocol. One or more additional warp web servers 455 can service requests involving third-party systems API's 410, unified wallet communications 370, or both. One or more databases 465 can provide support to the one or more warp servers 455, 460 and associated services. On-premise components can be further managed through various administrative interfaces and components, such as, for example, a services administration interface 440, an administrative client interface 445, and a command line interface 450.

In some embodiments, the warp server instance 460 allows patrons to perform one-off actions from communications flows such as, for example, password reset, email verification, email unsubscribe actions, rendering a series of webpages depending on what address is input into the web browser address bar or selection interface. Client web browsers communicate with it using, for example HTTPS/TLS encryption, and the warp server instance communicates in the background with the appropriate API's.

The API gateway 320 can include interfaces supporting functionality for a patron of a given operator's program to be one or more of onboarded or scored, and to maintain their account on an ongoing basis. In some instances, the API and associated services communicate with one or more databases in order to maintain state and store at least some information needed to fulfill player program requirements. API functionality can include, but is not limited to:

a) Onboarding/Underwriting—the business logic used to perform underwriting by communicating with, for example, Equifax and other 3rd party partners to validate the players identity, offer the correct advance line based on a matrix of possible advance lines, and the like;
b) Payments—maintain connectivity with, for example, an ACH provider, in order to process regularly scheduled payments against the patrons outstanding balances, as well as on-demand payments;
c) Ledger Communications—maintain communication with the accounting system with ledger 375 (e.g., see FIG. 3) in order to update it of posted or pending payments as well as reversals. Additionally, in some instances, the API provides an interface for retrieving information regarding the players latest transactions from the ledger in order to display that to the patron;
d) Geofencing—validate whether or not a given patron is located within a pre-specified geographic area or whitelisted IP address in order to perform operations identified as needing to be performed at a specific geographic location;

e) On-Premise Communications—In some implementations, the on-premise components retrieve customer information from the property casino management system in order to verify information in the onboarding process as well as send the initial line information to the on-premise services so that patrons can begin to draw against an approved and accepted credit line.

f) Authentication—maintain communication with the authentication service in order to validate that a given patrons credentials are valid, whether that be a password or an authentication token contained in request headers.

In some embodiments, the on-premise database is a relational database that includes patrons' personal information and identifying business logic identifiers in order to track the patrons' actions throughout the ecosystem. In some implementations, data can be stored with encryption, such as, for example, AES-256 encryption, and integrates with a key-brokerage system via the API helping to ensure the key is not stored with the hardware. This can help to ensure that even with a full breach of physical security including theft of the hardware, confidential data is not disclosed. In the event of simultaneous power and internet failure, manual recovery procedures and keys can be distributed to properties.

In some embodiments, on-premise backend components are a self-contained managed application stack that can include, for example, a Kubernetes application controller, one or more application services, a database engine, and a configuration communicatively coupled to a related casino management system and other services.

In some instances, the on-premise servers or instances can store data using AES-256 full-disk encryption. Encryption keys can require 2-factor authentication before allowing the system to start up. Management of this can be performed in conjunction with an IT-team. Booting the on-premise system components can involve passing one of two available 2fa checks. If internet access is available, this can be provided by a check of a source public IP address and a local encrypted keyfile. In the event internet access is not available, the system may be booted by inserting a provided hardware security key and entering a passphrase at startup.

During normal boot, the on-premise servers or instances can request a Key-Encryption-Key (KEK) from the API services. In some implementations, the API services validate the server requesting the key as well as compare the requesting IP address against a list of known-valid IP addresses for that server. Provided the checks pass, the KEK is provided to the on-premise server. This can then be used to decrypt a local encryption keyfile which can then be used to decrypt the disk. Both the KEK and decrypted keyfile can discarded from memory prior to the boot process proceeding.

In the event the API services cannot be contacted, or if the public IP address has changed, the system can be provided an alternate 2fa boot credential. Along with the on-premise servers or instances, a hardware security key and passphrase can be provided.

In some embodiments, application access is performed over HTTPS with the network configuration provided by, for example, an IT department. If the operator has HTTPS certificates and internal domains, these may be pre-loaded on the system. Otherwise, self-signed HTTPS certificates can be used. The customer may explicitly accept these certificates in order to access applications. Unless hostnames are provided by the operator, default host names can be used and can be added to a hosts file or local DNS configuration.

In some instances, the on-premise servers or instances involves access to certain APIs, which may be located on or off-premise depending on customer configurations. In addition to access to these APIs, a management VPN can be created to allow for updates and systems management.

Figure 5:
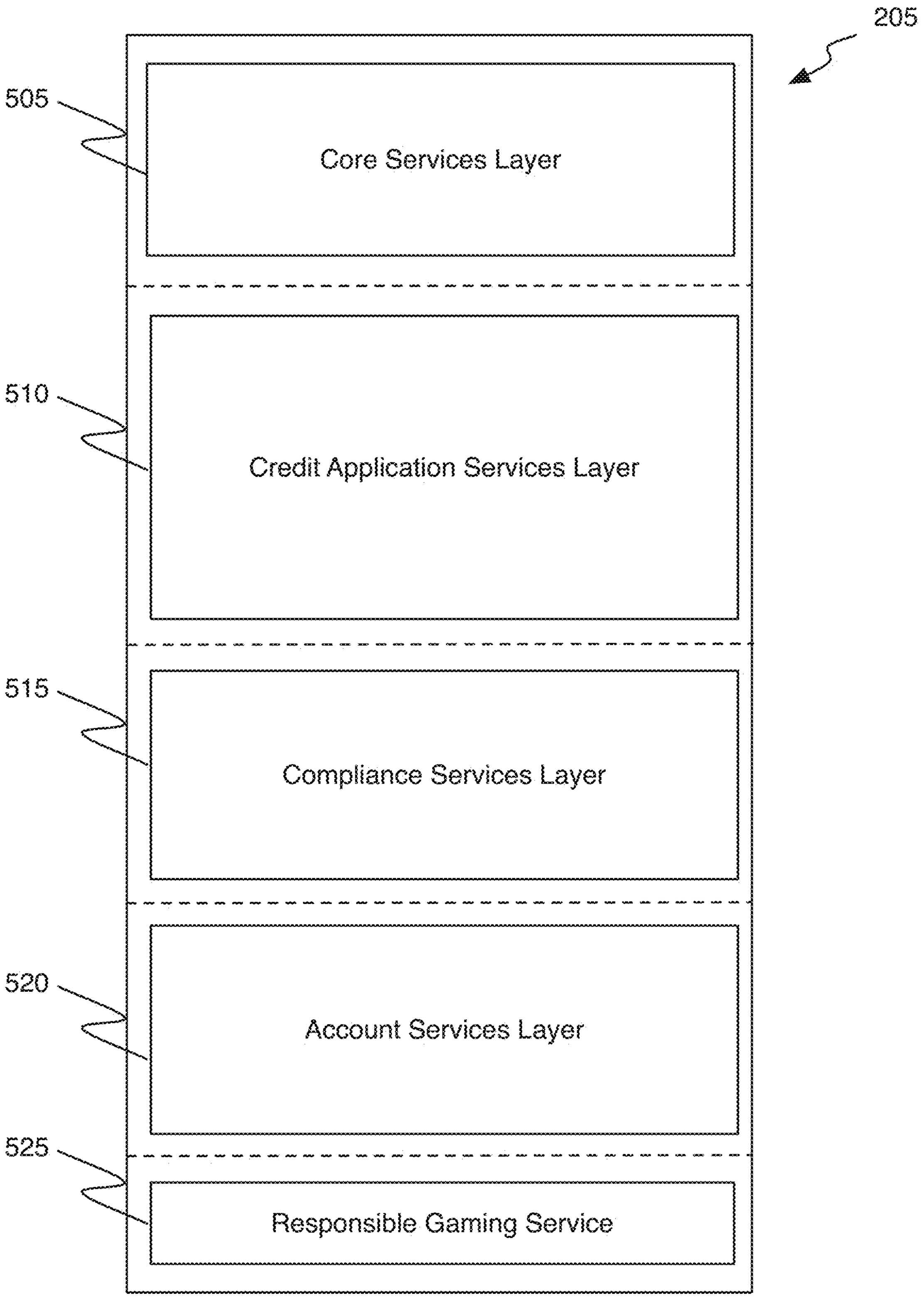
FIG. 5 is a block diagram of the services layers of the credit wagering system with loan and warrantying of FIG. 2B and FIG. 3.
Figure 6:
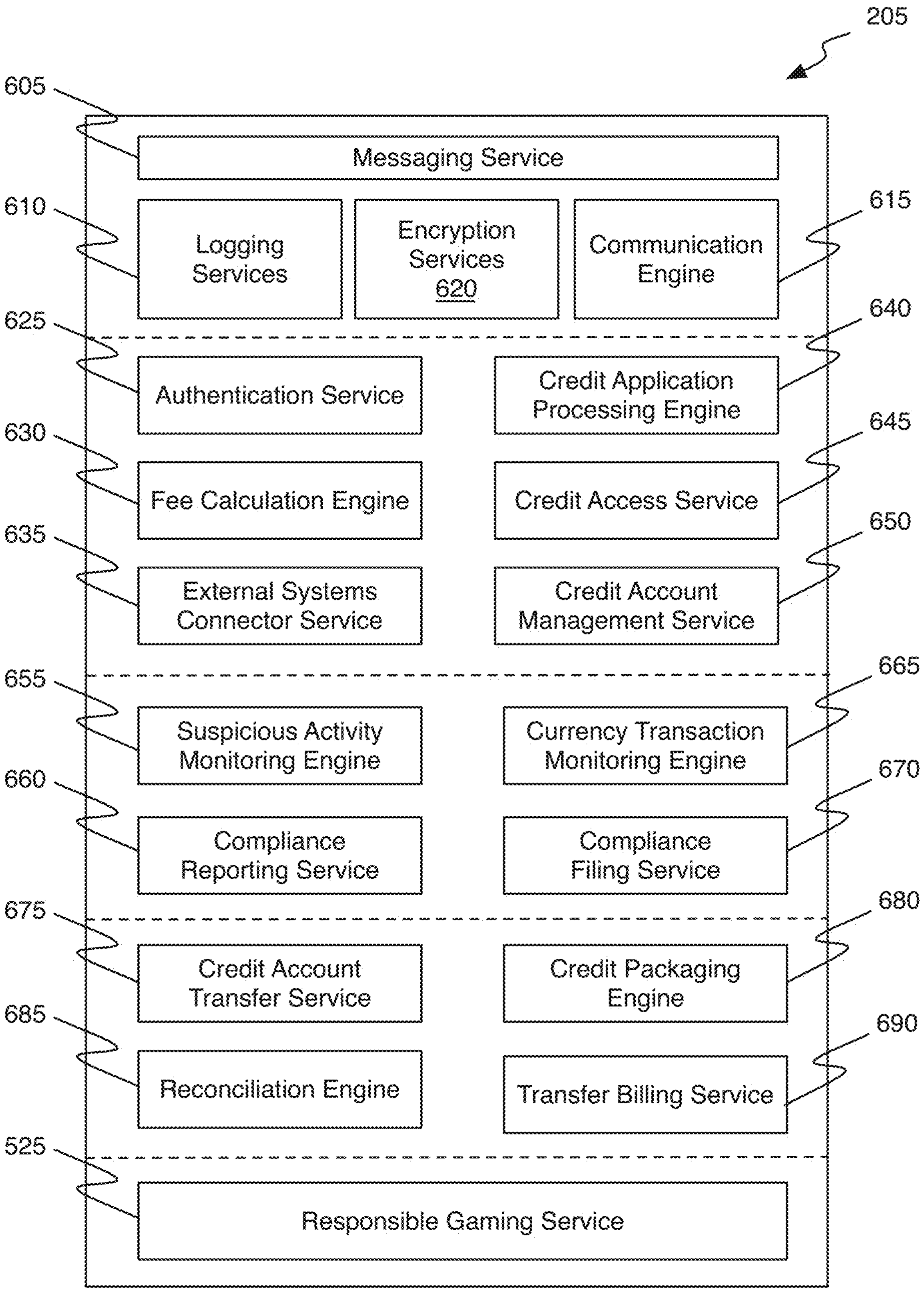
FIG. 6 is a block diagram of the services and engines of the services layers of FIG. 5 performing the various operations of the credit wagering system with loan and warrantying of FIG. 2B and FIG. 3.

Referring now to FIG. 5 and FIG. 6, in some embodiments, one or more engines or services perform the various operations of the credit wager system with loan and warrantying 200. The core services layer 505 can include, for example, one or more of a messaging service 605, logging service 610, encryption services 620, and a communication engine 615. The credit application services layer 510 can include one or more of authentication services 625, credit application processing engine 640, a fee calculation engine 630, a credit access service 645, an external systems connector service 635, and a credit account management service 650. In some instance, a compliance service layer 515 includes one or more of a suspicious activity monitoring engine 655, a currency transaction monitoring engine 665, a compliance reporting service 660, and a compliance filing service 670. In some implementations, an account services layer 520 includes one or more of a credit account transfer service 675, a credit packaging engine 680, a reconciliation engine 685, and a transfer billing service 690. In some embodiments, a responsible gaming service 525 provides configurable credit allocation to support responsible gaming practice or compliance.

In some embodiments, the credit line may be funded in advance of play, while the player is in the casino, or during play, either on request of the player before play commences or while the player is engaged in wagering and is in need or want of credit. The player may make the request through the gaming machine, through a gaming machine peripheral, at a kiosk, at a cashier window, on a mobile device, or at or through some other suitable point of contact or interface. A decision whether to extend credit may be made by casino management or by other casino employees or by another party that may be paid by the casino or the player for providing this service, or by a warrantor. The decision may be made automatically by computer or other suitably programmed machine that in some embodiments may automatically obtain and evaluate information about the player such as a credit report. If the casino or warrantor decides not to extend credit, the player may fund the play with cash. If the casino decides to extend credit, a credit limit is set and entered into a database along with a player identification, and a credit account is created for the player. If a fee is charged for credit, the credit fee is added to the player's credit obligation, or in some embodiments the player may opt to pay this fee in cash or some other way. The player may then fund the play with credit or in some embodiments with more cash or a combination of cash and credit. In some instances, an intermediate wager account holds allocated wager credit.

In some instances, the player submits a request for a credit line in advance of arriving at the casino. In some embodiments a message is sent to the player advising that a fee will be assessed. Such notice can be provided as part of the initial credit application rather than by separate message. In some implementations, if the player does not agree to the fee, the process ends. In some embodiments, no fee is charged for the initial application. If the request is not approved, optionally a message to that effect may be sent to the player and the process ends. Otherwise, a credit limit is set based on financial or other information provided by the player or as determined by the casino without player information, the credit limit and a player identification are entered in a database, and a credit account, wager account, or both are created for the player. In some embodiments the initial wager account balance is zero. In some embodiments the database is contained within a gaming device, at a server location in the casino, or in another location as may be convenient, or the database may be maintained by another party and accessed by the casino by electronic or other suitable communication interface.

In some embodiments the credit line may be funded in advance of being used by the player. If the casino's own funds are to be used, the funds are made available. Otherwise the funds are made available from a party other than the casino, such as a warrantor. For example, a lender such as a bank, finance company, small-loan company, or the like may commit to advance funds against a credit line. In some embodiments such an advance could be done all at once in the entire amount of the credit line, the advance being credited to the casino's account. The funds would then be transferred from the casino's account to the player's account in amounts and at times as needed by the player, for example as requested by the player or as determined by the casino. In other embodiments the funds would be disbursed from the lender only as the player actually uses them for wagering. In yet another embodiment, an intermittent reconciliation occurs transferring funds between the warrantor and the casino based on the credit balance of a single player, or alternatively, based on an aggregated balance of credit across a set of players.

Figure 7A:
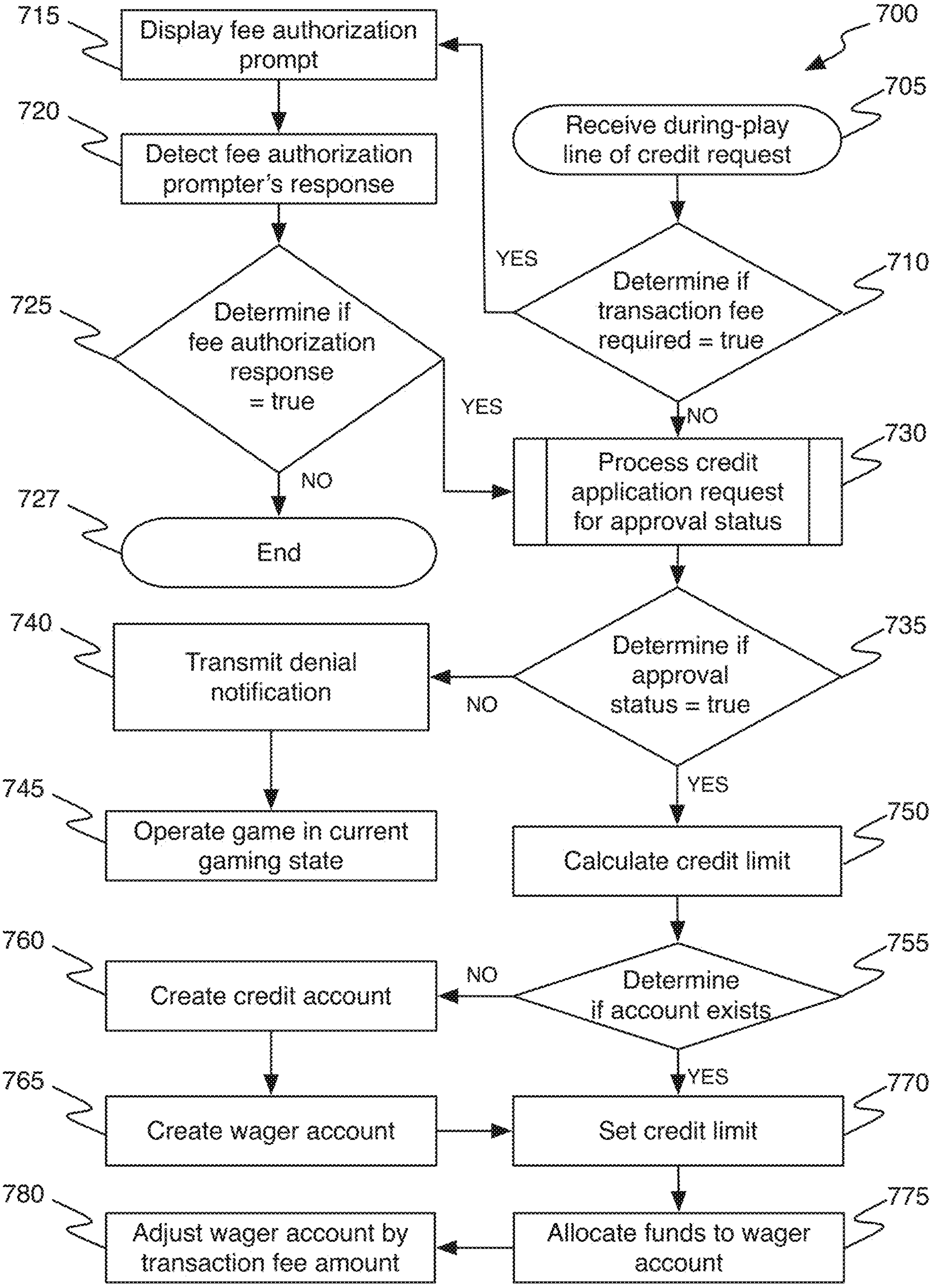
FIG. 7A is a flowchart of a method for during-play processing of credit applications and approvals by the credit application services layer of FIG. 5 in the credit wagering system with loan and warrantying of FIG. 2B and FIG. 3.

Referring now to FIG. 7A, in some embodiments, while a player is engaged in game play 700, a player requests a line of credit 705 through an at-game interface, such as through a gaming device interface, a SMIB, a mobile device, or the like. This request can be communicated to the credit application services layer 510 of the wager credit management service 205 via the messaging service 605. The fee calculation engine 630 can determine, based on input factors, fee requirement and amount rules, or both, whether a fee is required and if so, the amount of the required fee 710. In some embodiments, a fee can include one or more of an application fee, a scoring fee, an external service fee, a convenience fee, or the like. Once the fee determination is made, if a fee is required, the credit application processing engine 640 can initiate a process generating a fee prompt view for display at the player interface 715. A fee acceptance input is received at the player interface, indicating whether or not the fee is authorized 720. If it is determined that the fee is not authorized 725, the credit application process ends 727 and the player can continue play with existing funds or through the addition of cash. If it is determined that the fee is authorized 725, the credit application processing engine initiates the credit application process 730, which can include collecting information from the player directly through the player interface, collecting information from other sources such as an internal or external database, performing credit checks through interfacing with third-party credit services, requesting credit approval from a warrantor, or the like, and making a determination based one or more of the aforementioned factors whether or not to extend credit 735. If the credit application processing engine 640 determines that credit will not be extended, credit application processing engine 640 can initiate generating a credit denial view for display at the player interface 740. At this point, the game will continue to operate in its current state 745, such as a credit-less, cash-only state.

Figure 7B:
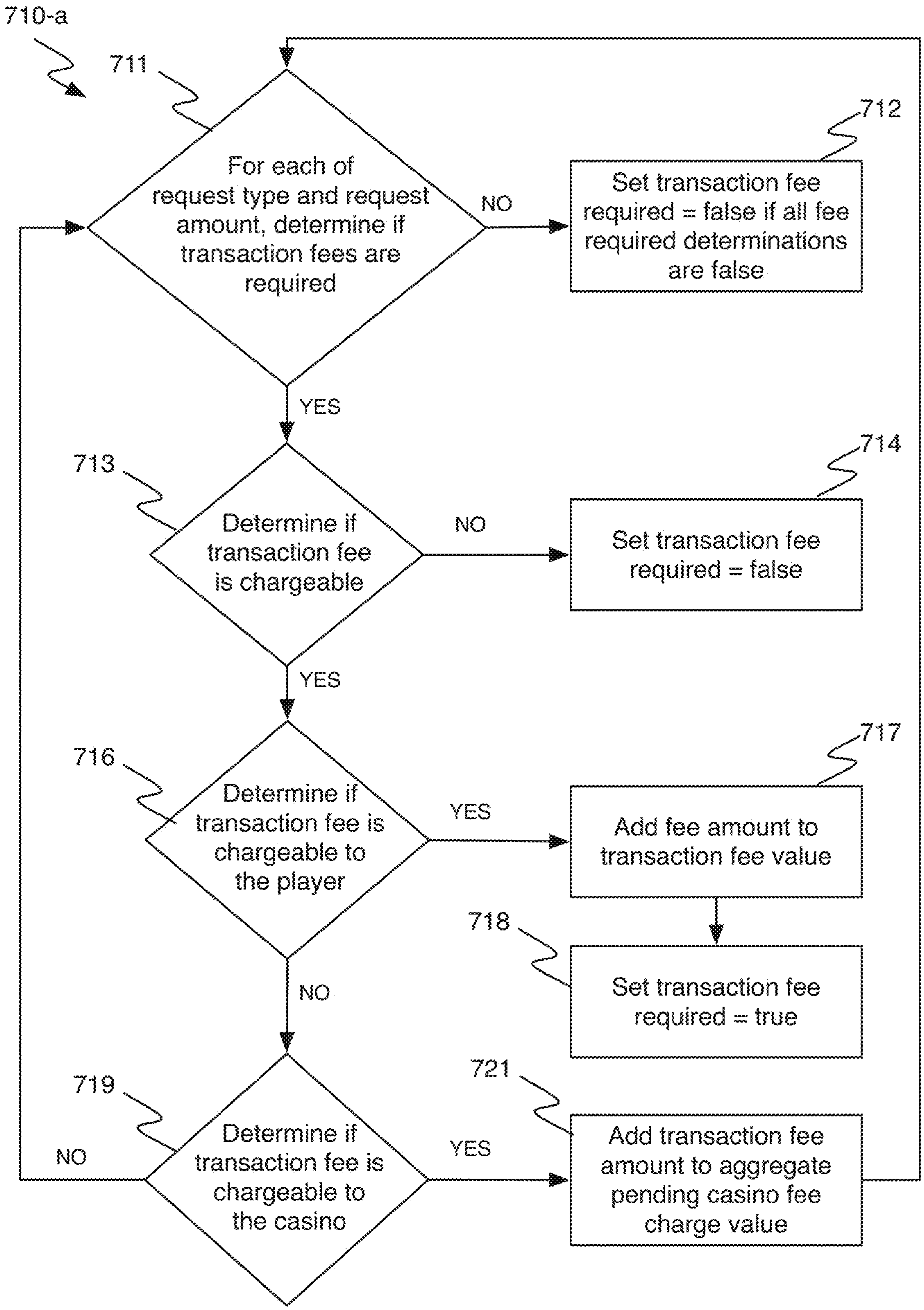
FIG. 7B is a flowchart of a method for allocating fees among the participants of FIG. 1.

Referring now to FIG. 7B, in some embodiments, one or more transaction fees are allocated to particular entities based, at least in part, request type, request amount, or both 711. If it is determined that there are no fees required, then the transaction fee required variable is set to false 712. If transaction fees are required, a determination is made whether or not the fee is chargeable 713. If it is not chargeable, then the transaction fee required variable is set to false 714. If it is chargeable, then it is determined whether or not the player is to be charged the fee 716. If the player is to be charged, then the fee amount is added to the transaction fee variable 717, and the transaction fee required variable is set to true 718. If it is determined the player is not to be charged, then it is determined whether or not the casino is to be charged 719. If so, the transaction fee amount is added to the aggregate pending casino fee charge variable 721.

Figure 7C:
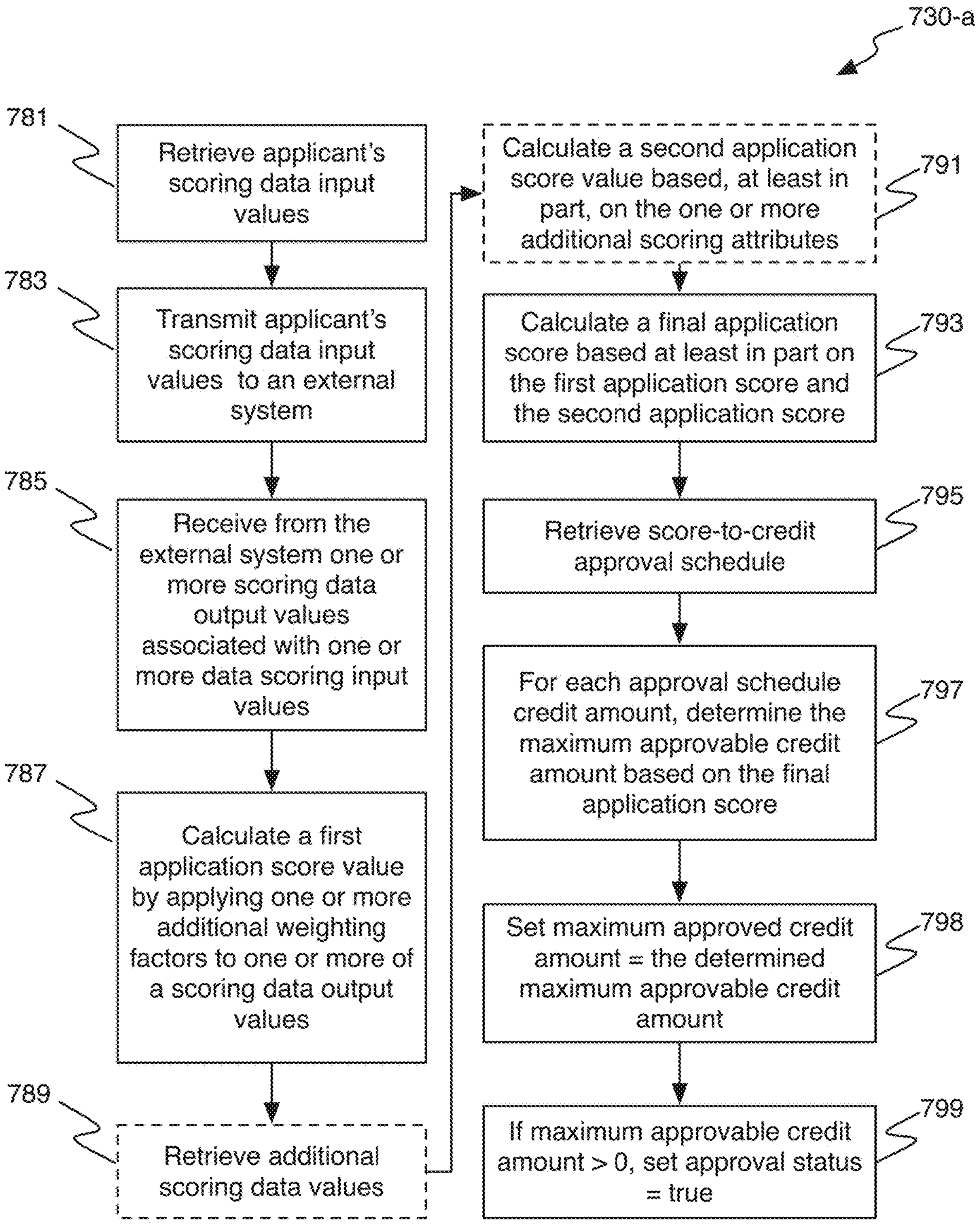
FIG. 7C is a flowchart of a method for using an external service for the credit application scoring of FIG. 7A by the credit application services layer of FIG. 5 in the credit wagering system with loan and warrantying of FIG. 2B and FIG. 3.

Referring now to FIG. 7C, in some embodiments, one or more of credit approval, maximum credit amount, or both, are determined, at least in part, based, at least in part, on data received from one or more external systems 216 (e.g., see FIG. 2), such as a third party credit scoring system 213, credit screening system 212, verification system 206, or the like. The processing of a credit application request can begin by retrieving applicant's scoring data input values 781, such as, for example, one or more of the applicant's first name, last name, social security number, driver's license number, driver's license information, age, email, bank account information, address, and the like. Some or all of the retrieved applicant's scoring data input values can be marshalled and transmitted to one or more external system 783. Upon completion of third-party external processing activity, the credit wager system with loan and warrantying receives from the external system 216 one or more scoring data output values associated with one or more data scoring input values 785. Scoring data output values can include, for example, FICO scores, non-FICO credit scores, such as an iPredict score, and the like. These scores can be use alone or in combination to calculate a first application score value, in certain cases, by applying one or more additional weighting factors to one or more of a scoring data output values 787.

In some embodiments, additional scoring data values are retrieved. Such values can include, for example, one or more of player club enrollment status, player gaming history, bank account automated direct debit authorization status, prior funds advancement, player employment status, player income source verification, player [fungible assets on deposit with linked financial institution and account pay down activity, full FICO report status, and the like 789. In some instances, a second application score value is calculated based, at least in part, on the one or more additional scoring attributes 791. In some instances, a final application score is calculated based at least in part on the first application score. In other embodiments, a final application score is calculated based at least in part on the second application score. In still other embodiments, a final application score is calculated based at least in part on the first application score and the second application score 793.

In some implementations, one or more score-to-credit approval schedules are retrieved 795 (e.g., see FIG. 94 through FIG. 97). For each approval schedule credit amount of the applicable schedule, the final application score is used to determine a maximum approvable credit amount 797, and the maximum approved credit amount is set to the determined maximum approvable credit amount 798. If the maximum approved credit amount is greater than zero, the approval status is set to true 799.

In some embodiments, multiple pre-defined approval tiers define requirements for players to obtain approval and advances for increased credit limits. These tiers can follow the same process described in FIG. 7C, but with one or more of different preconditions, receiving different external system outputs, receiving different additional scoring data values, applying different thresholds or schedules, or the like. FIG. 94 through FIG. 97 provides an example of a set of a tiered credit approval schedules. Pre-conditions for a first tier could include for example, one or more mandatory requirements, such as, existing enrollment in a casino player's club system 207, receipt of acceptable output from an identity verification system 206, receipt of acceptable output from a fraud verification system 209, minimum score from a credit scoring system 213, a minimum age, such as 21 years or older, and acceptance of one or more contractual conditions, such as acceptance of system terms and conditions, privacy policy, and the like. Approval for additional tiers can include one or more additional requirements, such as authorized direct debit from a bank account, receipt of acceptable output from a credit screening service 212, prior history of having utilized all existing available credit by advancing of funds to a wager account, prior history of having fully paid down a fully used available credit, and receipt of acceptable output of a full FICO credit bureau report from a credit screening system 212.

In some embodiments, if instead, the credit application processing engine 640 determines that credit will be extended 735, the credit application processing engine 640 can initiate a credit limit calculation determination process 750 determining the maximum credit available. In some instances, the maximum amount is authorized for automatic allocation to an existing or new credit account. In other instances, the player is prompted to select an authorized amount up to the maximum amount. In some instances, a maximum approval credit amount (e.g., see FIG. 7C) is displayed as the maximum selectable amount or the maximum amount. If it is determined a credit account does not exist 755, one or more of a credit account is created 760, a general wager account or game-specific wager account may be created 765, or both. Once the credit account is created the credit limit is set 770. The credit limit can be set in various ways, including, for example, automatically based on a credit allocation rule, such as allocating the maximum authorized amount, or through a combination of a player's credit score combined with their gaming history or through receipt of a credit amount selection less than the maximum authorized amount received from an input transmitted from the player interface to the credit application processing engine 640.

In some embodiments, once the credit application process is completed and funds are approved, some amount of the available credit can be accessed through the credit access service 645, added to the wager account 775, and deducted from the available credit of the credit account. Any transaction fee amount required 710 can be deducted from the wager account at the time the funds are added to the wager account 780. Alternatively, the player can provide payment of the fee by another means unrelated to the wager account.

Figure 8:
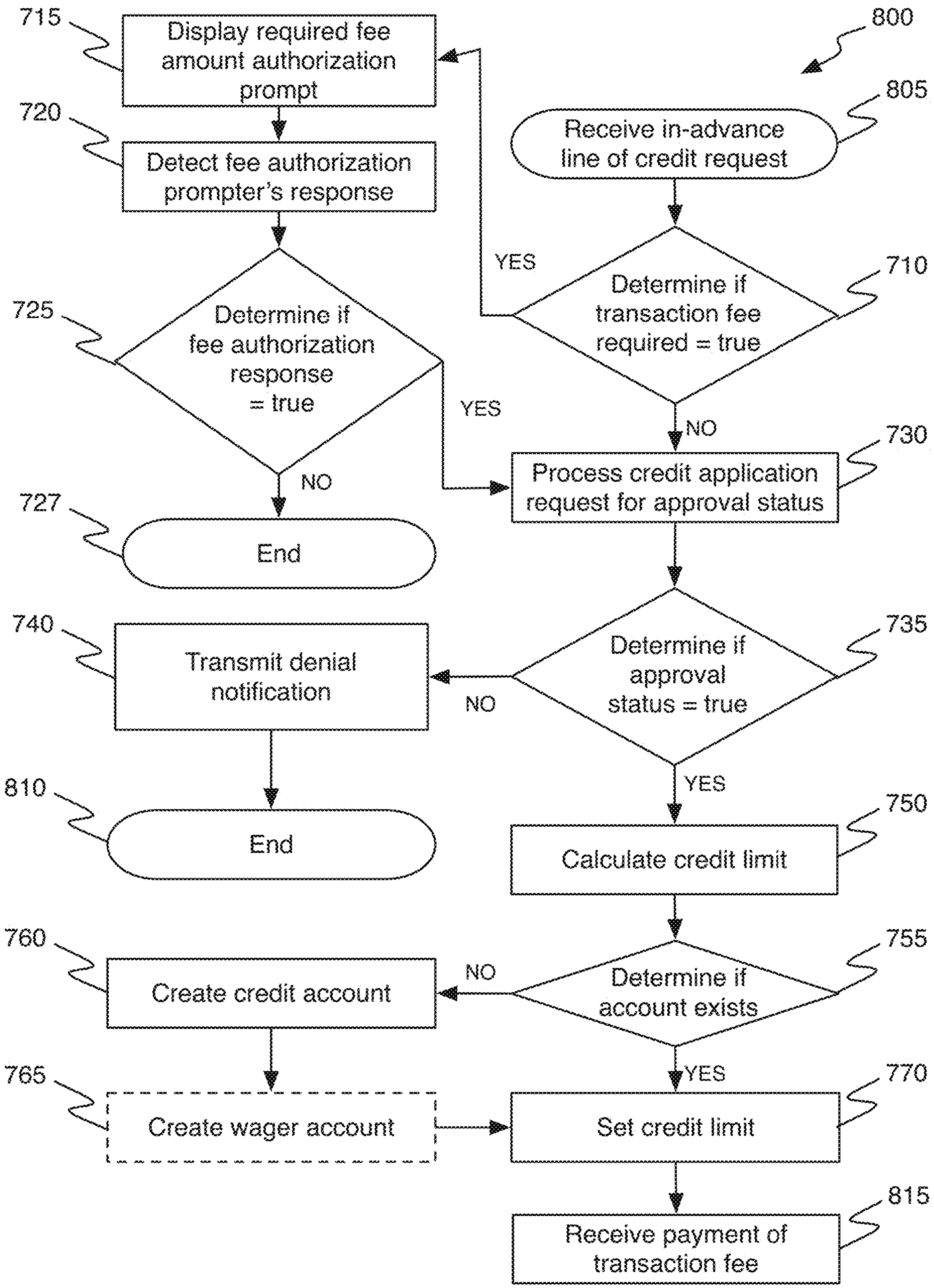
FIG. 8 is a flowchart of a method for in-advance processing of credit applications and approvals by the credit application services layer of FIG. 5 in the credit wagering system with loan and warrantying of FIG. 2B and FIG. 3.

Referring now to FIG. 8, in some embodiments, a player requests a line of credit in advance of engaging in game play 800. This process is similar to the process described for requesting credit while a player is engaged in game play 700 with a few variations. For example, the request is received in advance of game play, 805, which means the request can occur off-premise, and can utilize additional interfaces, such as by voice phone, computer, written application, and the like. Also, where a required fee is not authorized, the credit application process simply ends without any return to game play 810. Also, the transaction fee can be received by methods other than reducing available funds in a wager account, such as by electronic payment from a banking or funds account 815.

Figure 9:
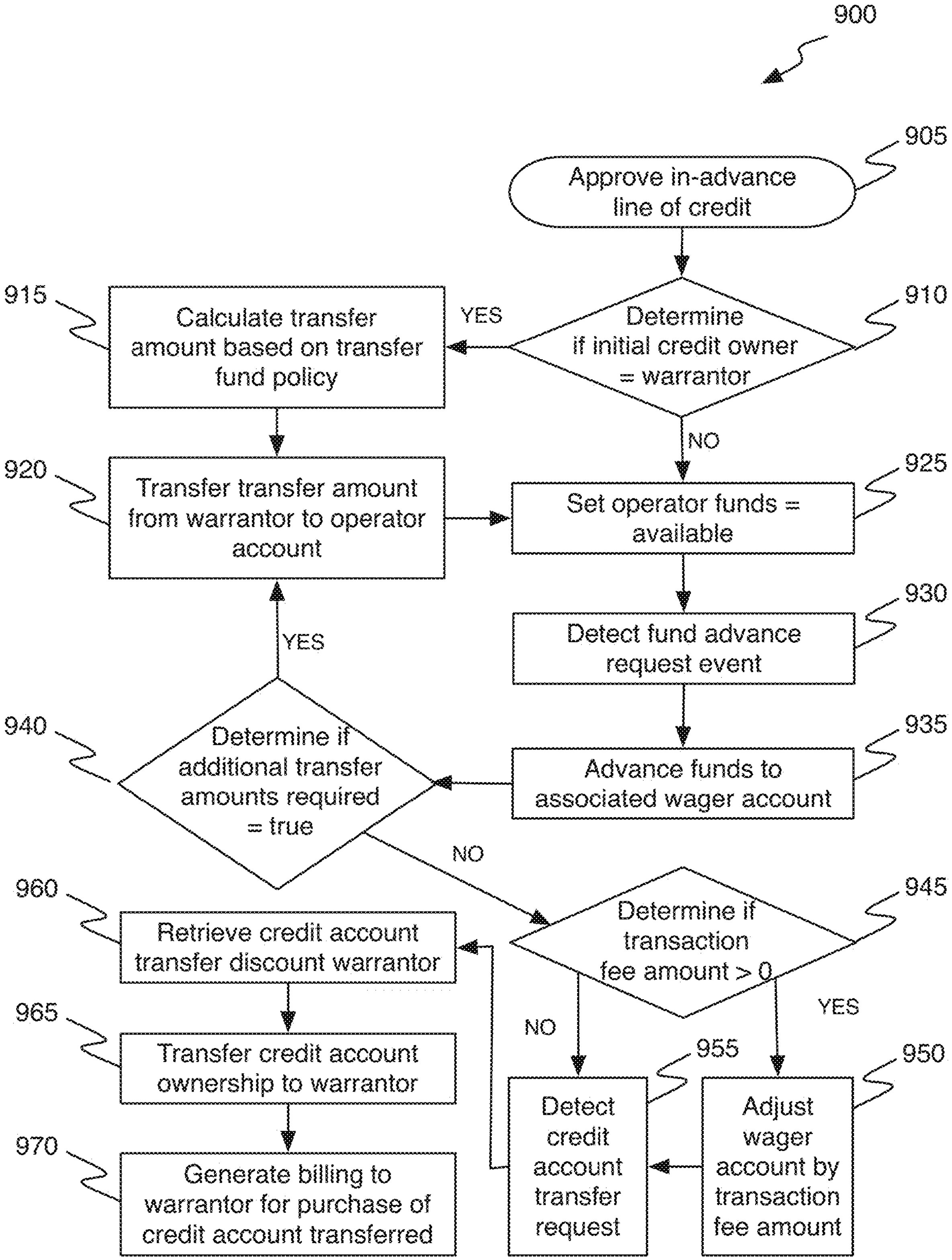
FIG. 9 is a flowchart of a method for an in-advance approval of credit applications by the credit application services layer of FIG. 5 in the credit wagering system with loan and warrantying of FIG. 2B and FIG. 3.

Referring now to FIG. 9, in some instances, a warrantor participates in one or more of the credit approval process, funds issuance process, and credit account ownership 900. Initially, a credit-approval process occurs that results in an approval 905. This approval process can be based on factors and rules directed by the casino operator, the warrantor, or both. In some instances, a warrantor owns the credit account and associated accounts receivable from the point of credit account creation. If it is determined that the credit account is warrantor-owned 910, funds can be transferred to the casino operator 920 to support the allocation of funds to player wager accounts. The amount of funds transferred from the warrantor to the casino operator can depend, at least in part, on a transfer fund policy, such as, for example, an immediate transfer of a full amount, an immediate transfer of a partial amount based on a credit threshold, a delayed transfer based on an intermittent schedule, a discounted transfer amount, and the like 915. In some embodiments, where it is determined that the credit account is not warrantor-owned 910, the operator can fund advance request from an operator-funded operator account 925.

Upon detection of a fund advance request 930 at the credit access service 645, funds can be advanced to the associated wager account 935 by the credit account management service 650. If it is determined that the fund advance request is in excess of a pre-determined operator account threshold amount, the exceeding of which requires additional funding from a third party 940, transfer amounts can be requested from and transferred from a warrantor to the casino operator 920. The warrantor can be an existing warrantor with a participation interest in the credit account, or in case of an operator-owned credit account, the warrantor can be a new warrantor.

Once there are no additional funds required to meet the funds advance request 930, the fee calculation engine 630 determines whether or not a transaction fee is due 945. In some instances, the fee is calculated intermittently based on funds advance over a time period, such as twenty-four hours. If there is a fee due, then the wager account where the funds are advanced is adjusted down by an amount equal to the transaction fee 950. When a credit account transfer request is detected 955 at the credit account transfer service 675, the discount factor for the receiving warrantor is retrieved 960 and the credit account ownership is transferred to the warrantor 965. The transfer billing service 690 generates a billing event for the credit account 970, accounting for the determined discount factor if applicable, and effectuates the billing through a pre-determined process, such as part of a reconciliation process.

Figure 10:
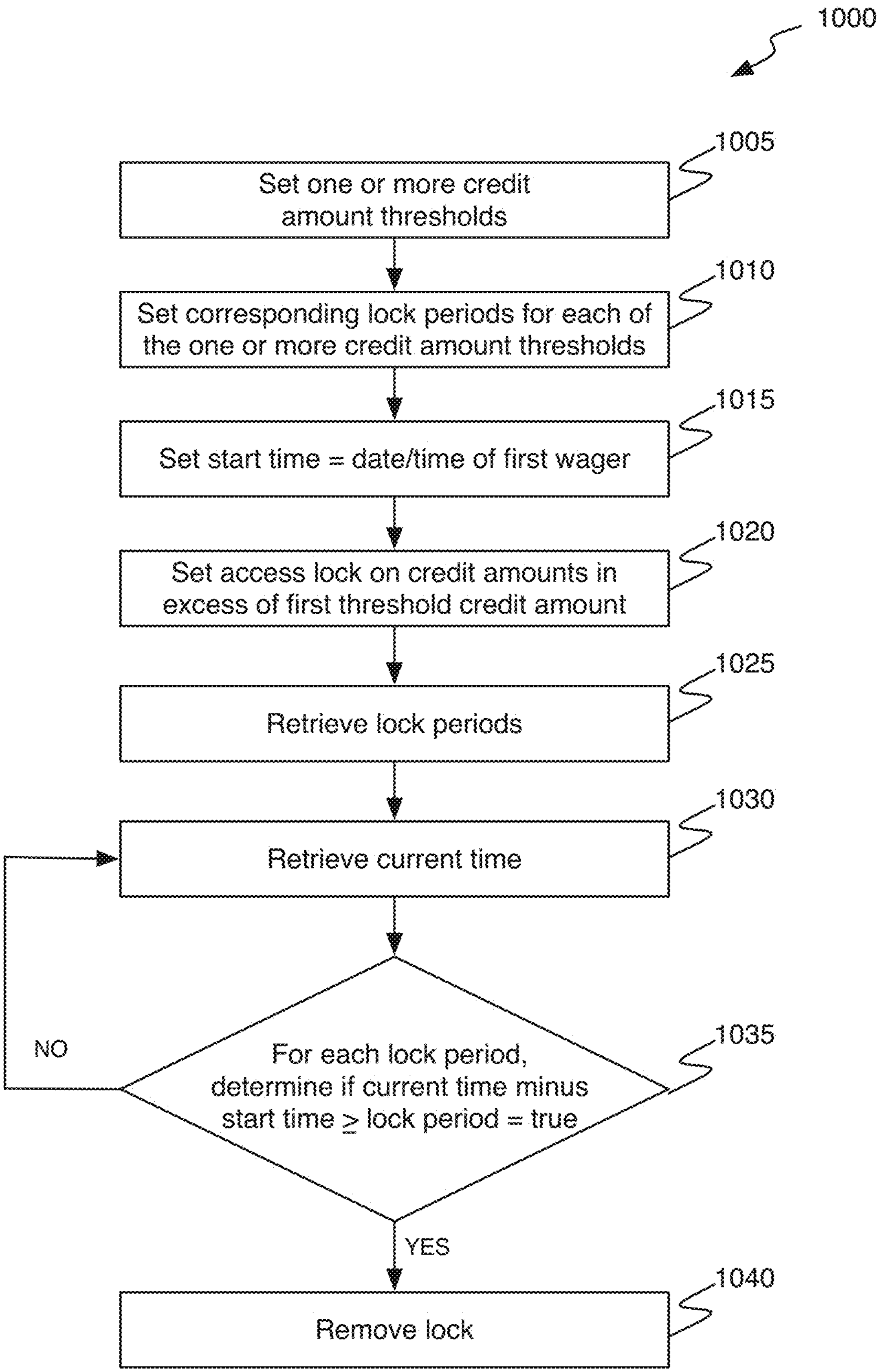
FIG. 10 is a flowchart of a method of responsible gaming approvals by the responsible gaming services layer of FIG. 5 in the credit wagering system with loan and warrantying of FIG. 2B and FIG. 3.
Figure 11:
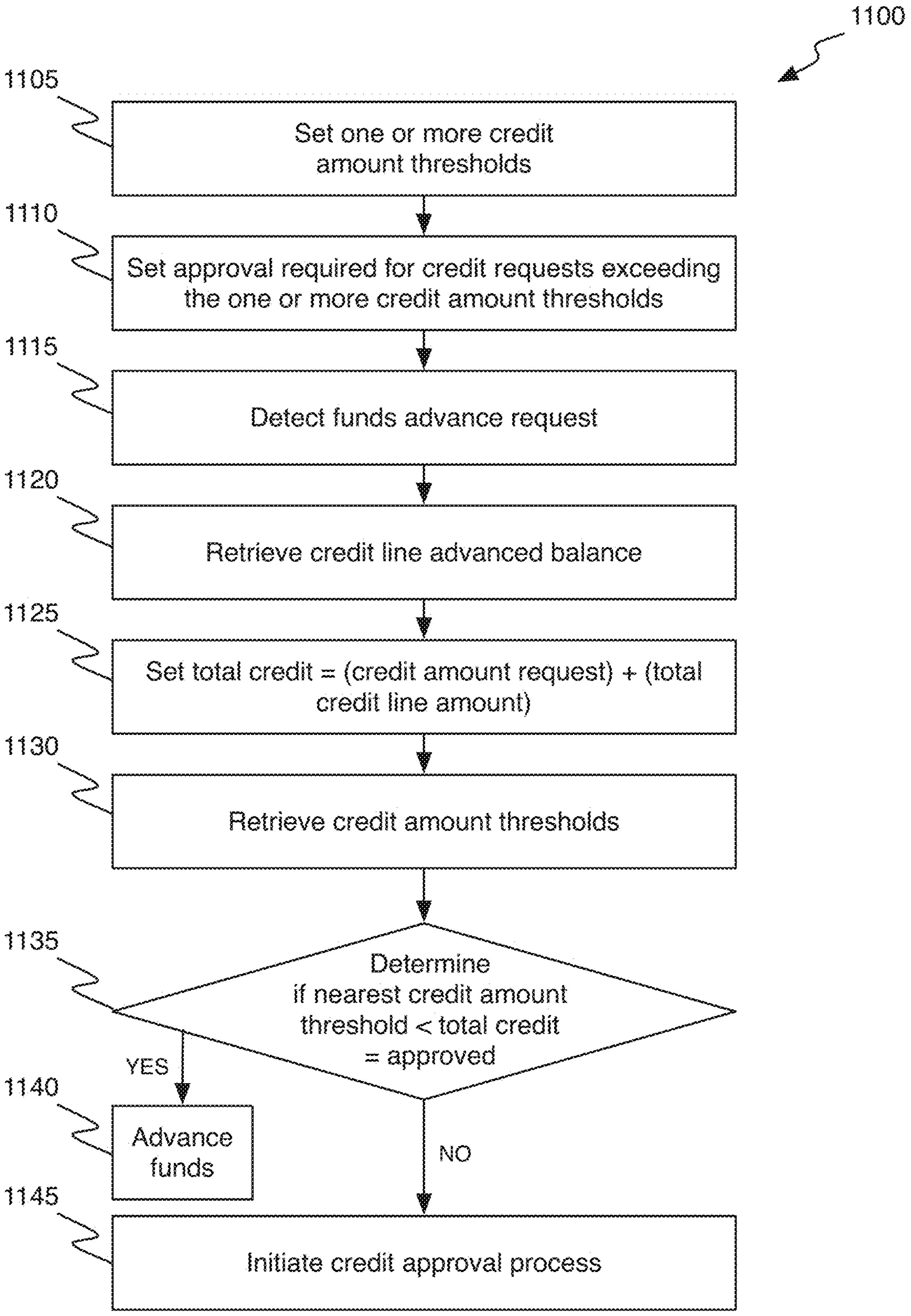
FIG. 11 is a flowchart of a method of tiered approval credit thresholds in the credit wagering system with loan and warrantying of FIG. 2B and FIG. 3.

Referring now to FIG. 10 and FIG. 11, in some embodiments, one or both of wager advance thresholds or credit approval amount thresholds can be used to throttle the access to and advancing of funds to players, such as for the purpose of promoting responsible gaming behaviors, complying with one or more laws or regulatory requirements, or reducing risk of financial loss to one or more of the player, casino, or warrantor.

Referring first to FIG. 10, in some embodiments, the credit wager system with loan and warrantying supports promotion or enforcement of one or more responsible gaming behaviors, such as, through the use of wager advance thresholds 1000 set and monitored at the responsible gaming service 525. One or more pre-determined credit thresholds can be set based on factors determined to be relevant to throttling game play 1005. It could be determined that based on factors such as, for example, the rate of play, the amount wagered, the current credit balance, past gaming behavior, financial well-being, and the like, a credit-per-period threshold of $1,000.00 is set. That period could be, for example a one-hour lock period 1010, or could be set to period mandated by a regulatory body. Similarly, there could be additional thresholds with varying locking periods, such as, a 48-hour locking period once an advanced credit threshold of $10,000.00 is reached within a 24-hour period.

In some embodiments, the start time is set when a player places a first wager 1015 and a lock is set restricting credit advances to a maximum amount equal to a first threshold amount 1020. In other instances, the start time is set when a player first advances funds from a credit account to a wager account. One or more lock periods are retrieved 1025, the current time is retrieved repeatedly during game play at regular intervals 1030, and a determination is made if time has passed in excess of the one or more lock period 1035. Where the time that has passed from the start time to the current time exceeds a given lock period, that lock is removed 1040. Where the lock is not removed, the ability to advance funds in excess of the threshold is restricted.

Referring now to FIG. 11, in some embodiments, the credit wager system with loan and warrantying utilizes credit approval amount thresholds to throttle gaming behavior 1100 set and monitored at the responsible gaming service 525. One or more pre-determined credit approval thresholds can be set based on factors determined to be relevant to throttling game play 1105. An approval required setting can be set to true for credit requests exceeding one or more credit amount thresholds 1110. When a funds advance request is detected 1115, the total credit line advance amount is retrieved 1120. The total credit for purposes of determining approval requirements is the sum of the total credit line advance amount and the funds advance amount requested 1125. Credit approval thresholds are retrieved 1130, and if it is determined that the nearest credit amount threshold less than this summed total credit amount is approved 1135, then funds can be advanced 1140. If not, then an approval process is initiated 1145. In some instances, like the wager advance thresholds mechanisms 1000, the credit approval thresholds can be used with associated locks to throttle play, avoiding the need to go through the credit approval process until such credit is needed.

Figure 12:
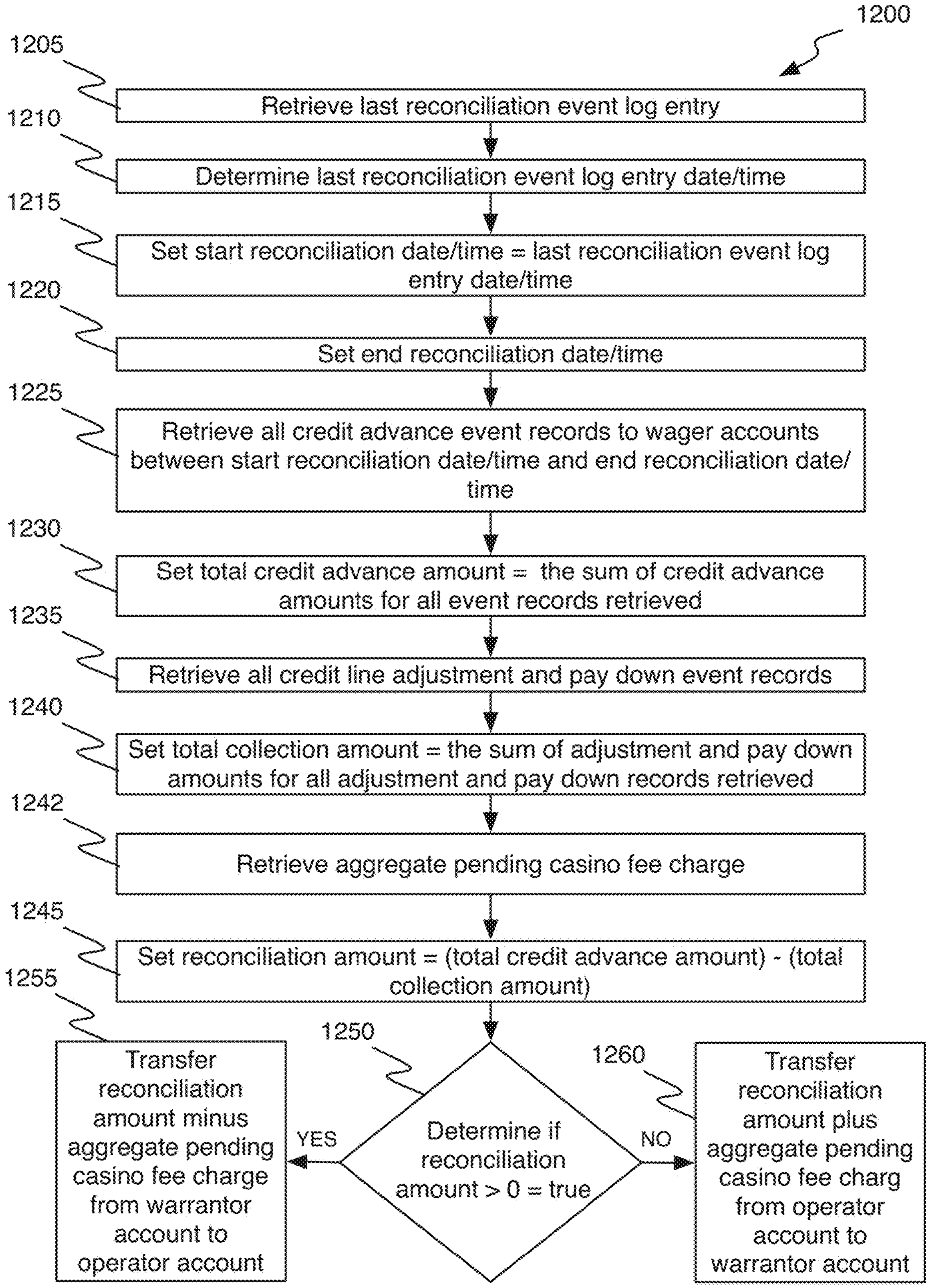
FIG. 12 is a flowchart of a method of intermittent credit account reconciliation by the account services layer of FIG. 5 in the credit wagering system with loan and warrantying of FIG. 2B and FIG. 3.

In some instances, services support and facilitate intermittent reconciliation of credit accounts held, owned, or participated in, in whole or in part, by one or more warrantors and one or more casinos. Referring now to FIG. 12, in some embodiments, a reconciliation engine 685 preforms reconciliation of funds advanced between a warrantor and an operator based, at least in part, on intermittent analysis of player credit account balances, either individually or in the aggregate 1200. In some embodiments, the last reconciliation even log entry is retrieved from a data store 1205. It is parsed such that the data/time of the log entry is determined 1210, and the start date/time reconciliation variable for the reconciliation process is set to the parsed date/time value 1215. The end date/time reconciliation variable for the reconciliation process is set to the current date/time value 1220, or in certain instances, a selected date/time value, and all credit advance event records to wager accounts between start reconciliation date/time and end reconciliation date/time are retrieved 1225. The total credit advance amount for the reconciliation period is calculated and set by summing the credit advance amounts for all event records retrieved 1230. All credit line adjustment and pay down event records are retrieved for the same reconciliation period 1235, and the total collection amount is calculated and set as the sum of adjustment and pay down amounts for all adjustment and pay down records retrieved 1240. The amount of the aggregate pending fee payments chargeable to the casino is retrieved 1242. Reconciliation amount for the reconciliation period is set to the total credit advance amount minus the total collection amount 1245. If its determined that the reconciliation amount is greater than zero 1250, then the reconciliation amount minus the aggregated pending casino fee charge is transferred from warrantor account to the operator account 1255. Alternatively, if its determined that the reconciliation amount is less than zero 1250, then the reconciliation amount plus the aggregated pending casino fee charge is transferred from operator account to the warrantor account 1260. It will be appreciated by one skilled in the art that reconciliation calculations can be adapted based on other factors and business arrangements.

Figure 13:
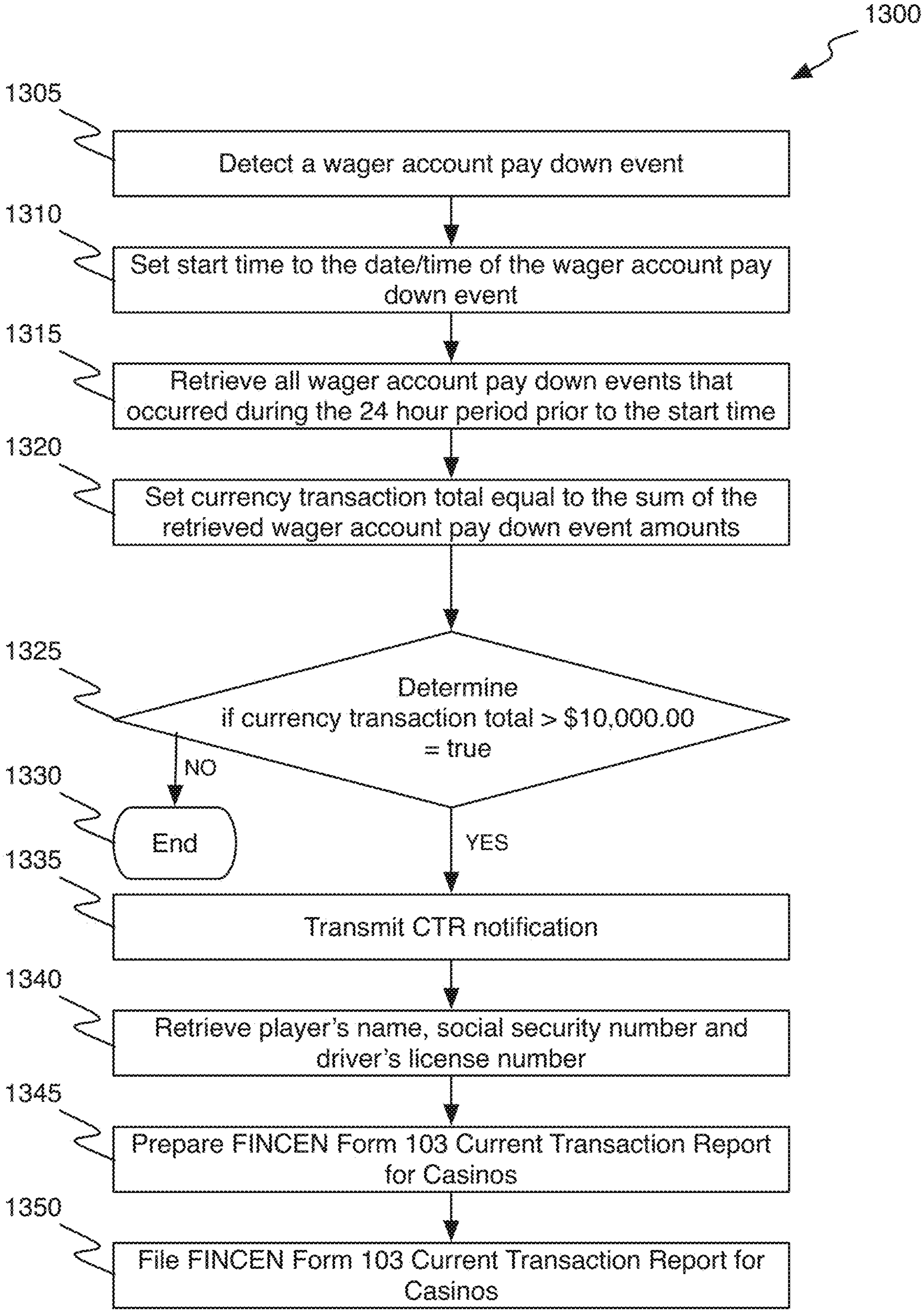
FIG. 13 is a flowchart of a method of monitoring for credit transaction report triggering events by the compliance services layer of FIG. 5 in the credit wagering system with loan and warrantying of FIG. 2B and FIG. 3.
Figure 14:
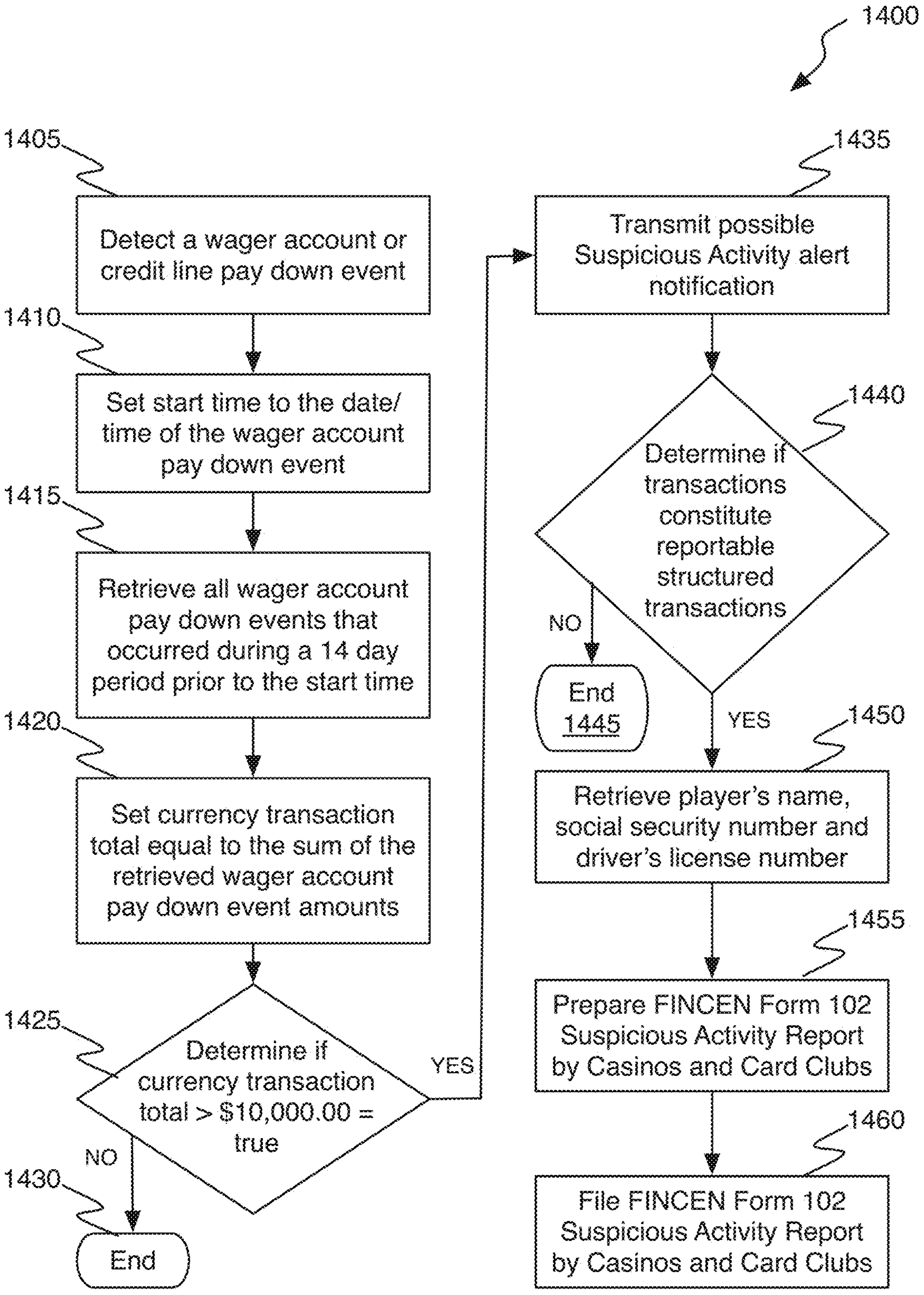
FIG. 14 is a flowchart of a method of monitoring for structure transactions by the compliance services layer of FIG. 5 in the credit wagering system with loan and warrantying of FIG. 2B and FIG. 3.
Figure 15:
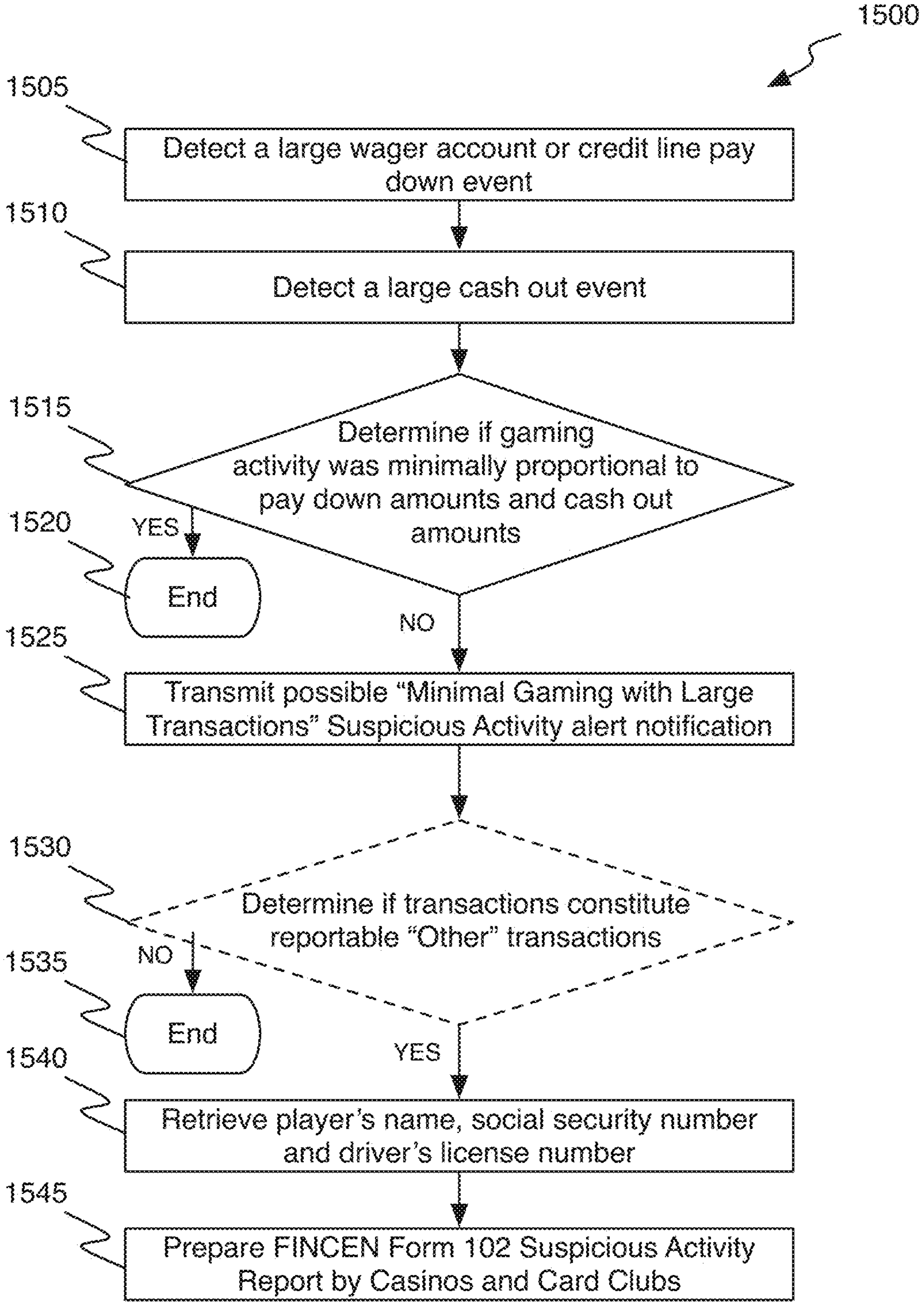
FIG. 15 is a flowchart of a method of monitoring for minimal gaming conditions by the compliance services layer of FIG. 5 in the credit wagering system with loan and warrantying of FIG. 2B and FIG. 3.

Referring now to FIG. 13 through FIG. 15, in some embodiments, one or more services provide suspicious activity and currency transaction monitoring and reporting, such as, for example, one or more of for currency transactions exceeding threshold amounts, structured transactions, and minimal gaming activity. In certain instances, reports are automatically generated, automatically filed, or both.

Referring now to FIG. 13, in some instances, the currency transaction monitoring engine 665 detects a wager account pay down event 1305. The start time is set to the date/time of the wager account pay down event 1310, and all wager account pay down events that occurred during the 24 hour period prior to the start time are retrieved 1315. Currency transaction total is set to the sum of the retrieved wager account pay down event amounts 1320. If it is determined that the currency transaction total is less than, for example, $10,000.00 1325, no transaction reporting alerts or reporting occurs 1330. Alternatively, if it is determined that the currency transaction total is greater than, for example, $10,000.00 1325, transaction reporting alerts, reporting, or both occur. Reporting alerts from the compliance reporting service 660 can include, for example, transmitting a Currency Transaction Report notification alert 1335. Reporting can include, for example, retrieving the player's name, social security number, and driver's license number 1340 and in some implementations, preparing, for example FINCEN Form 103 Current Transaction Report for Casinos 1345. In some embodiments, a compliance filing service 670 facilitates automatic, or semi-automatic, filing of such reports 1350.

Referring now to FIG. 14, another example of compliance activities includes monitoring for and detection of structured transactions 1400. In some instances, the suspicious activity transaction monitoring engine 655 detects a wager account pay down event 1405. The start time is set to the date/time of the wager account pay down event 1410, and all wager account pay down events that occurred during a 14 day period prior to the start time 1415. Currency transaction total is set to the sum of the retrieved wager account pay down event amounts 1420. If it is determined that the currency transaction total is less than, for example, $10,000.00 1425, no transaction reporting alerts or reporting occurs 1430. Alternatively, if it is determined that the currency transaction total is greater than, for example, $10,000.00 1425, transaction reporting alerts, reporting, or both occur. In some instances, the suspicious activity monitoring engine 655 transmits a possible suspicious activity alert notification 1435. If it is determined that the transactions do not constitute reportable structured transactions 1440, then no further action is taken 1445. If it is determined that the transactions do constitute reportable structured transactions 1440, the player's name, social security number and driver's license number are retrieved 1450, and in some instances, the compliance reporting service 660 prepares the appropriate reports, such as the FINCEN Form 102 Suspicious Activity Report by Casinos and Card Clubs 1455. In some embodiments, a compliance filing service 670 facilitates automatic, or semi-automatic, filing of such reports 1460.

Referring now to FIG. 15, another example of compliance activities includes monitoring for and detection of minimal gaming transactions 1500. In some instances, the suspicious activity transaction monitoring engine 655 detects a large wager account or credit line pay down event 1505 and a large cash out event 1510. The suspicious activity transaction monitoring engine 655 then determines based on a pre-determined ratio thresholds if gaming activity was minimally proportional to the pay down amounts and cash out amounts 1515. If that determination is that it is proportional, then no transaction reporting alerts or reporting occurs 1520. If that determination is that it is not proportional, then in some instances, the suspicious activity monitoring engine 655 transmits a possible Minimal Gaming with Large Transactions suspicious activity alert notification 1525. In some embodiments, further determinations are made as to whether transactions constitute other reportable transactions 1530. If no other reportable transaction conditions are identified, no transaction reporting alerts or reporting occurs 1535. If it is determined that the transactions do constitute reportable structured transactions 1530, the player's name, social security number and driver's license number are retrieved 1540, and in some instances, the compliance reporting service 660 prepares the appropriate reports, such as the FINCEN Form 102 Suspicious Activity Report by Casinos and Card Clubs 1545.

Figure 16:
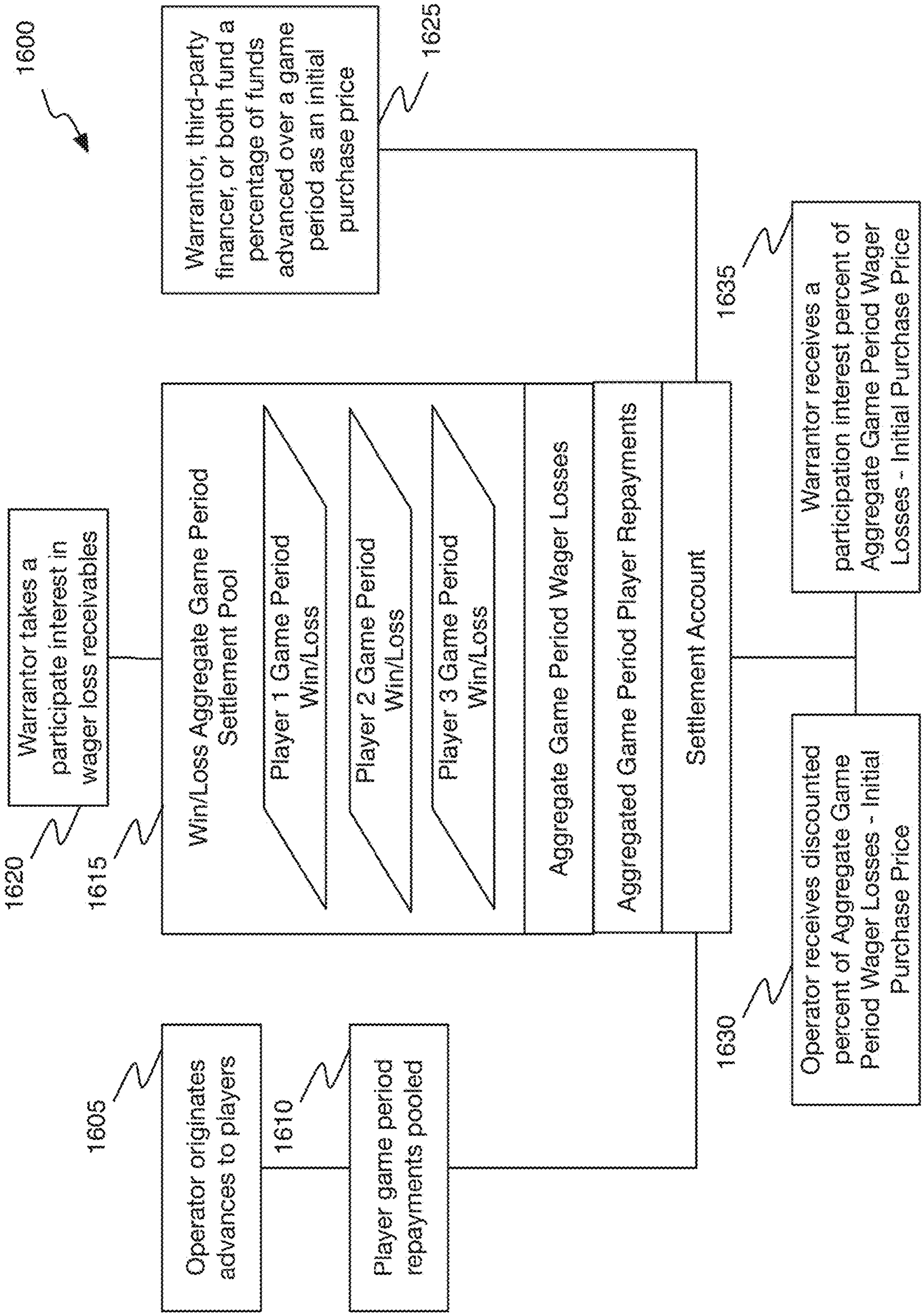
FIG. 16 is a block diagram of the win/loss aggregate game period settlement pool method for distributing revenue share based on wager loss receivable participation interests.

In some embodiments, one or more approaches are available for the use the win/loss aggregate game period settlement pool for settlement and the sharing of wager loss collection percentages between the operator and the warrantor. Referring now to FIG. 16, players wager individually and over a gaming period. The credit wagering system with loan and warrantying gathers those outcomes into a win/loss aggregate game period settlement pool and settles to the operator based on the losses over that game period time. The operator advances money to players, but at the end of the game period, there is typically a net aggregate loss less than 100% of the advanced amounts. Settling, typically at a discounted rate, is a discounted level of the advances made to the individual players. In certain instances, the operator is the originator and the warrantor buys a participation interest in the daily receivables at a discount of the originated aggregated advance pool, with such purchase potentially funded by the warrantor, a downstream licensed finance partner, or both.

In some instances, the warrantor buys the receivables and is wholly at risk.

In yet other instances, the warrantor or a licensed finance partner makes a consumer loan to a player that may be, for example, interest free, subject to interest, or subject to a fee, and settles with the operator for the actual discounted loss.

In some implementations, credit wagering system with loan and warrantying is directly or indirectly engaged in one or more of two distinct independent transactions, namely, a first independent transaction that funds a wagering account (the transaction being between the player and the third party warrantor or licensed finance partner), and a second independent transaction between the operator and the warrantor where the warrantor buys a participation interest in accounts receivable (the losses ascertainable from the win/loss aggregate game period settlement pool) generated at the end of each game period.

In some embodiments, the variables include n number of players provided a consumer advance over a period of time representing a game period. Amounts funded move to the players' cashless wagering account and can, in some instances, only be used for wagering activity. The warrantor gives the operator a discounted percentage of the actual losses ascertainable from the win/loss aggregate game period settlement pool. On the game period settlement day, the actual game period losses might be, for example, 90% of the amount funded for that game period. The warrantor funds a discounted percentage of that by buying a position in the receivables of the operator (e.g., 80%), such that the warrantor is effectively funding, in this example, 72% of the actual advanced funds on the day of game period settlement with the operator. In some embodiments, the warrantor has full and sole responsibility for recovering from the players. The warrantor might apply interest to late payments. The warrantor then pays back to the operator a revenue share for funds above, in this example, the 80% game period settlement.

In some embodiments, an operator, such as, for example, a casino, originates advances to players 1605. A player then uses at least a portion of these advances to fund wagering activity during a gaming period 1610, where that gaming period can extend from, for example, a gaming session to a period of days, weeks, months, or the like. The wins and losses for the gaming period can be aggregated into a win/loss aggregate game period settlement pool, that pool including one or more of the individual wager winnings or losses for each player for the game period, the aggregated wager losses across at least some of the players, the aggregated game period player repayments, and a settlement account for funds transfers 1615. In some instances, a warrantor takes a participation interest in the aggregated game period wager loss receivables 1620. In some instances, one or more of a warrantor or third-party financer fund at least a percentage of the funds advanced over a game period 1625. This amount can be characterized as an initial purchase price. At the time of settlement, the reconciliation engine 685 (e.g., see FIG. 6) can accomplish a revenue share with respect to the realization and collection of wager losses, where the operator receives a discounted percent of Aggregate Game Period Wager Losses—the Initial Purchase Price 1630, and the warrantor receives a participation interest percent of Aggregate Game Period Wager Losses—Initial Purchase Price 1635.

Figure 17:
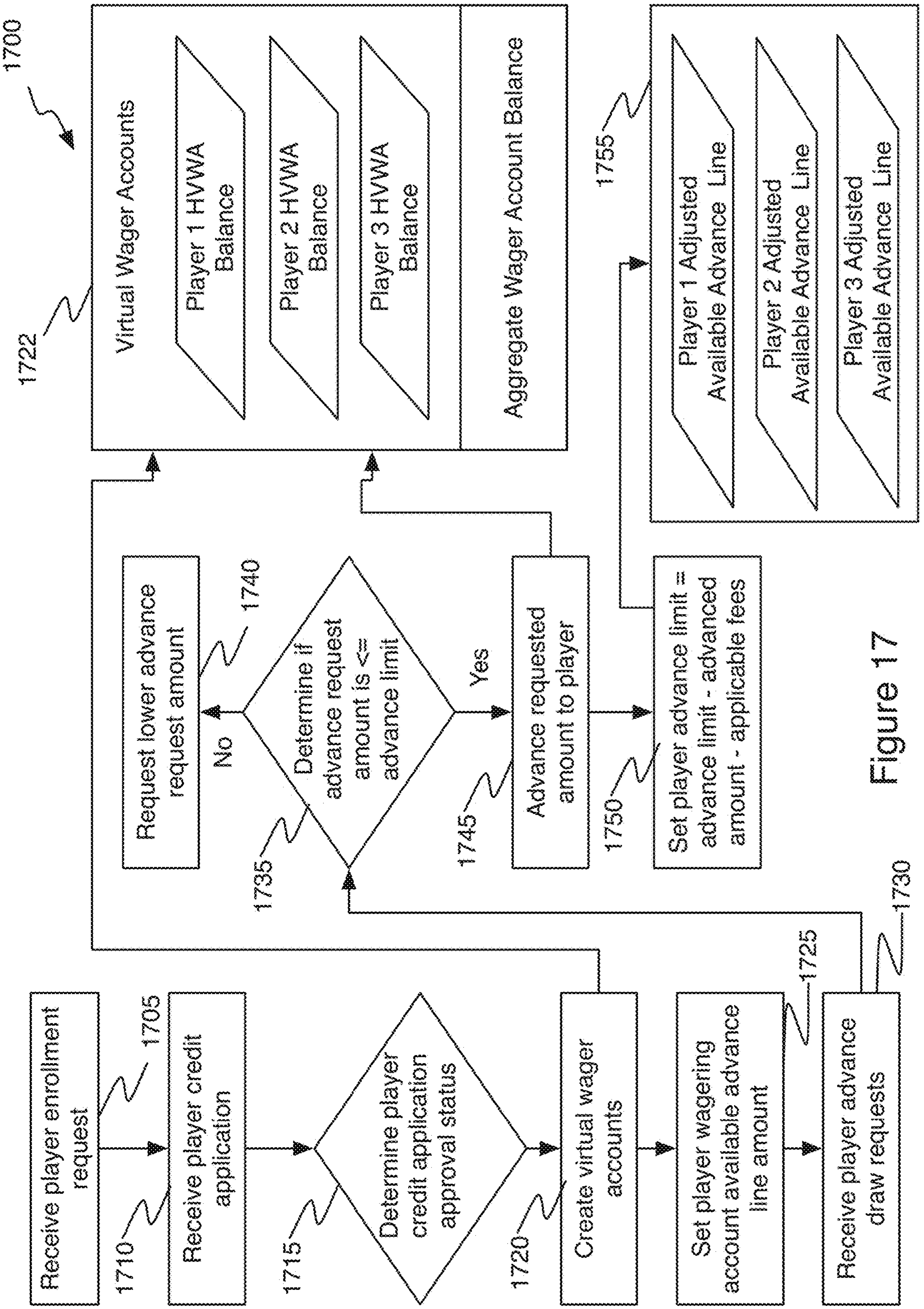
FIG. 17 is a flowchart of a method of managing and settling virtual player wager accounts and revenue sharing using a win/loss aggregate game period settlement pool in the credit wagering system with loan and warrantying of FIG. 2B and FIG. 3.

Referring now to FIG. 17, in some embodiments, the credit wager system with loan and warrantying receives a player enrollment request 1705 and a player credit application 1710. It is determined based at least in part on the credit application whether the player is approved for a credit advance 1715. Where the player is approved, a virtual wager account is created 1720 and an aggregate wager account balance is maintained 1722 and the advance line amount is made available in the wagering account 1725. The credit wager system with loan and warrantying receives one or more player advance draw requests 1730. When a advance request is received, it is determined whether or not the amount is less than the present advance limit 1735. If it is over the advance limit, then a request is displayed directing the player to lower the advance request amount 1740. If the advance is less than or equal to the limit, the amount is advanced 1745 and the advance limit is adjusted accordingly 1750 1755.

Figure 18:
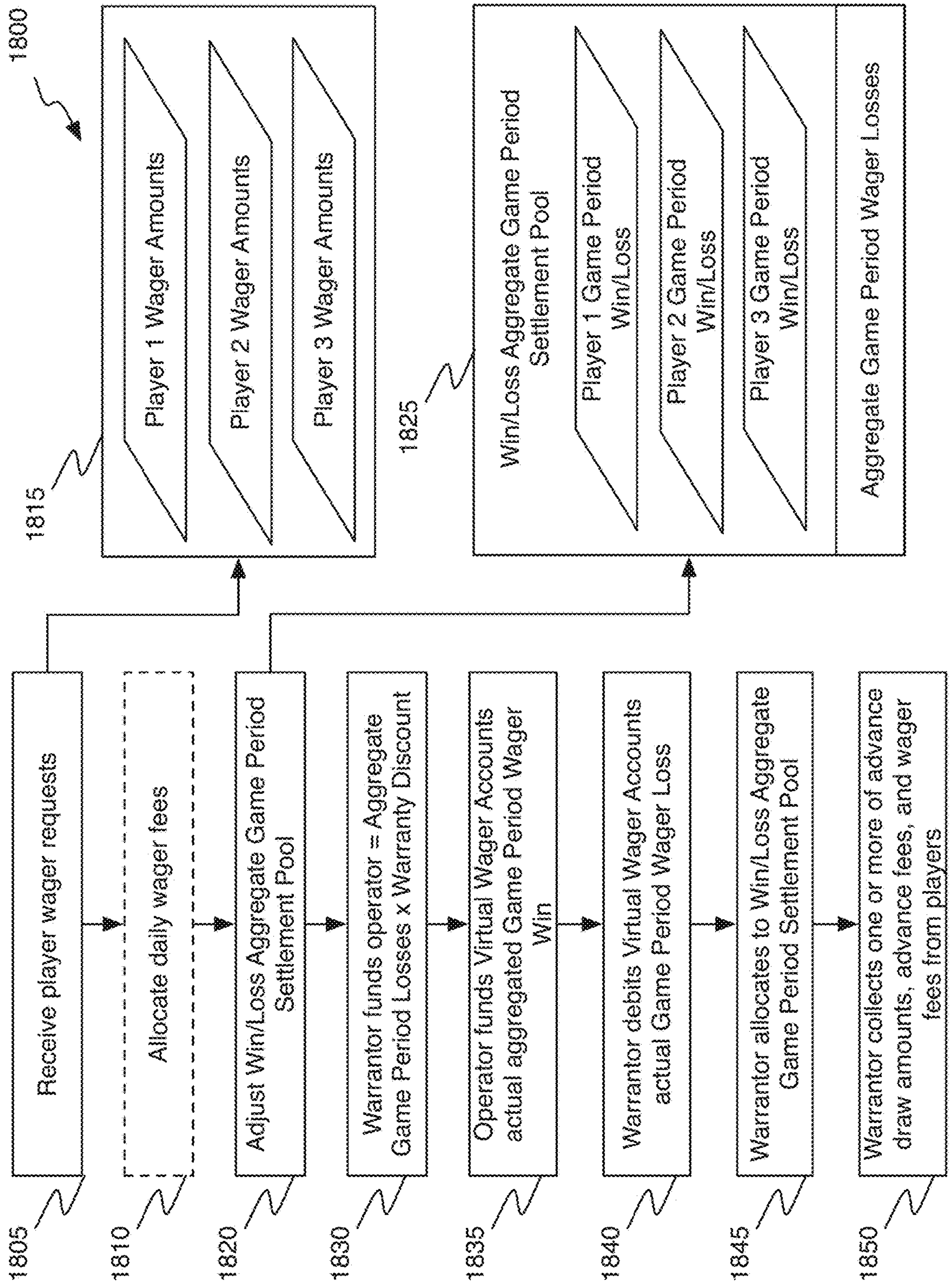
FIG. 18 is another flowchart extending the method of FIG. 16 for managing and settling virtual player wager accounts and revenue sharing using a win/loss aggregate game period settlement pool in the credit wagering system with loan and warrantying of FIG. 2B and FIG. 3.

Referring now to FIG. 18, in some embodiments, the credit wager system with loan and warrantying receives a player wager request 1805 1810. In some instance fees, such as a daily wager fee, are allocated to the player 1815. As the gaming period progresses, the win/loss aggregate game period settlement pool is adjusted to reflect the win or loss condition of the players 1820, and an aggregate game period wager losses calculation is maintained or is otherwise available to be calculated 1825. A warrantor funds the operator in an amount equal to the aggregate game period losses times a warranty discount 1830. The operator funds virtual wager accounts during the game period in an amount equal to the actual aggregated game period wager winnings 1835. The warrantor debits the virtual wager accounts in an amount equal to the actual game period wager losses 1840. The warrantor allocates to the win/loss aggregate game period settlement pool, and collects one or more of the advance draw amounts, advance fees, and wager fees from one or more players 1845, 1850.

Figure 19A:
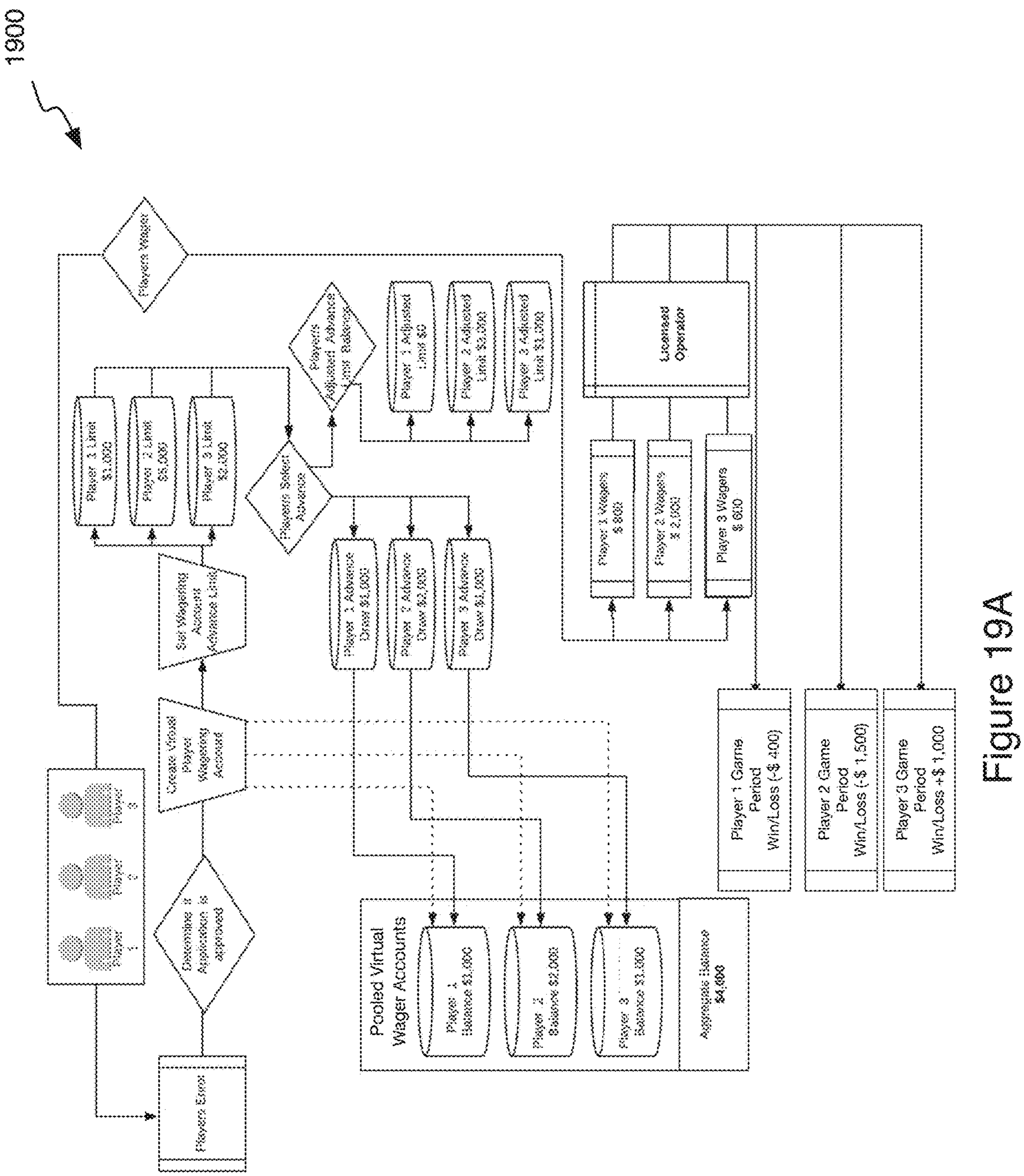
FIG. 19A and FIG. 19B are flowchart diagrams of an example of managing and settling virtual player wager accounts using a win/loss aggregate game period settlement pool of FIG. 17 and FIG. 18.
Figure 19B:
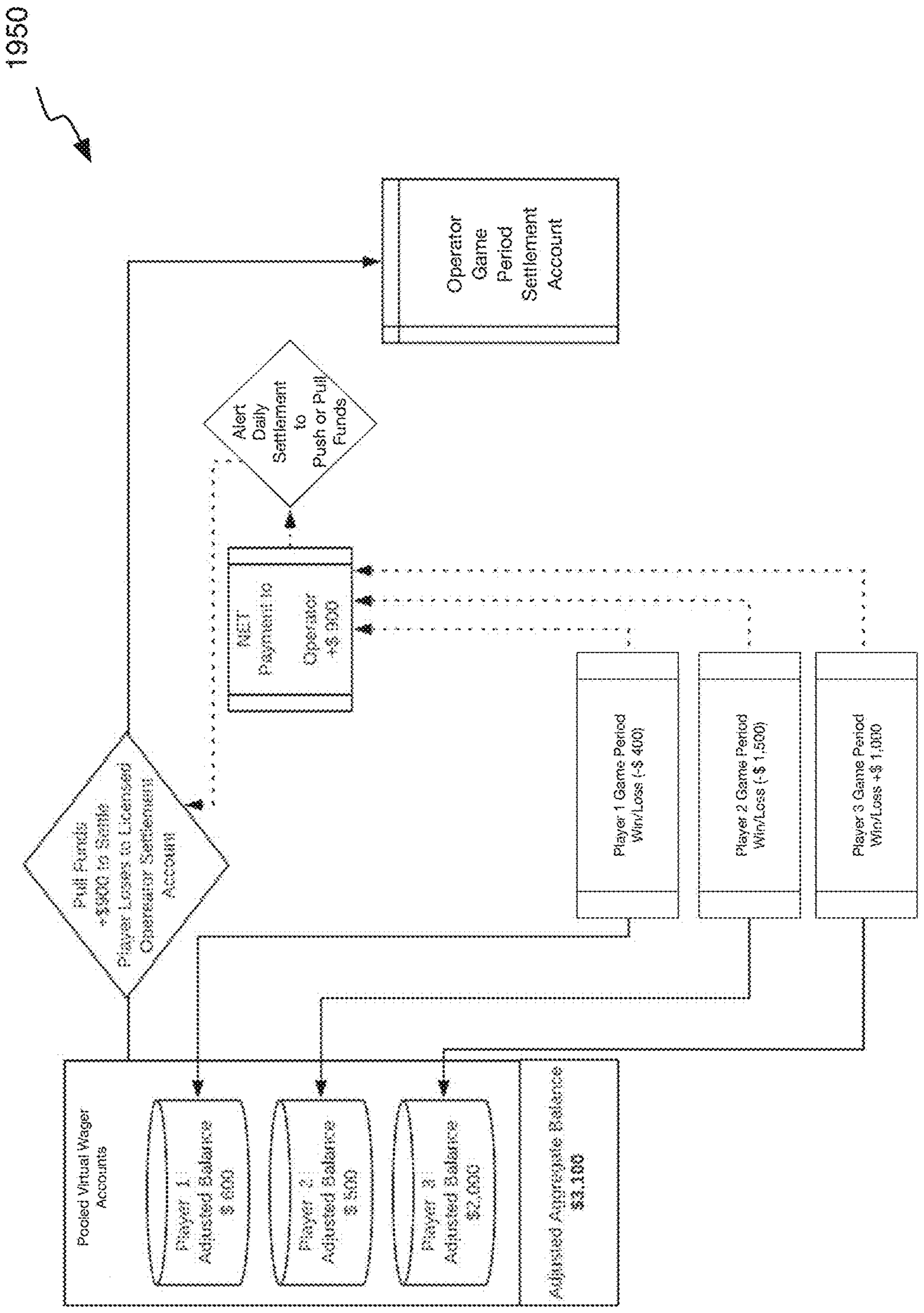

Referring now to FIG. 19A and FIG. 19B, examples are shown for the use the win/loss aggregate game period settlement pool for settlement and the sharing of wager loss collection percentages between the operator and the warrantor.

Figure 20:
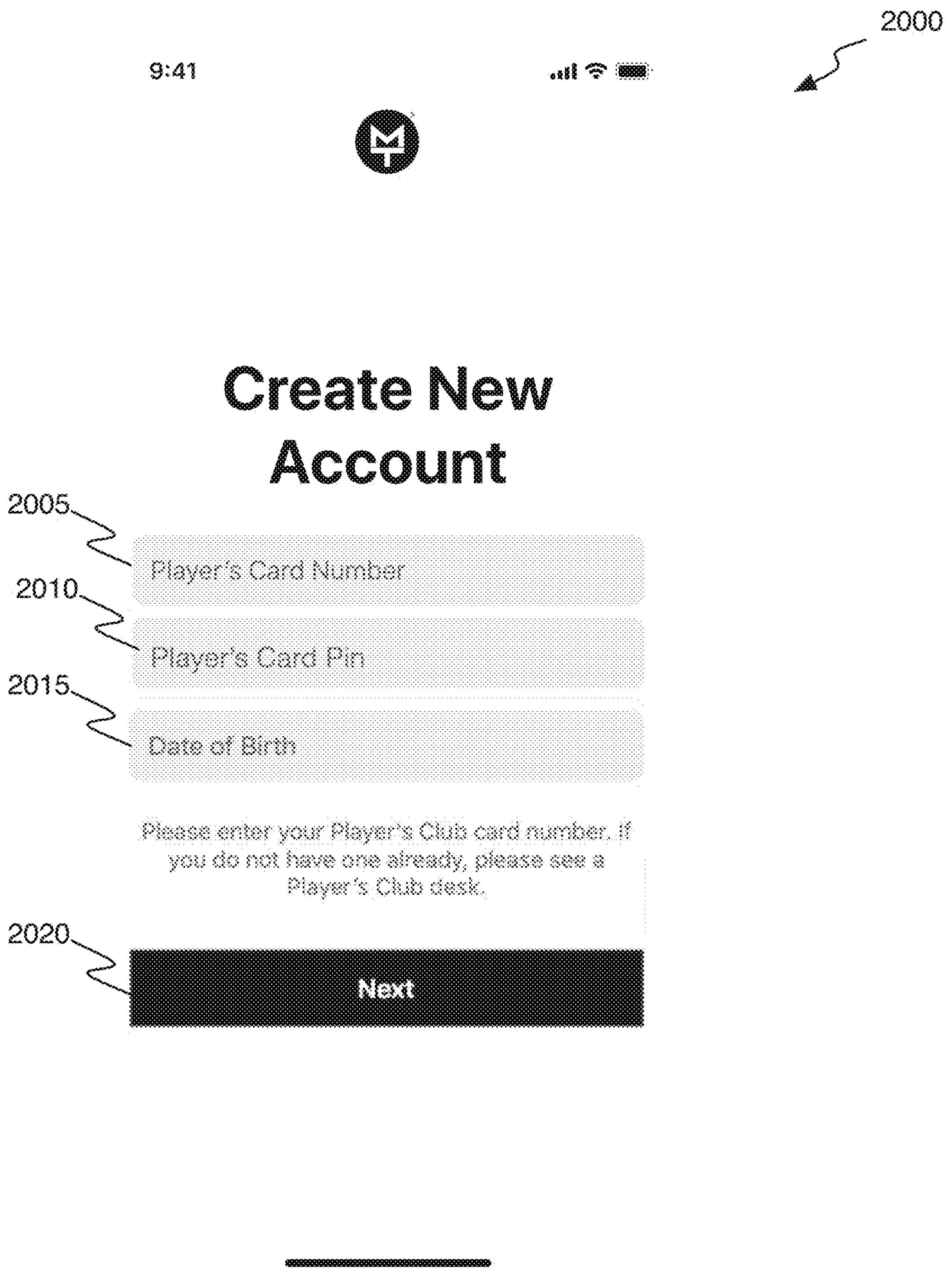
FIG. 20 is a screen capture of the create new account view of the mobile application of FIG. 1.
Figure 21:
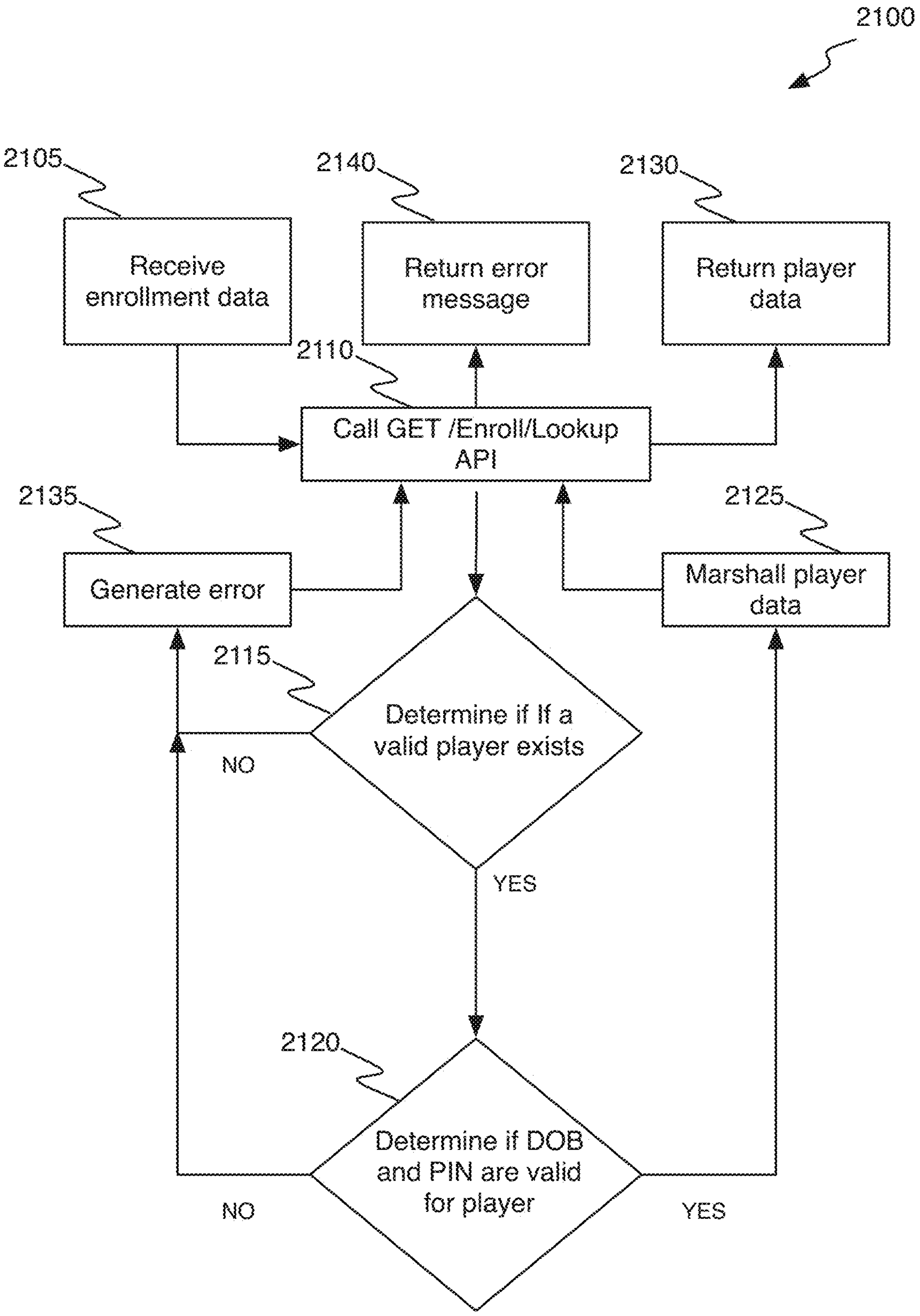
FIG. 21 is a flowchart of create new account method by the authentication and other services of FIG. 3 in the credit wagering system with loan and warrantying of FIG. 2B and FIG. 3 that interfaces with the create new account view of FIG. 20.

In some embodiments, a mobile interface 310 (e.g., see FIG. 3) provides certain services to patrons, players, or both. Referring now to FIG. 20 and FIG. 21, in some embodiments, upon initiation of the mobile interface 310, an create account view 2000 is displayed, with controls for the collection of identifying credentials 2005, 2010, 2015 and for the submission of collected identifying credentials 2020. API endpoints can include, for example, GET /Enroll/Lookup. The interface can collect identifying credentials for marshalling and transmission, such as:

Example Data Input:

{
"card_number": "123456789",
"card_pin": "1234"
"date_of_birth": "1985-12-12",
"property_id": "2"
}

Upon receiving of identifying data 2105, the API endpoint of GET /Enroll/Lookup 2110 and the data input is passed to the authentication service. The authentication service then validates and checks the authentication and user database to see if the user identification credentials correspond to a valid player 2115. If the user identification credentials are verified, the authentication service determines if the date of birth and pin are valid and correspond to the identified stored player information 2120. If the correspondence is validated, the authentication service then marshals and returns the data output 2125, 2130. If the correspondence is not valid, the authentication service generates an error 2135. The authentication service then returns a failure message 2140.

Example Data Output:

{
"name_first": "John",
"name_last": "Smith",

-continued

Example Data Output:

"property_id": "2",
"player_card_program_id": "2",
"card_number": "123456789",
"street": "123 Main St.",
"city": "Las Vegas",
"state": "NV",
"zip": "89101",
"phone": "7021234567",
"date_of_birth": "1985-12-12",
"name": "John Smith"
}

Figure 22:
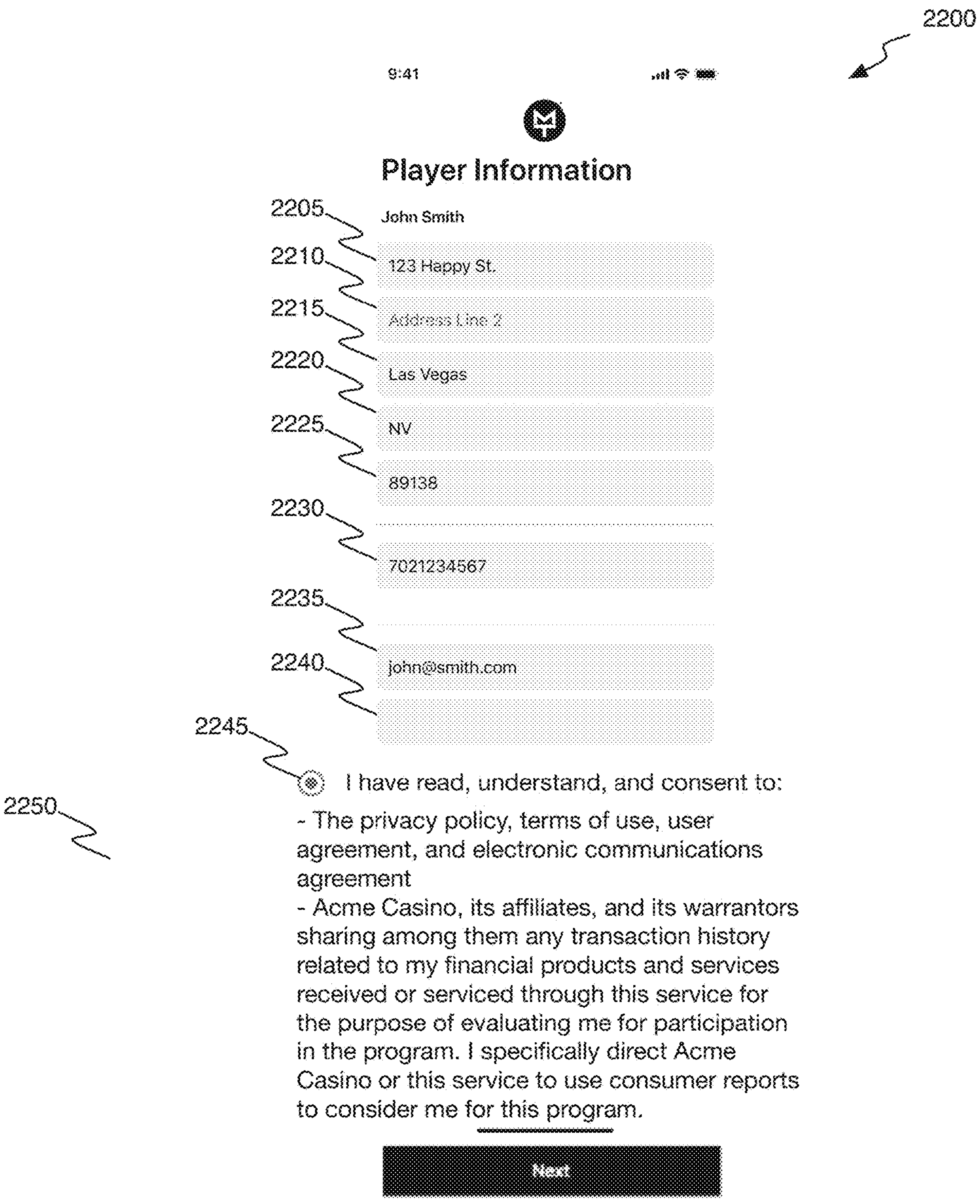
FIG. 22 is a screen capture of the player information view of the mobile application of FIG. 1.
Figure 23:
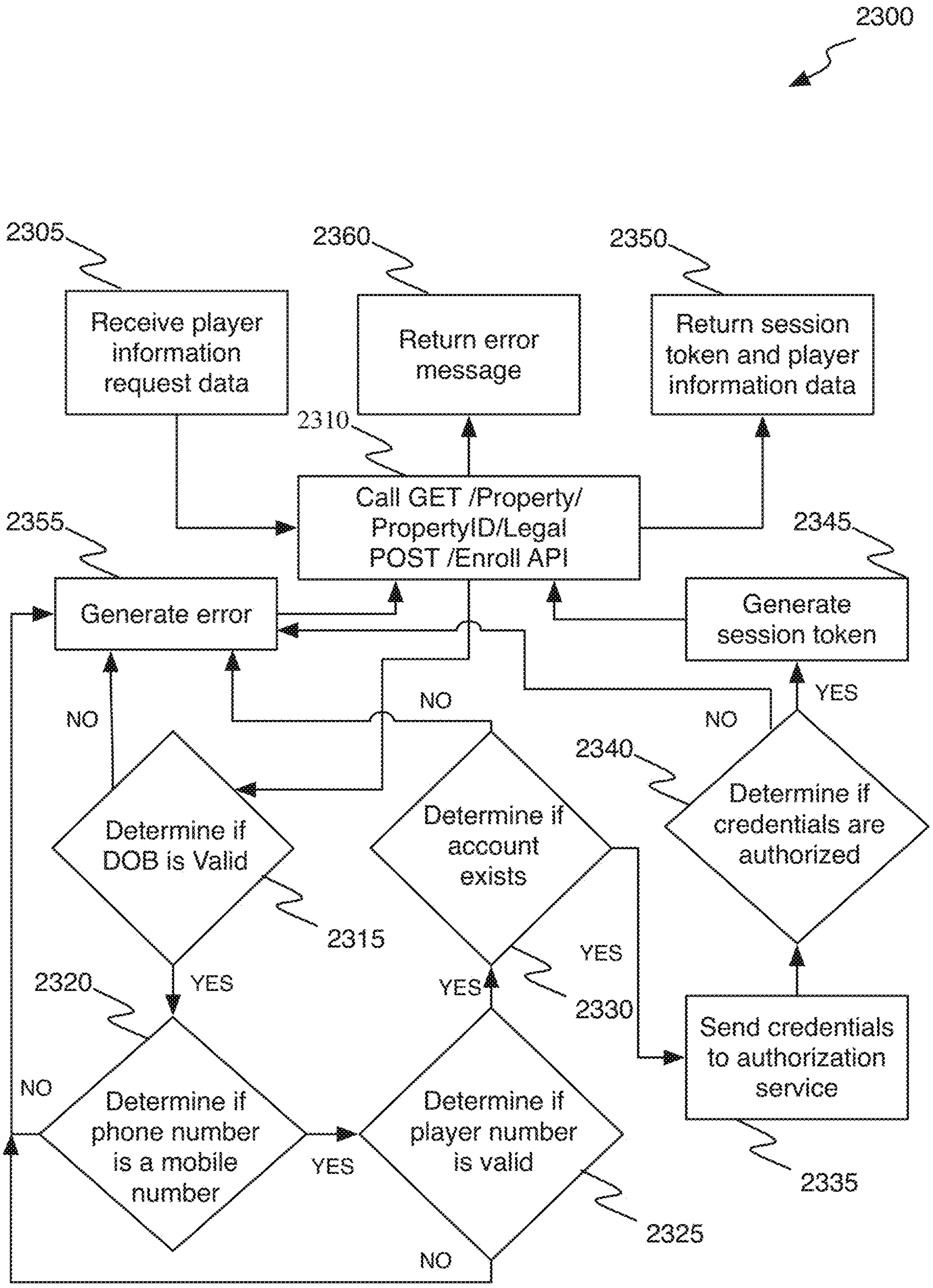
FIG. 23 is a flowchart of player information method by the authentication and other services of FIG. 3 in the credit wagering system with loan and warrantying of FIG. 2B and FIG. 3 that interfaces with the player information view of FIG. 22.

Upon detection of Next button event associated with the create account view 2000, the player information view is displayed 2200. Referring now to FIG. 22 and FIG. 23, in some implementations, the player information view 2200 includes one or more of controls for the display and collection of player information 2205 through 2240, for consent and acceptance of terms 2245, and for the submission of collected player information 2250. API endpoints can include, for example, GET /Property/PropertyID/Legal and POST /Enroll. The interface can collect player information data for marshalling and transmission, such as:

Example Data Input:

{
"card_number": "123456789",
"date_of_birth": "1985-12-12",
"email": "john@smith.com",
"property_id": "2",
"password": "password123",
"mobile": "+17021234567",
"city": "Las Vegas",
"street": "123 Main St.",
"state": "NV",
"zip": "89123",
}

Upon receiving of player information data 2305, the API endpoint of POST /Enroll is called 2310 and the data input is passed to the authentication service. The authentication service then validates and checks the authentication and user database to see if the user identification credentials correspond to a valid player 2315, 2320, 2325. If the user identification credentials are verified, the authentication service determines if the account exists 2330. Authentication credentials are then passed to the authentication service 2335, and if validated 2340, a session token is generated and returned along with player information output data below 2345, 2350. If the account does not exist or if the authentication credential cannot be validated, the authentication service generates an error 2355 and returns a failure message 2360.

Example Data Output:

{
"id": "10",
"property_id": "2",
"player_card_program_id": "2",
"player_card_number": "123456789",
"email": "john@smith.com",
"identity_verified": null,
"email_verified": 1,
"name_first": "John", -continued

| Example Data Output: |
|---|
| "name_last": "Smith",<br>"name": "John Smith",<br>"date_of_birth": "1985-12-12",<br>"name_middle": null,<br>"line1": "123 Main St.",<br>"line2": null,<br>"line3": null,<br>"street": "123 Main St.",<br>"sub_region": null,<br>"city": "Las Vegas",<br>"region": "NV",<br>"postal_code": "89101",<br>"sorting_code": null,<br>"country_code": "US",<br>"mobile": "+17021234567",<br>"mobile_verified": 1,<br>"advance_line_type_code": "accepted",<br>"advance_line_type_display": "Accepted Line",<br>"advance_line": "1000",<br>"bank_linked": "0"<br>} |

Figure 24:
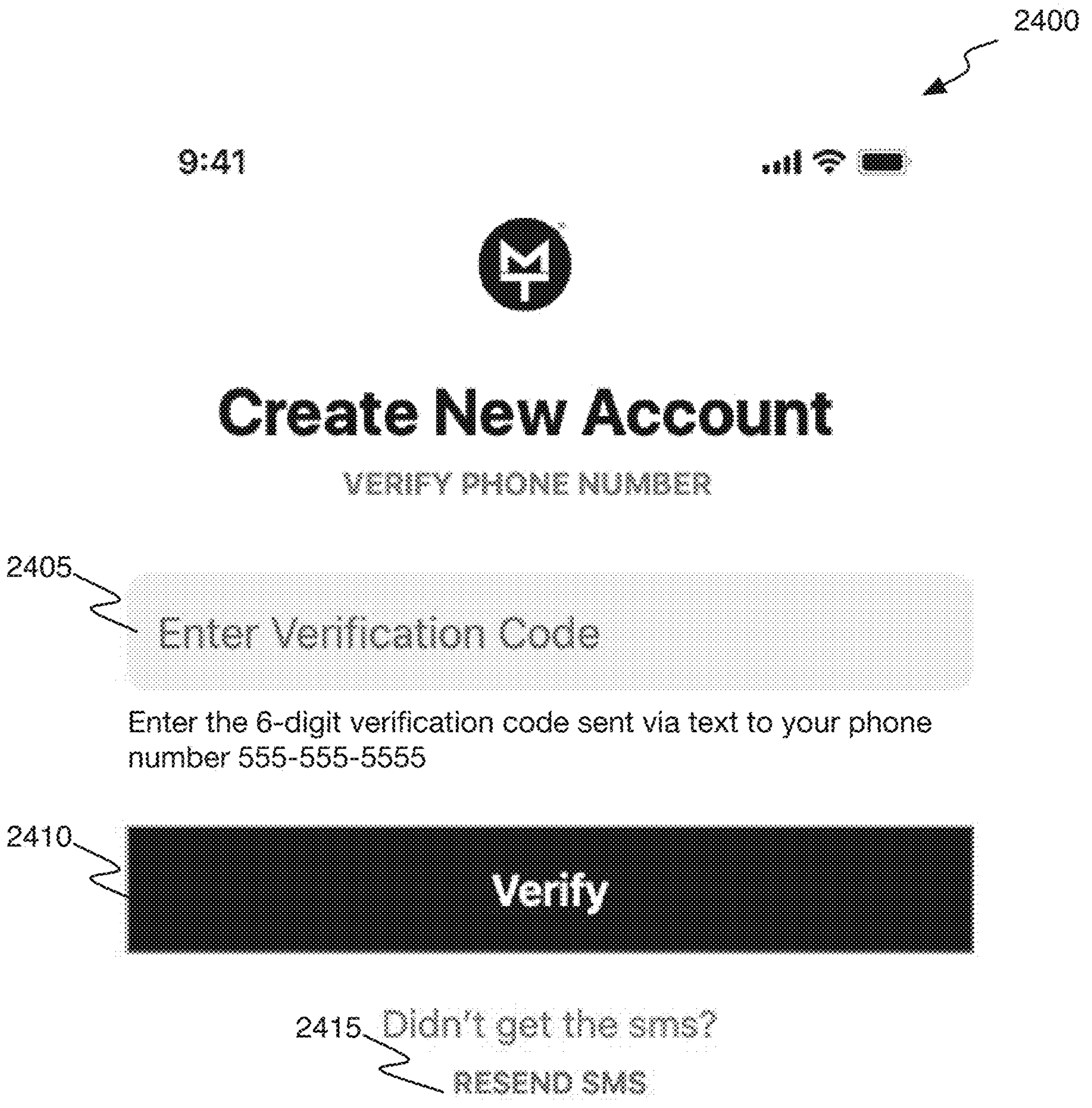
FIG. 24 is a screen capture of the create new account phone verification view of the mobile application of FIG. 1.
Figure 25:
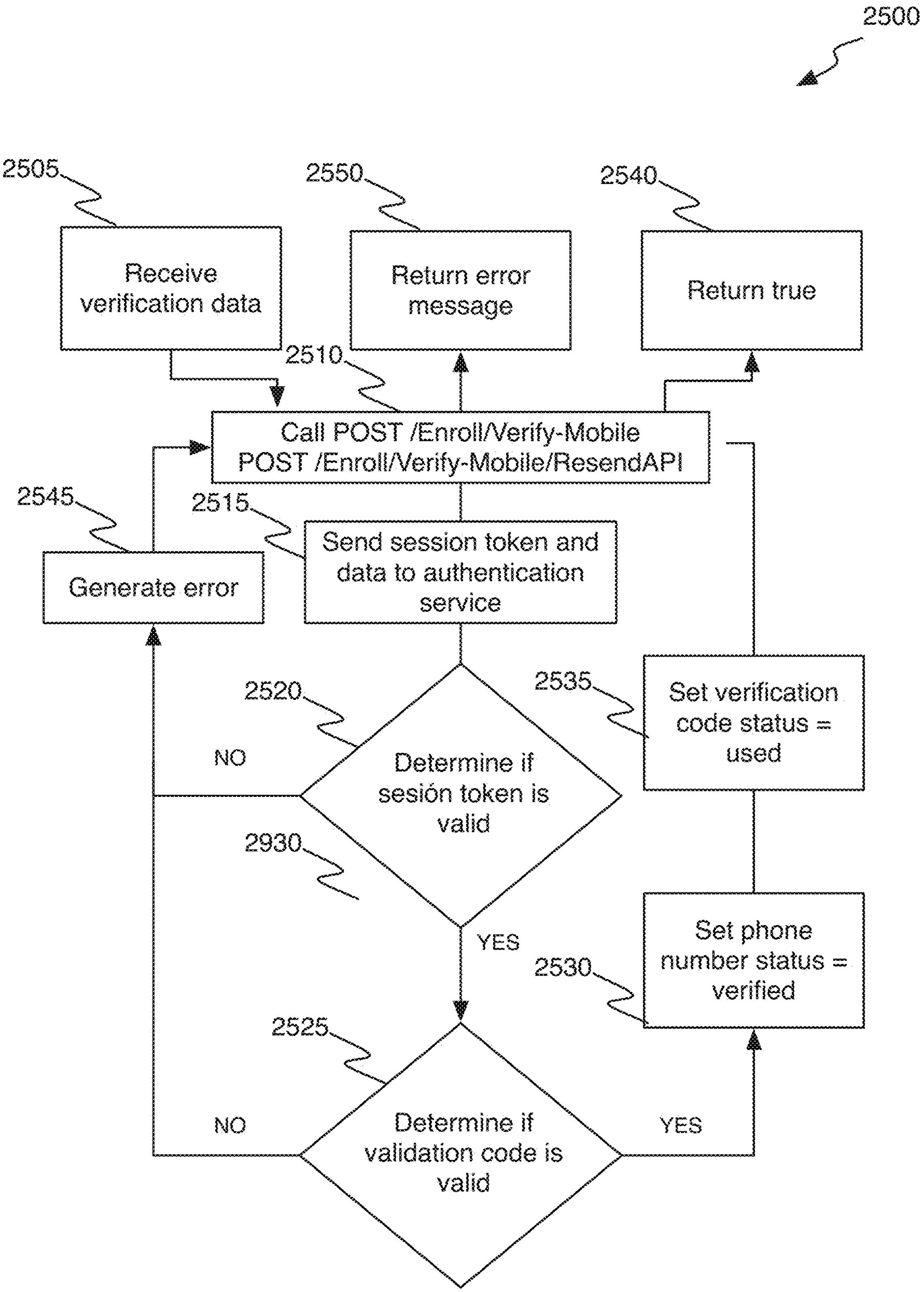
FIG. 25 is a flowchart of create new account phone verification method by the authentication and other services of FIG. 3 in the credit wagering system with loan and warrantying of FIG. 2B and FIG. 3 that interfaces with the create new account phone verification view of FIG. 24.

Upon detection of Next button event associated with the player information view 2200, the verify phone number view 2400 is displayed. Referring now to FIG. 24 and FIG. 25, in some implementations, the verify phone number view 2400 includes one or more of controls for the display and collection of player verification information 2405 for the submission of a verification code received by, for example, sms 2410, and for the resending of a verification code 2415. API endpoints can include, for example, POST /Enroll/Verify-Mobile and POST /Enroll/Verify-Mobile/Resend. The interface can collect verification code information for marshalling and transmission, such as:

| Example Data Input: |
|---|
| {<br>"code":"123456"<br>} |

Upon receiving of a verification code 2505, the API endpoint of POST /Enroll/Verify-Mobile is called 2510 and the data input is passed to the authentication service 2515. The authentication service then validates and checks the validity of the session token 2520, and if valid, proceeds determine if the validation code is valid 2525. In some implementations, the code is further verified to determine if it has not been used, if its use time limit has expired, or both. If it is determined that the code has neither expired nor has been used before, the verification code status is set to used 2535 and the phone number status is set to verified 2530. A verification equal to true message is then generated and returned. If it is determined that the code has expired or has been used before, an error is generated 2545 and an error message returned 2550.

In certain instances, upon detection of a click event associated with the resend control 2415, the POST /Enroll/Verify-Mobile/Resend is called. Any previous sent codes are set to used, and a new valid code is generated and transmitted to the player via, for example, SMS.

Figure 26:
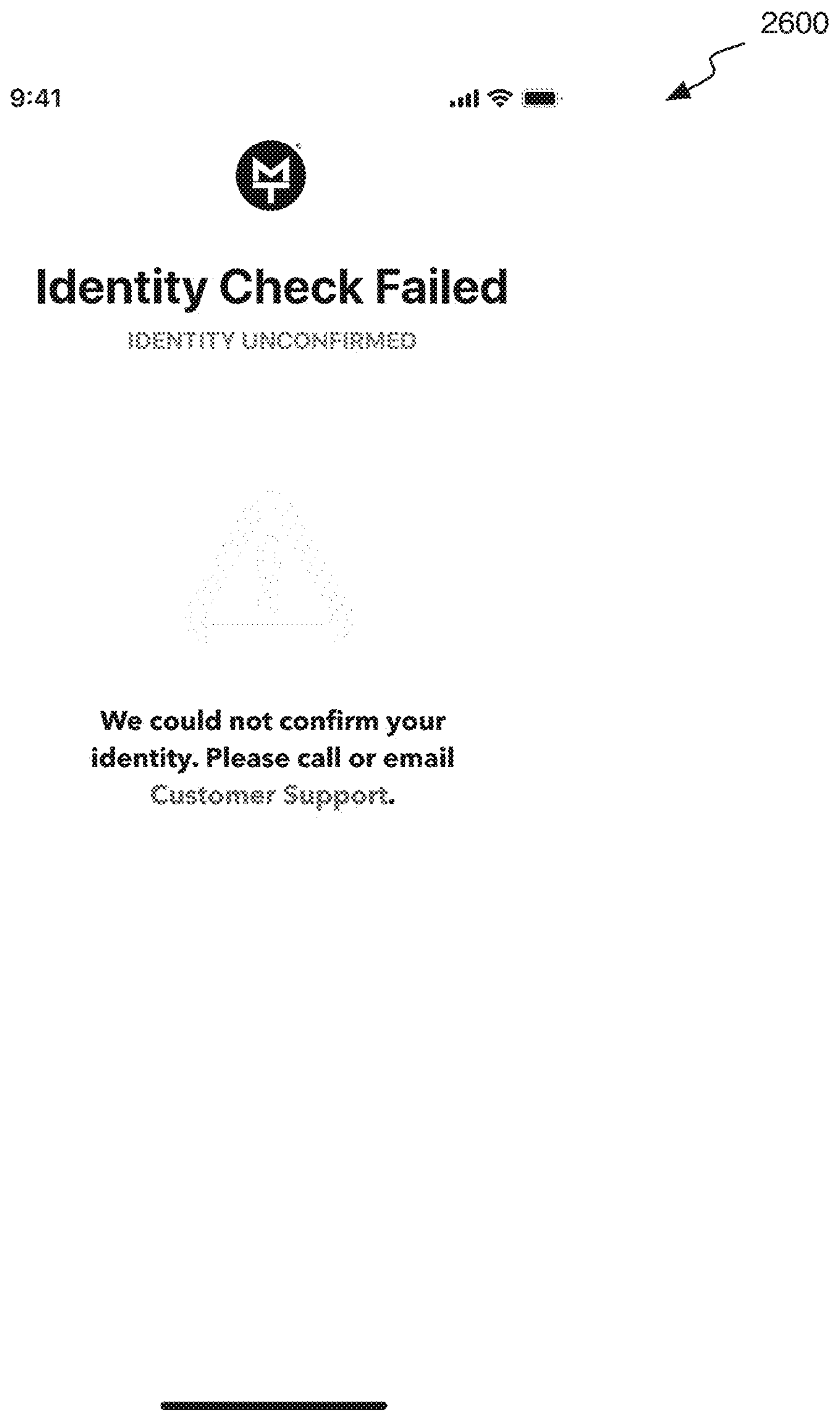
FIG. 26 is a screen capture of the phone verification failed notification view of the mobile application of FIG. 1.
Figure 27:
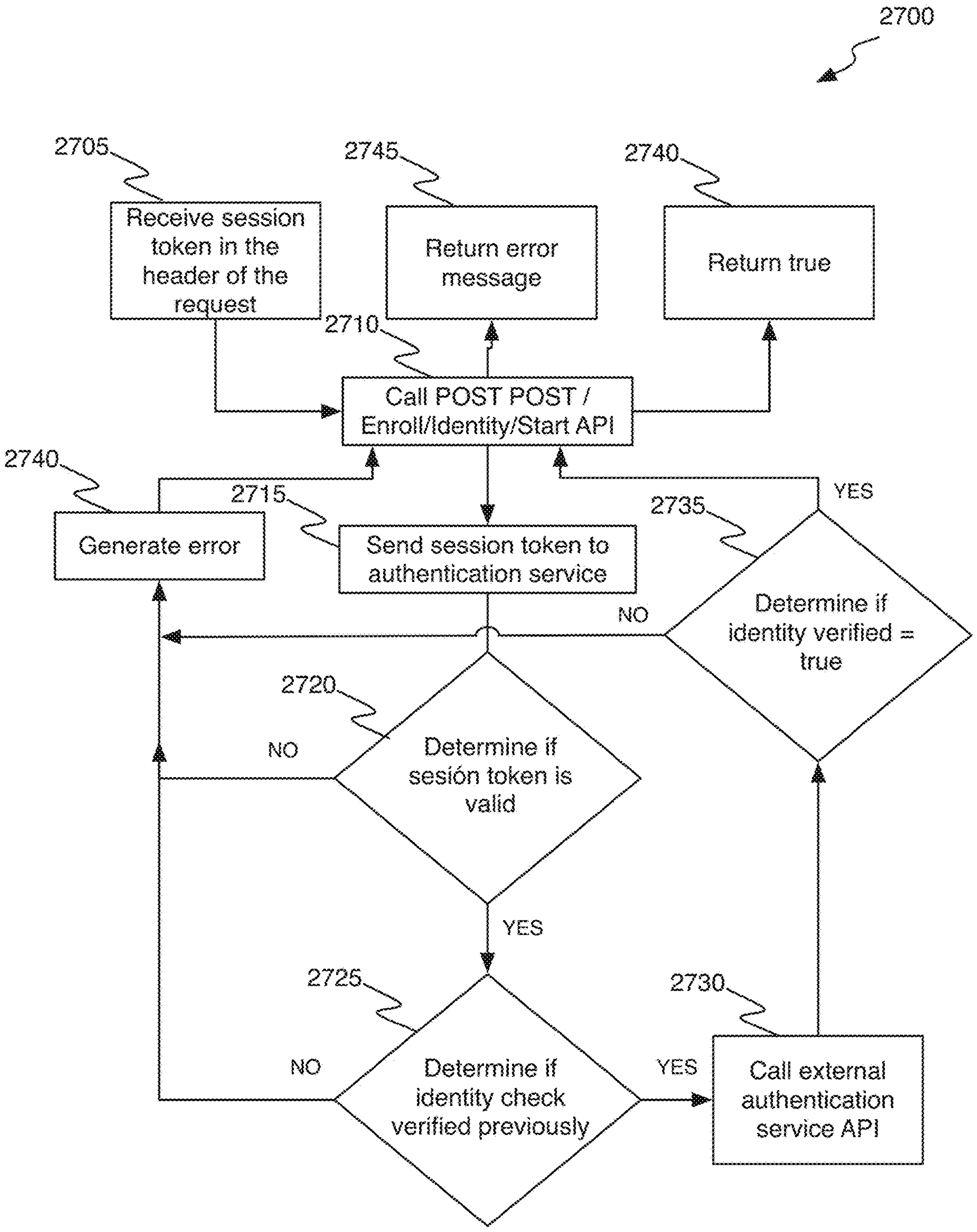
FIG. 27 is a flowchart of phone verification failed notification method by the authentication and other services of FIG. 3 in the credit wagering system with loan and warrantying of FIG. 2B and FIG. 3 that interfaces with the phone verification failed notification view of FIG. 26.

In some embodiments, an additional identity verification occurs. Referring now to FIG. 26 and FIG. 27, if the additional identity verification is successful, no view is displayed. If the additional identity verification fails, an identity check failed view is displayed 2600.

Where the additional identity verification occurs, API endpoints can include, for example, POST /Enroll/Identity/Start 2710. The interface can receive the following input: Example Data Input:

Session token in the header of the request

The authentication service checks the validity of the session token 2705, 2715, 2720 and if valid, proceeds determine if an additional identity verification was performed previously 2725. If it is determined that a check was not performed previously, an external authentication service API can be called 2730 by passing, for example, first name, last name, date of birth, phone number, address, or other identifying data. If the external service verification is successful, identity verified is set to true 2735 and a value of true is returned 2740.

Figure 28:
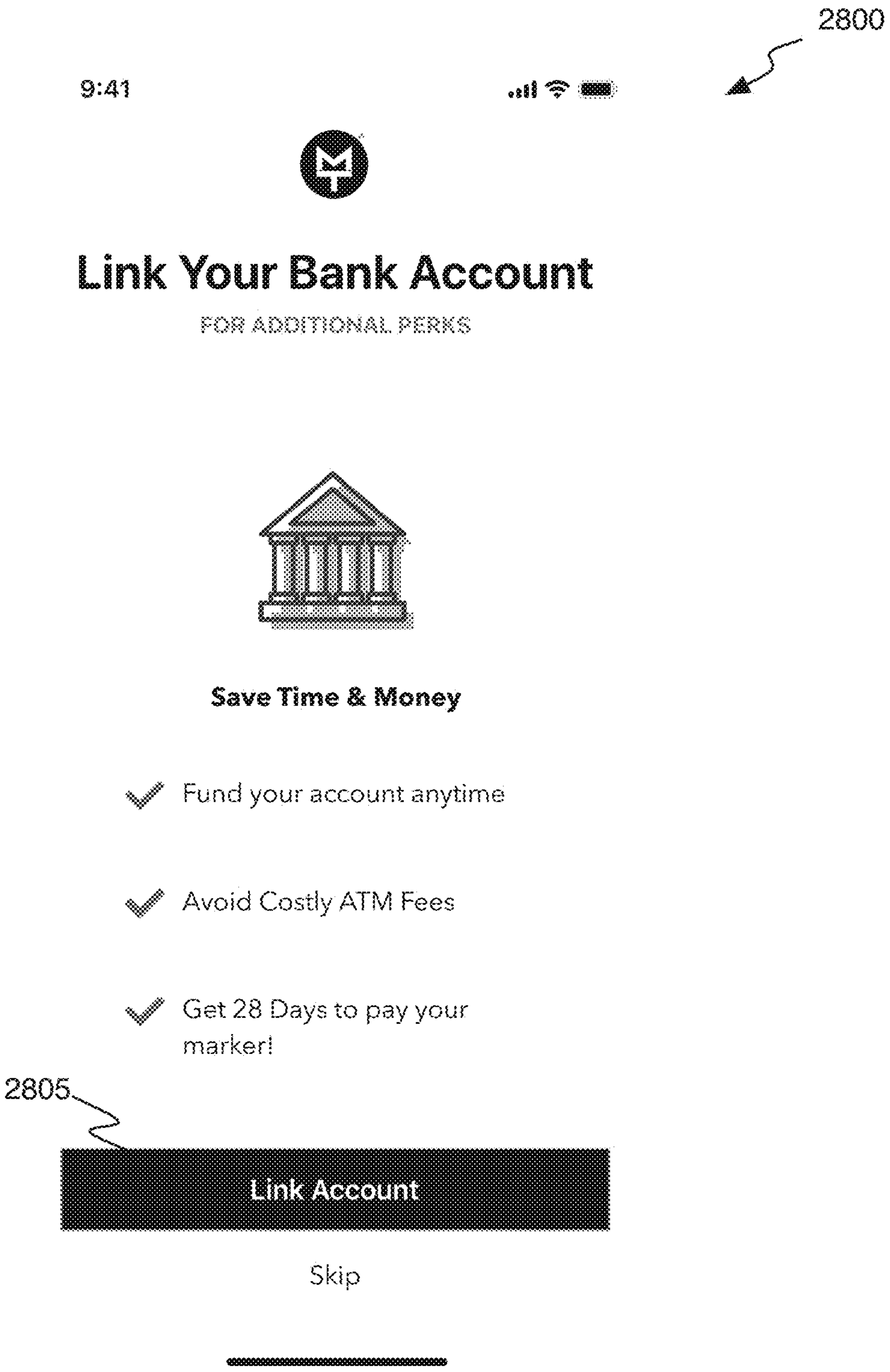
FIG. 28 is a screen capture of the link bank account view of the mobile application of FIG. 1.
Figure 29:
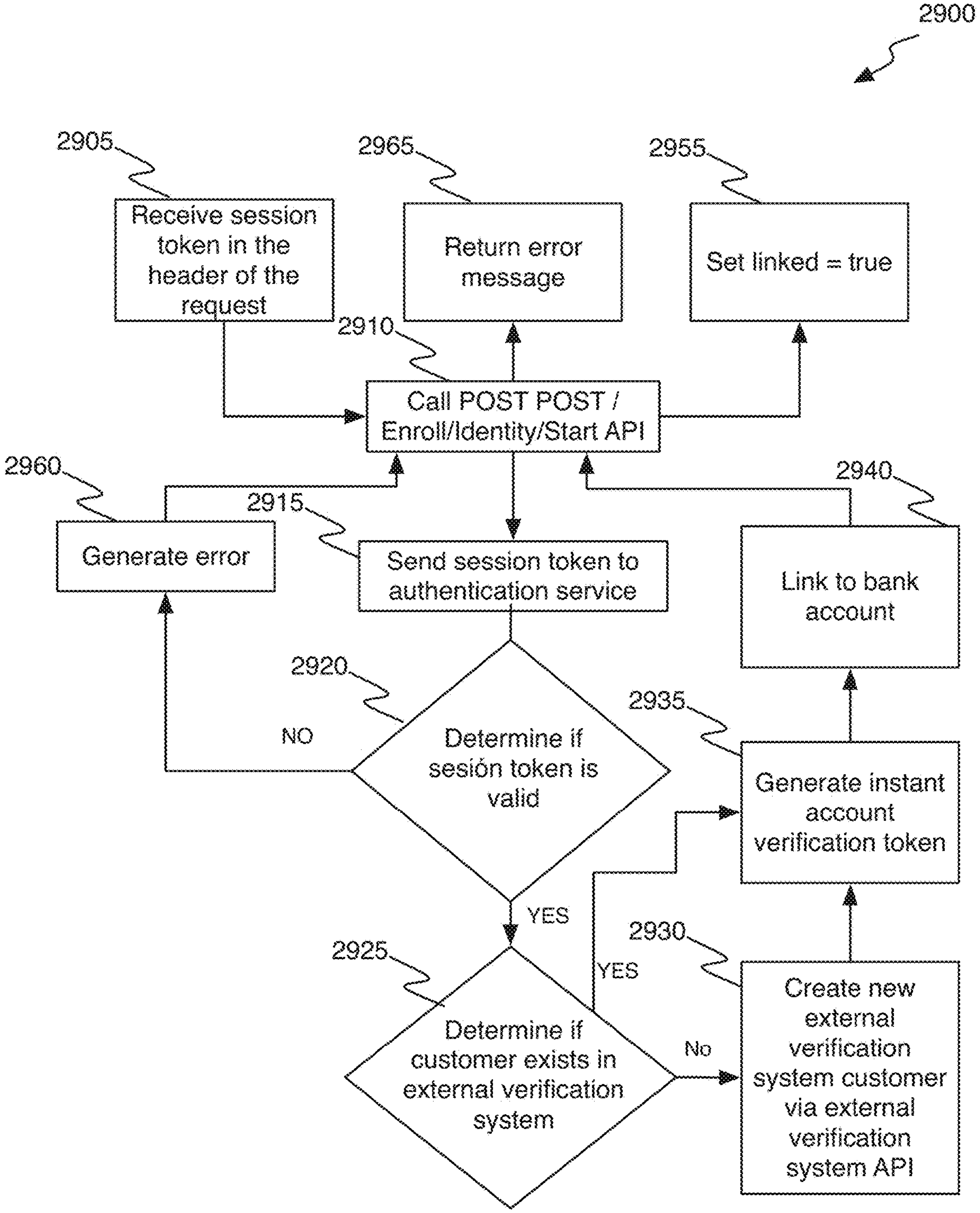
FIG. 29 is a flowchart of link bank account method by the authentication and other services of FIG. 3 in the credit wagering system with loan and warrantying of FIG. 2B and FIG. 3 that interfaces with the link bank account view of FIG. 28.
Figure 30:
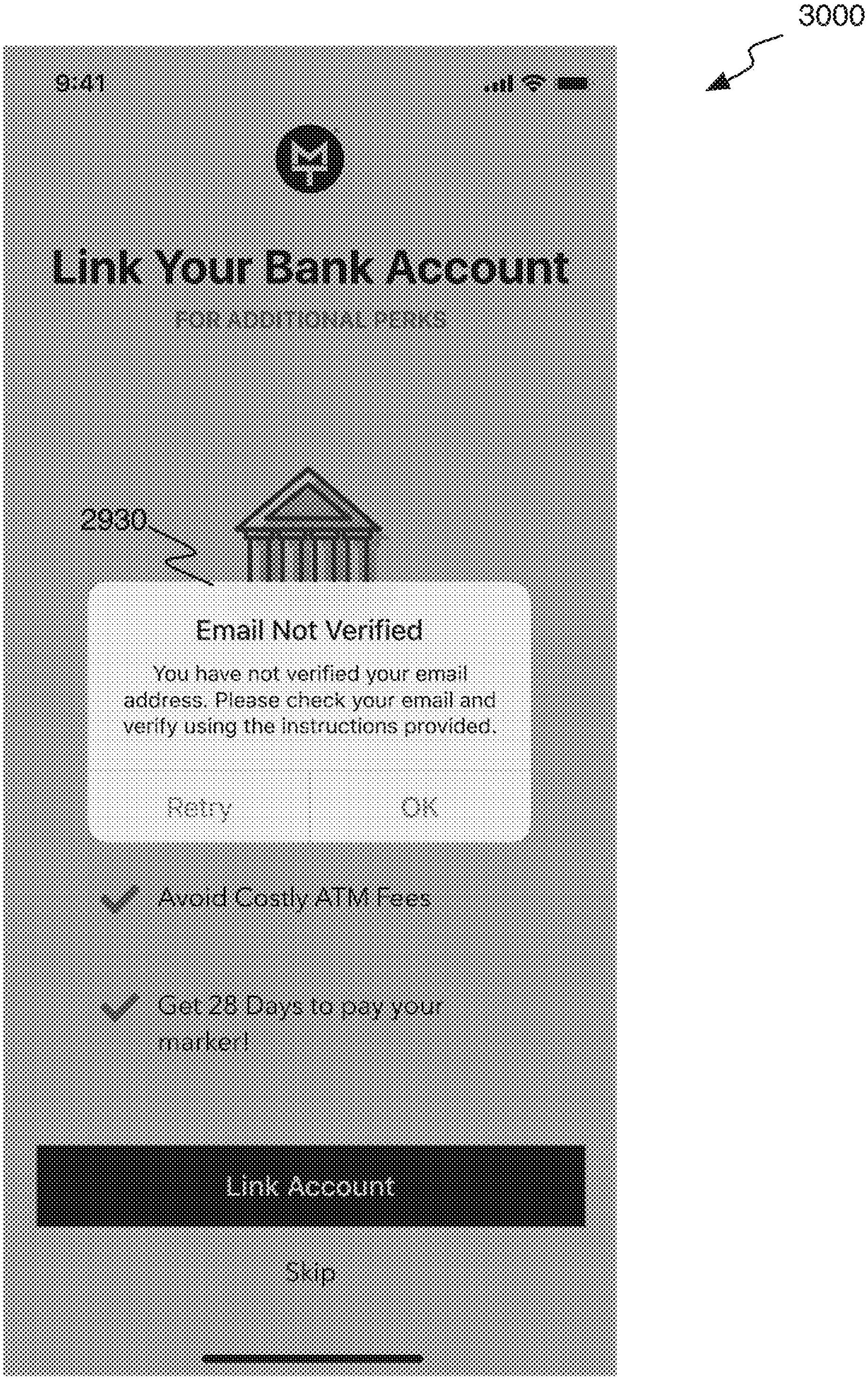
FIG. 30 is a screen capture of email verification failed notification view of the mobile application of FIG. 1.
Figure 31:
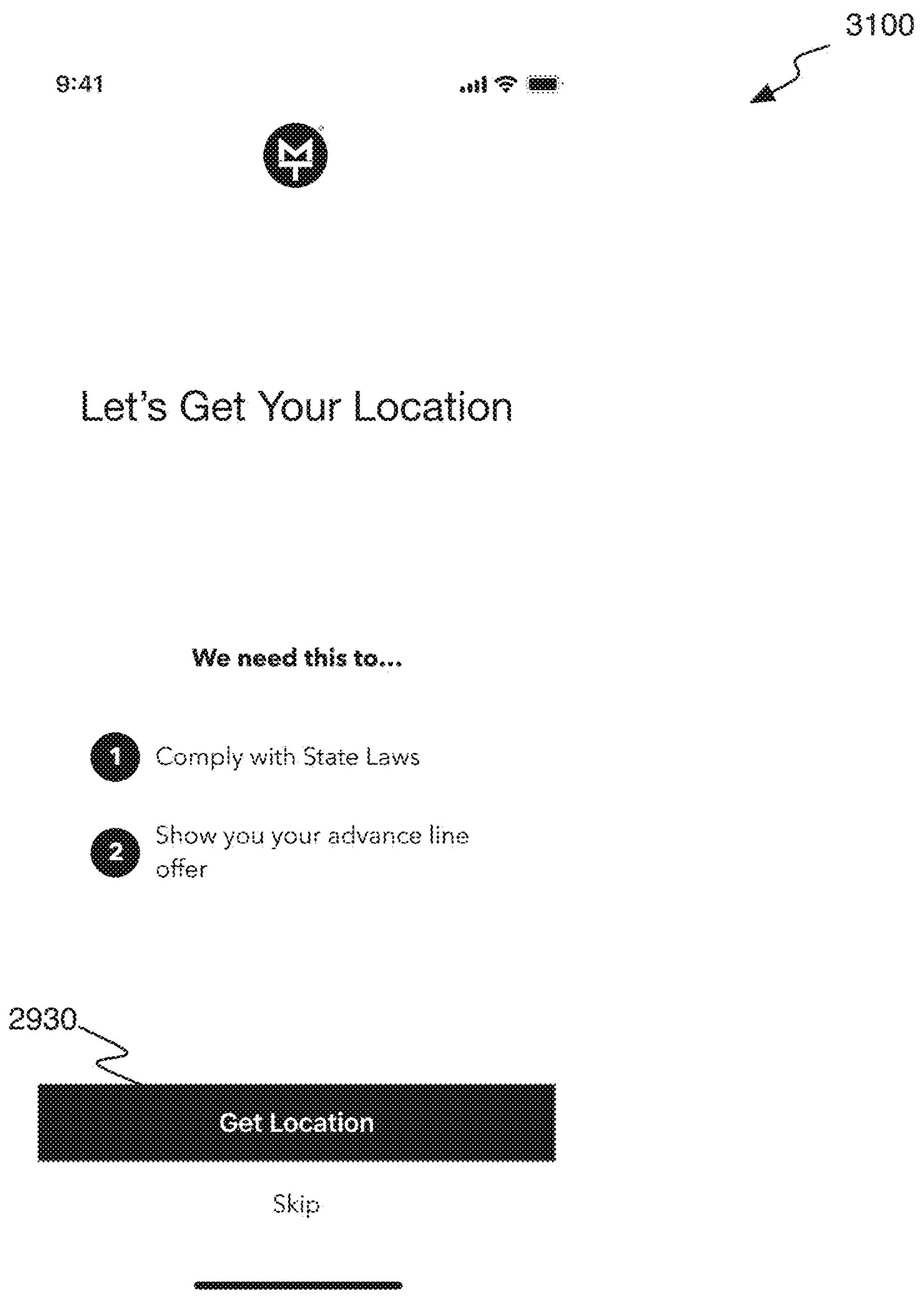
FIG. 31 is a screen capture of the get location view of the mobile application of FIG. 1.
Figure 32:
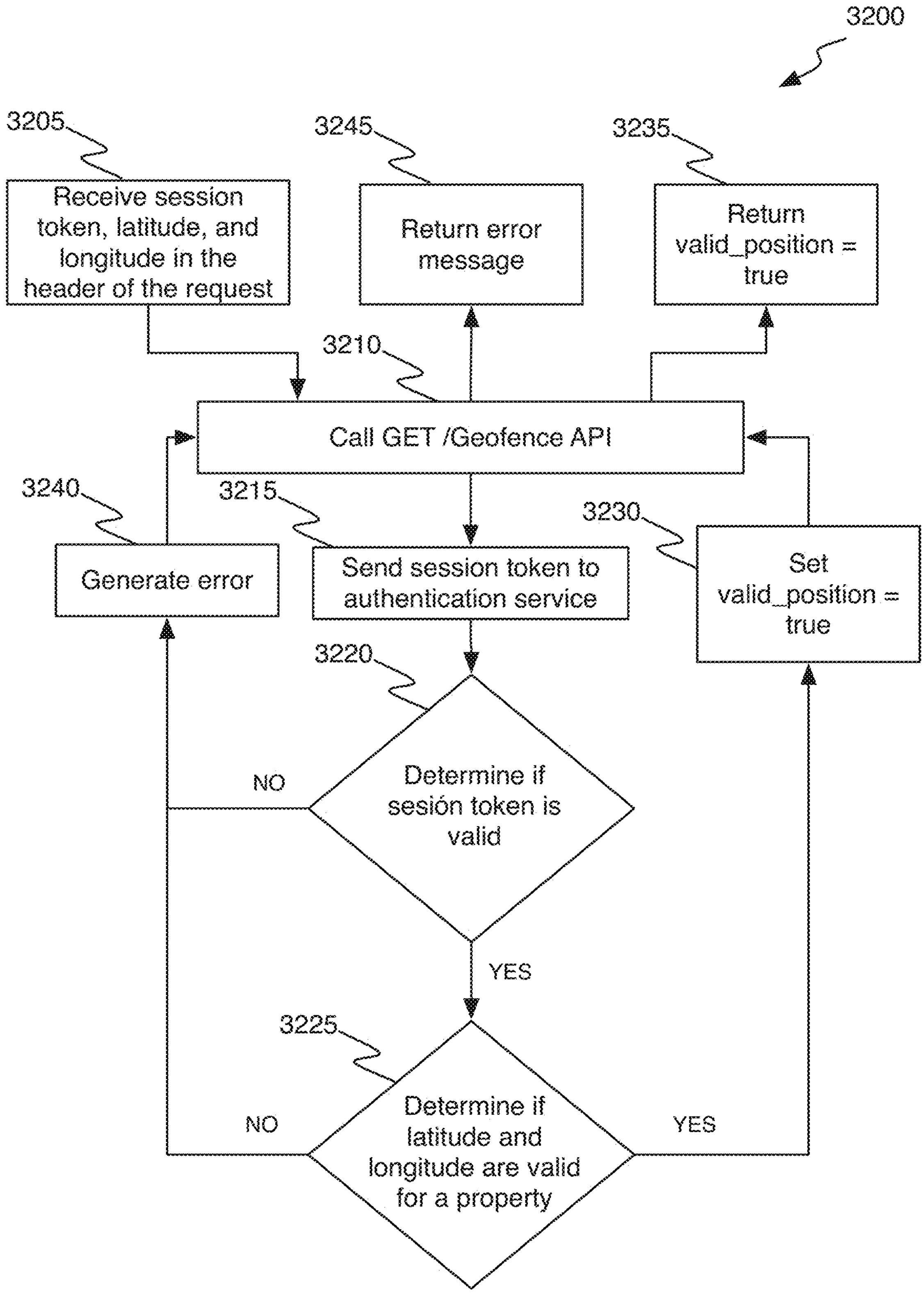
FIG. 32 is a flowchart of get location method by the authentication and other services of FIG. 3 in the credit wagering system with loan and warrantying of FIG. 2B and FIG. 3 that interfaces with the get location view of FIG. 31.
Figure 33:
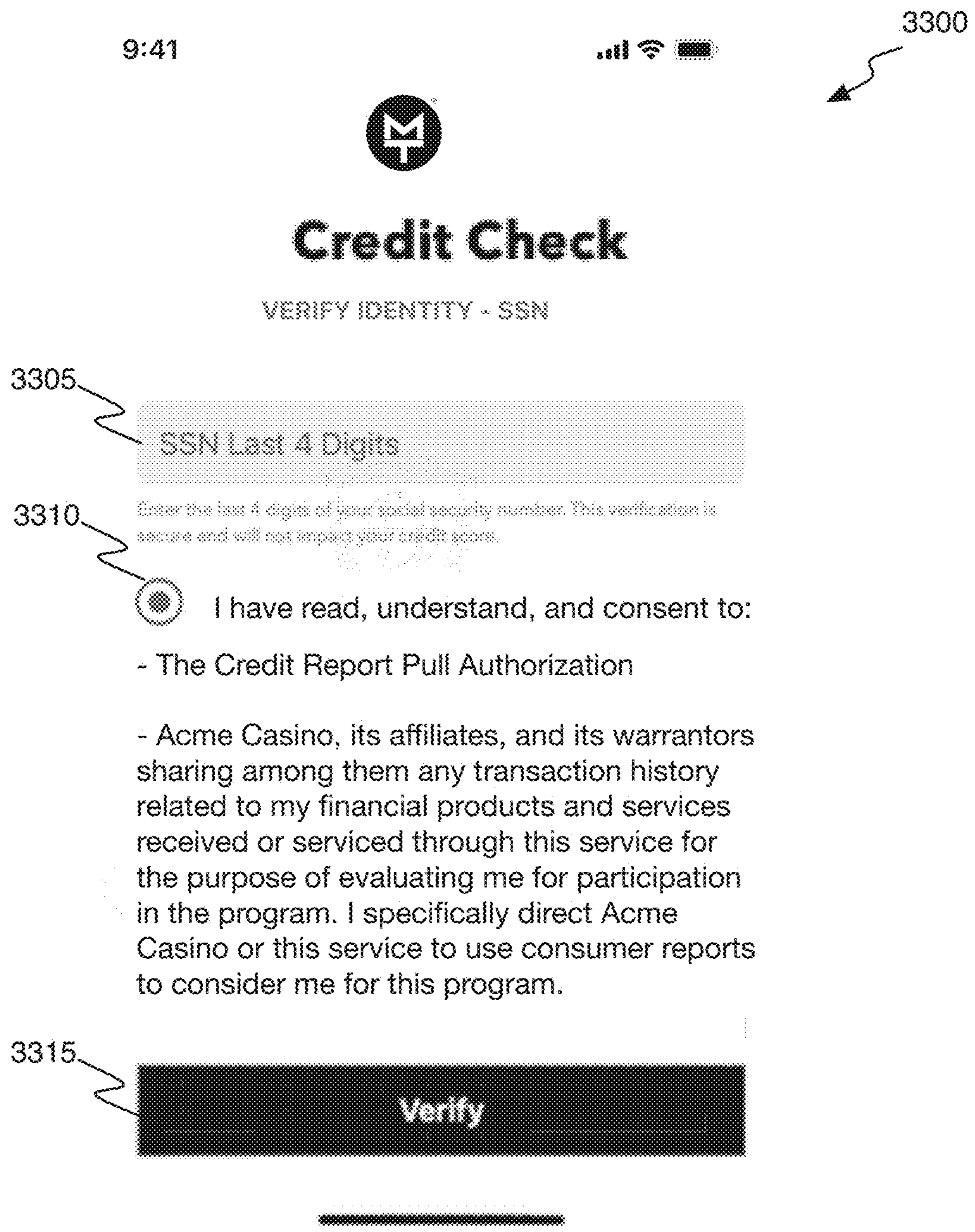
FIG. 33 is a screen capture of the credit check with social security number view of the mobile application of FIG. 1.
Figure 34:
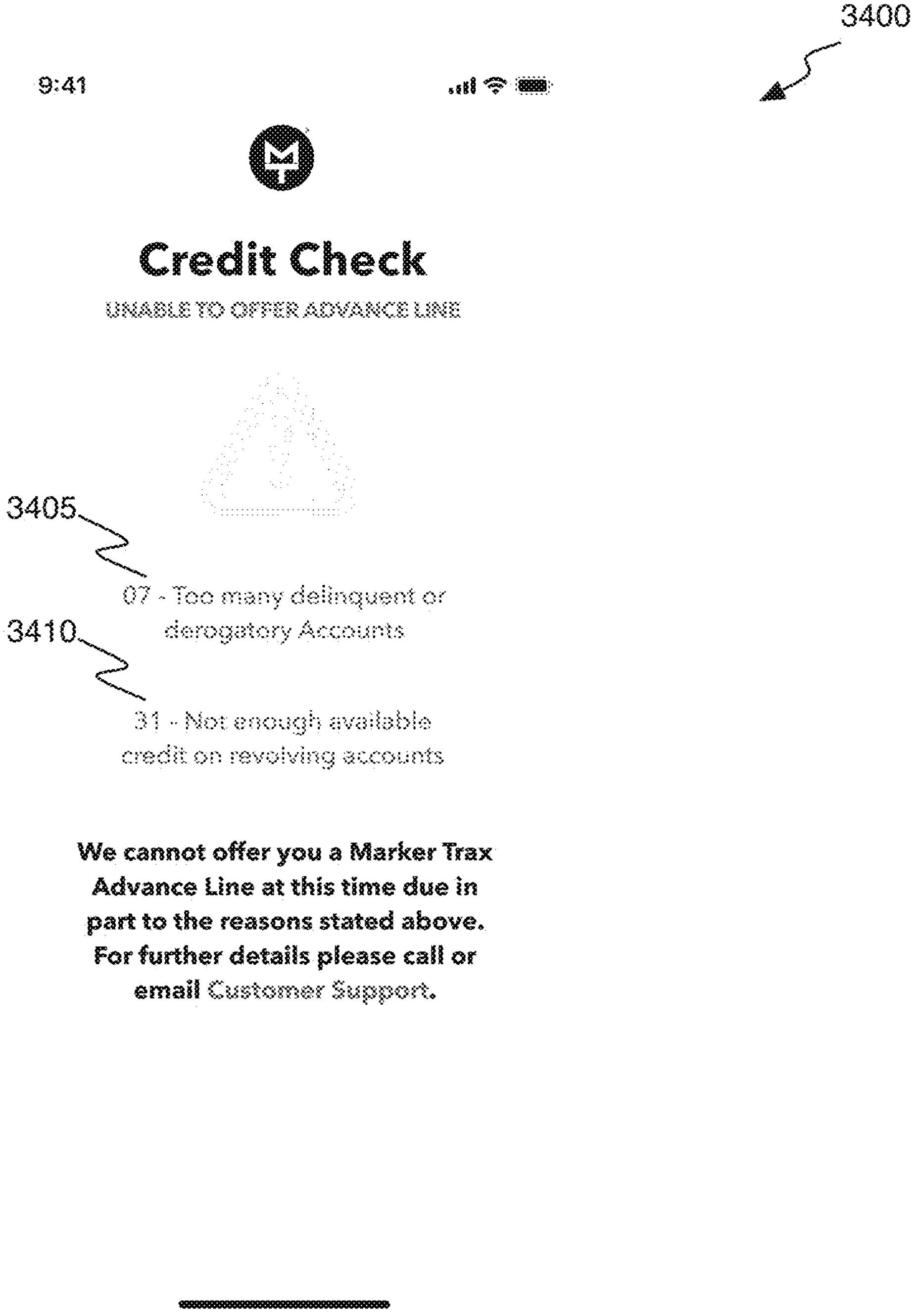
FIG. 34 is a screen capture of the offer advance line where unable to extend credit view of the mobile application of FIG. 1.
Figure 35:
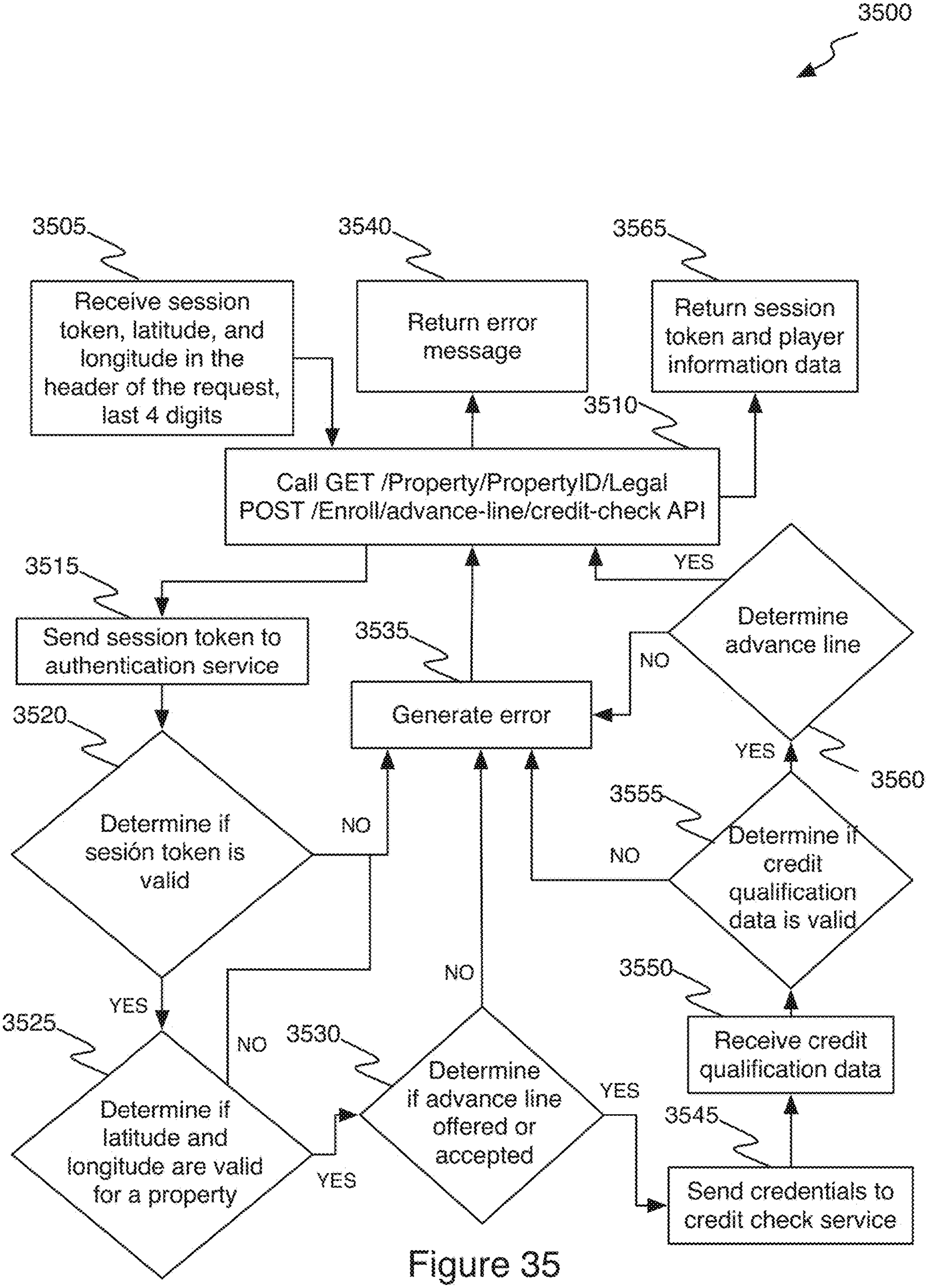
FIG. 35 is a flowchart of credit check method by the services of FIG. 3 in the credit wagering system with loan and warrantying of FIG. 2B and FIG. 3 that interfaces with the credit check view of FIG. 33 and the offer advance line where unable to extend credit view if FIG. 34.
Figure 36:
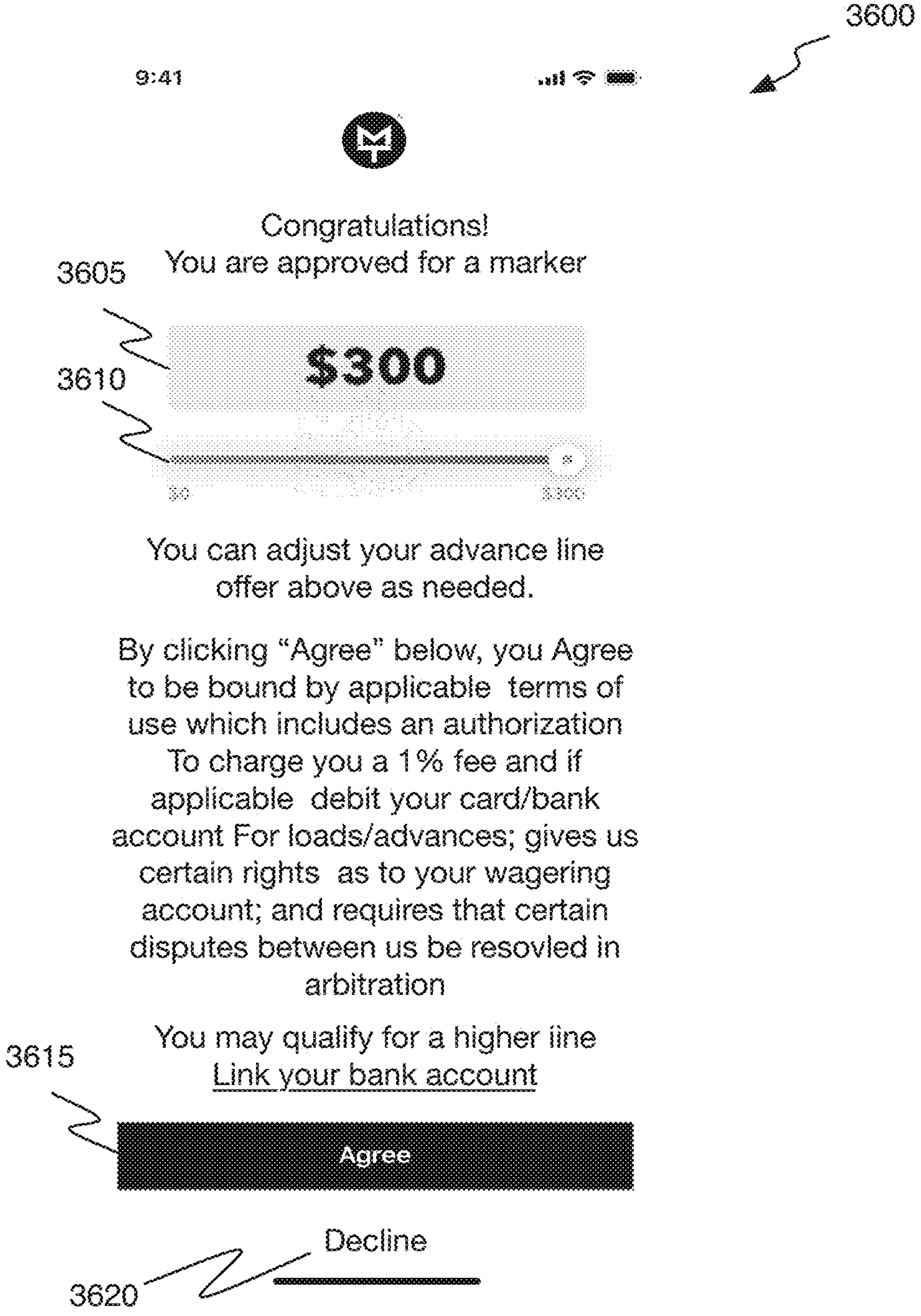
FIG. 36 is a screen capture of the offer advance line able to extend credit view of the mobile application of FIG. 1.
Figure 37:
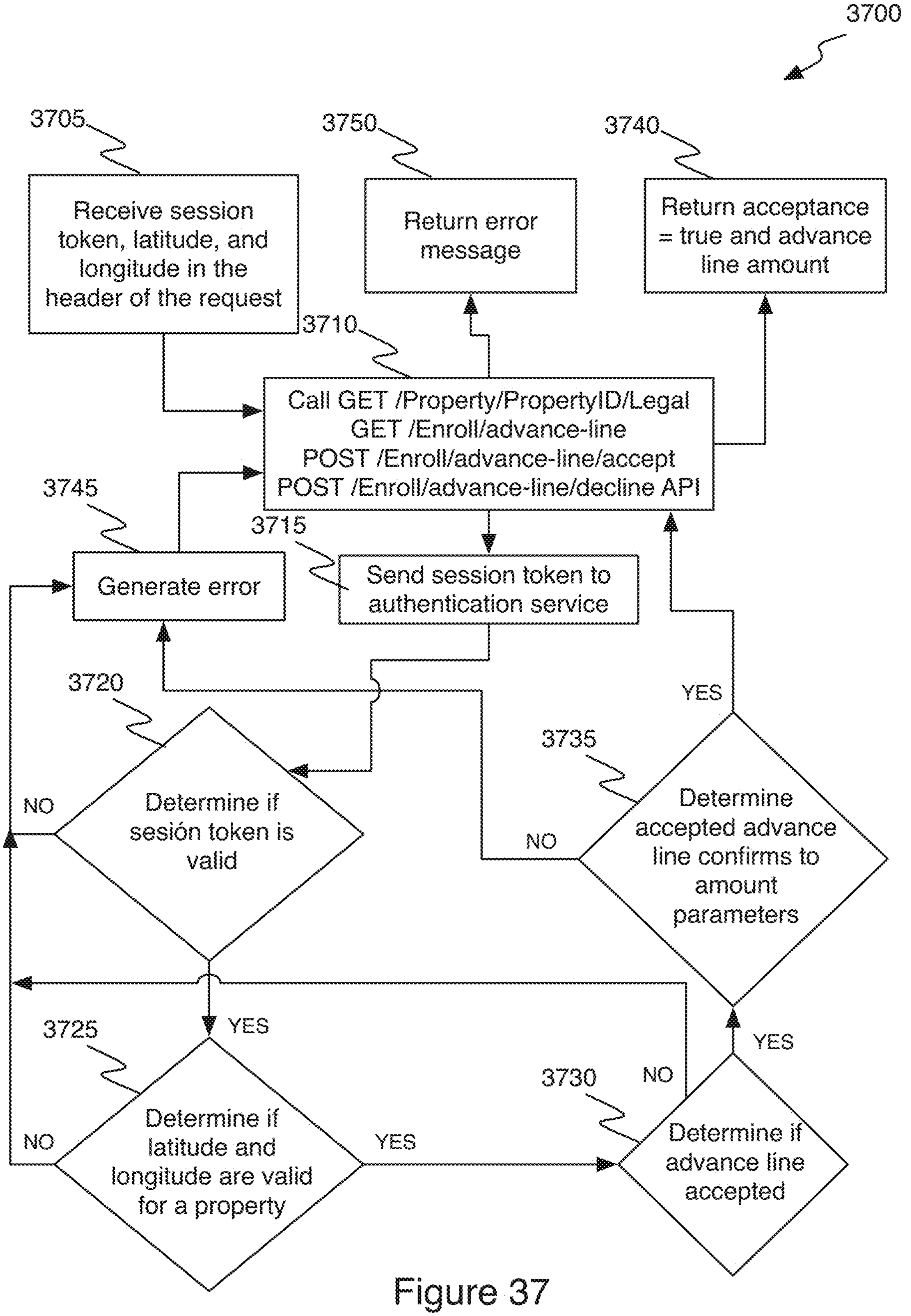
FIG. 37 is a flowchart of the offer advance line able to extend credit method by the services of FIG. 3 in the credit wagering system with loan and warrantying of FIG. 2B and FIG. 3 that interfaces with the offer advance line able to extend credit view of FIG. 36.
Figure 38:
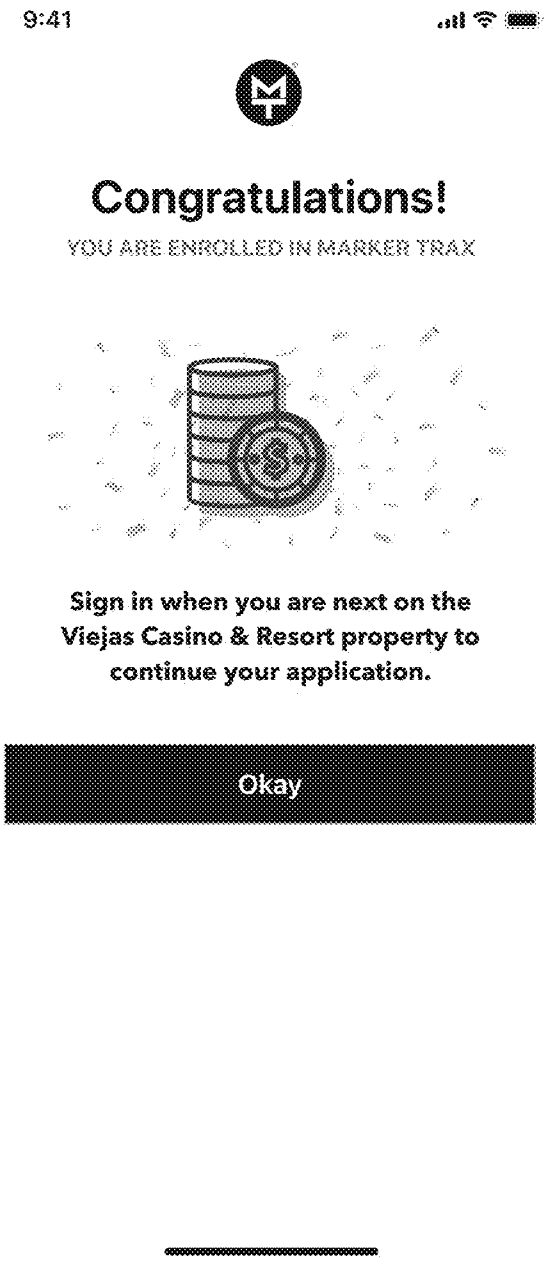
FIG. 38 is a screen capture of the enrollment confirmation view of the mobile application of FIG. 1.
Figure 39:
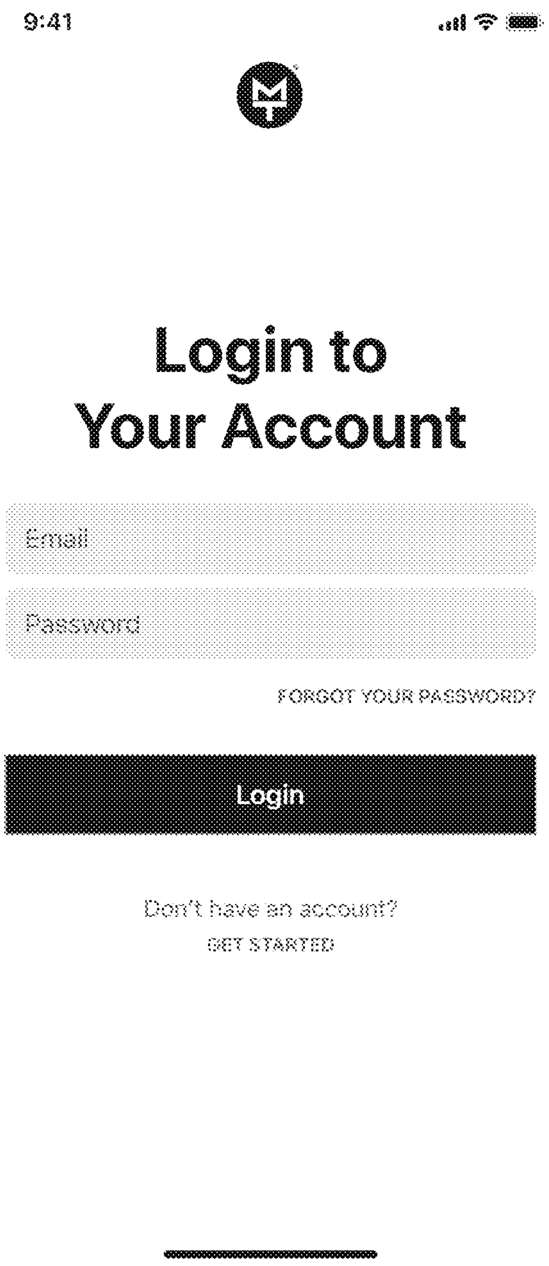
FIG. 39 is a screen capture of the login view of the mobile application of FIG. 1.
Figure 40:
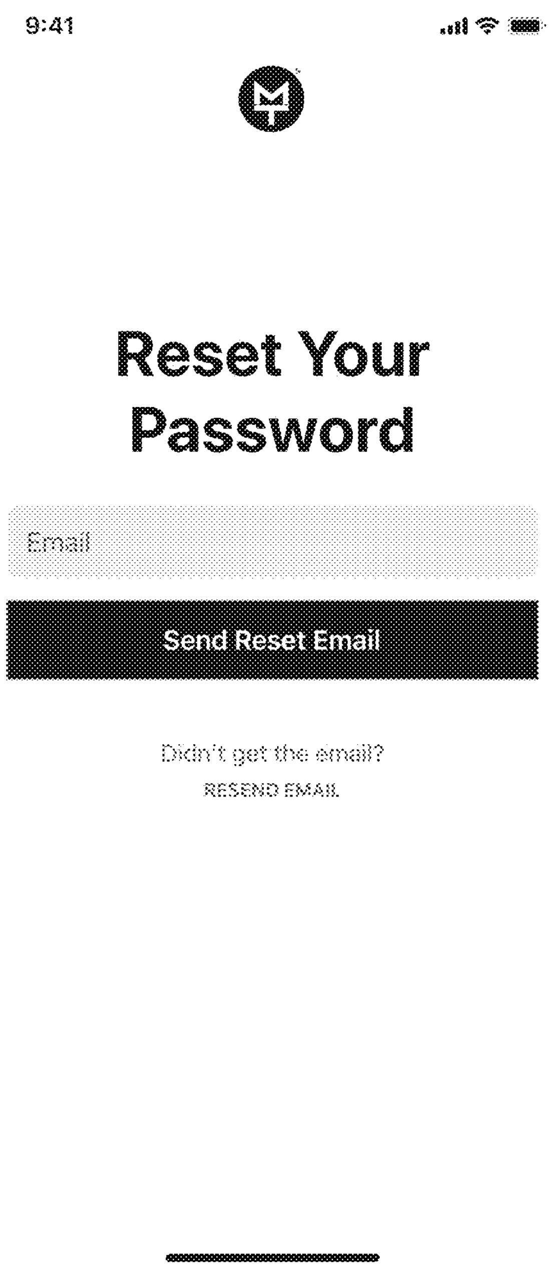
FIG. 40 is a screen capture of the reset password view of the mobile application of FIG. 1.
Figure 41:
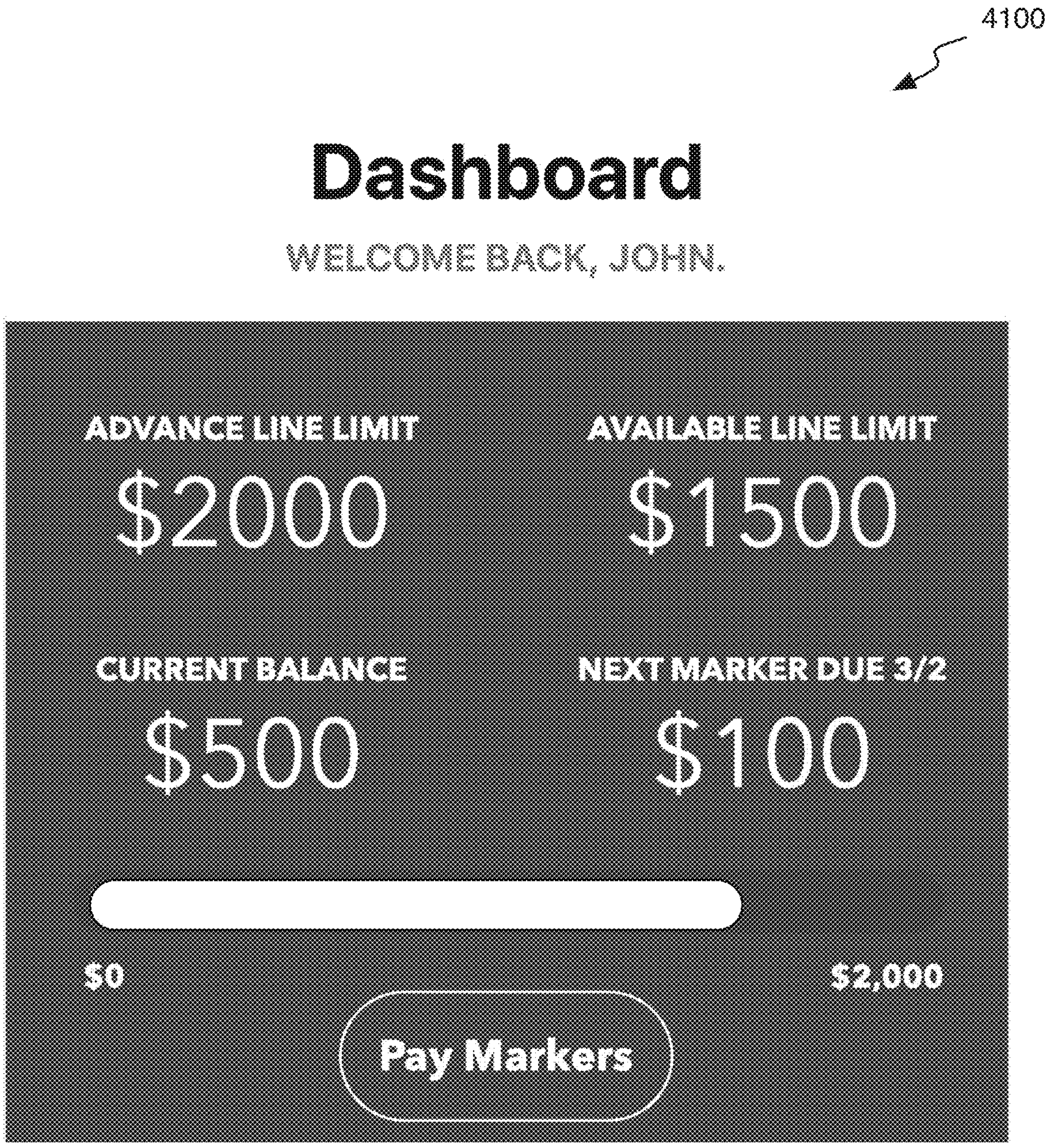
FIG. 41 is a screen capture of the user mobile dashboard view of the mobile application of FIG. 1.
Figure 42:
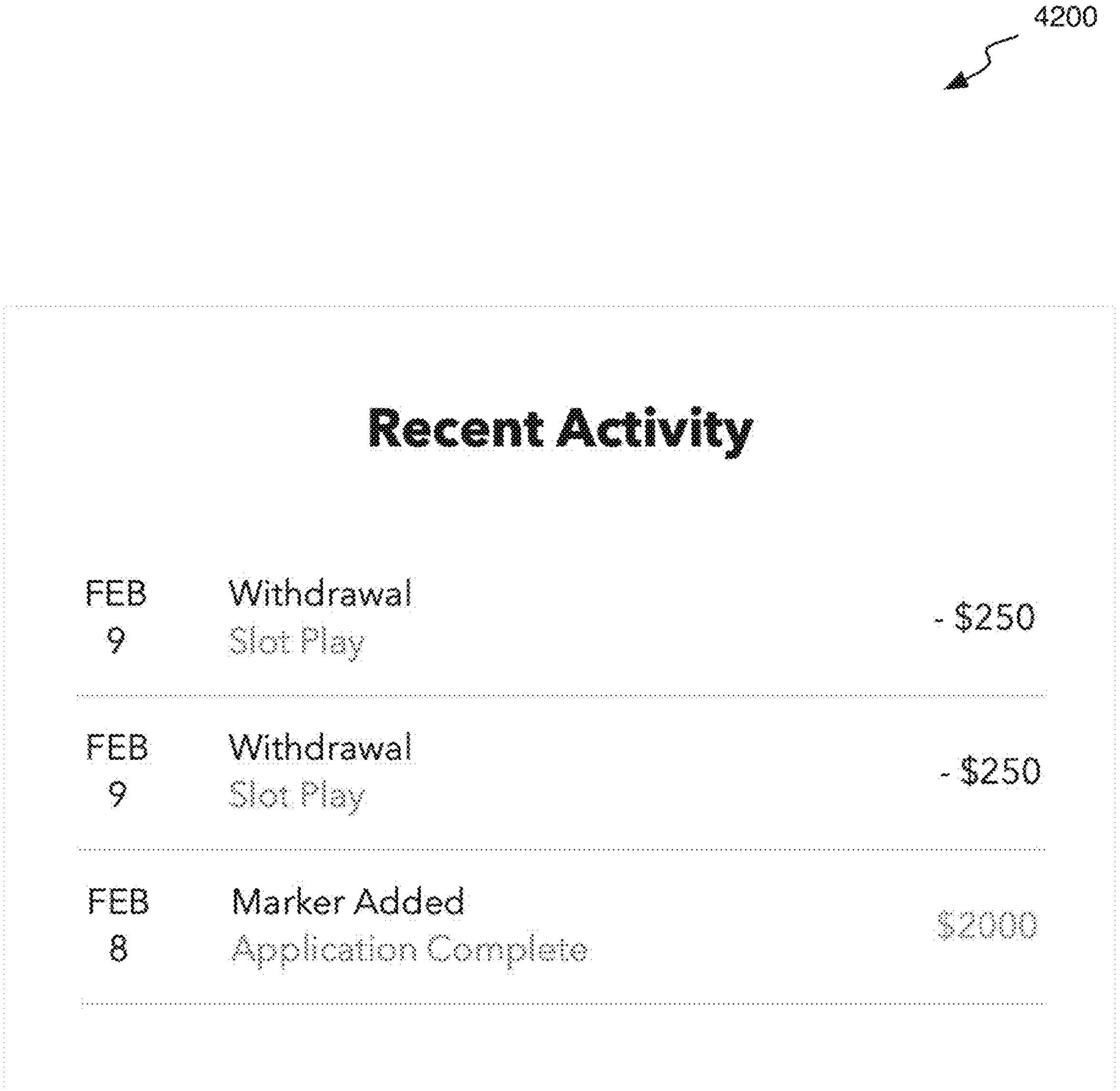
FIG. 42 is a screen capture of the user mobile recent activity view of the mobile application of FIG. 1.
Figure 43:
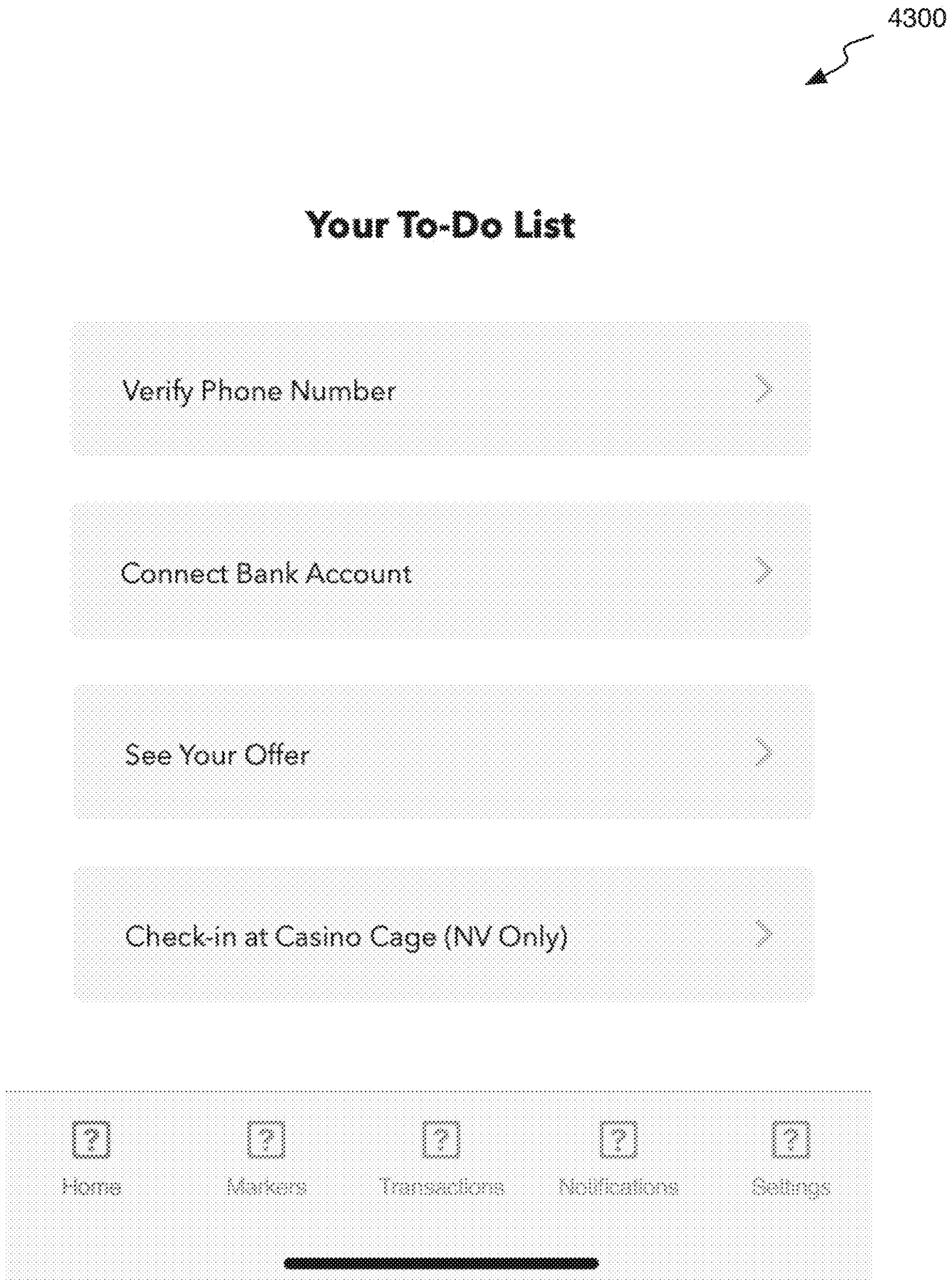
FIG. 43 is a screen capture of the user mobile todo list view of the mobile application of FIG. 1.
Figure 44:
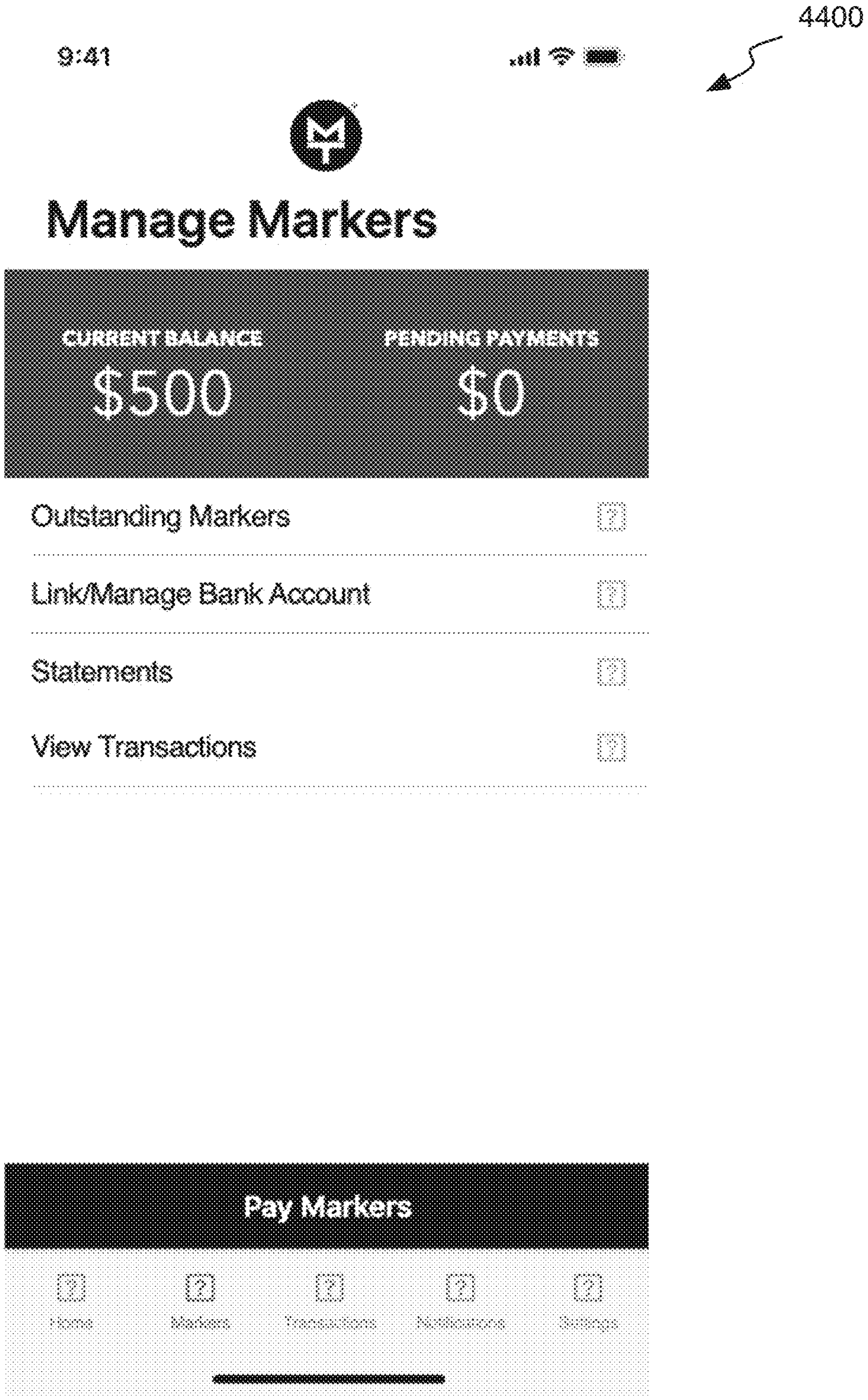
FIG. 44 is a screen capture of the manage markers view of the mobile application of FIG. 1.
Figure 45:
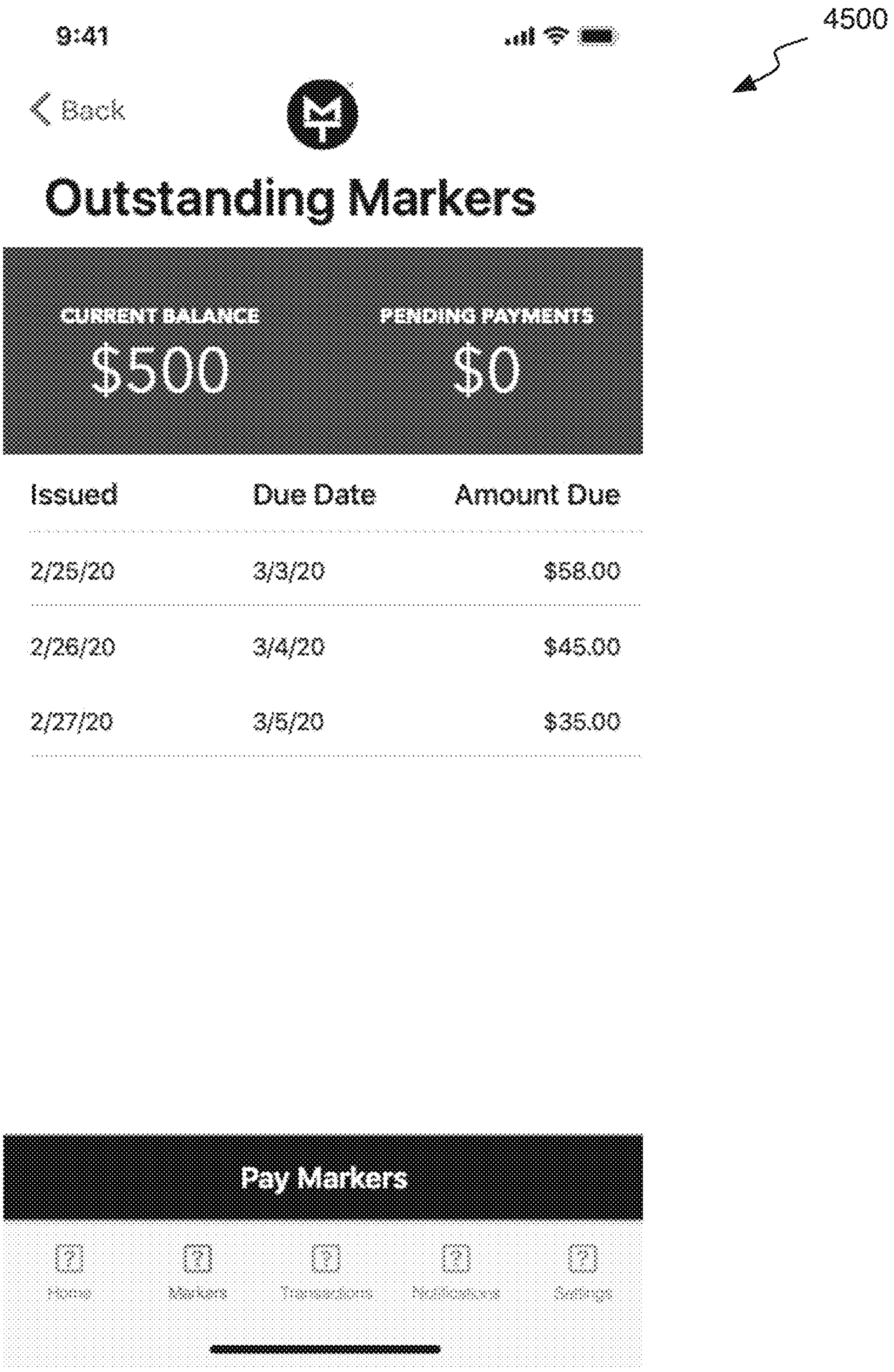
FIG. 45 is a screen capture of the outstanding markers view of the mobile application of FIG. 1.
Figure 46:
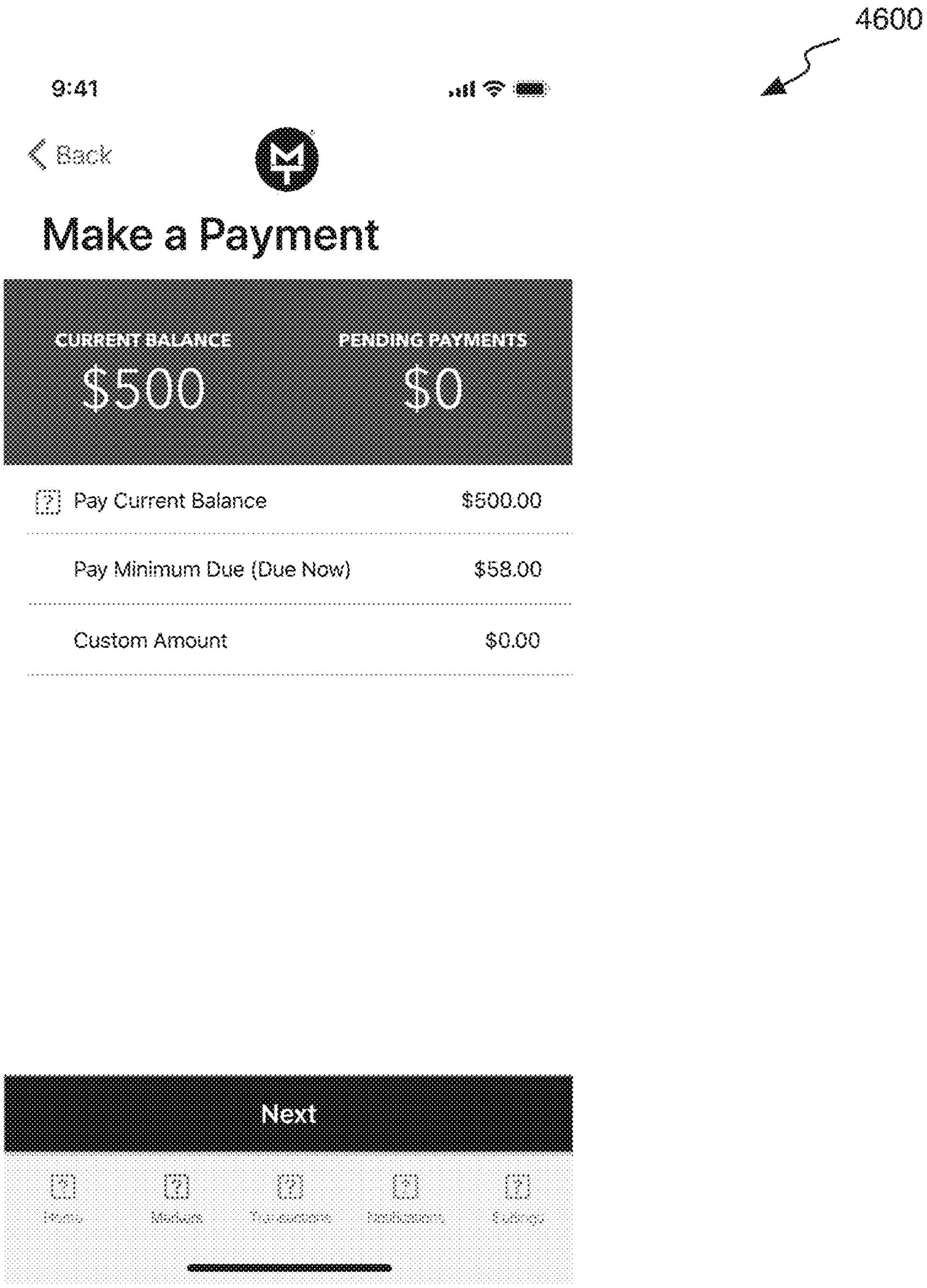
FIG. 46 is a screen capture of the make a payment view of the mobile application of FIG. 1.
Figure 47:
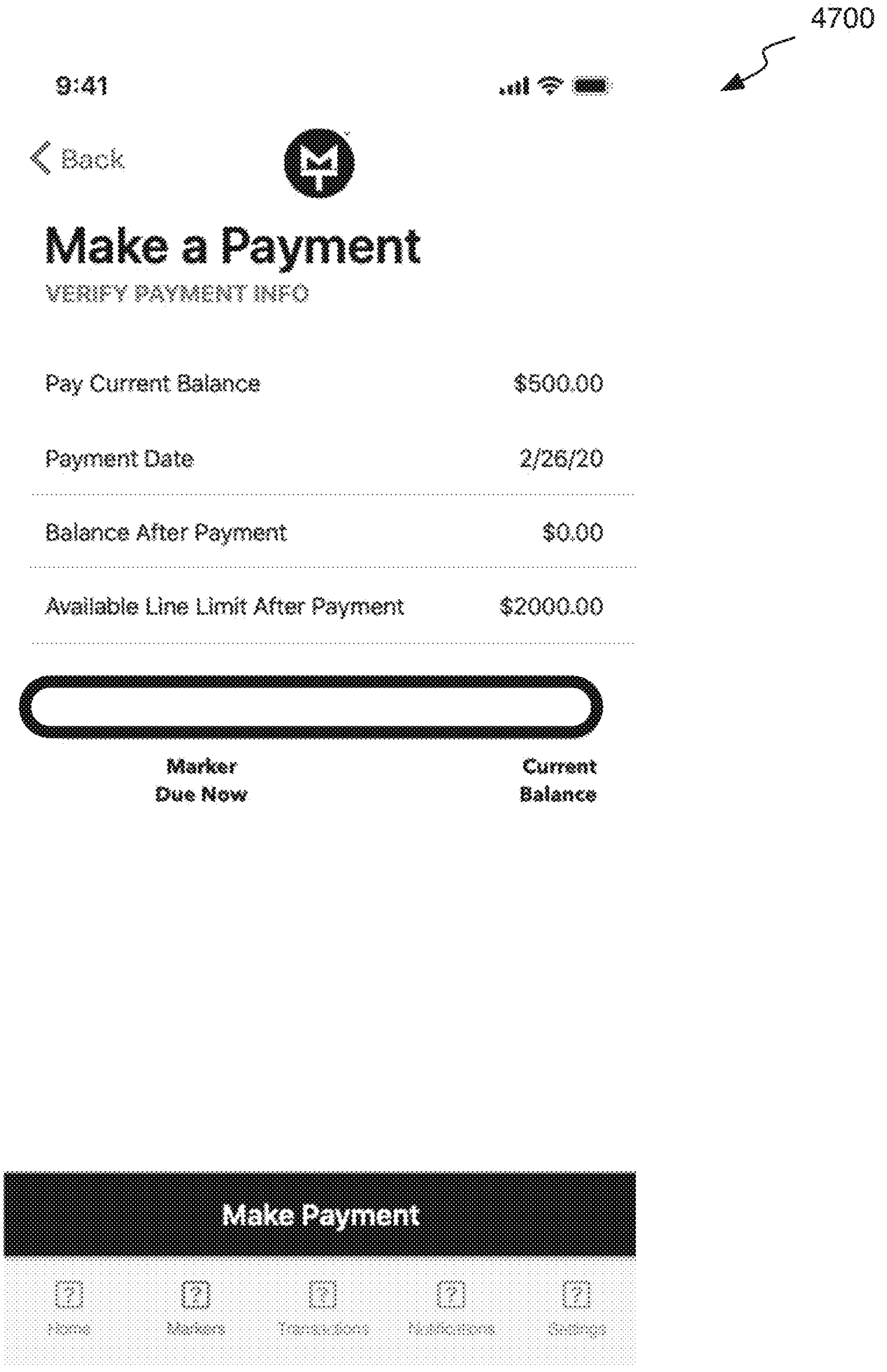
FIG. 47 is a screen capture of the verify payment view of the mobile application of FIG. 1.
Figure 48:
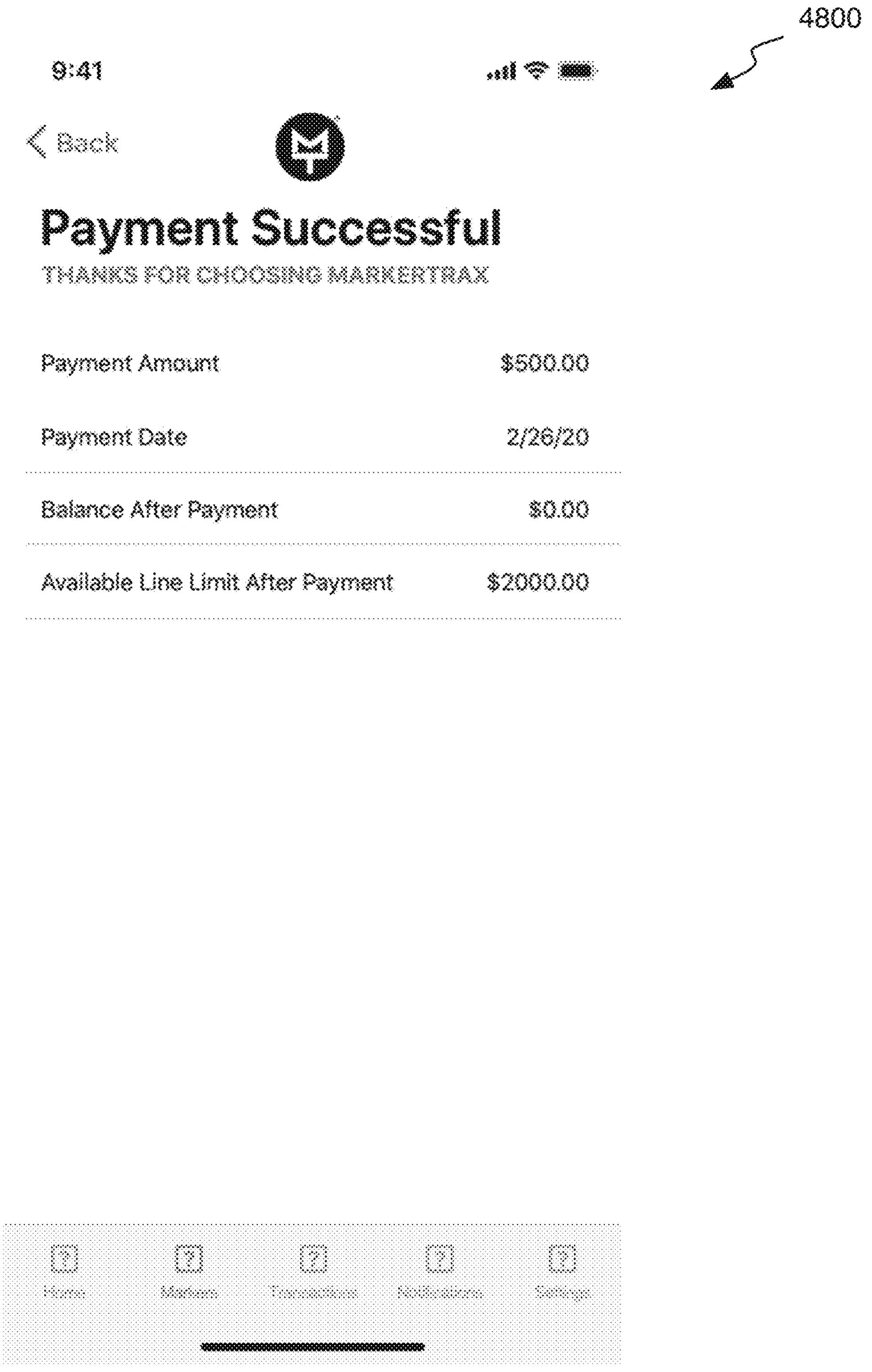
FIG. 48 is a screen capture of the successful payment view of the mobile application of FIG. 1.
Figure 49:
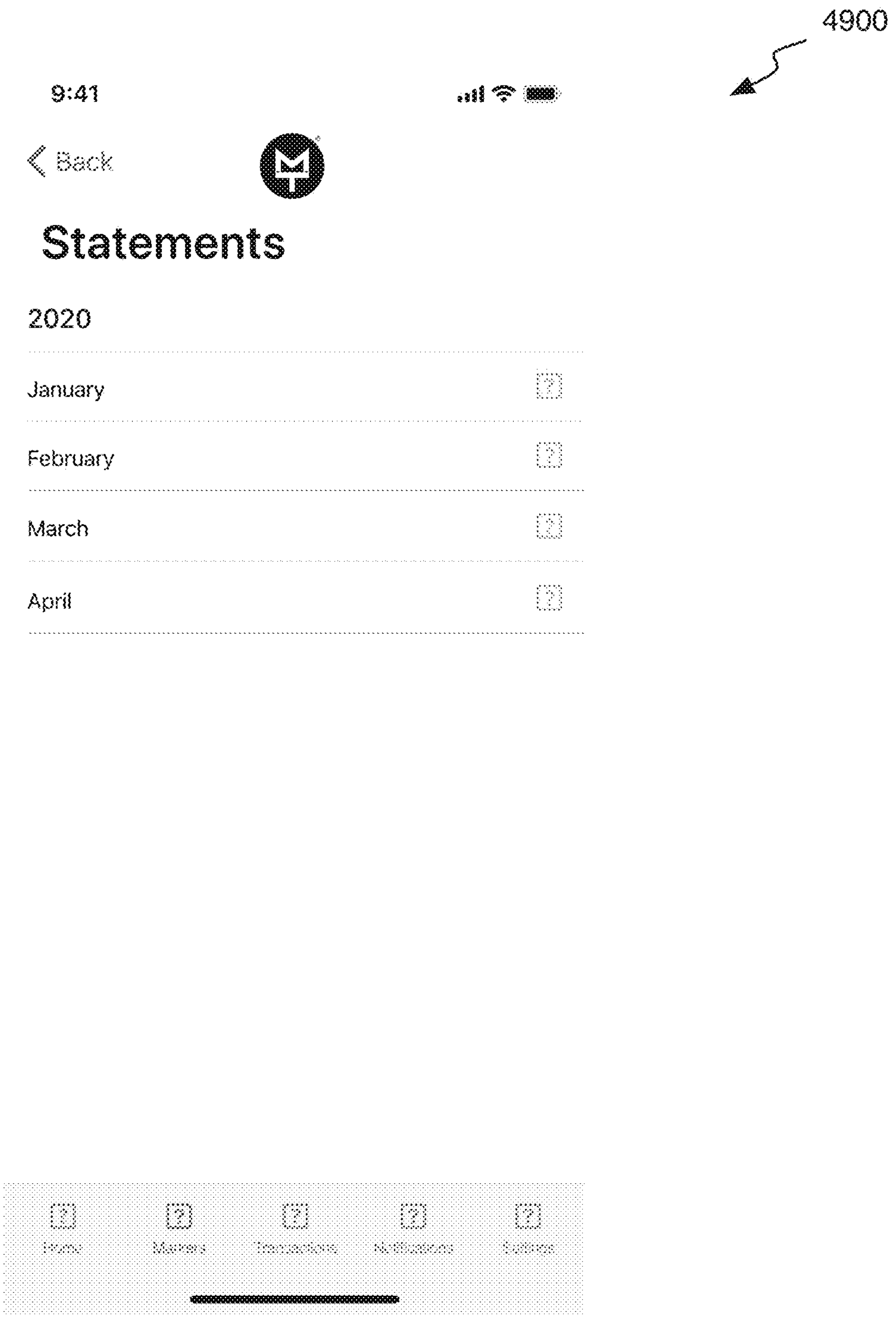
FIG. 49 is a screen capture of the statement view of the mobile application of FIG. 1.
Figure 50:
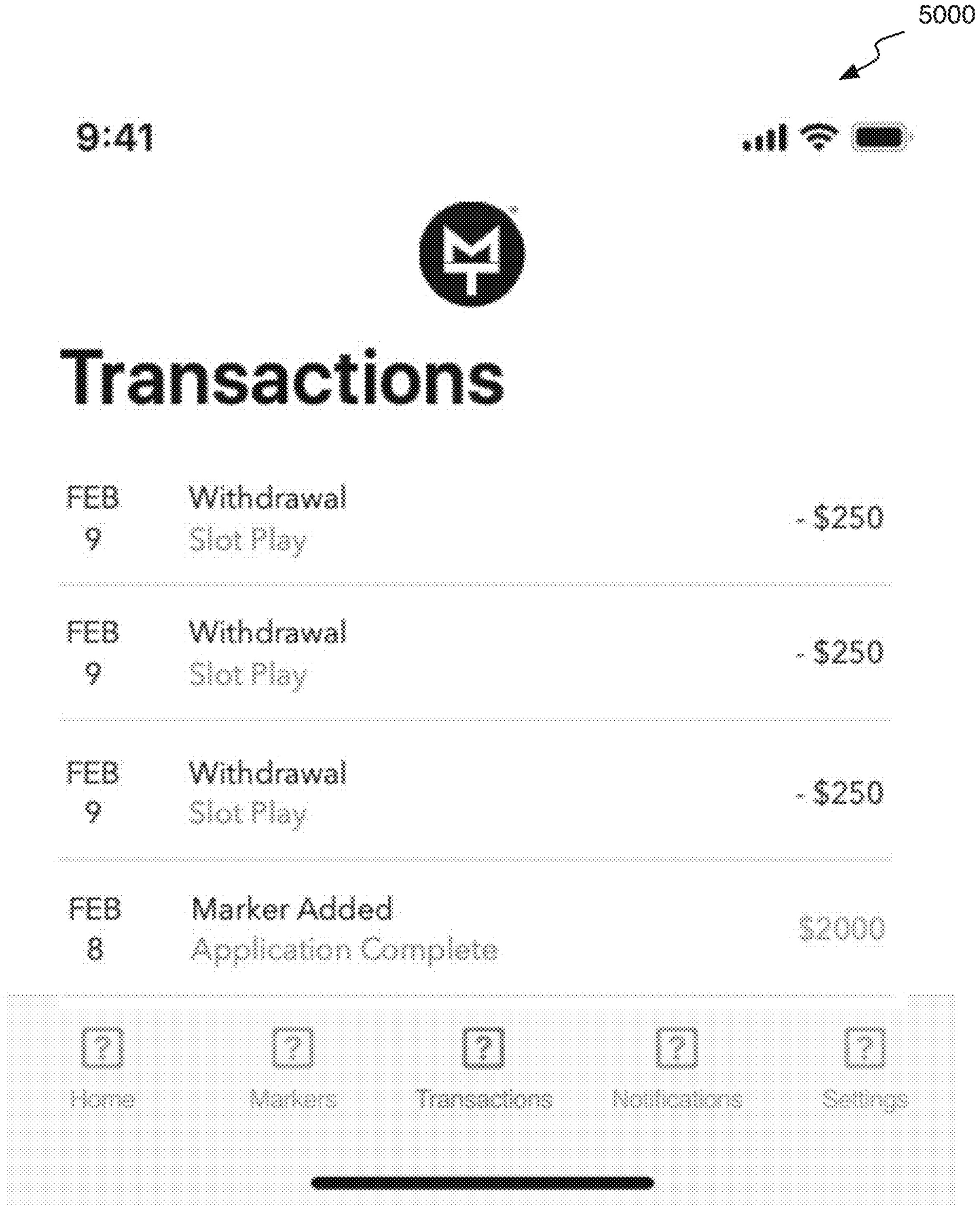
FIG. 50 is a screen capture of the transactions view of the mobile application of FIG. 1.
Figure 51:
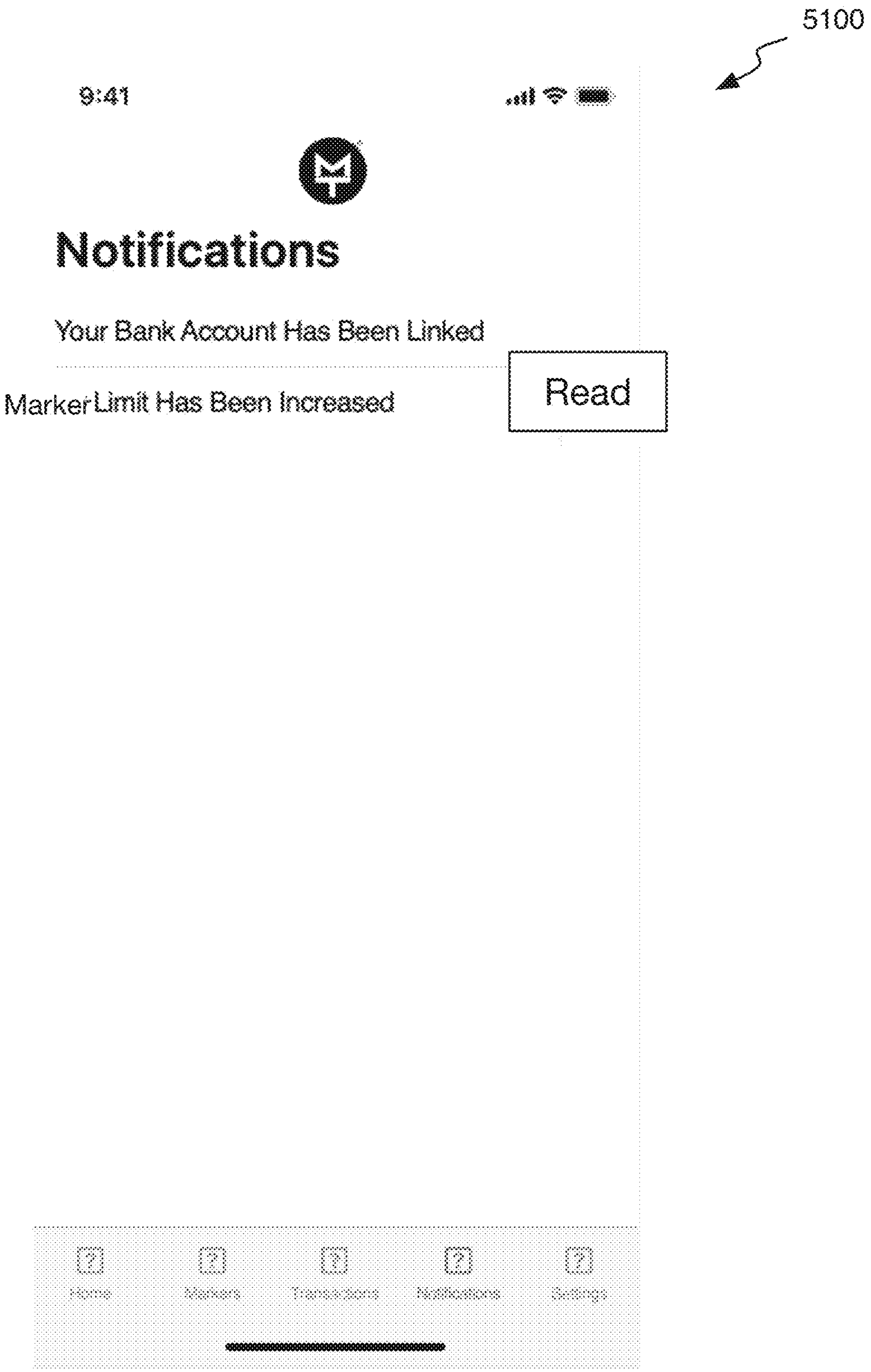
FIG. 51 is a screen capture of the notifications view of the mobile application of FIG. 1.
Figure 52:
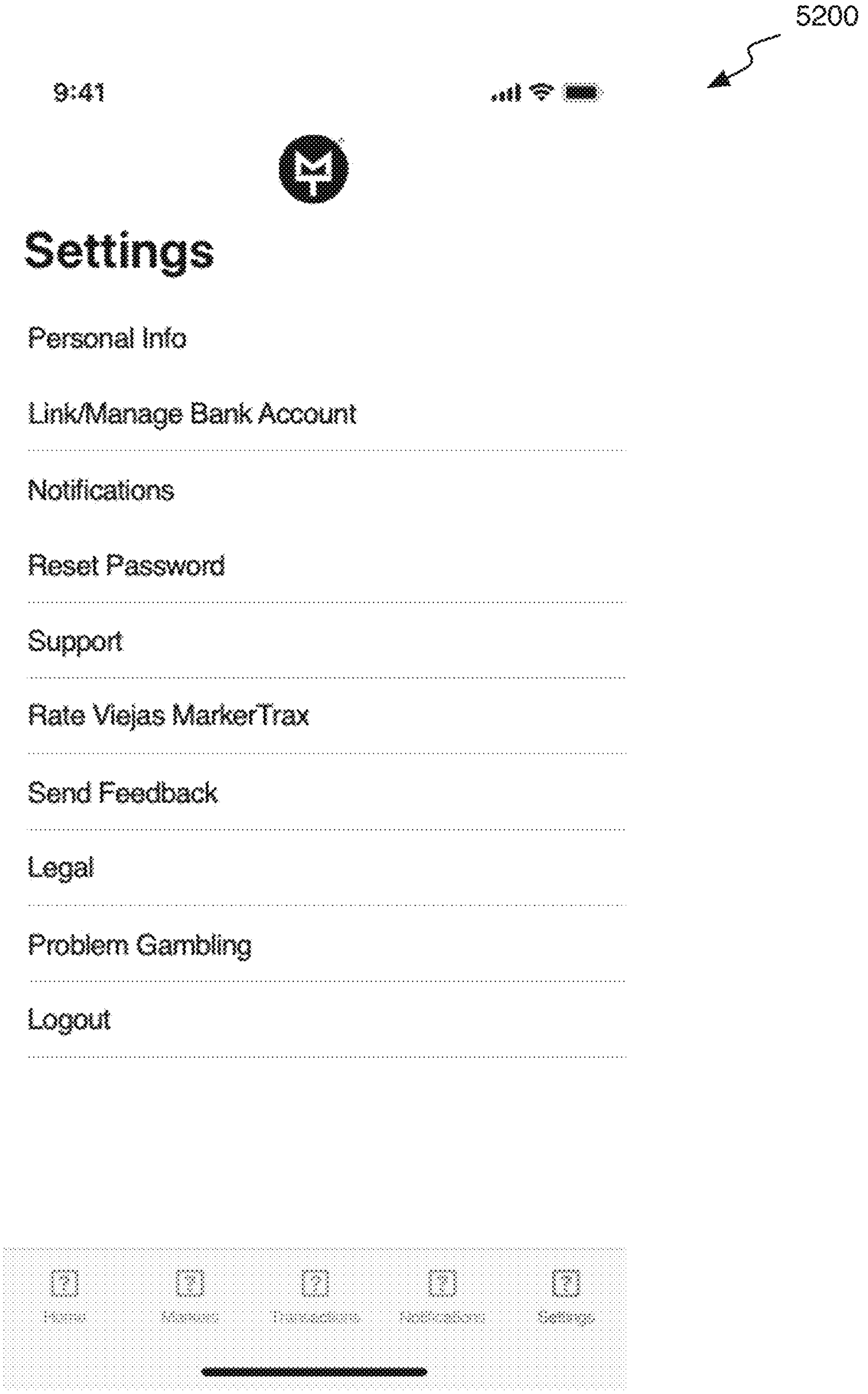
FIG. 52 is a screen capture of the settings view of the mobile application of FIG. 1.
Figure 53:
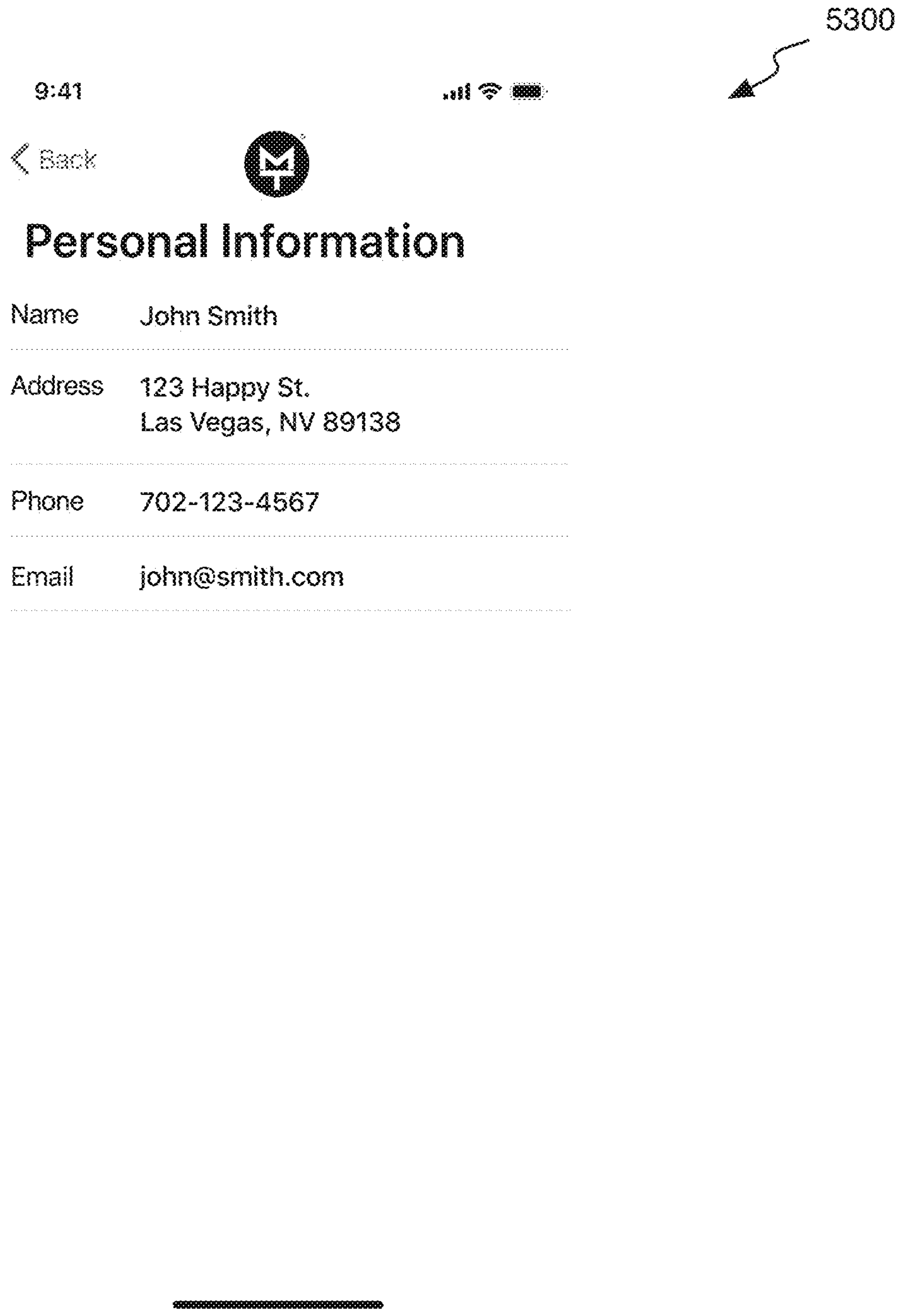
FIG. 53 is a screen capture of the personal information view of the mobile application of FIG. 1.
Figure 54:
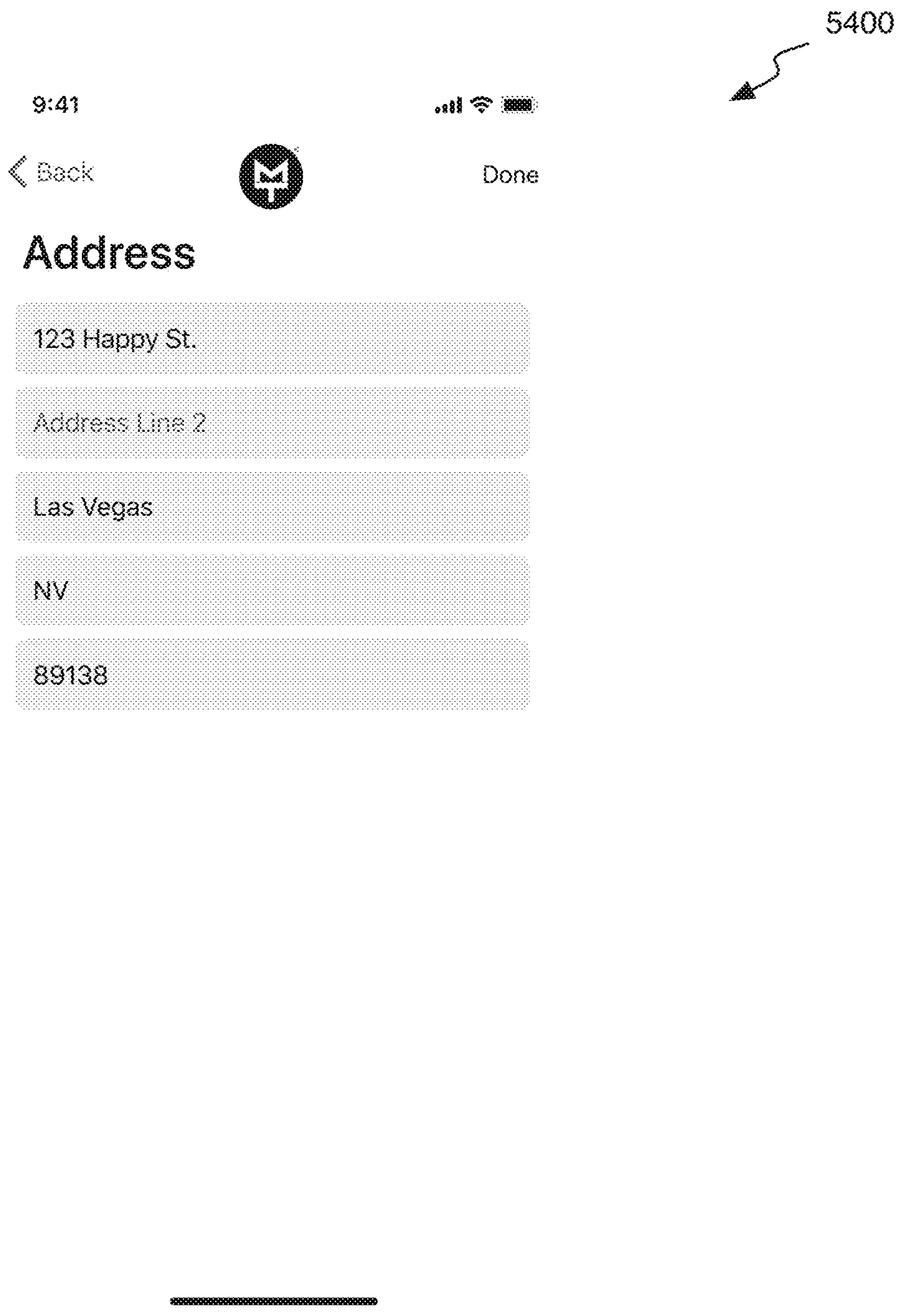
FIG. 54 is a screen capture of the address view of the mobile application of FIG. 1.
Figure 55:
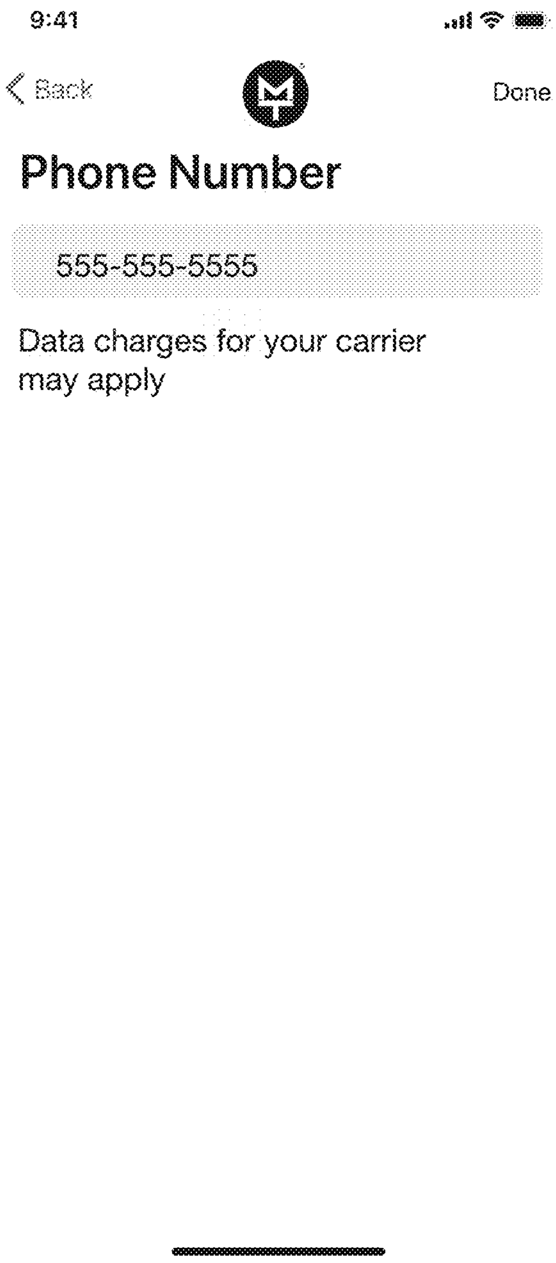
FIG. 55 is a screen capture of the phone number view of the mobile application of FIG. 1.
Figure 56:
FIG. 56 is a screen capture of the email address view of the mobile application of FIG. 1.
Figure 57:
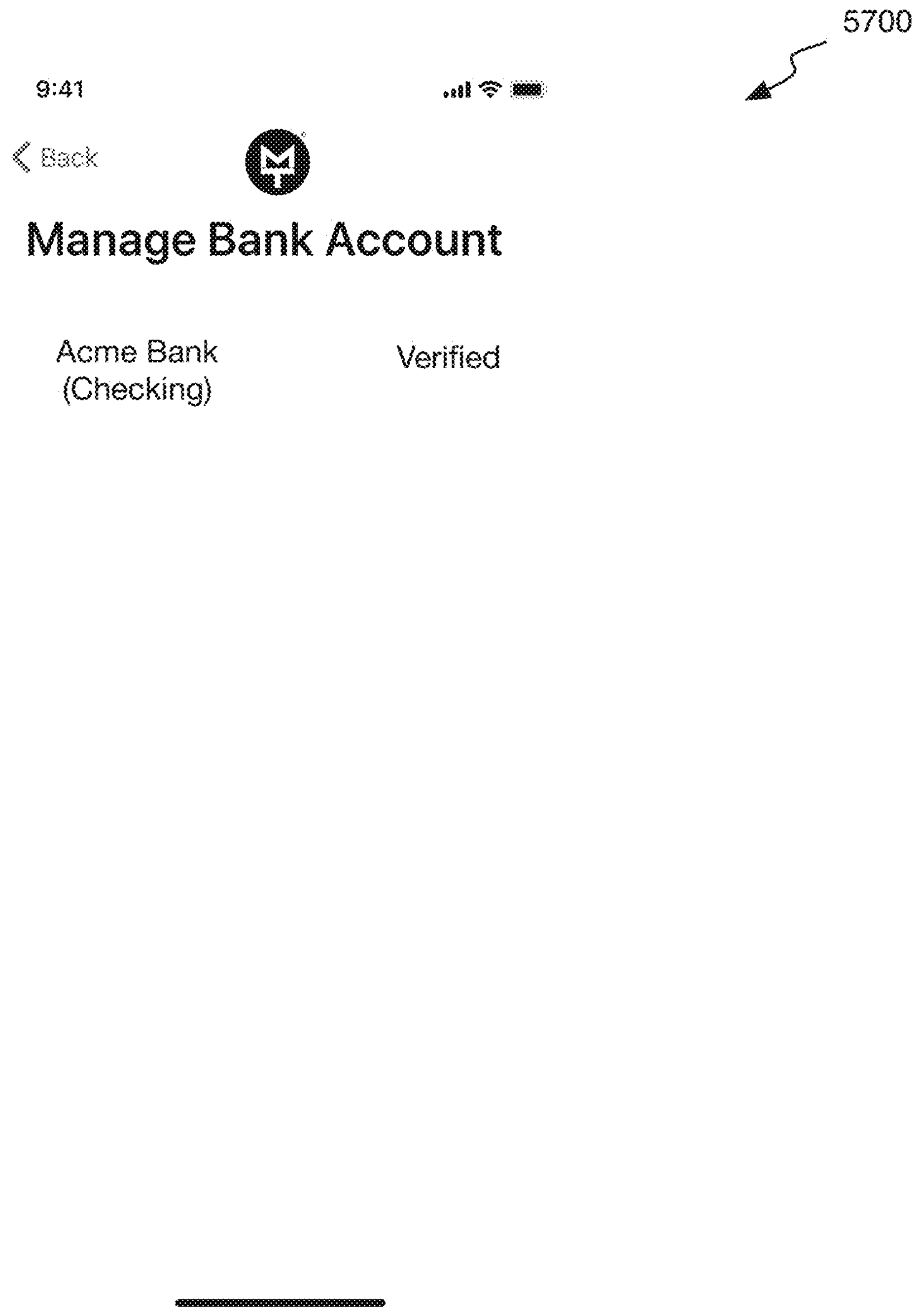
FIG. 57 is a screen capture of the manage bank account view of the mobile application of FIG. 1.
Figure 58:
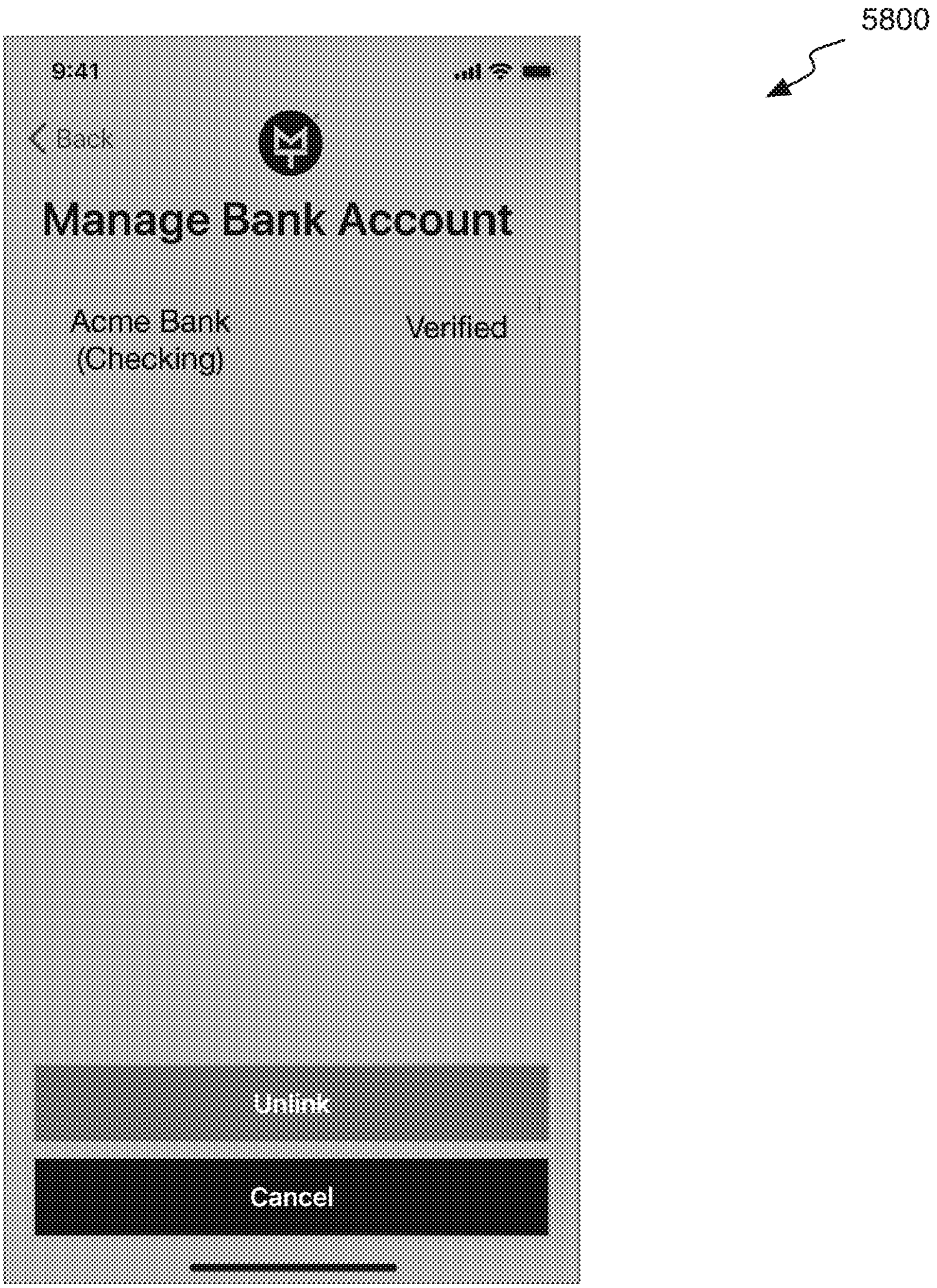
FIG. 58 is a screen capture of the unlink bank account view of the mobile application of FIG. 1.
Figure 59:
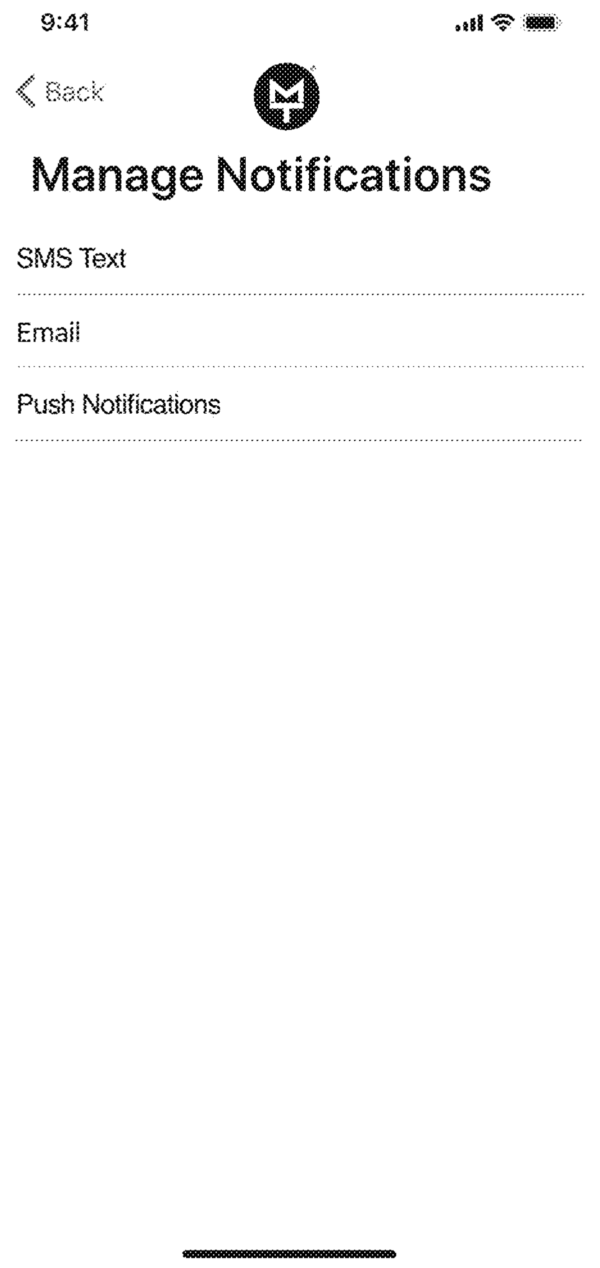
FIG. 59 is a screen capture of the manage notifications view of the mobile application of FIG. 1.
Figure 60:
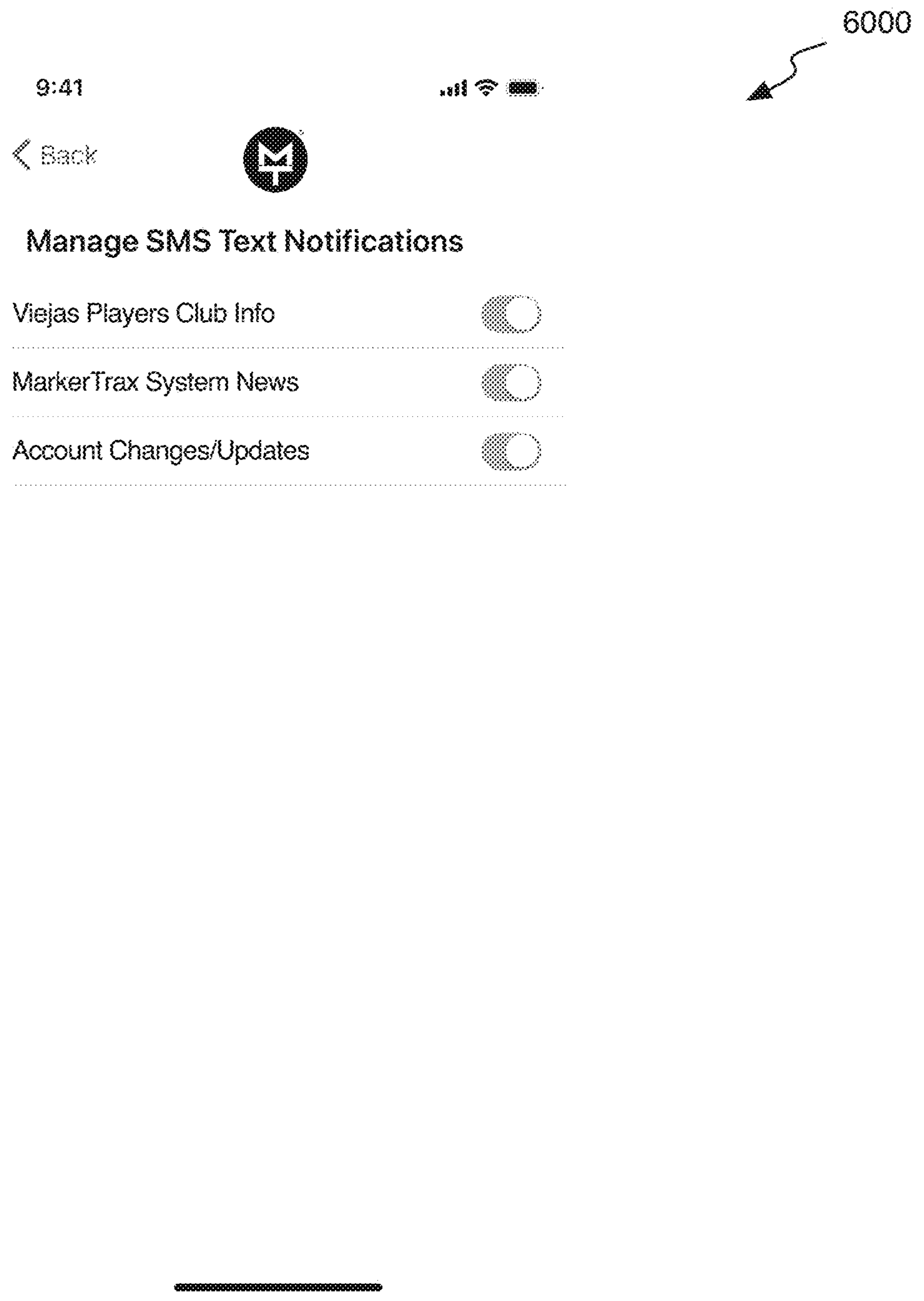
FIG. 60 is a screen capture of the manage sms text notifications view of the mobile application of FIG. 1.
Figure 61:
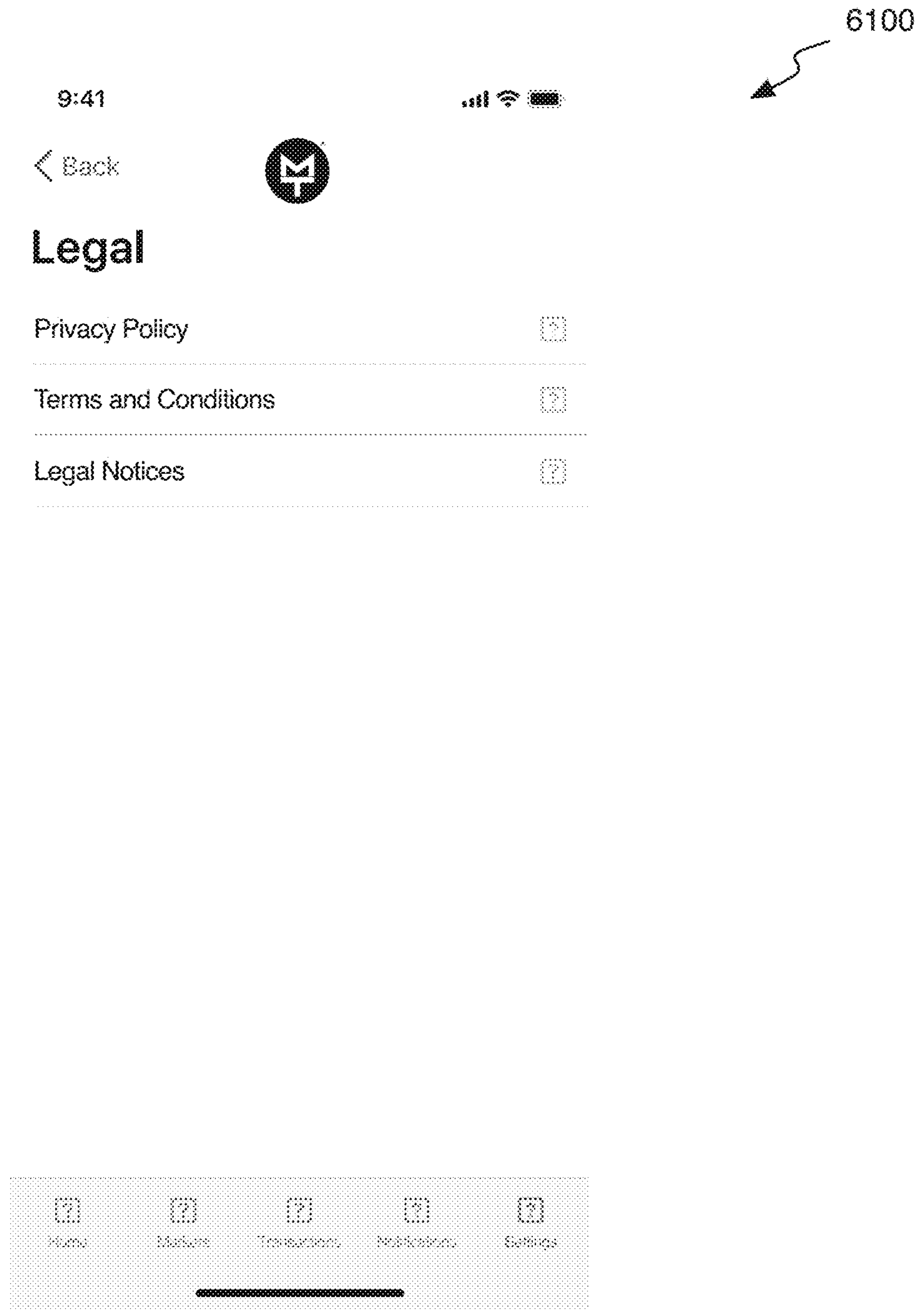
FIG. 61 is a screen capture of the legal view of the mobile application of FIG. 1.
Figure 62:
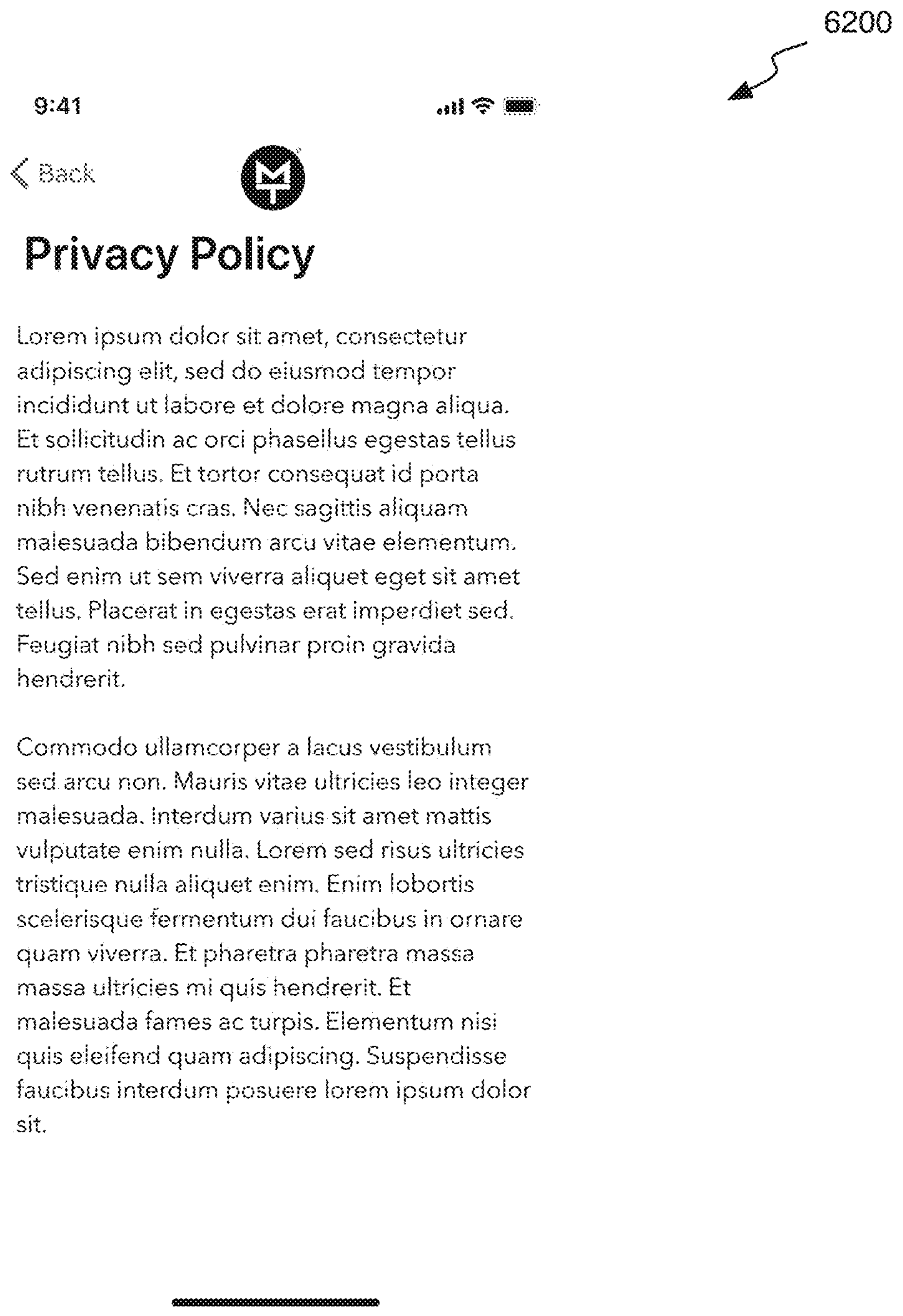
FIG. 62 is a screen capture of the privacy policy view of the mobile application of FIG. 1.
Figure 63:
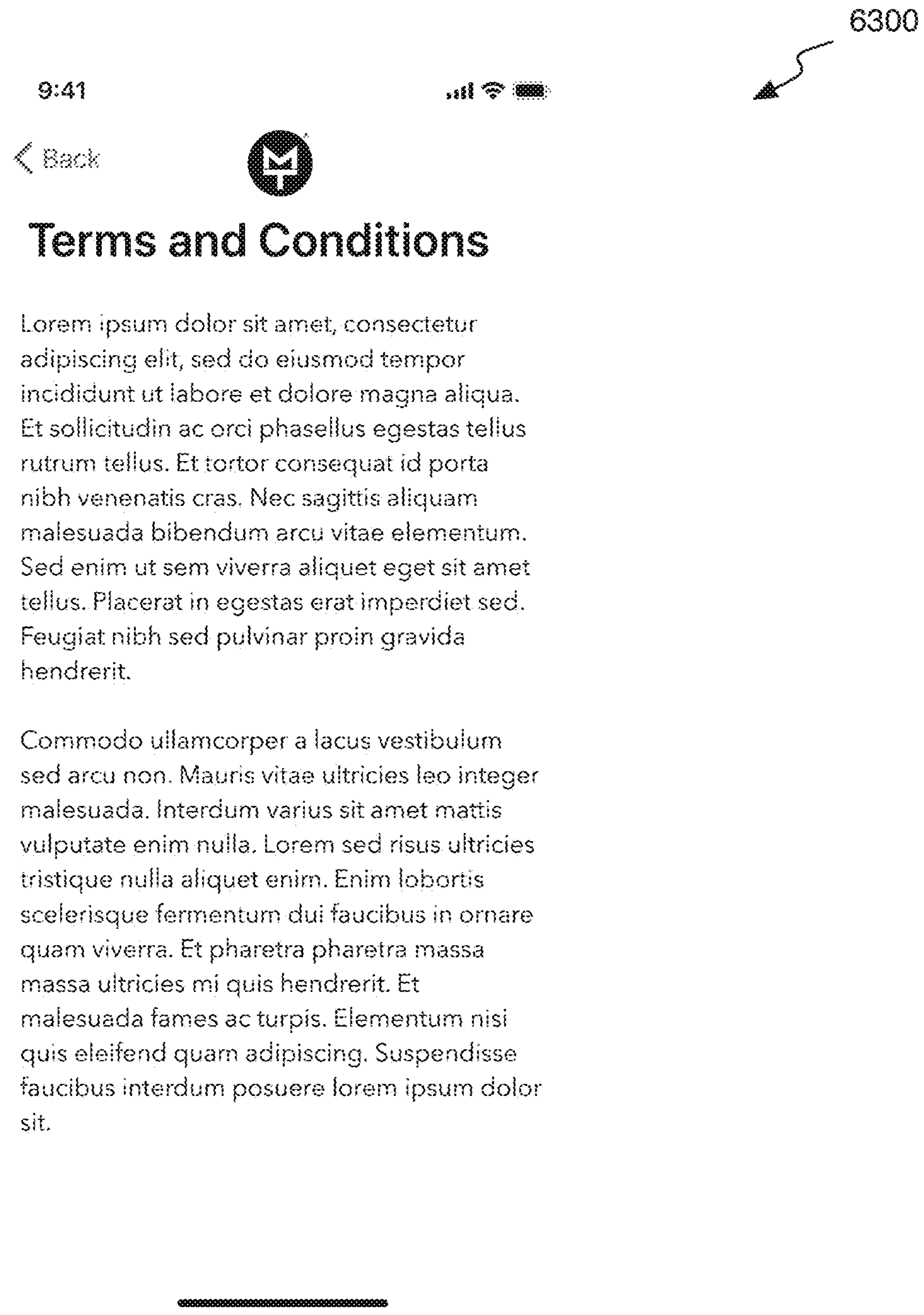
FIG. 63 is a screen capture of the terms and conditions view of the mobile application of FIG. 1.
Figure 64:
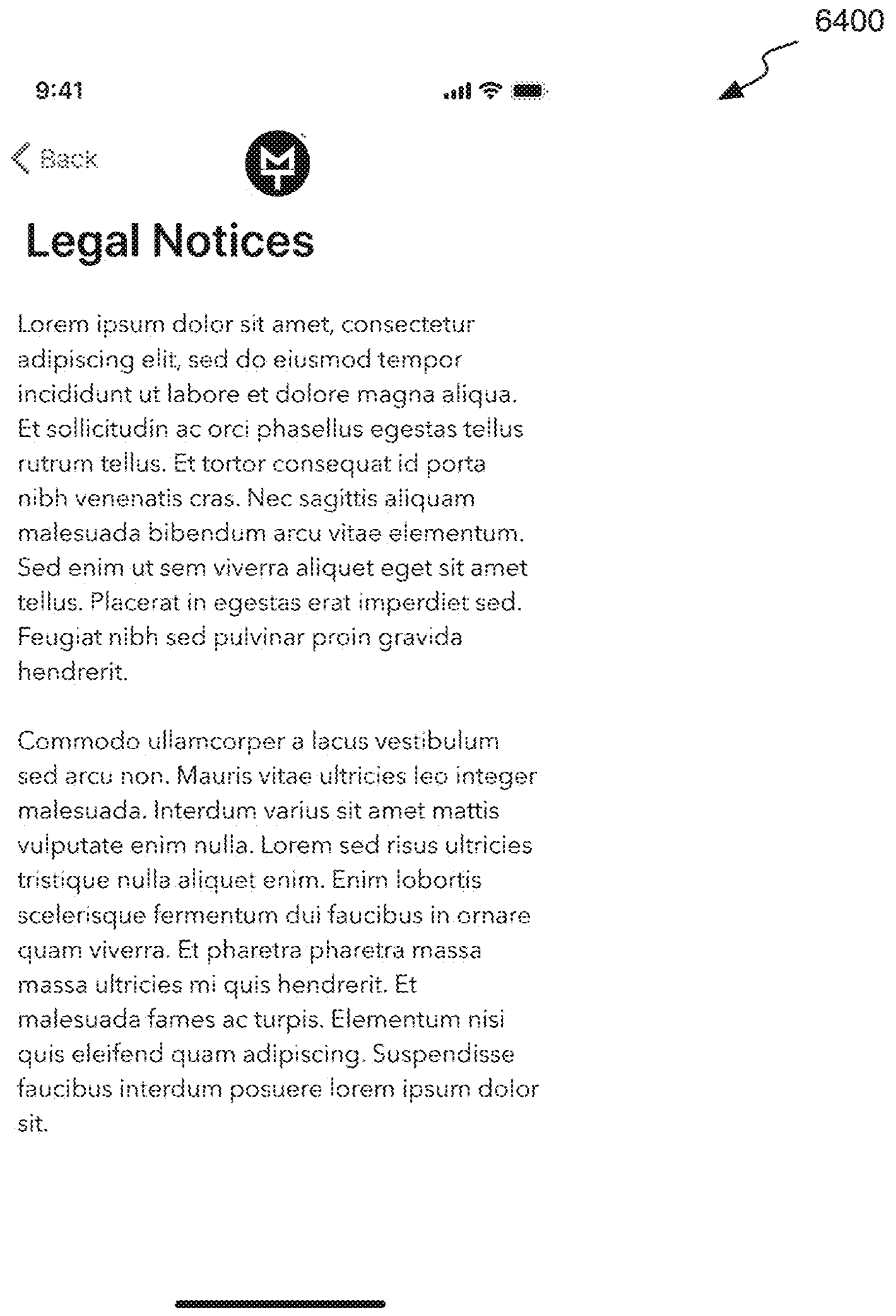
FIG. 64 is a screen capture of the legal notices view of the mobile application of FIG. 1.
Figure 65:
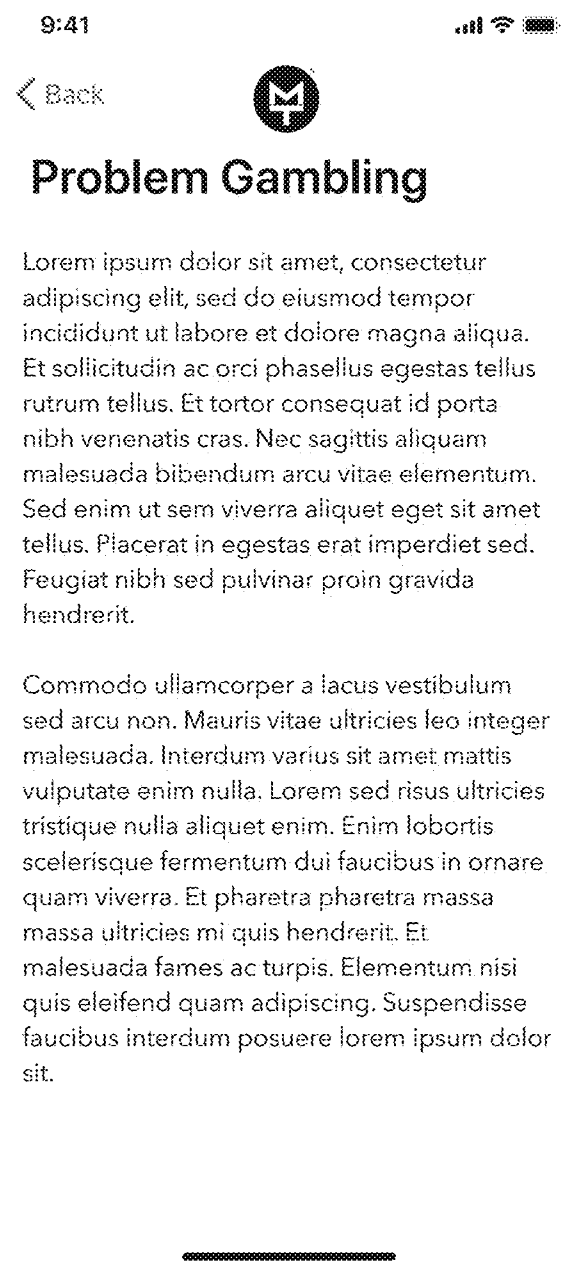
FIG. 65 is a screen capture of the problem gambling view of the mobile application of FIG. 1.

In some embodiments, a mobile interface 310 (e.g., see FIG. 3) provides certain account linking services. Referring now to FIG. 28 through FIG. 30, in some embodiments, upon detecting an account linking request event, an account linking view 2800 is displayed, with controls for initiating account link activity 2805. API endpoints can include, for example, API's that interact with third-party account linking services, such as Dwolla, including, for example, POST /Enroll/Dwolla, POST /Enroll/Verify-Email/Resend, GET /Enroll/Dwolla/lav/Load, and POST /Enroll/Dwolla/lav/Completed. If it is determined that an associated email account has not yet been verified, an email not verified view is displayed 3000 and the user is not allowed to proceed.

Upon receiving the link request, the data and input is passed to the authentication service. The authentication service then validates and checks to determine if the session token is valid 2905, 2910, 2915, 2920. If the token is valid, it is next determined if the customer exists in the external verification system 2925, and if not, a customer is created using the external verification system API 2930. An instant account verification token is generated using the external verification system API 2935, which is then used to complete the account linking process 2940. Once completed, link attempt ID and and funding source ID re received from the external service and stored in a data store, and the account is identified as bank linked 2955. If it is determined that the If it is determined that the session toke is not valid, an error is generated 2960 and an error message returned 2965.

In some embodiments, the enrollment process includes a location check, a credit check, or both. Referring now to FIG. 31 through FIG. 35, in some embodiments, a location check view is displayed 3110 to determine location to, for example, comply with state laws at least with respect to authorizing and completing the credit check. In some implementations, the API endpoint of GET /Geofence is called by providing the session token latitude, and longitude in the header request 3205, 3210. The session token is passed to the authentication service 3215 and it is deterred whether the session token is valid 3220. If it is valid, the latitude and longitude, in combination, are assessed as to whether or not they are associated with a valid property 3225. If location is correct, valid position is set to true 3230, and true is returned 3235. If the session toke is determined to be invalid or if the latitude and longitude are determined not to be associated with a property, then an error is generated 3240 and an error message is returned 3245.

In some embodiments, a credit check initiation view 3300 is displayed, with controls for collecting identification data, such as the last four digits of a social security number 3305, consent for a credit report pull 3310, such as consenting to one or more of displayed property-specific or state-specific terms, and submission of a verification request 3315. API endpoints can include, for example, GET /Property/PropertyID/Legal and POST /Enroll/advance-line/credit-check. The interface can collect location input date for marshalling and transmission, such as a session token, latitude and longitude, and identifying data collected, transmitted in the header of the request 3505.

In some implementations, the API endpoint of GET /Property/PropertyID/Legal is called and retrieves legal documents associated with the relevant property 3505. The API endpoint GET /Enroll/advance-line us called and passes the data input as noted above 3510. The session token is passed to the authentication service 3515 and it is determined whether the session token is valid 3520. If it is valid, the latitude and longitude, in combination, are assessed as to whether or not they are associated with a valid property 3525. If location is valid, it is determined whether an advance line has already been offered or accepted 3530. If a line has been offered or accepted, a response is returned 3535, 3540. If a line has not been offered or accepted, identifying information such as the last 4 digits of the social security number, first name, last name, phone, address, date of birth, and like are passed to an external credit check API 3545. Credit qualification data is received 3550. Received credit qualification data is validated 3555 and if valid, and either alone or in combination with other data, an advance line amount is determined and offered based, at least in part, on the credit qualification data 3560 3565.

| Example Data Output: |
|---|

{
"id": "10",
"property_id": "2",
"player_card_program_id": "2",
"player_card_number": "123456789",
"email": "john@smith.com",
"identity_verified": null, "email_verified": 1,
"name_first": "John",
"name_last": "Smith",
"name": "John Smith",
"date_of_birth": "1985-12-12",
"name_middle": null,
"line1": "123 Main St.",
"line2": null,
"line3": null,
"street": "123 Main St.",
"sub_region": null,
"city": "Las Vegas",
"region": "NV",
"postal_code": "89101",
"sorting_code": null,
"country_code": "US",
"mobile": "+17021234567",
"mobile_verified": 1,
"advance_line_type_code": "offered",
"advance_line_type_display": "Offered Line",
"advance_line": "2000",
"bank_linked": "0",
}

Referring now to FIG. 34 through FIG. 37, if it is determined that no advance line will be offered, a credit check fail view is displayed 3400, which, in some instances, includes one or more explanations for the advance line denial 3405, 3410. If instead, an advance line is approved, an approve and accept view is displayed 3600 with controls for selecting the amount of the advance 3605, 3610, accepting or declining of the advance along with the associated terms 3615, 3620, or both. API endpoints can include, for example, GET /Property/PropertyID/Legal, GET /Enroll/advance-line, POST /Enroll/advance-line/accept, POST /Enroll/advance-line/decline. The interface can collect location input date for marshalling and transmission, such as a session token, latitude and longitude, and identifying data collected, transmitted in the header of the request.

In some instances, an API endpoint of GET /Property/PropertyID/Legal is called and retrieves the legal documents associated with the property 3710. A call is then made to GET /Enroll/advance-line 3705, 3710. The session token is passed to the authentication service 3715. The authentication service then determines if the session token is valid 3720. the latitude and longitude are validated to determine if they correspond to the property 3725. The advance-line-offer is returned and displayed, along with the available advance line amount. Upon detection of an acceptance event 3730, the amount accepted is transmitted via a call to POST /Enroll/Advance-Line/Accept. The amount received is validated. In some instances, the amount accepted is validated against a set of required parameters such as, for example, whether or not the amount is divisible by 50, is greater than 100, or the like 3735. Once the advance line accepted amount is validated the accepted line with the accepted amount is recorded in the database and a success message is returned 3740. If the session token is invalid, the latitude and longitude do not correspond to a property, the advance line is not accepted, or the advance line does not conform to one or more parameters, then an error is generated 3745 and an error message returned 3750.

| Example Data Output: |
|---|

{
"advance_line_type_code": "accepted",
"advance_line_type_display": "Accepted Line",
"advance_line": "1000",}

Referring now to FIG. 38 through FIG. 65, in some embodiments, one or more from a series of mobile views provides interfaces to various features, functions, and services of the credit wager system and method of use with loan and warrantying including, but not limited to, enrollment views 3800, authentication views 3900, 4000, dashboard views 4100, recent activity views 4200, todo views 4300, marker management and payment views 4400, 4500, 4600, 4700, 4800, statement and transaction history views 4900, 5000, notification views 5100, setting views 5200, player info views 5300, 5400, 5500, 5600, linked bank account views 5700, 5800, notification management views 5900, 6000, and legal terms, policies, and notices views 6100, 6200, 6300, 6400, 6500.

Figure 66:
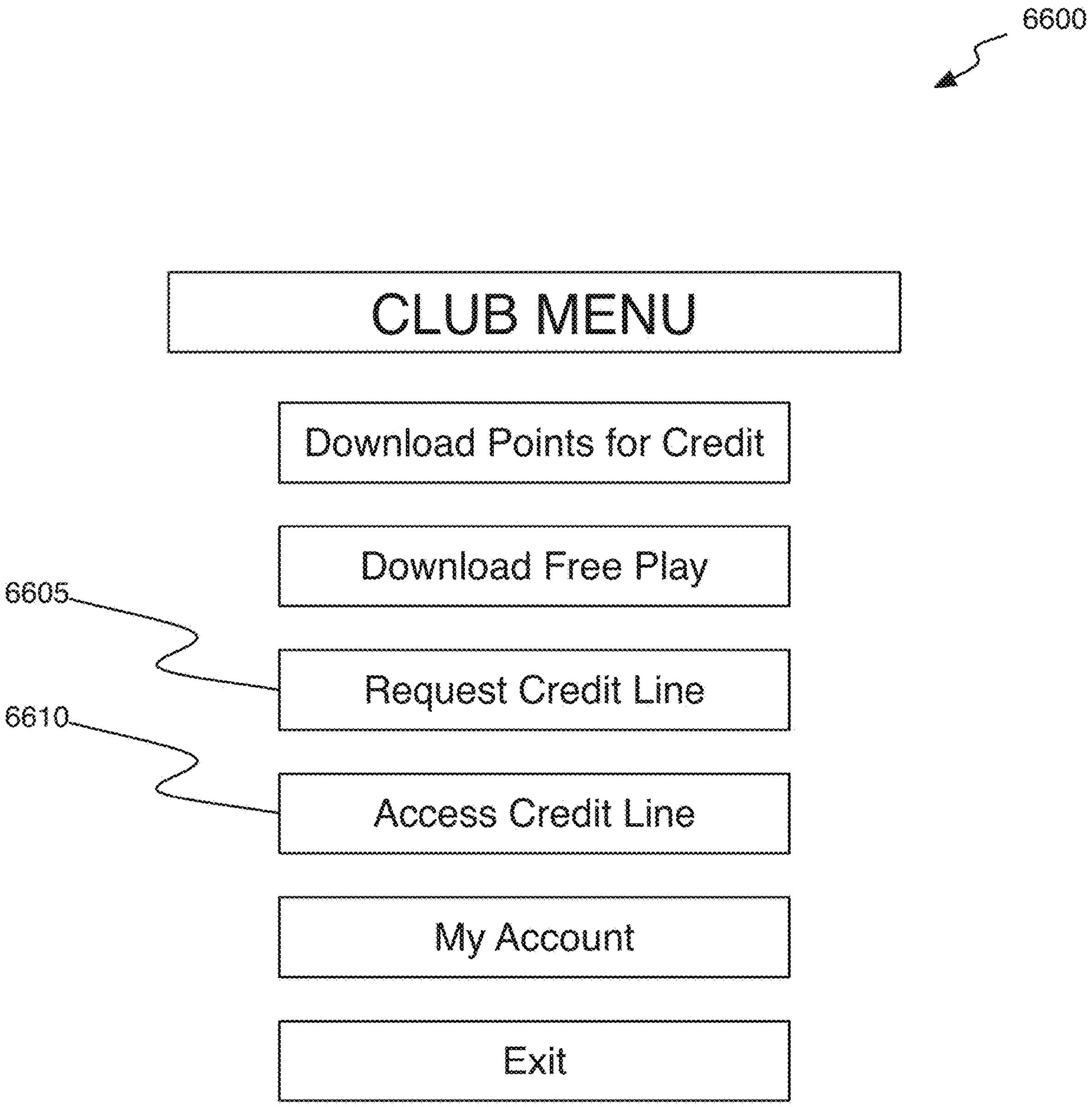
FIG. 66 is a wireframe of an account access view of the touch display of FIG. 2B.
Figure 67:
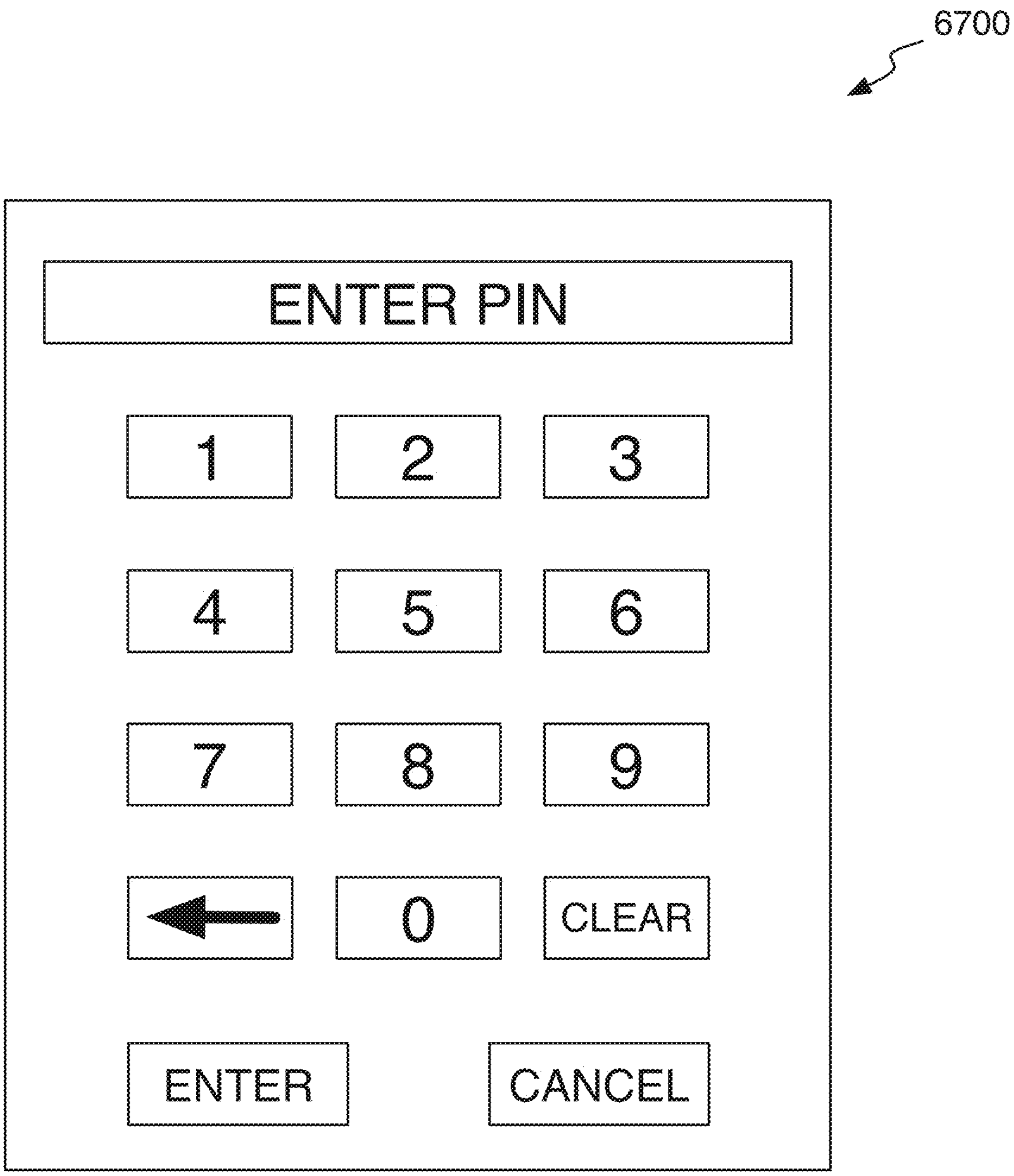
FIG. 67 is a wireframe of an account authorization view for authenticating credit account access pool in the credit wagering system with loan and warrantying of FIG. 2B and FIG. 3.
Figure 68:
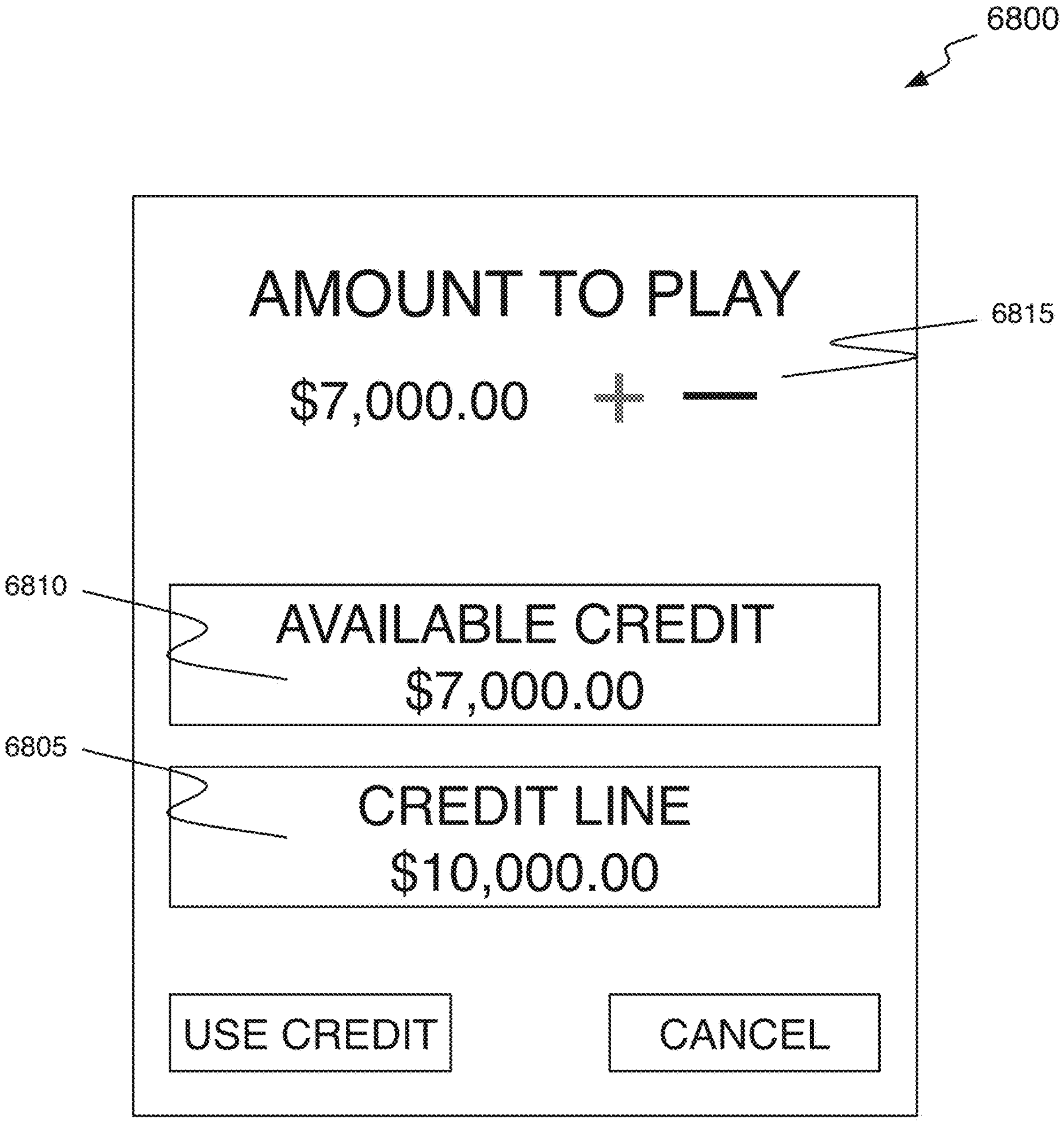
FIG. 68 is a wireframe of the credit account amount selection and use view pool in the credit wagering system with loan and warrantying of FIG. 2B and FIG. 3.

In some implementations, an at-machine interface, such as via a SMIB or embedded technology, provides one or more of account authorization, account access, credit request submission, credit approval notification, credit access, funds advancement, and fee authorization. Referring now to FIG. 66 through FIG. 68, in some embodiments, a user interface can provide a series of selections for account game management 6600, including interface controls to request a new credit line 6605, access an existing credit line 6610, or both. Upon detection of a credit access event, an authentication event is initiated such as, for example, generating an account authorization view for authenticating credit account access 6700. Once received, the receiving device can communicate the authentication input to the authentication service 625 (e.g., see FIG. 6). If authentication is validated, the credit access service 645 can control elements of credit access. The credit account management service 650 can provide credit management views 6800, displaying the credit line total 6805, the available credit 6810, and one or more controls for initiating fund advancement functions 6815.

Figure 69:
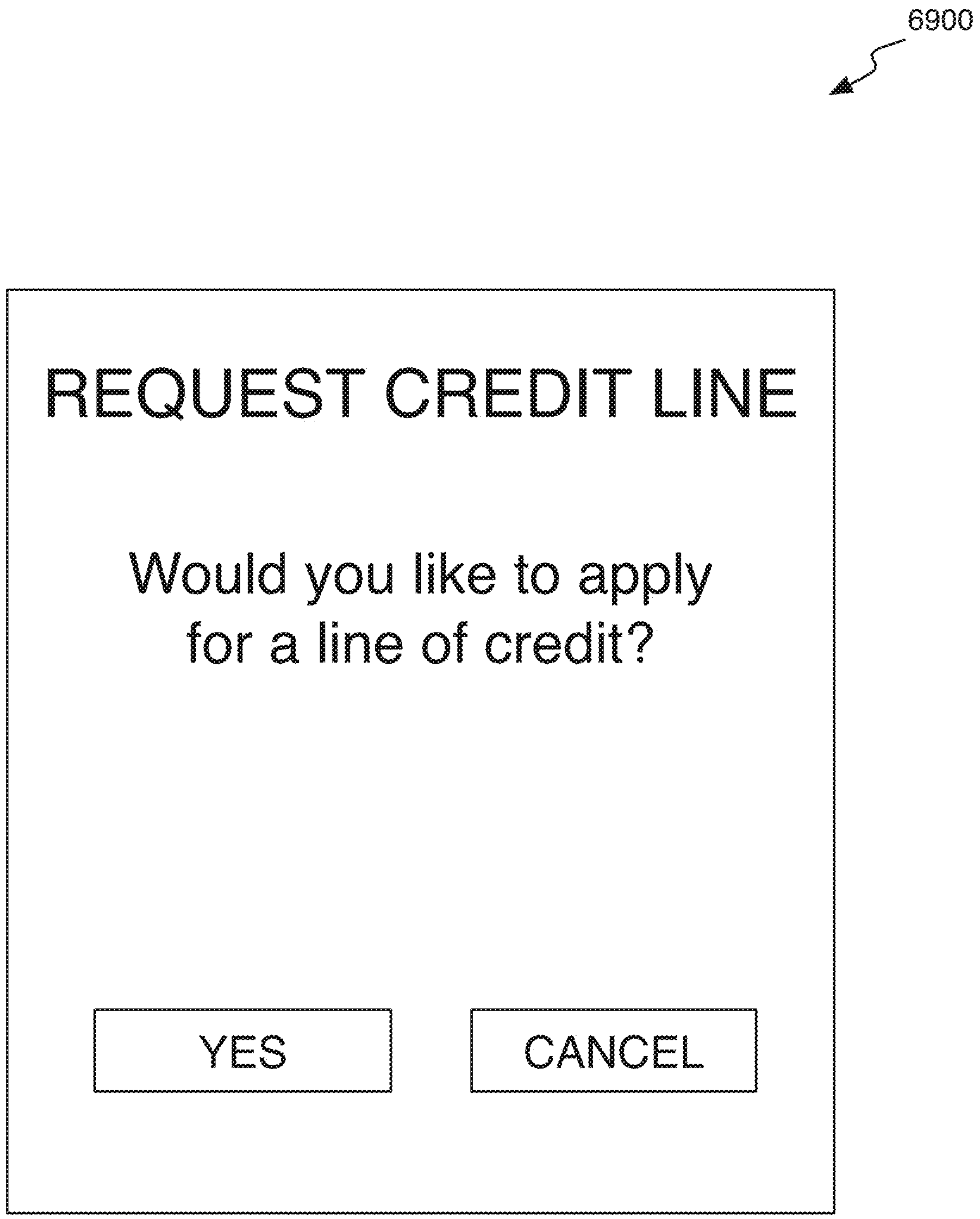
FIG. 69 is a wireframe of the credit line request view pool in the credit wagering system with loan and warrantying of FIG. 2B and FIG. 3.
Figure 70:
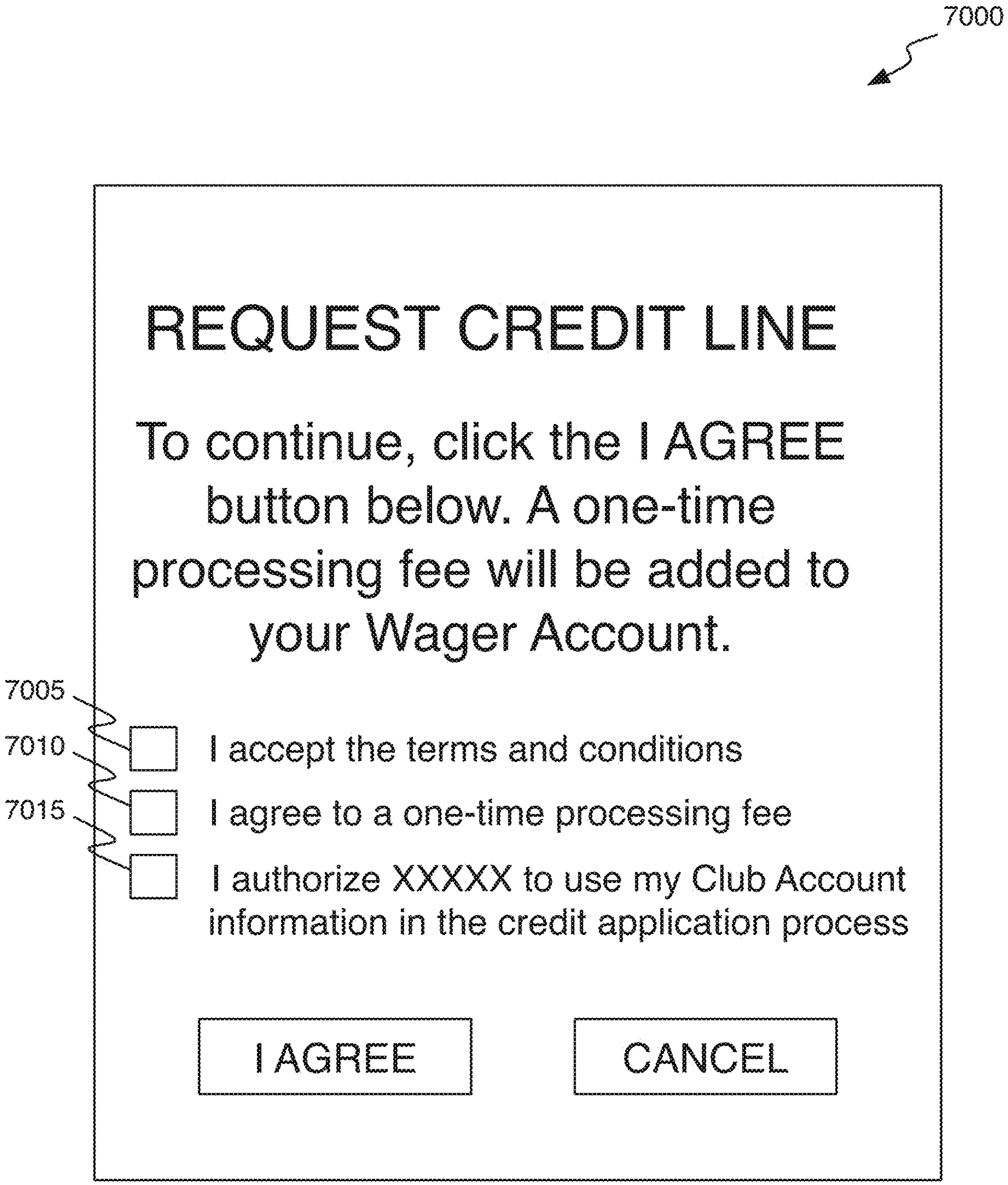
FIG. 70 is a wireframe of the credit request authorization, fee, and terms acceptance view pool in the credit wagering system with loan and warrantying of FIG. 2B and FIG. 3.
Figure 71:
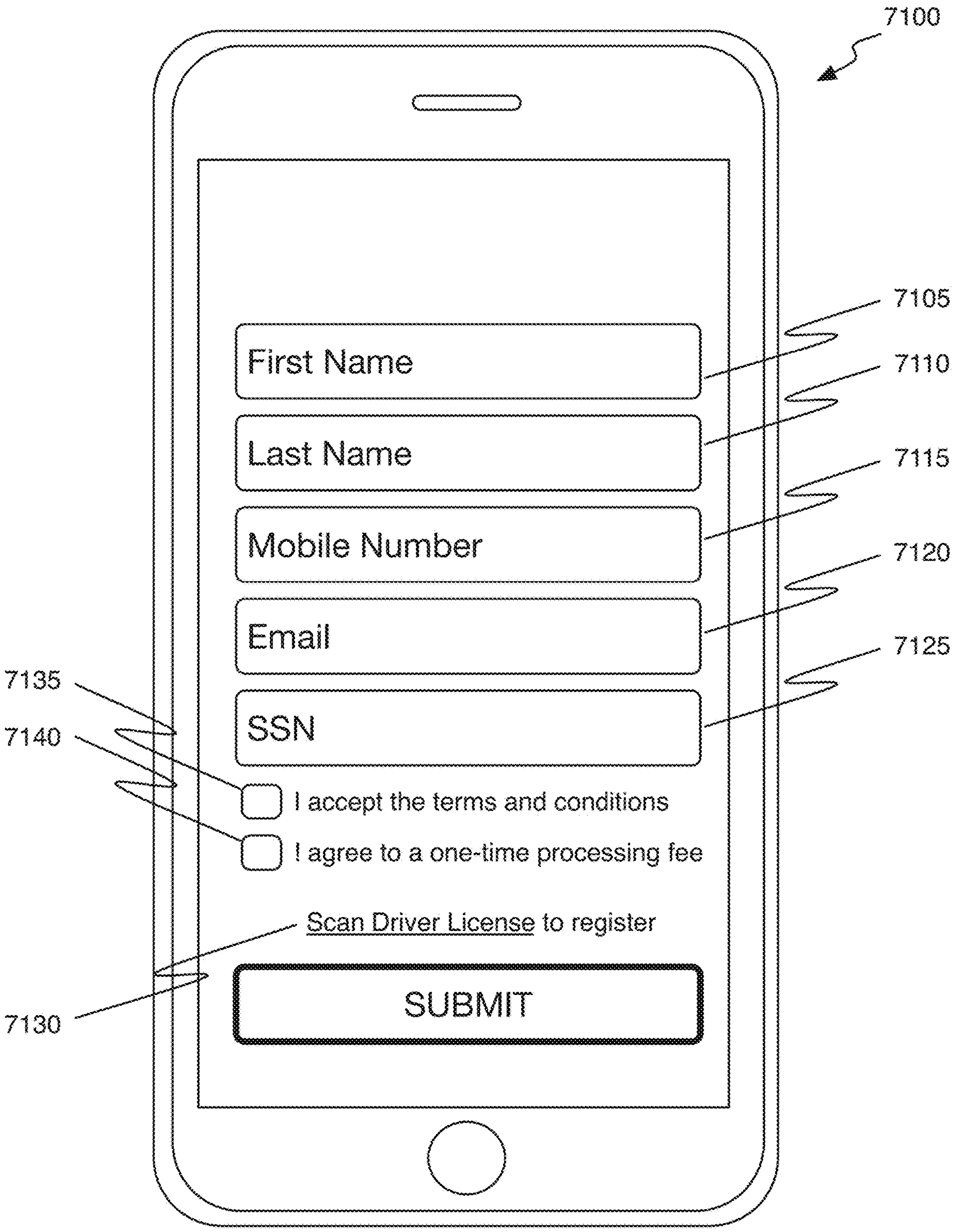
FIG. 71 is a screen capture mobile app credit request view in the credit wagering system with loan and warrantying of FIG. 2B and FIG. 3.
Figure 72:
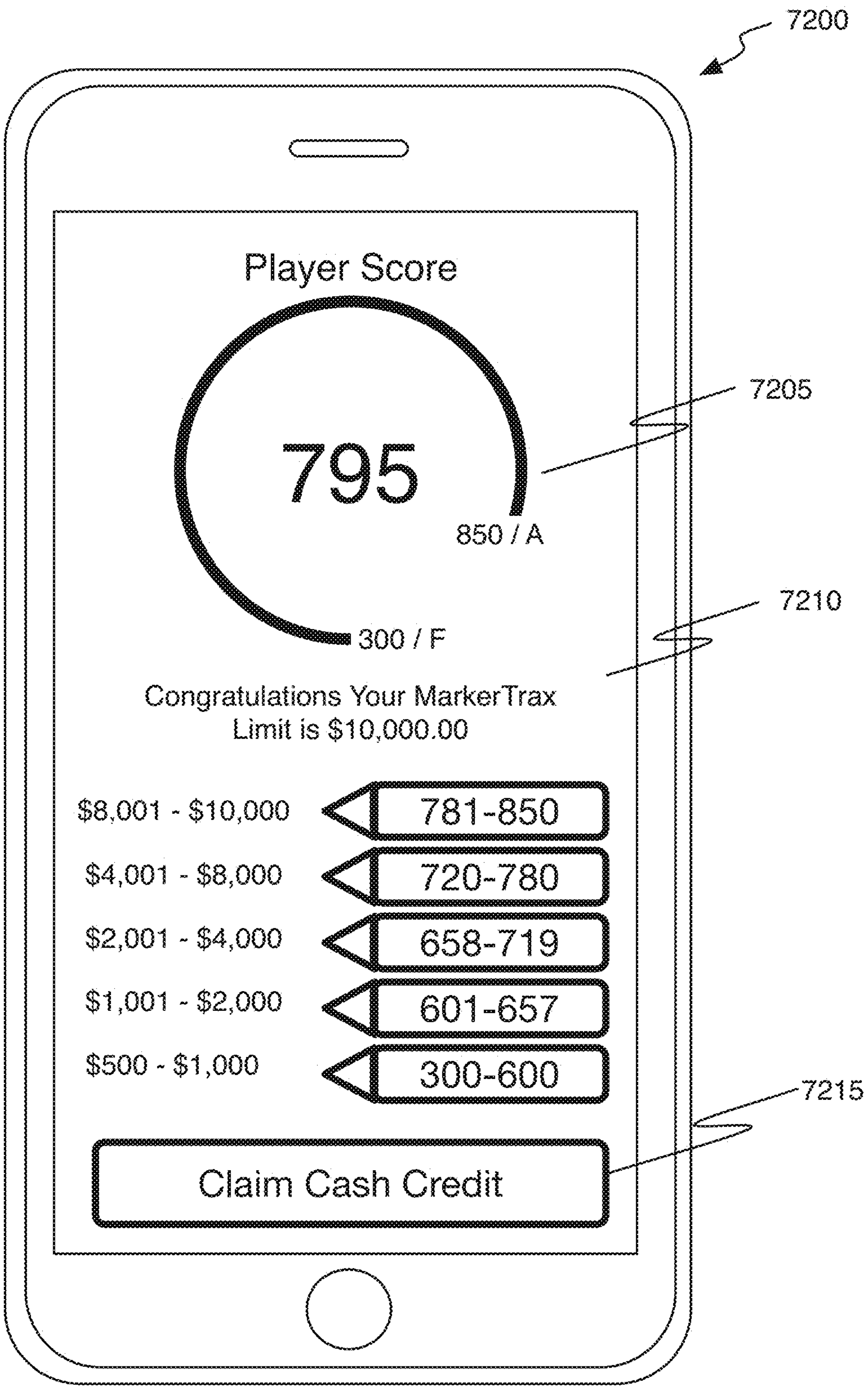
FIG. 72 is a screen capture mobile app credit approval view in the credit wagering system with loan and warrantying of FIG. 2B and FIG. 3.
Figure 73:
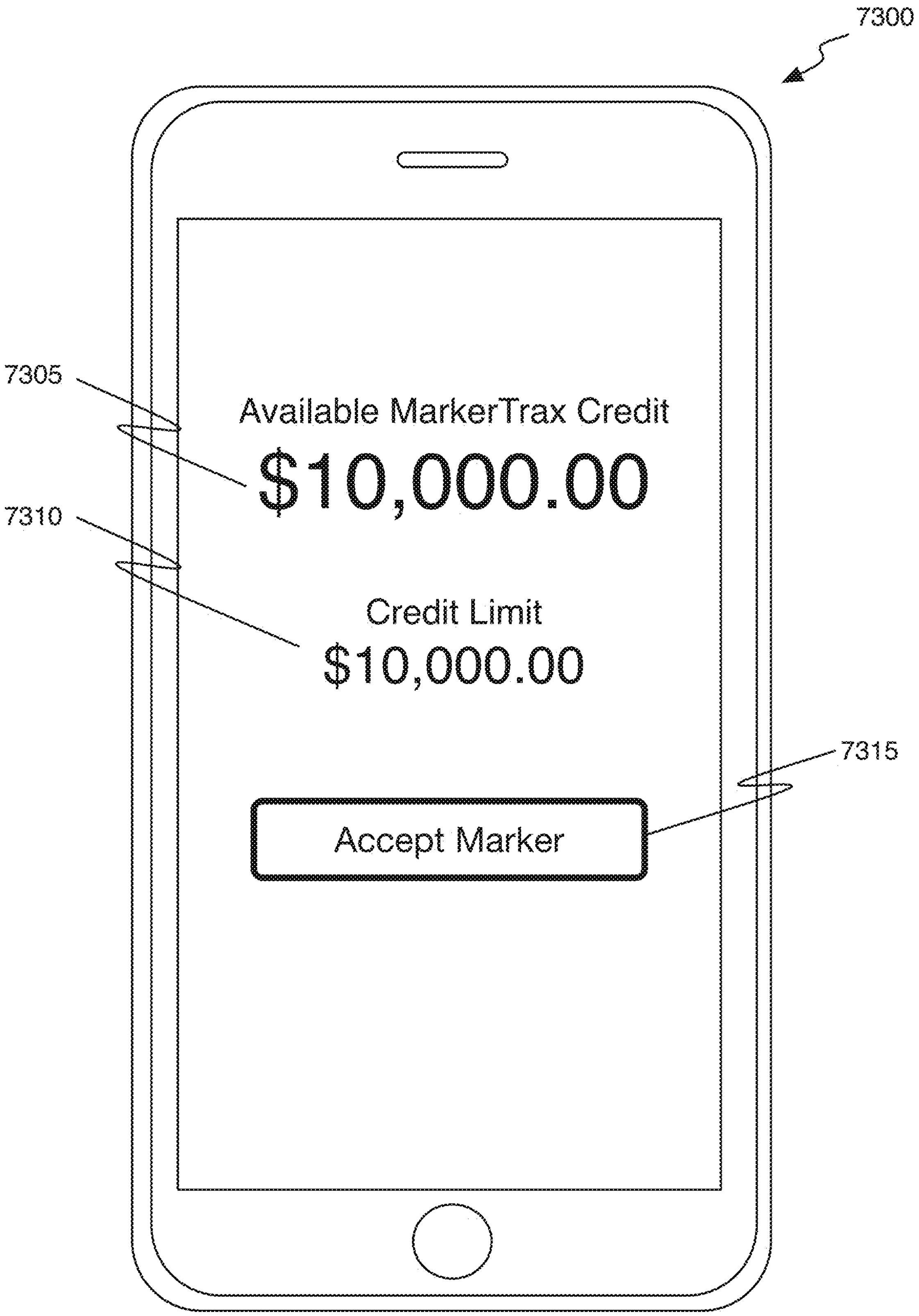
FIG. 73 is a screen capture mobile app credit account view in the credit wagering system with loan and warrantying of FIG. 2B and FIG. 3.
Figure 74:
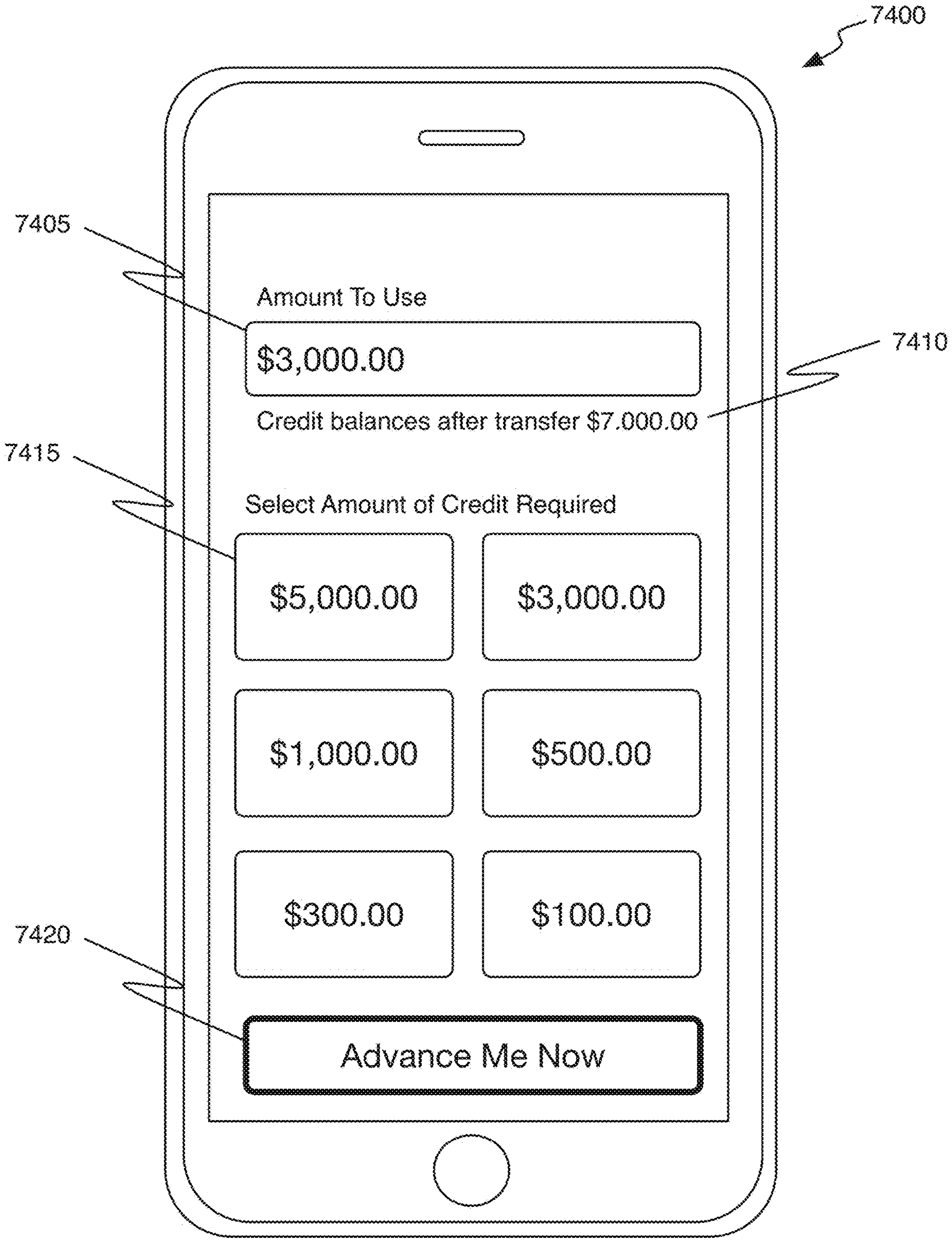
FIG. 74 is a screen capture mobile app credit advance view in the credit wagering system with loan and warrantying of FIG. 2B and FIG. 3.
Figure 75:
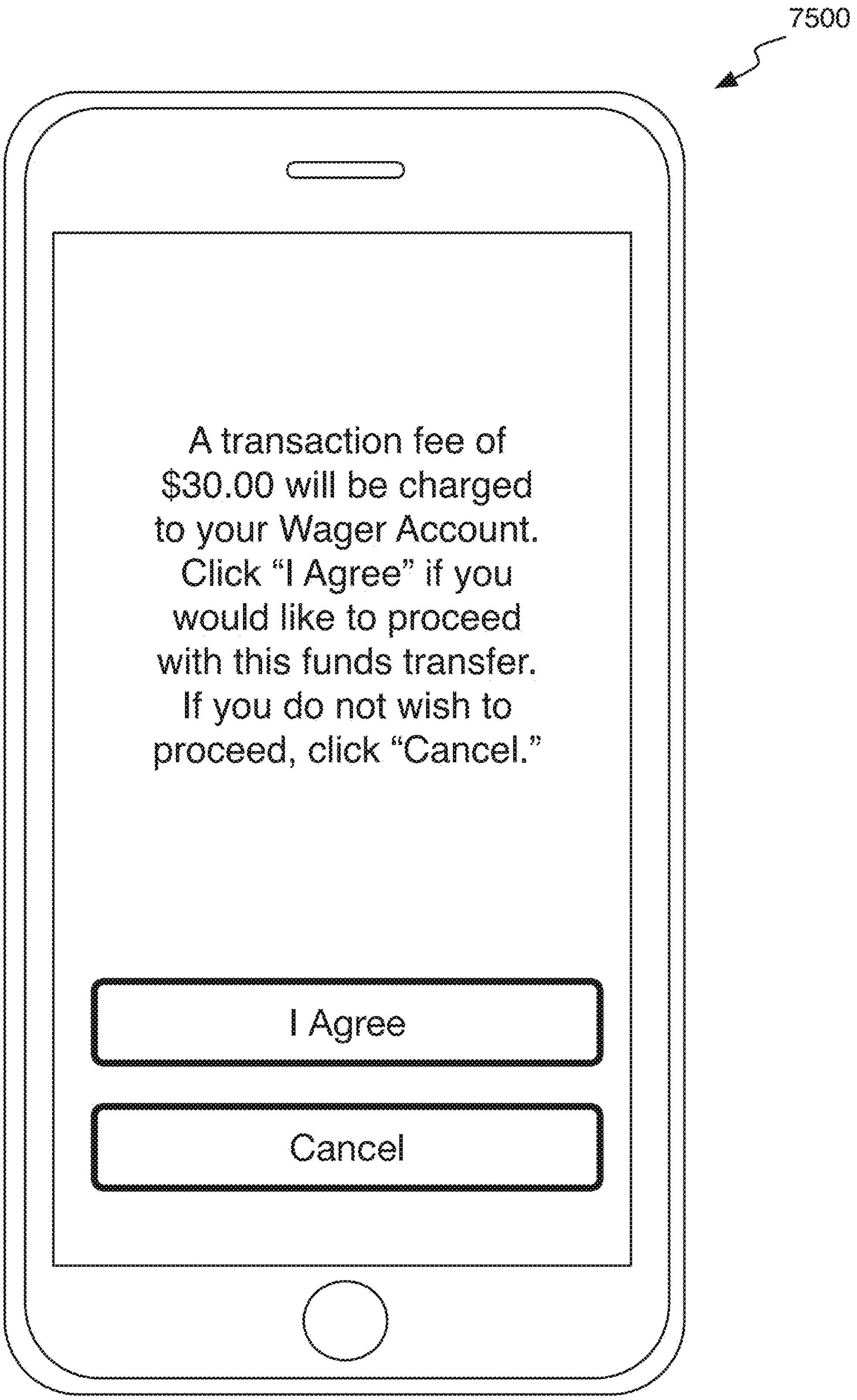
FIG. 75 is a screen capture mobile app fee acceptance view in the credit wagering system with loan and warrantying of FIG. 2B and FIG. 3.
Figure 76:
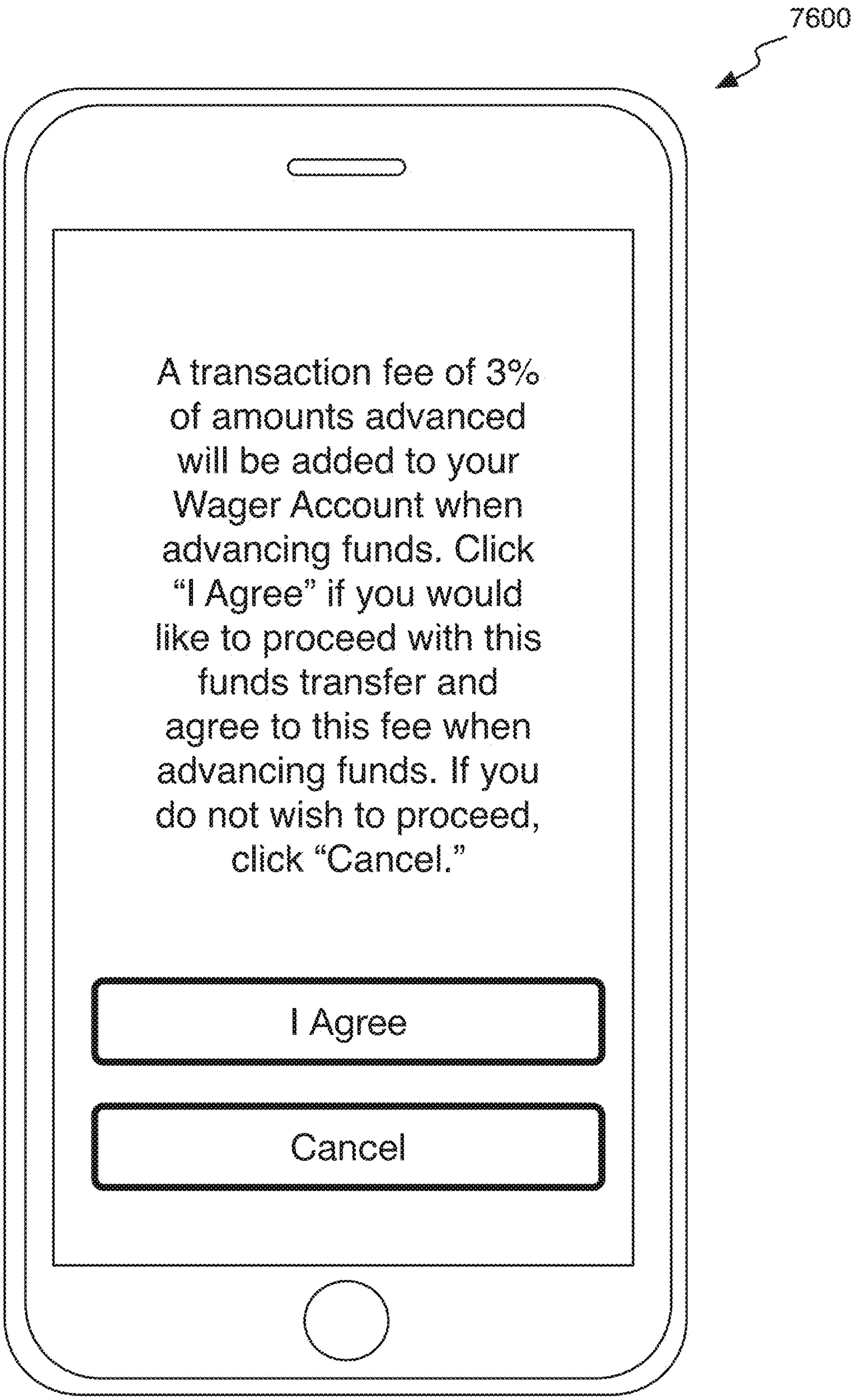
FIG. 76 is another screen capture mobile app fee acceptance view in the credit wagering system with loan and warrantying of FIG. 2B and FIG. 3.
Figure 77:
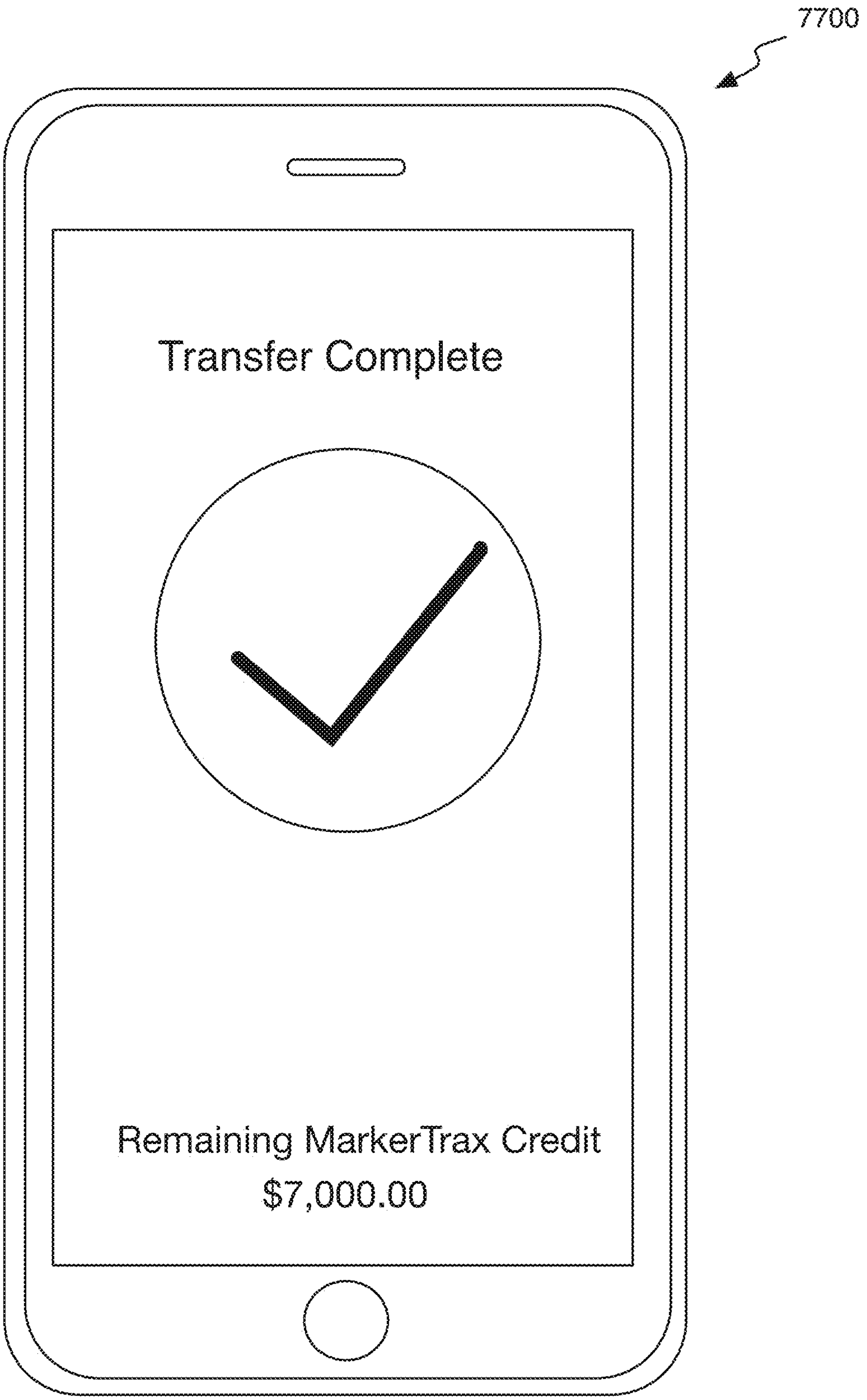
FIG. 77 is a screen capture mobile app funds transfer confirmation view in the credit wagering system with loan and warrantying of FIG. 2B and FIG. 3.

Referring now to FIG. 69 and FIG. 70, in some embodiments, upon detection of a credit request event, a credit line request view can be displayed 6900. In some embodiments, a series of authorization acknowledgement prompts can be provided, such as, for example, an acceptance of terms 7005, an acceptance of fees 7010, and an authorization to use available information to perform credit application processing activities 7015.

Referring now to FIG. 71 to FIG. 77, in some embodiments, a mobile device app provides one or more of credit request submission, credit approval notification, account access, credit access, funds advancement, fee authorization, and funds transfer confirmation. An account registration view 7100 can collect identification and authentication credential information, as well as information used in credit application processing. In some embodiments, this can include one or more of first name 7105, last name 7110, mobile number 7115, email 7120, and social security number 7125. In some instances, there is an interface to one or more of receive, scan, and transmit a driver's license 7130. In some embodiments, a series of authorization acknowledgement prompts can be provided, such as, for example, an acceptance of terms 7135, and an acceptance of fees 7140.

In some instances, a view is available confirming the authorization of a credit line 7200, which can include, for example, a credit score 7205, an authorized maximum credit amount 7210, and a control to accept the available credit line 7215. Once acceptance is detected, an interface to the credit account management service 650 (e.g., see FIG. 6) functions can be displayed 7300, providing controls to, for example, view offered available credit 7305, view the offered credit limit 7310, and accept marker 7315. Upon detection of an accept maker control event, a view can be displayed for drawing an amount of credit. Controls can include, for example, an amount to be advanced display 7405, a post-advance available credit display 7410, fixed advance amounts 7415, and an initiate advance control 7420. In some embodiments, the advance amount is immediately available for game play on a particular gaming machine. In another embodiment, the advance amount is advanced to an intermediate container, such as a unified wallet, for use in particular game play. In other embodiments, the advance amount is advance to a player account which may be cashed out in whole or in part. In certain implementations, the application of fees is triggered, at least in part, by the drawing of funds against the accepted marker. In still other embodiments, the funding amounts to an intermediate account by advances drawn against an accepted marker, may be automatically available to a player during game play at a gaming device or instance.

In some embodiments, a fixed transaction fee acceptance view is displayed 7500. In another embodiment, a percentage of amounts advanced acceptance view is displayed 7600. In some implementations, acceptance of fees, such as transactions fees, is agreed to prior to advancing amounts, such as during the setup of the player account, through acceptance of general terms of use, through a one-time acceptance prior to the first advance, or the like. In certain instances, fees are determined intermittently rather than at the moment that funds are advanced against an accepted marker. For example, fees can be calculated as a percentage of amounts advanced based on the maximum amount advanced at any given time over a twenty-four hour period.

In some implementations, upon completion of the funds transfer, a confirmation view is displayed 7700.

Figure 78:
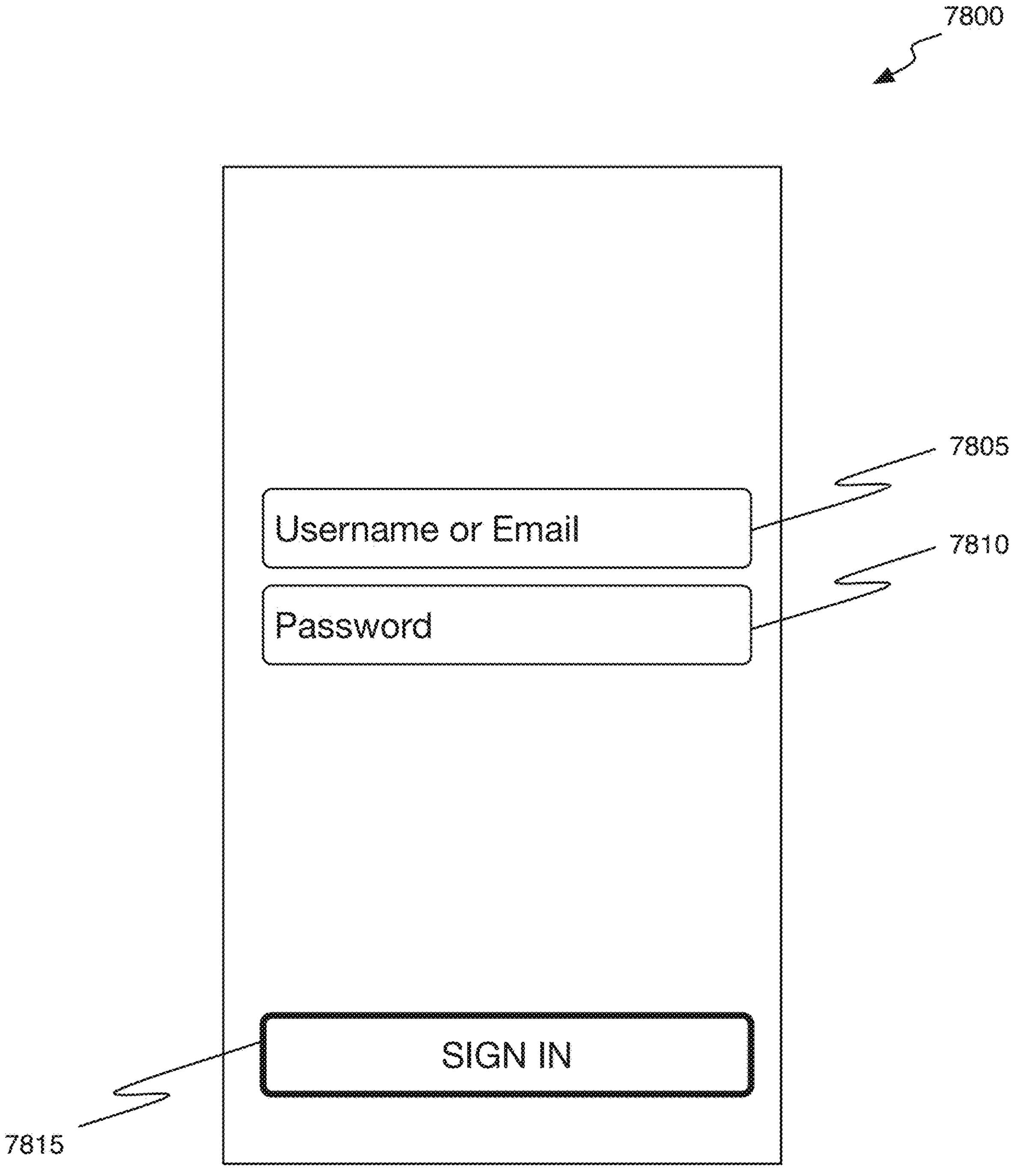
FIG. 78 is a wireframe authentication view of the operator dashboard of FIG. 3.
Figure 79:
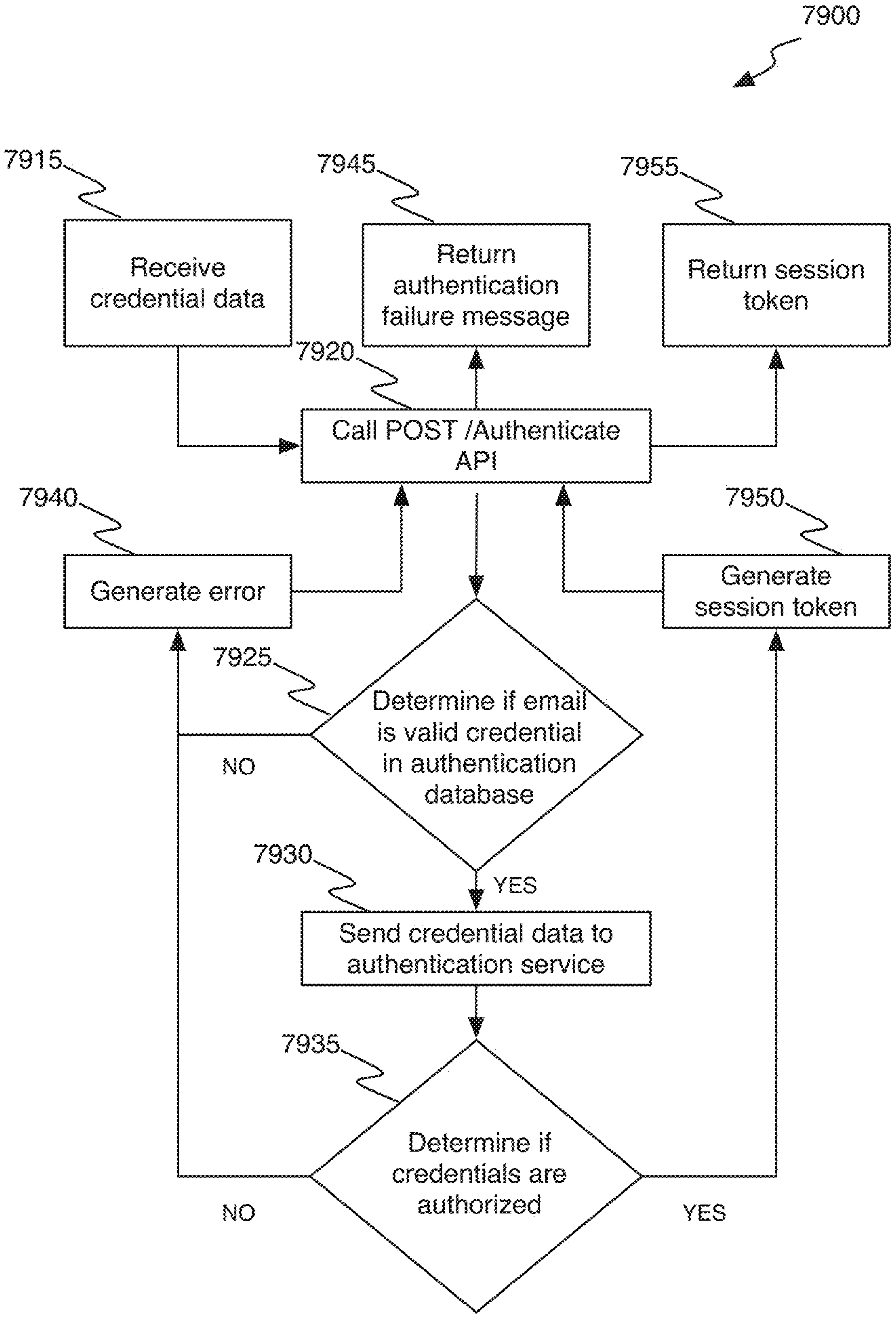
FIG. 79 is a flowchart of an authentication method by the authentication service of FIG. 3 in the credit wagering system with loan and warrantying of FIG. 2B and FIG. 3 that interfaces with the authentication view of FIG. 28.

In some embodiments, a dashboard interface 330 (e.g., see FIG. 3) provides certain services to property operators, system operators, warrantors, and the like. Referring now to FIG. 78 and FIG. 79, in some embodiments, upon initiation of the dashboard interface 330, an authentication view 7800 is displayed, with controls for the collection of authentication credentials 7805, 7810, and for the submission of collected credentials 7815. API endpoints can include, for example, POST /Authenticate and GET /Authenticate. The interface can collect authentication credentials for marshalling and transmission, such as:

Example Data Input:

{
"email":john@smith.com
"password":"password123"
"Biometric; facial recognition, thumbprint, retinal scan"
"Out of Wallet Challenge":
"Text PIN validation"
}

Upon receiving of credential data 7915, the API endpoint of POST /Authenticate is called 7920 and the data input is passed to the authentication service. The authentication service then validates and checks the authentication and user database to see if the user identification credentials are valid 7925. If the user identification credentials are verified, the authentication service determines if the password is valid for the identification credential 7930, 7935. If the credentials are valid, the authentication service generates a session token 7950. The authentication service then returns the data output along with the session token as a cookie 7955. If the credentials are not valid, the authentication service generates an error 7940. The authentication service then returns an authentication failure message 7945. A GET request uses the session token to get the user's information with the same output.

Example Data Output:

{
"id": "2",
"company_id": "1",
name": "John Smith",
"title": "Project Manager",
"email": "john@smith.com",
"role": "superadmin",
"role_display": "Super Admin",
"company": "Marker Trax",
"suspended": 0
}

Figure 80:
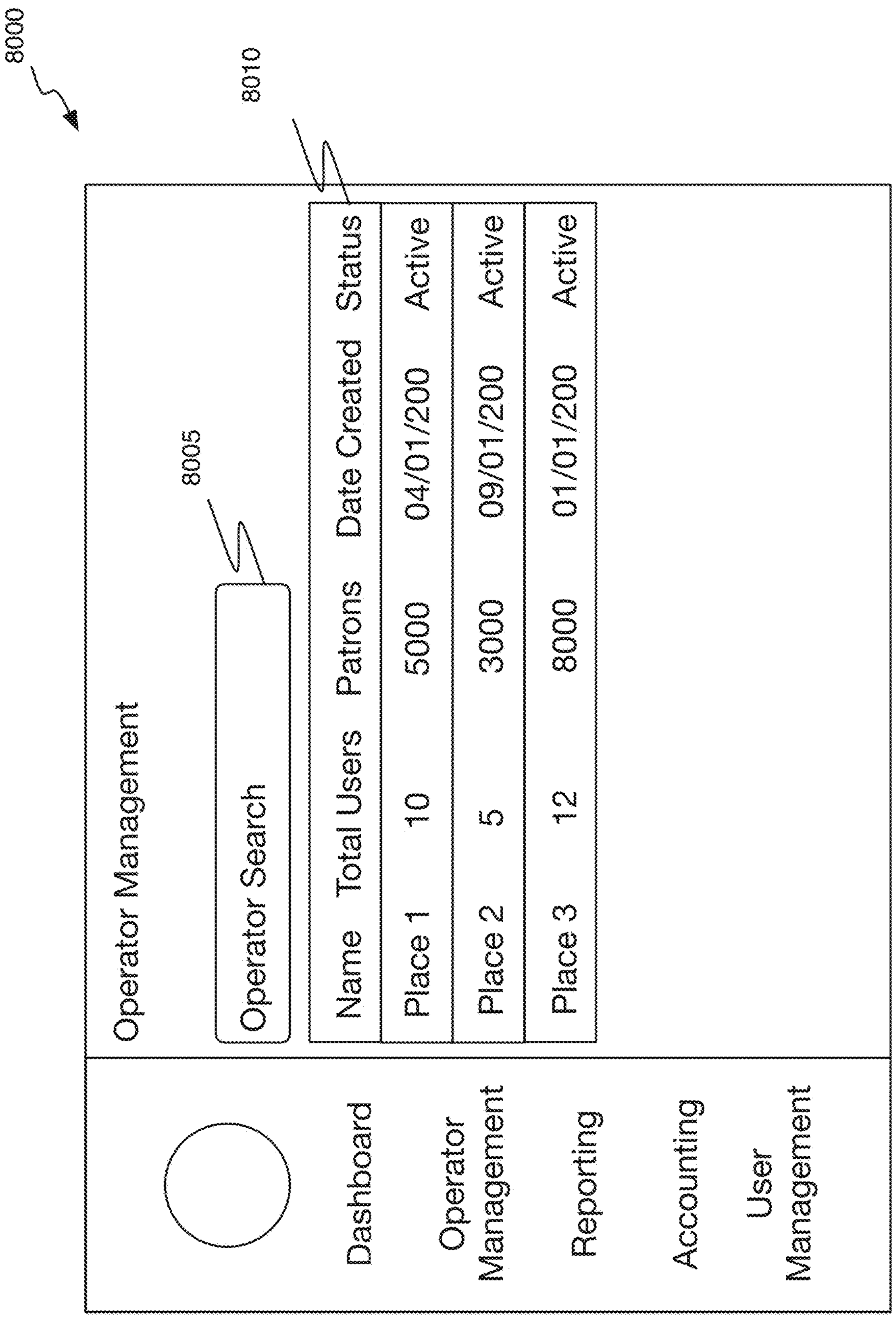
FIG. 80 is a wireframe operator listing view of the operator dashboard of FIG. 3.
Figure 81:
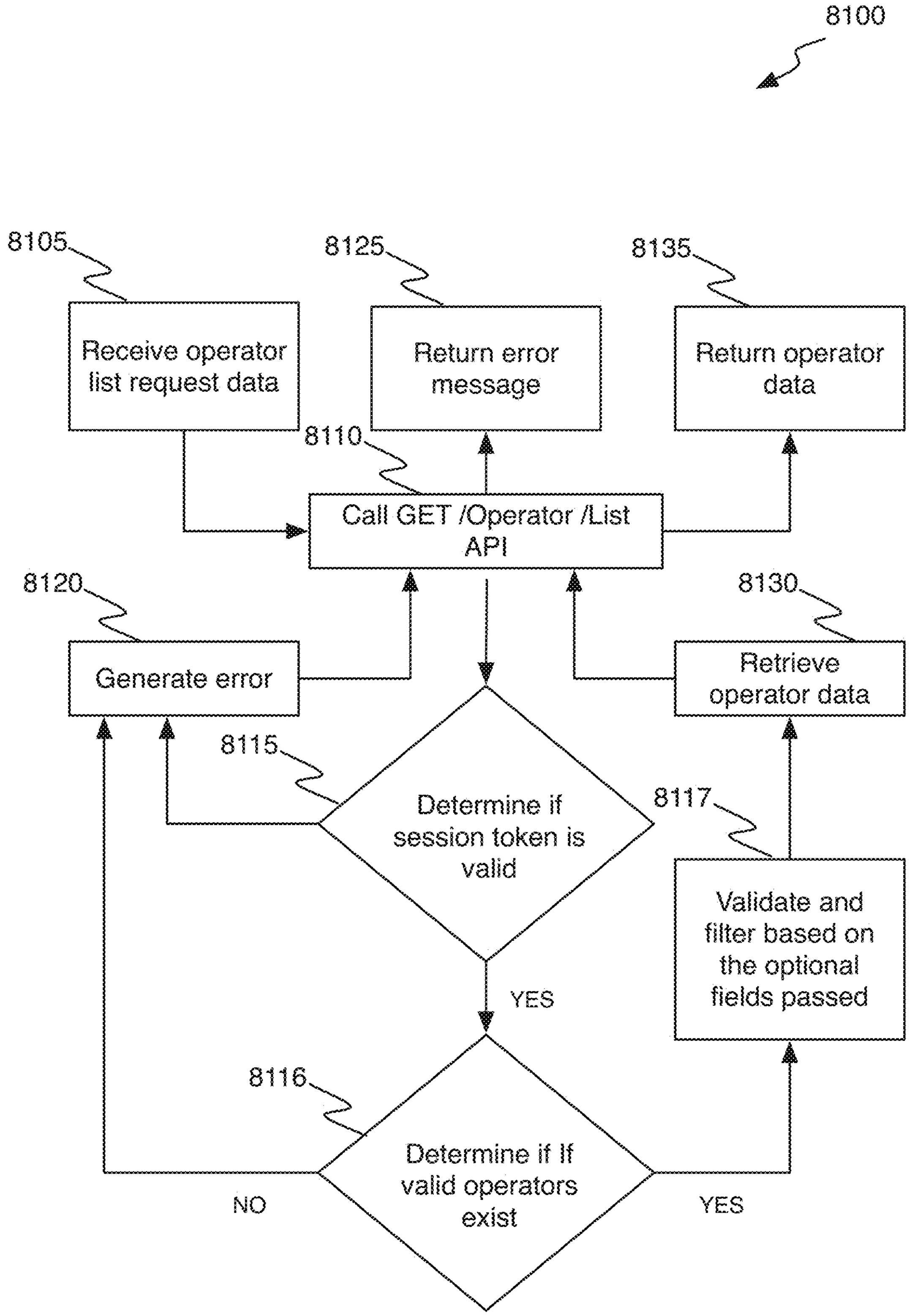
FIG. 81 is a flowchart of an operator listing method by the account services layer of FIG. 5 in the credit wagering system with loan and warrantying of FIG. 2B and FIG. 3 that interfaces with the operator listing view of FIG. 30.

Referring now to FIG. 80 and FIG. 81, in some embodiments, upon successful authentication, the dashboard interface 330 can display an operator list view 8000, with controls for searching 8005 and for listing results 8010. API endpoints can include, for example, GET /Operator/List.

Example Optional Data Input:

{
"sort": "patrons",
"direction": "DESC"
}

Upon receiving an operator list view request event 8105, the API endpoint of GET /Operator/List is called 8110 and the data input is passed to the account services layer 520 (e.g., see FIG. 5). If the session token is valid 8115, the account service then validates and checks the database for the optional fields if they were passed. If valid operators exist in the database 8116, the account services layer will validate and filter based on the optional fields passed 8117. If the operators were successfully validated. the API retrieves and returns the operator data output below 8130, 8135, otherwise an error is generated 8120 and returned 8125.

Example Data Output:

```
{
"totalCount": "2",
"queryTime": 1595521613,
"start": 0,
"limit": 10,
"sort": "patrons",
"direction": "DESC",
"filter": "",
"operators": [
  {
    id": 3,
    "display": "One Casino & Resort",
    "code": "one_casino",
    "created": 1568169919,
    "users": "2",
    "patrons": "7"
  },
  {
    "id": 2,
    "display": "Another Casino",
    "code": "another_casino",
    "created": 1568169919,
    "users": "6",
    "patrons": "4"
    }
  ]
}
```

Figure 82:
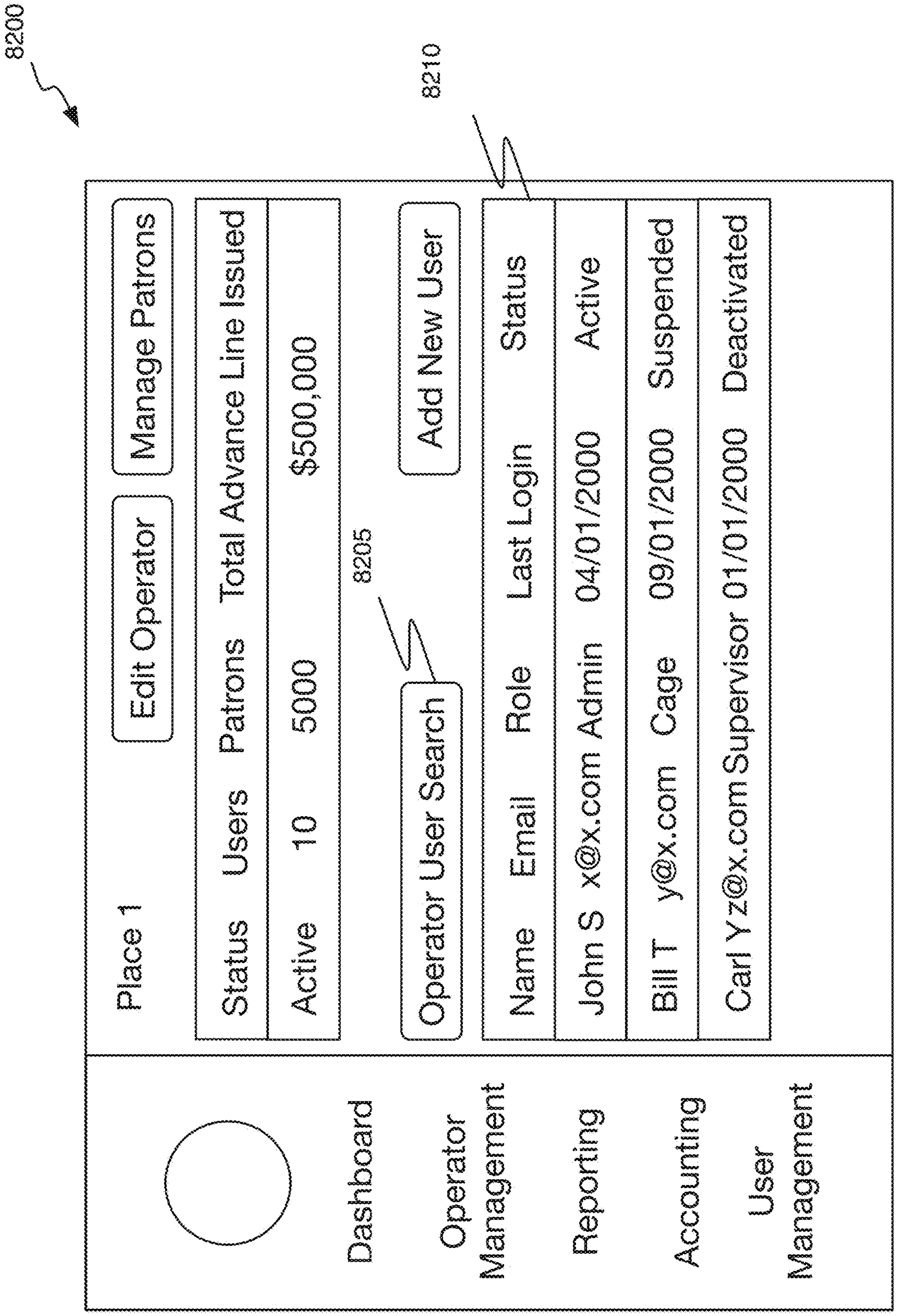
FIG. 82 is a wireframe operator detail view of the operator dashboard of FIG. 3.
Figure 83:
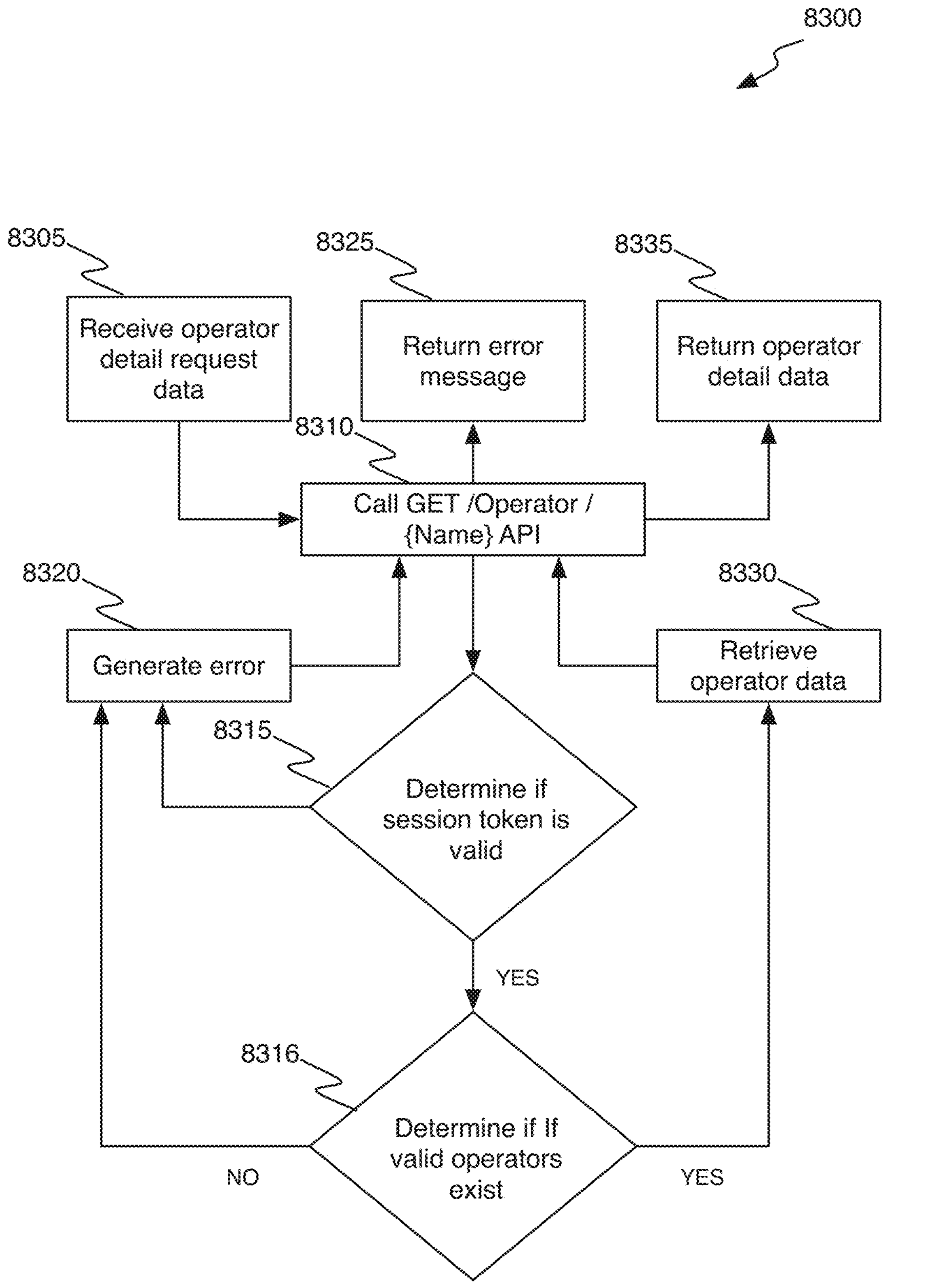
FIG. 83 is a flowchart of an operator detail method by the account services layer of FIG. 5 in the credit wagering system with loan and warrantying of FIG. 2B and FIG. 3 that interfaces with the operator detail view of FIG. 32.

Referring now to FIG. 82 and FIG. 83, in some embodiments, upon successful authentication, the dashboard interface 330 can display an operator detail view 8200, with controls for searching 8205 and for listing results 8210. API endpoints can include, for example, GET /Operator /{Name}.

Example Optional Data Input:

```
{
"sort": "patrons",
"direction": "DESC"
}
```

Upon receiving an operator detail request 8305, the API endpoint of GET /Operator /{Name} is called 8310 and the data input is passed to the account services layer 520 (e.g., see FIG. 5). If the session token is valid 8315, the account service then validates and checks the database for the optional fields if they were passed. If operator name is in the database 8316, the API retrieves and returns the operator detail data output below 8330, 8335, otherwise an error is generated 8320 and returned 8325.

Example Data Output:

```
{
    "id": 3,
```

-continued

Example Data Output:

```
    "company_type_id": 2,
    "code": "one_casino",
    "display": "One Casino & Resort",
    "created": 1568169919,
    "updated": 1568169919,
    "deleted": "0", "stats": {
    "users": "0",
  "patrons": "7",
  "total_lines": "7500"}
}
```

Figure 84:
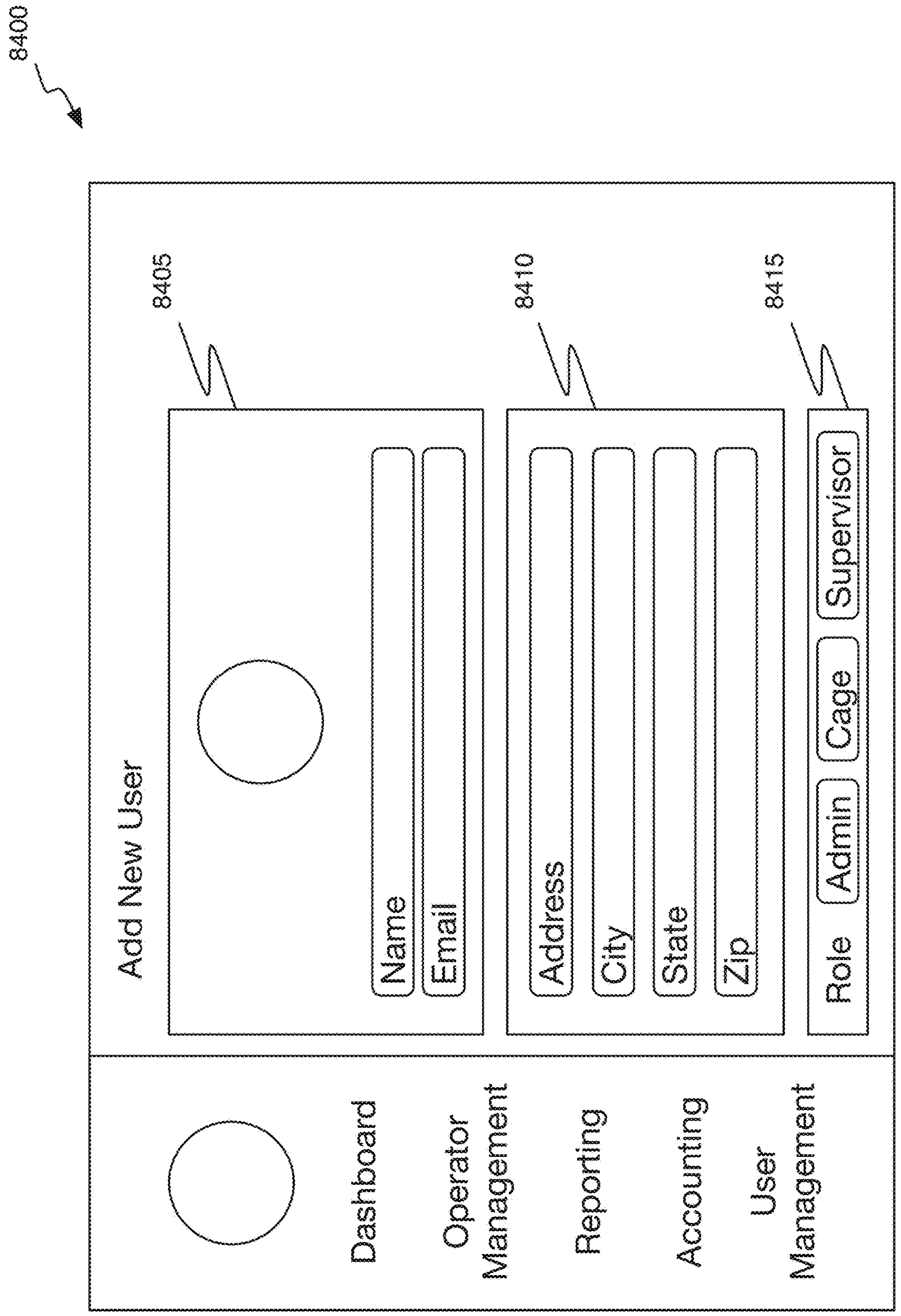
FIG. 84 is a wireframe add new user view of the operator dashboard of FIG. 3.
Figure 85:
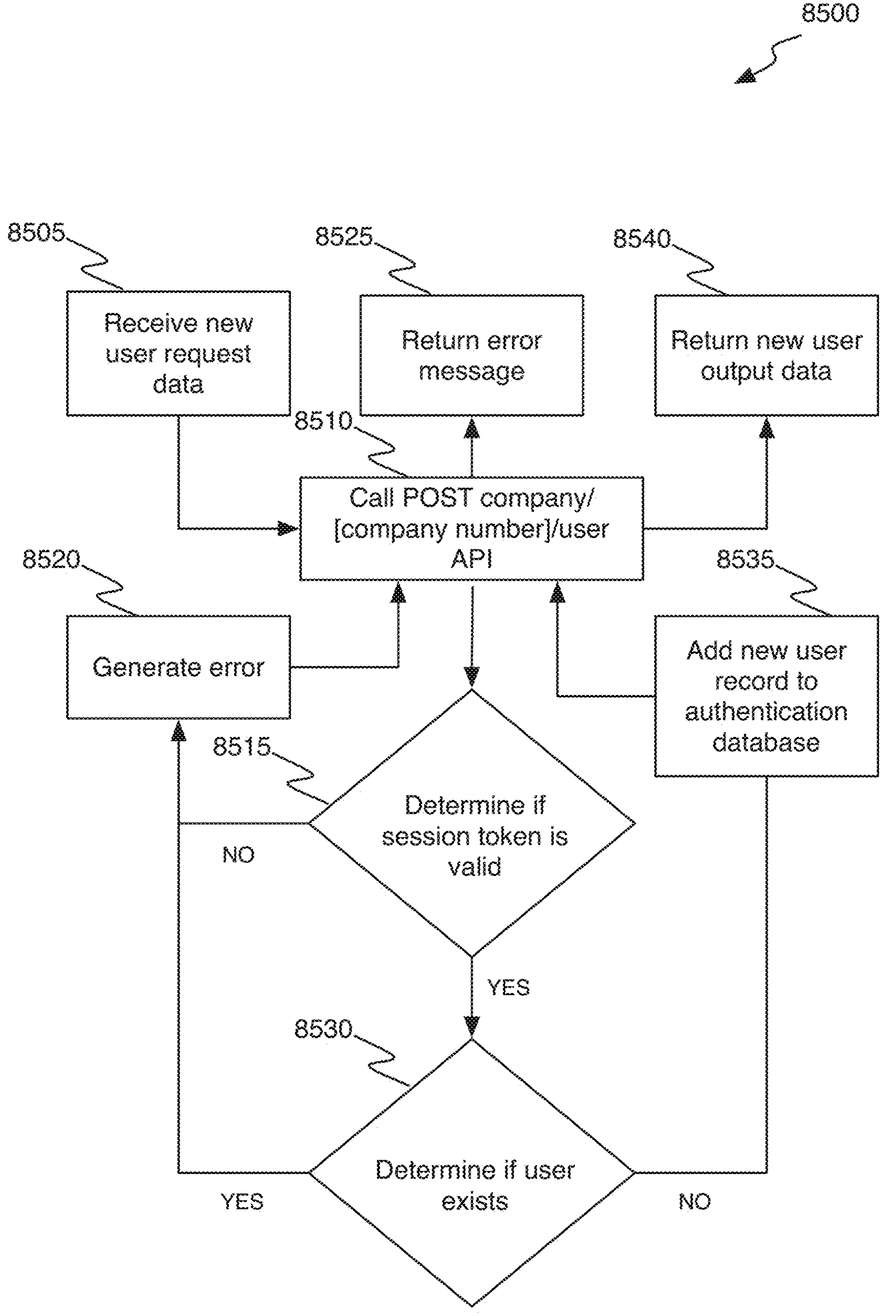
FIG. 85 is a flowchart of an add new user method by the account services layer of FIG. 5 in the credit wagering system with loan and warrantying of FIG. 2B and FIG. 3 that interfaces with the add new user view of FIG. 34.

Referring now to FIG. 84 and FIG. 85, in some embodiments, upon detection of an add user request event, the dashboard interface 330 can display an add user view 8400, with controls for collecting user metadata 8405, 8410 and user role data 8415. API endpoints can include, for example, POST company/[companyNumber]/user.

Example Data Input:

```
{
  "email": "user@markertrax.com",
  "title": "Rep",
  "name": "Some User",
  "role_id": "4"
}
```

Session token in the header of the request

Upon receiving new user request 8505, the API endpoint of POST company/[companyNumber}/user. is called 8510 and the data input is passed to the account services layer 520 (e.g., see FIG. 5). If the session token is valid 8515, the account service then validates and checks if the user already exists 8530. If the user is valid and does not already exist in the database, a new user record is added to the authentication database 8535 and output data returned 8540, otherwise an error is generated 8520 and returned 8525.

Example Data Output:

```
{
  "id": "10",
  "company_id": "3",
  "name": "Some User",
  "title": "Rep",
  "email": "user@markertrax.com",
  "role": "o_manager",
  "role_display": "Manager",
  "company": "One Casino & Resort",
  "suspended": 0
}
```

Figure 86:
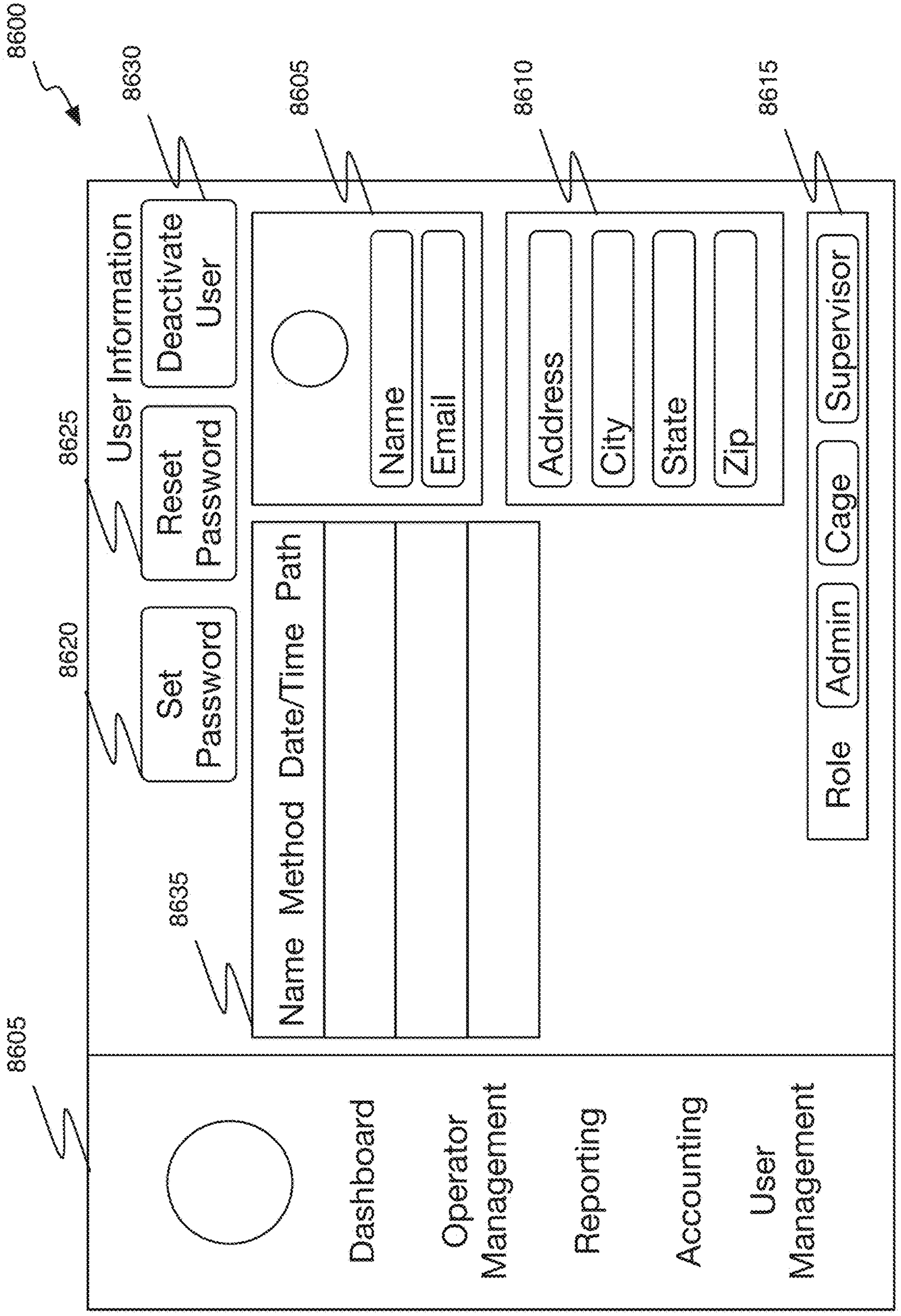
FIG. 86 is a wireframe user detail view of the operator dashboard of FIG. 3.
Figure 87:
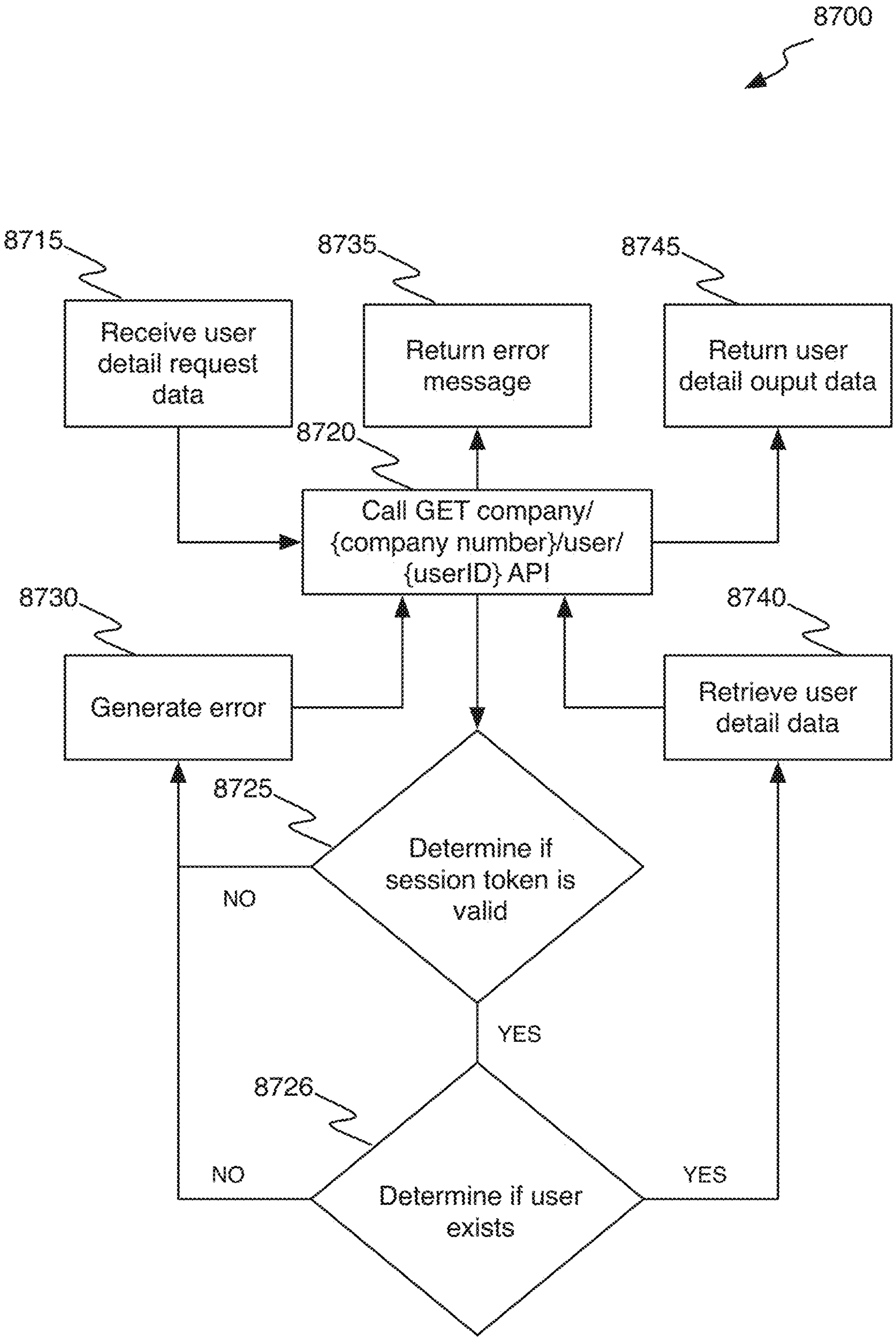
FIG. 87 is a flowchart of a user detail method by the account services layer of FIG. 5 in the credit wagering system with loan and warrantying of FIG. 2B and FIG. 3 that interfaces with the user detail view of FIG. 36.

Referring now to FIG. 86 and FIG. 87 in some embodiments, upon detection of a user detail request event, the dashboard interface 330 can display a user detail view 8600, with controls for viewing and modifying user and role data 8605, 8610, 8615, setting passwords 8620, resetting passwords 8625. setting user status 8630, and displaying user activity history 8635. API endpoints can include, for example, GET company/{company number}/user/{userID}. Example Input:

The companyNumber and userId are passed as URL parameters as a part of the GET request Session token in the header of the request Upon receiving user detail request 8715, the API endpoint of GET company/{company number}/user/{userID} is called 8720 and the data input is passed to the account services layer 520 (e.g., see FIG. 5). If the session token is valid 8725, the account service then validates and checks if the user exists in the database 8726, the API retrieves and returns the user detail data output below 8740, 8745, otherwise an error is generated 8730 and returned 8735.

Example Data Output:

```
{
  "id": "10",
  "company_id": "3",
    "name": "Some User",
    "title": "Rep",
    "email": "user@markertrax.com",
    "role": "o_manager", "role_display": "Manager",
    "company": "One Casino & Resort", "suspended": 0
{
```

Figure 88:
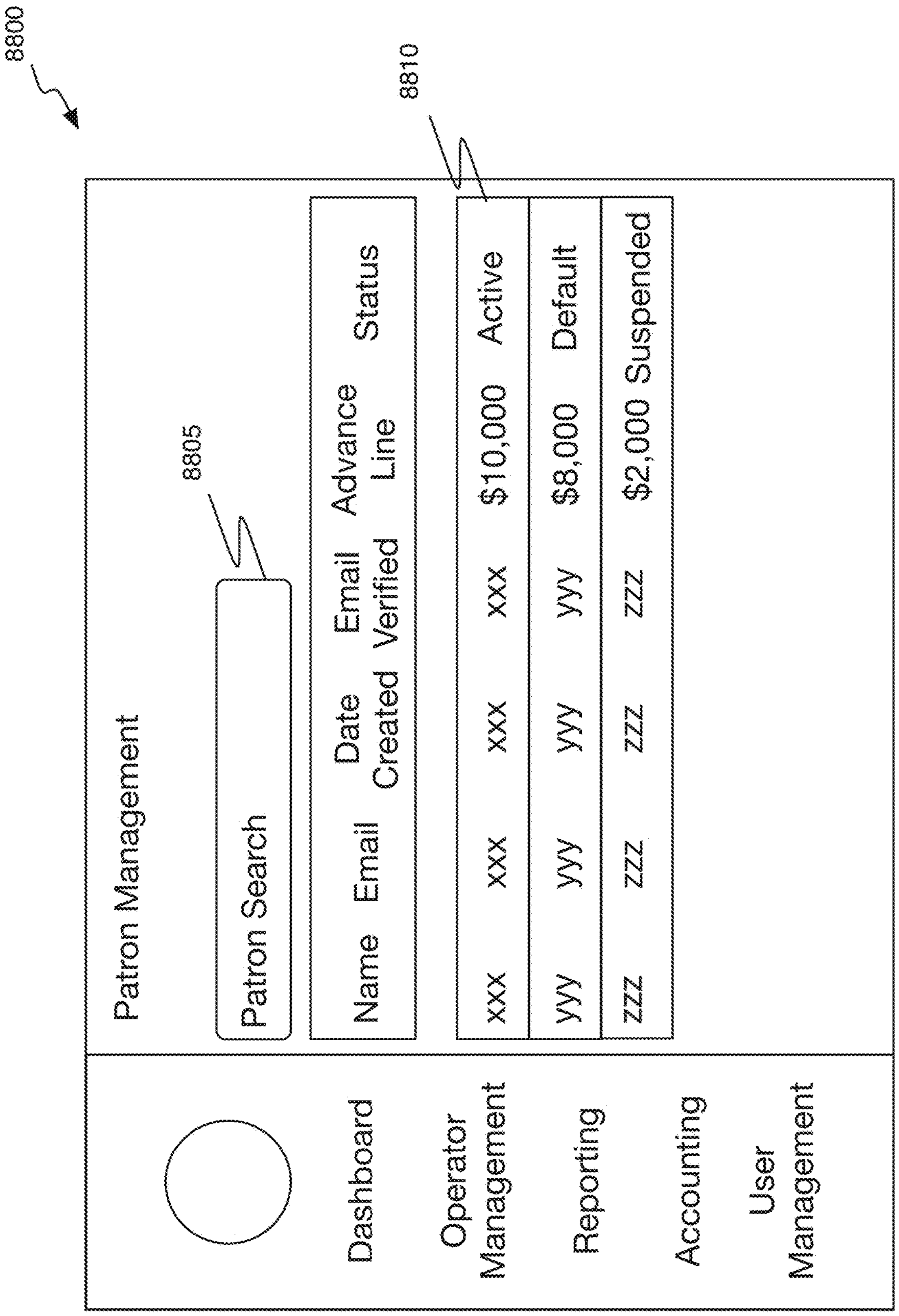
FIG. 88 is a wireframe patron listing view of the operator dashboard of FIG. 3.
Figure 89:
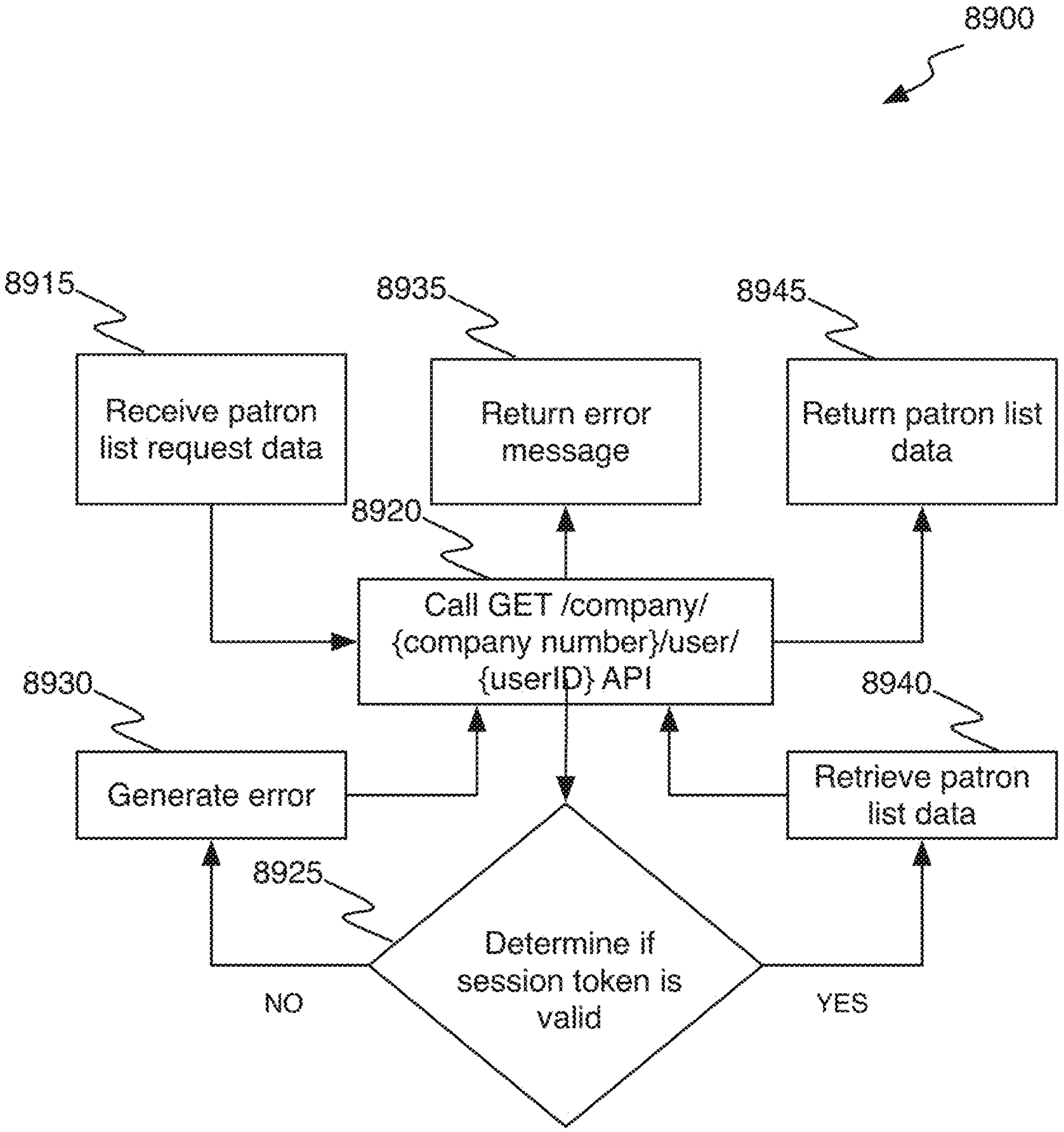
FIG. 89 is a flowchart of a patron listing method by the account services layer of FIG. 5 in the credit wagering system with loan and warrantying of FIG. 2B and FIG. 3 that interfaces with the patron listing view of FIG. 38.

Referring now to FIG. 88 and FIG. 89 in some embodiments, upon detection of a patron listing view request, the dashboard interface 330 can display a patron list view 8800, with controls for searching 8805 and for listing results 8810. API endpoints can include, for example, GET /company/{companyNumber}/patron/list.

Example Input:

```
{
  {companyNumber} as a URL parameter
}
```

Session token in the header of the request

Upon receiving a patron listing view request 8915, the API endpoint of GET /company/{companyNumber}/patron/list is called 8920 and the data input is passed to the account services layer 520 (e.g., see FIG. 5). If the session token is valid 8925. Patron records, if any exist, associated with the company number/company id are retrieved 8940 and the output data returned 8945, otherwise an error is generated 8930 and returned 8935.

Example Output:

```
{
  "totalCount": "4",
  "queryTime": 1595541008,
  "start": 0,
  "limit": 10, "sort": "name",
  "direction": "ASC",
  "filter": "", "patrons": [
    {
      "id": "48",
      "property_id": "1",
      "player_card_program_id": "1",
      "player_card_number": "123456789", "email":
      "john@gmail.com",
      "created": 1593154404,
      "email_verified": 1,
      "name_first": "John",
      "name_last": "Smith",
      "name": "John Smith"
    }
    {
      "id": "46",
      "property_id": "1",
      "player_card_program_id": "1",
      "player_card_number": "133456789",
      "email": "user@markertrax.com",
       "created": 1592550115,
      "email_verified": 1,
```

-continued

Example Output:

```
      "name_first": "Johnny",
      "name_last": "Smith",
      "name": "Johnny Smith"
    }
    {
      "id": "47",
      "property_id": "1",
      "player_card_program_id": "1",
      "player_card_number": "143456789",
      "email": "person@markertrax.com",
      "created": 1592827434,
      "email_verified": 0, "name_first": "Jon",
      "name_last": "Doe",
      "name": "Jon Doe"
    }
    {
    "id": "45",
    "property_id": "1",
    "player_card_program_id": "1",
     "player_card_number": "153456789",
    "email": "wilson@markertrax.com",
    "created": 1592006518,
    "email_verified": 1,
    "name_first": "Wilson",
    "name_last": "Smith",
    "name": "Wilson Smith"
    }
  [
}
```

Figure 90:
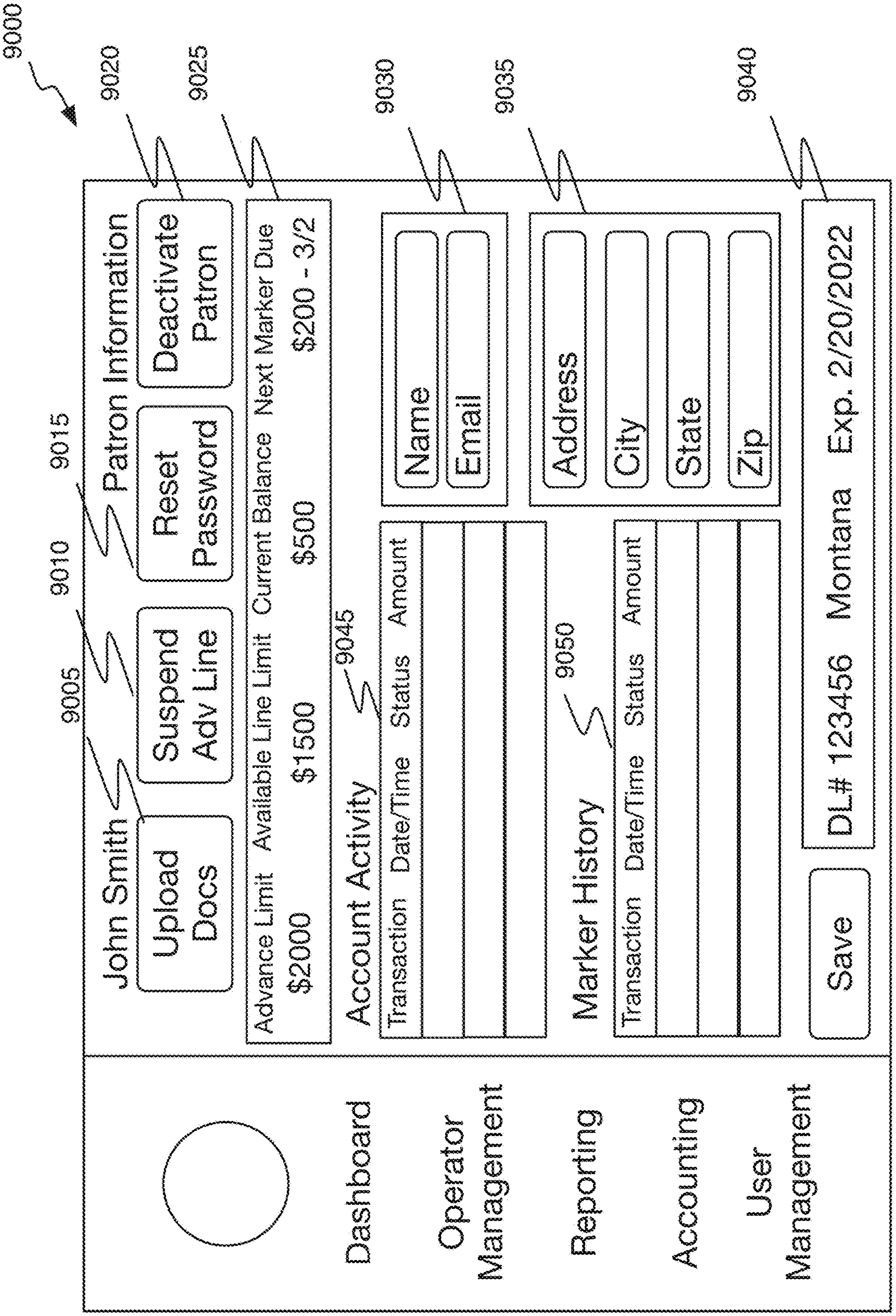
FIG. 90 is a wireframe patron detail view of the operator dashboard of FIG. 3.
Figure 91:
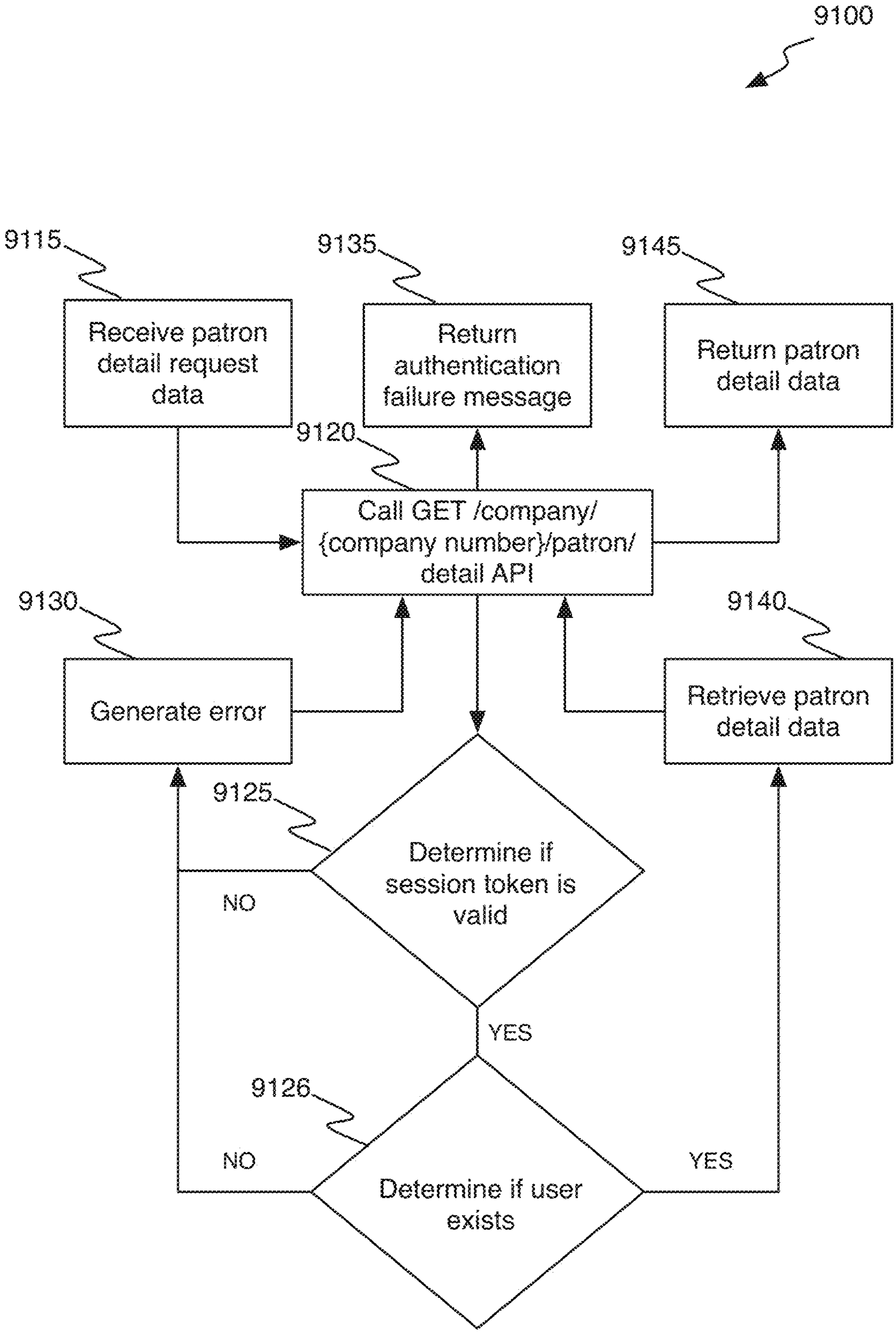
FIG. 91 is a flowchart of a patron detail method by the account services layer of FIG. 5 in the credit wagering system with loan and warrantying of FIG. 2B and FIG. 3 that interfaces with the patron detail view of FIG. 40.

Referring now to FIG. 90 and FIG. 91 in some embodiments, upon detection of a patron detail request, the dashboard interface 330 can display a patron detail view 9000, with controls for uploading documents 9005, changing advance line status 9010, resetting passwords 9015, changing patron status 9020, displaying market and credit line status 9025, displaying patron metadata 9030, 9035, 9040, displaying account activity 9045, and displaying marker history 9050. API endpoints can include, for example, GET /company/{companyNumber}/patron/{patronId}.

Example Input:

{companyNumber} and {patronId} as the URL parameters for the request Session token in the header of the request Upon receiving patron detail request 9115, the API endpoint of GET company/{company number}/user/{userID} is called 9120 and the data input is passed to the account services layer 520 (e.g., see FIG. 5). If the session token is valid 9125, the account service then validates and checks if the patron exists in the database 9126, the API retrieves and returns the patron detail data output below 9140, 9145, otherwise an error is generated 9130 and returned 9135.

Example Output:

```
{
  "id": "14",
  "property_id": "2",
  "player_card_program_id": "2",
  "player_card_number": "123456789",
  "email": "john@markertrax.com",
  "identity_verified": null,
  "email_verified": 0,
  "name_first": "John",
  "name_last": "Smith", "name": "John Smith",
  "date_of_birth": "1990-01-01", "name_middle": null,
  "line1": "123 Main St", "line2": "",
  "line3": null,
  "street": "123 Main St ",
  "sub_region": null,
```

-continued

| Example Output: |
| --- |
| "city": "Las Vegas",<br>"region": "NV",<br>"postal_code": "89123",<br>"sorting_code": null,<br>"country_code": "US",<br>"mobile": "+7021234567",<br>"mobile_verified": 1,<br>"drivers_license_verified": null,<br>"drivers_license_number": null,<br>"drivers_license_expiration": null,<br>"drivers_license_state": null,<br>"advance_line_type_code": null,<br>"advance_line_type_display": null,<br>"advance_line": null,<br>"bank_linked": "0"<br>} |

Many different systems can implement the method of the credit wagering system with loan and warrantying. Moreover, the steps of the present method could occur at different parts of a system, at a single part of a system, in parallel across the system, or in any other fashion. Moreover, certain embodiments of the credit wagering system with loan and warrantying are described with reference to methods, apparatus (systems) and computer program products that can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction that implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, circuits, and algorithm steps described in connection with the embodiments disclosed herein can be implemented as electronic hardware, computer software, or combinations of both. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Figure 93:
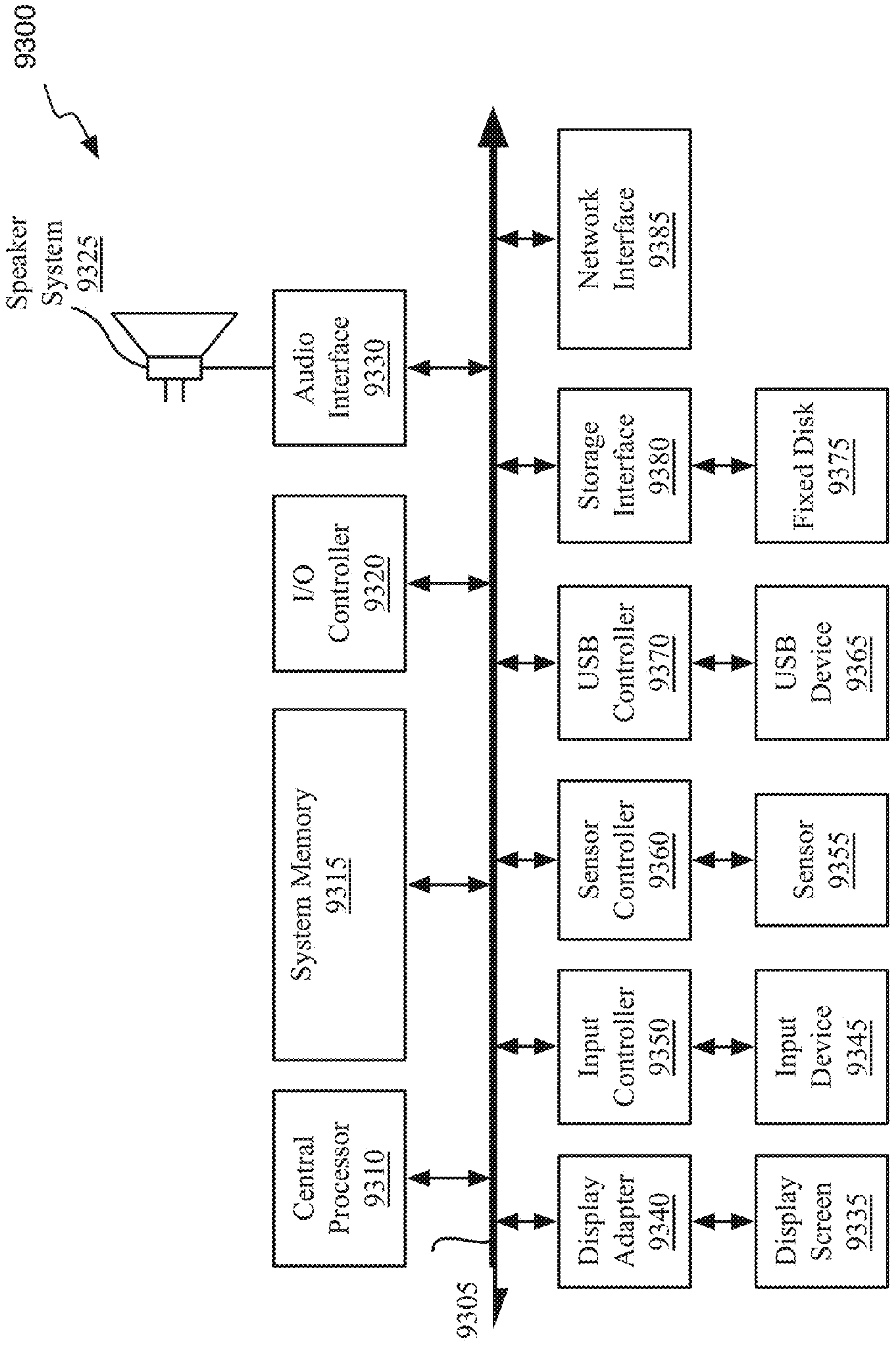
FIG. 93 is a block diagram of a computer system suitable for implementing the present systems and methods of FIG. 1.

Referring now to FIG. 93, in one configuration, the credit wager system with loan and warrantying devices 9300 include a bus 9305 which interconnects major subsystems of computing device, 112, such as a central processor 9310, a system memory 9315 (typically RAM, but which may also include ROM, flash RAM, or the like), an input/output controller 9320, an external audio device, such as a speaker system 9325 via an audio output interface 9330, an external device, such as a display screen 9335 via display adapter 9340, an input device 9345 (e.g., remote control device interfaced with an input controller 9350), one or more USB devices 9365 (interfaced with a USB controller 9370), and a storage interface 9380. In some instances, the computing device 112 includes one or more sensor s 9355 connected to bus 9305 through a sensor controller 9360 and a network interface 9385 (coupled directly to bus 9305).

Bus 9305 allows data communication between central processor 9310 and system memory 9315, which may include read-only memory (ROM) or flash memory (neither shown), and random access memory (RAM) (not shown), as previously noted. The RAM is generally the main memory into which the operating system and logic instructions are loaded. The ROM or flash memory may contain, among other code, the Basic Input-Output system (BIOS) which controls basic hardware operation such as the interaction with peripheral components or devices. Instructions resident with the credit wager system with loan and warrantying computing devices are generally stored on and accessed via a non-transitory computer readable medium, such as a hard disk drive (e.g., fixed disk 9375) or other storage medium. Additionally, applications may be in the form of electronic signals modulated in accordance with the application and data communication technology when accessed via interface 9385.

Storage interface 9380, as with the other storage interfaces of controller 9300, may connect to a standard computer readable medium for storage and/or retrieval of information, such as a fixed disk drive 9375. Fixed disk drive 9375 may be a part of computing device 9300 or may be separate and accessed through other interface systems. Network interface 9385 may provide a direct connection to a remote server via a direct network link to the Internet via a POP (point of presence). Network interface 9385 may provide such connection using wireless techniques, including digital cellular telephone connection, Cellular Digital Packet Data (CDPD) connection, digital satellite data connection, or the like. In some embodiments, one or more sensors connect to computing device 9300 wirelessly via network interface 9385.

Many other devices or subsystems (not shown) may be connected in a similar manner. Conversely, all of the devices shown in FIG. 93 need not be present to practice the present systems and methods. The devices and subsystems may be interconnected in different ways from that shown in FIG. 93. The aspect of some operations of a system such as that shown in FIG. 93 are readily known in the art and are not discussed in detail in this application. Computer instructions to implement the present disclosure may be stored in a non-transitory computer-readable medium such as one or more of system memory 9320 or fixed disk 9375. The operating system provided on computing device 9300 may be, for example, iOS™, ANDROID™, MS-WINDOWS™ UNIX™ LINUX™, OSX™, or another known operating system.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially. Moreover, in certain embodiments, acts or events can be performed on alternate tiers within the architecture. Alternatively, the gaming devices can be organized in alternate communication configurations such as daisy chaining.

The foregoing is a detailed description of some embodiments and aspects of this specification and is not intended to be limiting. Many other embodiments are possible and within the skill of those in the art.

We claim:

1. An automated wager gaming management computer system comprising a processor and a memory device that stores a plurality of instructions, which, when executed by the processor, cause the processor to provide for an operator, in combination and in association with one or more wager games provided by the operator to one or more game players on a plurality of gaming machines:

(1) by the automated wager gaming management computer system, obtaining player-specific information from a game player among the one or more game players in a gaming management app display on a mobile device in electronic communication with the automated wager gaming management computer system;

(2) authenticating, by an authentication service of the automated wager gaming management computer system, the obtained player-specific information with player information from an authentication/user database to verify that the obtained player-specific information corresponds to a valid player, comprising:

(a) generating a session token with the gaming management app on the mobile device;

(b) obtaining, by the authentication service of the automated wager gaming management computer system, a geographical location of the session token from the mobile device, which geographical location is generated in response to the session token; and (c) determining that the session token and the geographical location are valid, including by verifying that the geographical location corresponds to a specific geolocation; and (d) setting an authentication status indication if the session token and the geographical location are valid; and (3) when both (i) the authentication status indication exists and (ii) the game player lacks cashable credit on the plurality of gaming machines, establishing a communication session from the automated wager gaming management computer system to a selected gaming machine of the plurality of gaming machines and transmitting machine control messages via the communication network to place the selected gaming machine in a play-authorized state that accepts wager inputs and disables a payout function of the selected gaming machine.

2. The automated wager gaming management computer system of claim 1, wherein the communication session is established from the automated wager gaming management computer system to a smart interface board (SMIB) operatively coupled to the selected gaming machine.

3. The automated wager gaming management computer system of claim 1, wherein the communication session includes a serial-to-TCP/IP or UDP communication protocol.

4. The automated wager gaming management computer system of claim 1 further comprising, by the automated wager gaming management computer system through the gaming management app, offering the game player an opportunity to determine an amount of credit to be used in a gaming session.

5. The automated wager gaming management computer system of claim 1 further comprising, by the automated wager gaming management computer system through the gaming management app, providing a direct interface between the gaming management app and a banking app of the game player.

6. The automated wager gaming management computer system of claim 5 wherein the direct interface provides an automatic transfer of funds from a bank account linked to the banking app and to the operator.

7. The automated wager gaming management computer system of claim 5 wherein the direct interface provides an automatic transfer of funds won by the game player from the operator to a bank account linked to the banking app.

8. The automated wager gaming management computer system of claim 7 wherein the automatic transfer of funds is limited to any amount of funds by which winnings of the game player exceed any amount of credit extended to the game player.

9. The automated wager gaming management computer system of claim 1 further comprising, by the automated wager gaming management computer system through the gaming management app, displaying a range of credit scores and credit limits to the game player.

10. An automated wager gaming management computer system comprising a processor and a memory device that stores a plurality of instructions, which, when executed by the processor, cause the processor to provide for an operator, in combination and in association with one or more wager games provided by the operator to one or more game players on a plurality of gaming machines:

(1) by the automated wager gaming management computer system, obtaining player-specific information from a game player among the one or more game players in a gaming management app display on a mobile device in electronic communication with the automated wager gaming management computer system;

(2) comparing, by an authentication service of the automated wager gaming management computer system, the obtained player-specific information with player information from an authentication/user database to verify that the obtained player-specific information corresponds to a valid player, comprising:

(a) generating a session token with the gaming management app on the mobile device;

(b) obtaining, by the authentication service of the automated wager gaming management computer system, a geographical location of the session token from the mobile device, which geographical location is generated in response to the session token; and (c) determining that the session token and the geographical location are valid; and (3) automatically enabling the plurality of gaming machines (a) to provide access to the game player to play a wager game among the one or more wager games on a gaming machine of the plurality of gaming machines when both (i) the session token and the geographical location are valid, and (ii) the game player lacks cashable credit on the plurality of gaming machines, and (b) to deny access to play the wager game when both (i) one or both of the session token and the geographical location are invalid, and (ii) the game player lacks cashable credit on the plurality of gaming machines.

11. The automated wager gaming management computer system of claim 10 further comprising, by the automated wager gaming management computer system through the gaming management app, displaying a credit limit to the game player.

12. The automated wager gaming management computer system of claim 10 further comprising, by the automated wager gaming management computer system through the gaming management app, offering the game player an opportunity to accept a processing fee.

13. The automated wager gaming management computer system of claim 10 further comprising, by the automated wager gaming management computer system through the gaming management app, offering the game player an opportunity to determine an amount of credit to be used in a gaming session.

14. The automated wager gaming management computer system of claim 10 further comprising, by the automated wager gaming management computer system through the gaming management app, providing a direct interface between the gaming management app and a banking app of the game player.

15. The automated wager gaming management computer system of claim 14 wherein the direct interface provides an automatic transfer of funds from a bank account linked to the banking app and to the operator.

16. The automated wager gaming management computer system of claim 14 wherein the direct interface provides an automatic transfer of funds won by the game player from the operator to a bank account linked to the banking app.

17. The automated wager gaming management computer system of claim 16 wherein the automatic transfer of funds is limited to any amount of funds by which winnings of the game player exceed any amount of credit extended to the game player.

18. The automated wager gaming management computer system of claim 10 further comprising, by the automated wager gaming management computer system through the gaming management app, displaying a range of credit scores and credit limits to the game player.

* * * * *